US011777151B2

(12) United States Patent
Elfering et al.

(10) Patent No.: US 11,777,151 B2
(45) Date of Patent: Oct. 3, 2023

(54) ARRANGEMENTS FOR INHIBITING INTRUSION INTO BATTERY PACK ELECTRICAL COMPONENTS

(71) Applicant: MILWAUKEE ELECTRIC TOOL CORPORATION, Brookfield, WI (US)

(72) Inventors: James P. Elfering, Antioch, IL (US); Cameron R. Schulz, Milwaukee, WI (US); Ryan B. Jipp, Brookfield, WI (US); Samuel Sheeks, Germantown, WI (US); Kyle J. Radovich, West Bend, WI (US); Michael Kolden, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/339,008

(22) Filed: Jun. 4, 2021

(65) Prior Publication Data

US 2021/0296726 A1 Sep. 23, 2021

Related U.S. Application Data

(63) Continuation of application No. 16/690,337, filed on Nov. 21, 2019, now Pat. No. 11,031,651, which is a (Continued)

(51) Int. Cl.
*H01M 50/213* (2021.01)
*H01M 50/24* (2021.01)
(Continued)

(52) U.S. Cl.
CPC ..... *H01M 10/425* (2013.01); *H01M 10/4257* (2013.01); *H01M 50/213* (2021.01);
(Continued)

(58) Field of Classification Search
CPC .... H01M 50/24; H01M 50/10; H01M 50/183; H01M 50/543; H01M 50/147;
(Continued)

(56) References Cited

U.S. PATENT DOCUMENTS 3,944,432 A 3/1976 Brinkmann et al.
4,252,206 A 2/1981 Burkholder et al.
(Continued)

FOREIGN PATENT DOCUMENTS

CN 205900714 U 6/1997
CN 200976370 Y 11/2007
(Continued)

OTHER PUBLICATIONS

International Search Report and Written Opinion for Application No. PCT/US2018/037339 dated Oct. 2, 2018 (17 pages).
(Continued)

*Primary Examiner* — Imran Akram
(74) *Attorney, Agent, or Firm* — Michael Best & Friedrich LLP

(57) ABSTRACT

A battery pack and a method of assembling a battery pack. The battery pack may include an outer housing; a cell module supportable by the outer housing, the cell module including a module housing, a plurality of battery cells supported by the module housing, the battery cells having an energy of at least about 60. Watt-hours, a controller operable to control an operation of the battery pack, a conductive strap electrically connected to at least one of the battery cells, a weld strap connected between the controller and the conductive strap, and a terminal electrically connected to the battery cells and operable to connect the battery cells to an electrical device for power transfer; and a vapor-deposited, hydrophobic nano coating applied to at least a portion of the cell module.

30 Claims, 90 Drawing Sheets

Related U.S. Application Data continuation of application No. 15/974,151, filed on May 8, 2018, now Pat. No. 10,950,912.

(60) Provisional application No. 62/638,698, filed on Mar. 5, 2018, provisional application No. 62/586,832, filed on Nov. 15, 2017, provisional application No. 62/569,207, filed on Oct. 6, 2017, provisional application No. 62/526,298, filed on Jun. 28, 2017, provisional application No. 62/523,623, filed on Jun. 22, 2017, provisional application No. 62/519,722, filed on Jun. 14, 2017.

(51) Int. Cl.
*H01M 50/503* (2021.01)
*H01M 10/42* (2006.01)
*H02J 7/34* (2006.01)
*H01M 50/247* (2021.01)
*H01M 50/509* (2021.01)
*H01M 50/516* (2021.01)
*H02J 7/00* (2006.01)

(52) U.S. Cl.
CPC ......... *H01M 50/24* (2021.01); *H01M 50/247* (2021.01); *H01M 50/503* (2021.01); *H01M 50/509* (2021.01); *H01M 50/516* (2021.01); *H02J 7/342* (2020.01); *H02J 7/0042* (2013.01)

(58) Field of Classification Search
CPC ............ H01M 50/531; H01M 50/107; H01M 50/213; H01M 10/643; H01M 50/141; H01M 4/765; H01M 10/658; H01M 8/0278; H01M 8/0276; H01M 50/1245; H01M 50/186
See application file for complete search history.

(56) References Cited

U.S. PATENT DOCUMENTS

| | | | |
|---|---|---|---|
| 5,232,758 A | 8/1993 | Juskey et al. | |
| 5,418,083 A * | 5/1995 | Tamaki | H01M 50/528 429/174 |
| 5,561,004 A | 10/1996 | Bates et al. | |
| 5,569,520 A | 10/1996 | Bates | |
| 5,909,101 A | 6/1999 | Matsumoto et al. | |
| 5,912,546 A | 6/1999 | Sakou et al. | |
| 6,058,198 A | 5/2000 | Aceti et al. | |
| 6,127,038 A | 10/2000 | McCullough et al. | |
| 6,143,440 A | 11/2000 | Volz et al. | |
| 6,184,685 B1 | 2/2001 | Mori et al. | |
| 6,269,266 B1 | 7/2001 | Leysieffer | |
| 6,492,058 B1 | 12/2002 | Watanabe et al. | |
| 6,563,290 B2 | 5/2003 | Sakakibara et al. | |
| 6,605,382 B2 | 8/2003 | Ruth et al. | |
| 6,607,843 B2 | 8/2003 | Ruth, II et al. | |
| 6,654,218 B1 | 11/2003 | Yokoyama et al. | |
| 6,696,199 B2 | 2/2004 | Yoshida et al. | |
| 6,835,493 B2 | 12/2004 | Zhang et al. | |
| 6,972,544 B2 | 12/2005 | Seman et al. | |
| 7,041,413 B2 | 5/2006 | Tsukamoto et al. | |
| 7,118,828 B2 | 10/2006 | Dodd et al. | |
| 7,166,388 B2 | 1/2007 | Tsukamoto et al. | |
| 7,175,938 B2 | 2/2007 | Ruth, II et al. | |
| 7,232,625 B2 | 6/2007 | Leysieffer et al. | |
| 7,235,112 B2 | 6/2007 | Salot et al. | |
| 7,238,443 B2 | 7/2007 | Kazuyuki | |
| 7,285,355 B2 | 10/2007 | Ruth et al. | |
| 7,294,433 B2 | 11/2007 | Murashige et al. | |
| 7,382,945 B1 | 6/2008 | Sanders | |
| 7,410,512 B2 | 8/2008 | Tsukamoto et al. | |
| 7,501,197 B2 | 3/2009 | Kim | |
| 7,518,341 B2 | 4/2009 | Wang et al. | |
| 7,572,547 B2 | 8/2009 | Sakakibara | |
| 7,619,392 B2 | 11/2009 | Wang et al. | |
| 7,686,853 B2 | 3/2010 | Seman et al. | |
| 7,688,028 B2 | 3/2010 | Phillips et al. | |
| 7,709,141 B2 | 5/2010 | Kim et al. | |
| 7,713,651 B2 | 5/2010 | Leysieffer et al. | |
| 7,722,983 B2 | 5/2010 | Kim et al. | |
| 7,723,952 B2 | 5/2010 | Phillips et al. | |
| 7,843,170 B2 | 11/2010 | Anupindi et al. | |
| 7,846,579 B2 | 12/2010 | Krasnov et al. | |
| 7,868,591 B2 | 1/2011 | Phillips et al. | |
| 7,879,483 B2 | 2/2011 | Sakakibara | |
| 7,993,772 B2 | 8/2011 | Sakakibara | |
| 8,039,135 B2 | 10/2011 | Park et al. | |
| 8,097,354 B2 | 1/2012 | Sakakibara | |
| 8,119,281 B2 | 2/2012 | Kim | |
| 8,138,721 B2 | 3/2012 | Yang et al. | |
| 8,168,322 B2 | 5/2012 | Krasnov et al. | |
| 8,178,234 B2 | 5/2012 | Fukuoka | |
| 8,217,628 B2 | 7/2012 | Yang et al. | |
| 8,389,144 B2 | 3/2013 | Nam et al. | |
| 8,420,251 B2 | 4/2013 | Watanabe et al. | |
| 8,426,251 B2 | 4/2013 | Theuss | |
| 8,455,120 B2 | 6/2013 | Koh et al. | |
| 8,475,955 B2 | 7/2013 | Krasnov et al. | |
| 8,481,183 B2 | 7/2013 | Kim et al. | |
| 8,486,559 B2 | 7/2013 | Koh et al. | |
| 8,530,066 B2 | 9/2013 | Traulsen et al. | |
| 8,541,131 B2 | 9/2013 | Lund et al. | |
| 8,574,735 B2 | 11/2013 | Matsuura et al. | |
| 8,652,220 B2 | 2/2014 | Watanabe et al. | |
| 8,679,674 B2 | 3/2014 | Liang et al. | |
| 8,722,234 B2 | 5/2014 | Oukassi et al. | |
| 8,741,467 B2 | 6/2014 | Sakakibara | |
| 8,758,919 B2 | 6/2014 | Taga | |
| 8,778,532 B2 | 7/2014 | Salot et al. | |
| 8,808,892 B2 | 8/2014 | Maxwell et al. | |
| 8,865,328 B2 | 10/2014 | Kim et al. | |
| 9,017,854 B2 | 4/2015 | Fleischer | |
| 9,070,955 B2 | 6/2015 | Park et al. | |
| 9,099,720 B2 | 8/2015 | Lund et al. | |
| 9,105,918 B2 | 8/2015 | Chun | |
| 9,110,310 B2 | 8/2015 | Pugh et al. | |
| 9,178,252 B2 | 11/2015 | Park et al. | |
| 9,184,469 B2 | 11/2015 | Jedema et al. | |
| 9,186,787 B2 | 11/2015 | Noda et al. | |
| 9,246,158 B2 | 1/2016 | Holme et al. | |
| 9,318,748 B2 | 4/2016 | Chami | |
| 9,341,681 B2 | 5/2016 | Kobayakawa et al. | |
| 9,362,570 B2 | 6/2016 | Lund et al. | |
| 9,406,923 B2 | 8/2016 | Chun | |
| 9,406,969 B2 | 8/2016 | Pugh et al. | |
| 9,455,423 B2 | 9/2016 | Etzkorn et al. | |
| 9,472,794 B1 * | 10/2016 | Zakharyan | H01M 50/20 |
| 9,542,564 B2 | 1/2017 | Fasching et al. | |
| 9,551,064 B2 | 1/2017 | Baker et al. | |
| 9,564,627 B2 | 2/2017 | Koh et al. | |
| 9,570,738 B2 | 2/2017 | Kim et al. | |
| 9,613,911 B2 | 4/2017 | Rogers et al. | |
| 9,640,793 B2 | 5/2017 | Holme et al. | |
| 9,647,303 B2 | 5/2017 | Jin et al. | |
| 9,660,288 B2 | 5/2017 | Gendlin et al. | |
| 9,666,541 B2 | 5/2017 | Tsuboi et al. | |
| 9,680,177 B2 | 6/2017 | Iwamoto et al. | |
| 9,692,039 B2 | 6/2017 | Holme et al. | |
| 9,705,160 B2 | 7/2017 | Peterson et al. | |
| 9,706,646 B2 | 7/2017 | Jiang et al. | |
| 9,728,824 B2 | 8/2017 | Baumgartner et al. | |
| 9,748,528 B2 | 8/2017 | Wörhle et al. | |
| 9,755,272 B2 | 9/2017 | Gaben | |
| 9,793,522 B2 | 10/2017 | Bhardwaj et al. | |
| 9,843,066 B2 | 12/2017 | Snyder et al. | |
| 10,074,843 B2 | 9/2018 | Lee | |
| 2003/0082439 A1 | 5/2003 | Sakakibara | |
| 2003/0170519 A1 | 9/2003 | Mittelstadt et al. | |
| 2003/0193313 A1 * | 10/2003 | Takedomi | H01M 10/643 320/107 |
| 2003/0194601 A1 | 10/2003 | Lei | |
| 2003/0228502 A1 | 12/2003 | Tanaka et al. | |

(56) References Cited

U.S. PATENT DOCUMENTS

| | | | |
|---|---|---|---|
| 2005/0079408 A1* | 4/2005 | Hirano | H01M 10/613 429/174 |
| 2005/0118495 A1* | 6/2005 | Kim | H01M 50/578 429/54 |
| 2005/0191546 A1 | 9/2005 | Jeon | |
| 2006/0051660 A1 | 3/2006 | Chang et al. | |
| 2006/0214632 A1 | 9/2006 | Lee et al. | |
| 2007/0172735 A1 | 7/2007 | Hall et al. | |
| 2008/0113262 A1 | 5/2008 | Phillips et al. | |
| 2008/0220324 A1 | 9/2008 | Phillips et al. | |
| 2009/0155681 A1 | 6/2009 | Lin et al. | |
| 2010/0129717 A1 | 5/2010 | Bedjaoui et al. | |
| 2011/0086260 A1 | 4/2011 | Kohlberger et al. | |
| 2011/0114350 A1 | 5/2011 | Johnson et al. | |
| 2011/0164347 A1 | 7/2011 | Aitchison et al. | |
| 2011/0171505 A1* | 7/2011 | Kishll | H01M 50/583 429/82 |
| 2011/0177366 A1 | 7/2011 | Nagasaki et al. | |
| 2011/0195318 A1* | 8/2011 | Tsujikawa | H01M 10/4235 429/188 |
| 2012/0003522 A1* | 1/2012 | Fuhr | H01M 10/6551 429/120 |
| 2012/0034502 A1 | 2/2012 | Nieh et al. | |
| 2012/0040239 A1 | 2/2012 | Takahashi et al. | |
| 2012/0164495 A1 | 6/2012 | Sumida | |
| 2012/0235277 A1 | 9/2012 | Pugh et al. | |
| 2012/0290021 A1 | 11/2012 | Saurkar et al. | |
| 2012/0302107 A1 | 11/2012 | Ramasayer | |
| 2013/0059181 A1 | 3/2013 | LePort et al. | |
| 2013/0082659 A1* | 4/2013 | Kano | H01M 50/213 307/66 |
| 2013/0164607 A1 | 6/2013 | Shih et al. | |
| 2013/0224539 A1* | 8/2013 | Hayashi | H01M 50/60 429/82 |
| 2014/0007418 A1 | 1/2014 | Song et al. | |
| 2014/0011059 A1* | 1/2014 | Hashimoto | B60L 1/003 429/72 |
| 2014/0120384 A1* | 5/2014 | Tyler | H01M 50/578 429/82 |
| 2014/0127599 A1* | 5/2014 | Kachi | H01M 8/1246 429/434 |
| 2014/0134461 A1 | 5/2014 | Inoue et al. | |
| 2014/0141317 A1* | 5/2014 | Tyler | H01M 50/543 429/176 |
| 2014/0147737 A1 | 5/2014 | Anastas et al. | |
| 2014/0220422 A1 | 8/2014 | Rogers et al. | |
| 2014/0265915 A1 | 9/2014 | Huang et al. | |
| 2014/0295240 A1 | 10/2014 | Takeda et al. | |
| 2014/0295369 A1 | 10/2014 | Mangolini et al. | |
| 2015/0044527 A1 | 2/2015 | Neudecker et al. | |
| 2015/0079434 A1 | 3/2015 | Zahn | |
| 2015/0079444 A1 | 3/2015 | Baumgartner et al. | |
| 2015/0079457 A1 | 3/2015 | Noguchi | |
| 2015/0099167 A1 | 4/2015 | Oshima et al. | |
| 2015/0194710 A1 | 7/2015 | Naito | |
| 2015/0221998 A1 | 8/2015 | Jin et al. | |
| 2015/0222131 A1* | 8/2015 | Kano | B60L 50/64 320/112 |
| 2015/0287966 A1 | 10/2015 | Jeong | |
| 2015/0311494 A1 | 10/2015 | Layton et al. | |
| 2015/0333376 A1 | 11/2015 | Gaben | |
| 2015/0349370 A1 | 12/2015 | Snyder et al. | |
| 2015/0373831 A1 | 12/2015 | Rogers et al. | |
| 2016/0043357 A1 | 2/2016 | Aida et al. | |
| 2016/0073699 A1 | 3/2016 | Drapela | |
| 2016/0141728 A1 | 5/2016 | Fauteux et al. | |
| 2016/0181615 A1 | 6/2016 | Van Duren et al. | |
| 2016/0241065 A1 | 8/2016 | Kondo et al. | |
| 2016/0268647 A1 | 9/2016 | Umemura et al. | |
| 2016/0293943 A1 | 10/2016 | Hu et al. | |
| 2016/0311094 A1 | 10/2016 | Mergener et al. | |
| 2016/0330842 A1 | 11/2016 | Fleischer | |
| 2016/0336547 A1 | 11/2016 | Dawson et al. | |
| 2016/0336564 A1 | 11/2016 | Lee | |
| 2017/0047614 A1* | 2/2017 | Sakai | H01M 50/191 |
| 2017/0062778 A1 | 3/2017 | Mille et al. | |
| 2017/0062834 A1 | 3/2017 | Unnikrishnan et al. | |
| 2017/0069940 A1* | 3/2017 | Goldstein | H01M 50/545 |
| 2017/0098824 A1 | 4/2017 | Fasching et al. | |
| 2017/0110709 A1 | 4/2017 | Kolden et al. | |
| 2017/0125758 A1 | 5/2017 | Miller et al. | |
| 2017/0149093 A1 | 5/2017 | Sun et al. | |
| 2017/0170850 A1 | 6/2017 | Deng et al. | |
| 2017/0187012 A1* | 6/2017 | Cho | H01M 50/512 |
| 2017/0195801 A1 | 7/2017 | Rucker et al. | |
| 2017/0195804 A1 | 7/2017 | Sandhu et al. | |
| 2017/0195806 A1 | 7/2017 | Atamaniuk et al. | |
| 2017/0195809 A1 | 7/2017 | Teran et al. | |
| 2017/0200923 A1 | 7/2017 | Weinstein et al. | |
| 2017/0207428 A1 | 7/2017 | Tononishi | |
| 2017/0214062 A1 | 7/2017 | Song et al. | |
| 2017/0229712 A1 | 8/2017 | Wohrle et al. | |
| 2017/0290151 A1 | 10/2017 | Jiang et al. | |
| 2017/0301891 A1 | 10/2017 | Kwak et al. | |
| 2017/0301892 A1 | 10/2017 | Kwak et al. | |
| 2017/0301893 A1 | 10/2017 | Young et al. | |
| 2017/0301894 A1 | 10/2017 | Kwak et al. | |
| 2017/0301895 A1 | 10/2017 | Young et al. | |
| 2017/0301897 A1 | 10/2017 | Young et al. | |
| 2017/0301926 A1 | 10/2017 | Argyris et al. | |
| 2017/0301928 A1 | 10/2017 | Young et al. | |
| 2017/0301954 A1 | 10/2017 | Kwak et al. | |
| 2017/0301955 A1 | 10/2017 | Kwak et al. | |
| 2017/0301956 A1 | 10/2017 | Young et al. | |
| 2017/0301957 A1 | 10/2017 | Park et al. | |
| 2017/0338453 A1 | 11/2017 | Yu et al. | |
| 2017/0365826 A1 | 12/2017 | Varipatis et al. | |
| 2018/0198105 A1 | 7/2018 | Sato et al. | |
| 2018/0219204 A1 | 8/2018 | Takase et al. | |
| 2018/0376587 A1 | 12/2018 | Peters et al. | |

FOREIGN PATENT DOCUMENTS

| | | |
|---|---|---|
| CN | 101267057 A | 9/2008 |
| CN | 201975450 U | 9/2011 |
| CN | 102208678 A | 10/2011 |
| CN | 102376902 A | 3/2012 |
| CN | 104078702 A | 10/2014 |
| CN | 104124409 A | 10/2014 |
| CN | 203951175 U | 11/2014 |
| CN | 203967212 U | 11/2014 |
| CN | 204067455 U | 12/2014 |
| CN | 204067500 U | 12/2014 |
| CN | 102544397 B | 11/2015 |
| CN | 205196179 U | 4/2016 |
| CN | 205582990 U | 9/2016 |
| CN | 106208230 A | 12/2016 |
| CN | 205985247 U | 2/2017 |
| CN | 206210949 U | 5/2017 |
| CN | 106849260 A | 6/2017 |
| CN | 106970123 A | 7/2017 |
| DE | 102012205810 A1 | 4/2000 |
| DE | 102012205813 A1 | 5/2002 |
| DE | 102013208913 A1 | 6/2006 |
| DE | 102006060018 A1 | 6/2008 |
| DE | 102014217296 A1 | 11/2008 |
| DE | 102014221626 A1 | 5/2010 |
| DE | 112016004799 T5 | 6/2010 |
| EP | 2192638 A1 | 7/2011 |
| EP | 2721663 A1 | 4/2013 |
| EP | 3016171 A1 | 5/2016 |
| EP | 2343752 A2 | 11/2016 |
| EP | 2403031 B1 | 11/2016 |
| EP | 2410590 B1 | 1/2017 |
| EP | 2587584 B1 | 1/2017 |
| EP | 2487736 B1 | 4/2017 |
| EP | 2500960 B1 | 4/2017 |
| EP | 2849260 A1 | 6/2017 |
| JP | 2007317579 A2 | 12/2007 |
| JP | 2010118296 A2 | 4/2013 |
| JP | H09161851 A | 4/2013 |
| JP | 2006139972 A2 | 5/2013 |
| JP | 2002134075 A2 | 6/2013 |

(56) References Cited

FOREIGN PATENT DOCUMENTS

| | | |
|---|---|---|
| JP | 2000100402 A2 | 7/2013 |
| JP | 2008277062 A2 | 8/2013 |
| KR | 1020160082074 A | 7/2016 |
| WO | WO2012019371 A1 | 2/2012 |
| WO | WO2013037790 A1 | 3/2013 |
| WO | WO2013075904 A1 | 10/2013 |
| WO | WO2013087325 A2 | 10/2013 |
| WO | WO2013112803 A2 | 11/2014 |
| WO | WO2015031612 A1 | 3/2015 |
| WO | WO2015135696 A1 | 3/2015 |
| WO | WO2016153992 A1 | 9/2015 |
| WO | WO2016179499 A1 | 12/2015 |
| WO | WO2016183245 A1 | 3/2016 |
| WO | WO2017069209 A1 | 4/2016 |
| WO | WO2017089207 A1 | 9/2016 |
| WO | WO2017115032 A1 | 10/2016 |
| WO | WO2016100751 A2 | 7/2017 |
| WO | WO2017018213 A1 | 7/2017 |
| WO | WO2017175487 A1 | 10/2017 |
| WO | WO2017115092 A2 | 7/2018 |

OTHER PUBLICATIONS

Extended European Search Report issued by the European Patent Office for Application No. 20188247.9 dated Oct. 19, 2020 (12 pages).
Korean Patent Office Action for Application No. 10-2020-7001059 dated Jan. 15, 2021 (7 pages including statement of relevance).
Examination Report No. 1 issued by the Australian Government for Application No. 2018284377 dated Jan. 18, 2021 (4 pages).
Extended European Search Report for Application No. 18818196.0 dated Jan. 26, 2021 (9 pages).

* cited by examiner

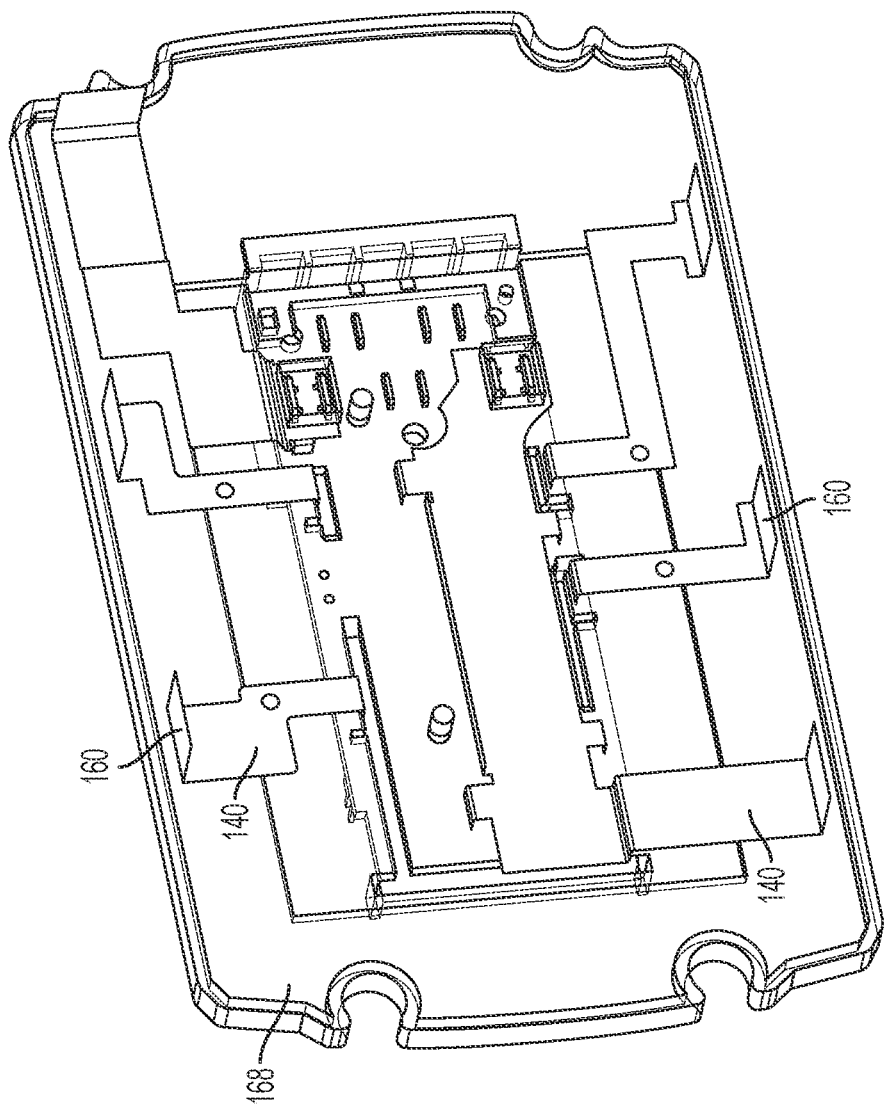

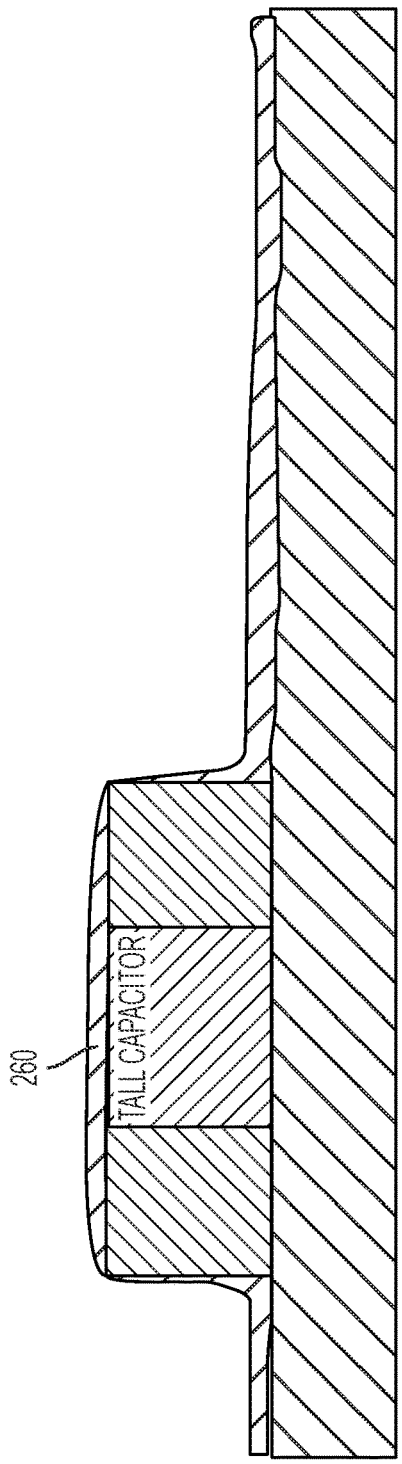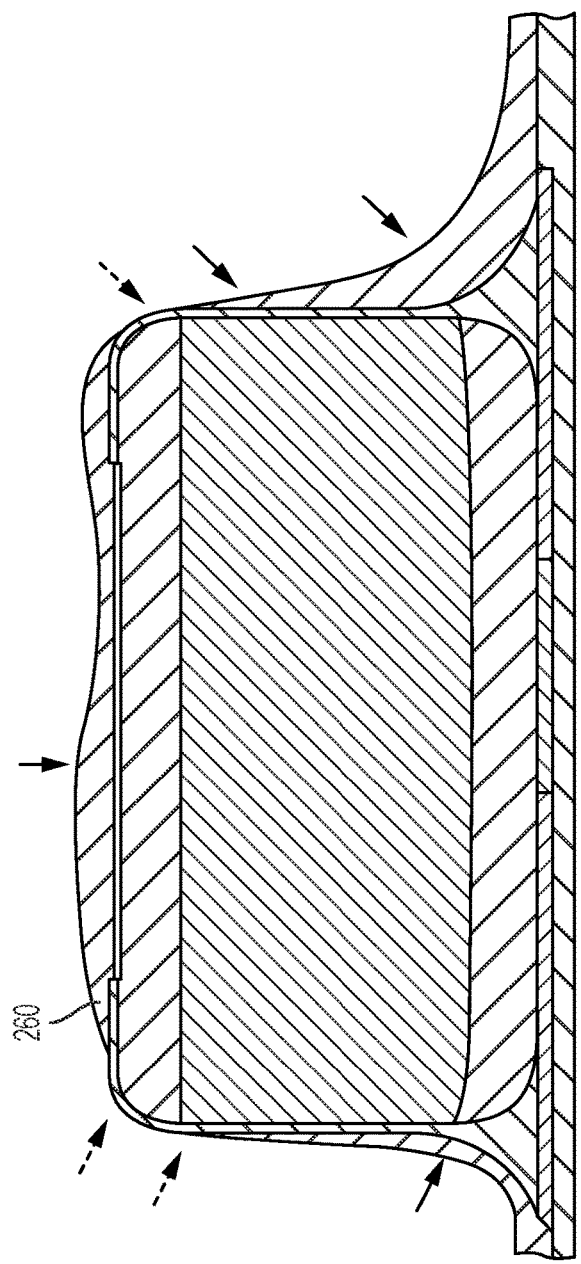
FIG. 41A
FIG. 41B

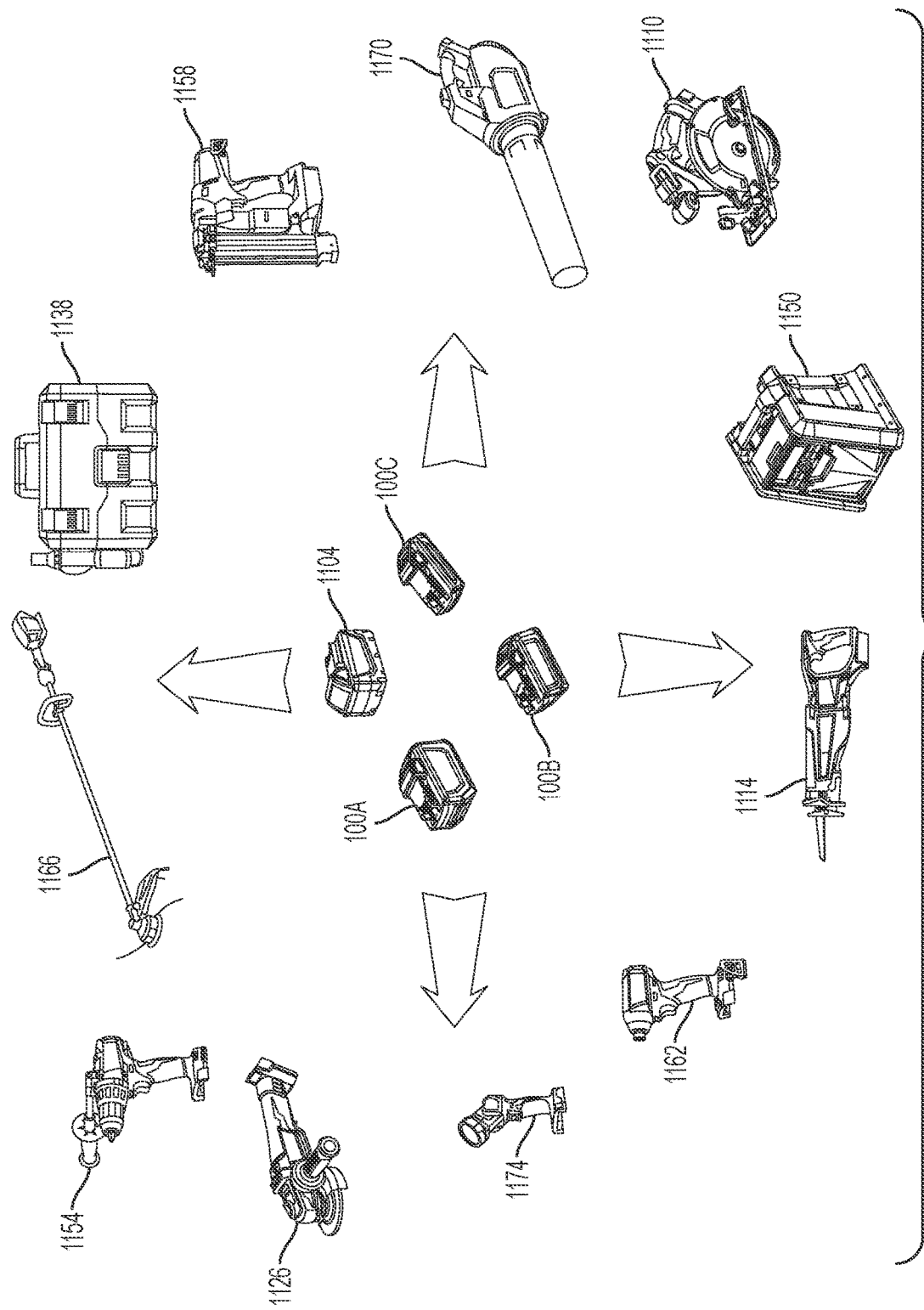

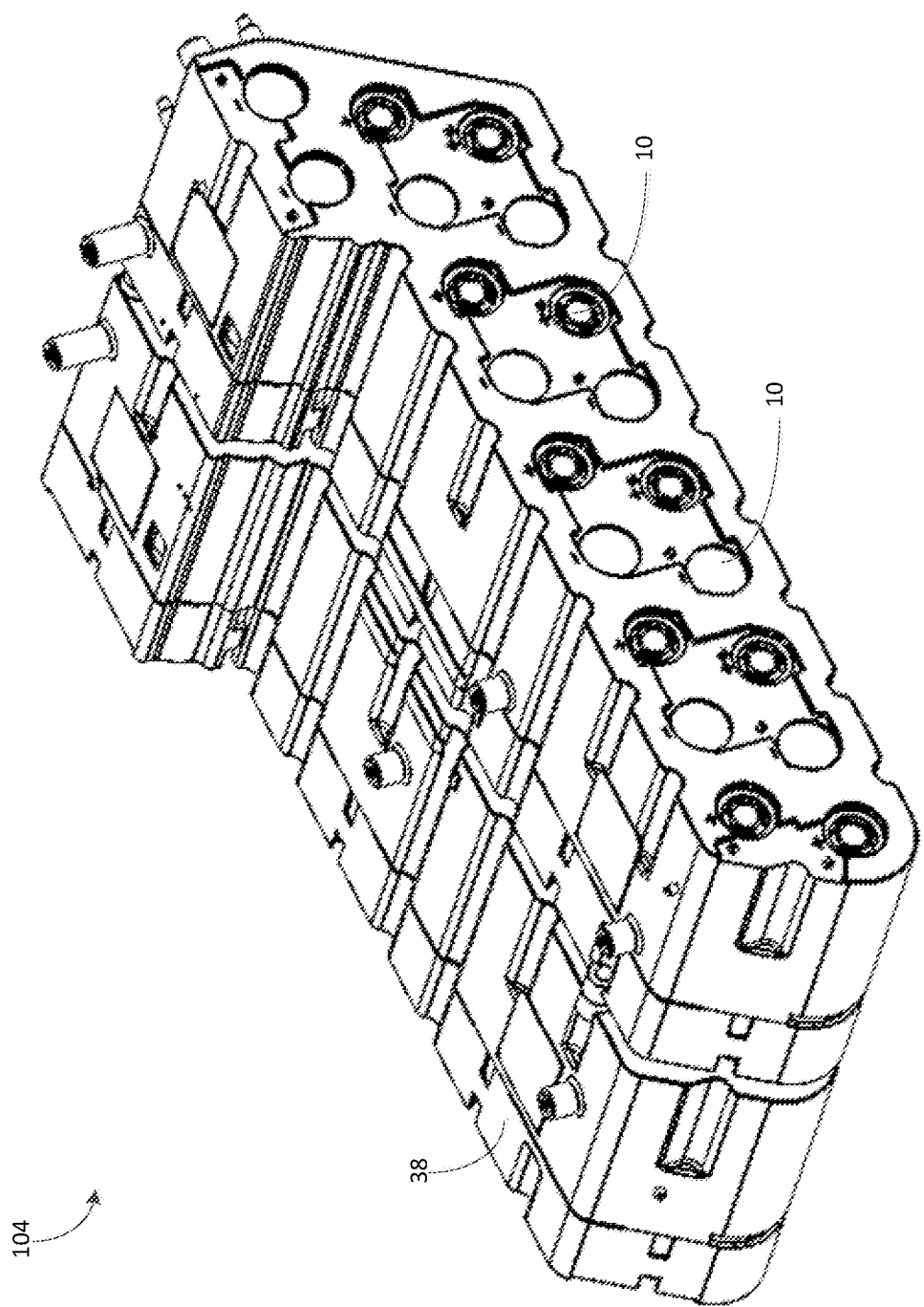

ARRANGEMENTS FOR INHIBITING INTRUSION INTO BATTERY PACK ELECTRICAL COMPONENTS

RELATED APPLICATIONS

This application is a continuation of U.S. patent application Ser. No. 16/690,337, filed on Nov. 21, 2019, which is a continuation of U.S. patent application Ser. No. 15/974,151, filed May 8, 2018, now U.S. Pat. No. 10,950,912, which claims priority to U.S. Provisional Patent Application Nos. 62/519,722, filed Jun. 14, 2017; 62/523,623, filed Jun. 22, 2017; 62/526,298, filed Jun. 28, 2017; 62/569,207, filed Oct. 6, 2017; 62/586,832, filed Nov. 15, 2017; and 62/638,698, filed Mar. 5, 2018, the entire contents of all of which are hereby incorporated by reference.

FIELD

The present invention generally relates to battery packs and, more particularly, to arrangements for inhibiting water intrusion into battery cells and electrical connections of the battery pack.

SUMMARY

Fluid (e.g., including liquids, such as water, sea water, etc.) or material (e.g., salt spray, snow which typically includes minerals, etc.) may enter a battery pack through various entry points including, for example, battery pack terminals, mechanical latches, mechanical interfaces between portions of a battery pack housing, drain holes in the battery pack housing, etc. If the ingress fluid or material is conductive (e.g., sea water), when such fluid or material enters the battery pack, a short circuit may occur, for example, between positive and negative electrodes of a single battery cell or between cell straps coupled to different groups of battery cells. In some situations, whether a short circuit occurs depends on battery impedance, power capacity, and the spacing/resistance between electrodes.

In order to avoid such occurrences, independent embodiments of the present invention may provide arrangements for inhibiting or preventing fluid/material intrusion into and/or a short circuit of a battery cell (e.g., a header portion), cells or a battery pack.

With respect to ingress fluids which are considered to be conductive, sea water has a conductivity of approximately 4.8 Siemens per meter (S/m). In some embodiments, an arrangement may inhibit or prevent a short circuit in a battery pack experiencing intrusion of a fluid having a conductivity of about 4.8 S/m or greater or a conductivity of about 4.5 S/m or greater. In some embodiments, an arrangement may inhibit or prevent a short circuit in a battery pack experiencing intrusion of a fluid having a conductivity of between about 4.0 S/m and 18.0 S/m, between about 4.5 S/m and about 18.0 S/m, or between about 4.8 S/m and about 18.0 S/m.

In one independent aspect, a battery pack may generally include an outer housing; a cell module connectable to the outer housing, the cell module including a module housing, a plurality of battery cells supported by the module housing, the battery cells having an energy of at least about 60 Watt-hours (Wh), a controller operable to control an operation of the battery pack, a conductive strap electrically connected to at least one of the battery cells, a weld strap connected between the controller and the conductive strap, and a terminal electrically connected to the battery cells and operable to connect the battery cells to an electrical device for power transfer; and a vapor-deposited coating applied to at least a portion of the cell module.

The vapor-deposited coating may be applied to at least one of the module housing, at least one of the battery cells, the controller, the conductive strap, and the weld strap. The vapor-deposited coating may be applied to substantially all of the cell module. The vapor-deposited coating may include a poly(p-xylylene) polymer (e.g., parylene). The vapor-deposited coating may include a hydrophobic vapor-deposited coating. The vapor-deposited coating may have a thickness of less than about 20 microns ($\mu$m).

The controller may include a substrate, an electronic component supported on the substrate, and a base coating applied to at least the electronic component, and the vapor-deposited coating may be applied over the base coating. The base coating may be applied to the substrate and the electronic component. The terminal may include a female terminal having opposing contact surfaces operable to engage opposite faces of a mating male terminal of the electrical device, and the vapor-deposited coating may be applied to the female terminal, the opposing contact surfaces being engaged during coating to inhibit application of the vapor-deposited coating to the contact surfaces.

The cell module may include a first battery cell and a second battery cell, a first conductive strap electrically connected to the first battery cell and a second conductive strap electrically connected to the second battery cell, and a first weld strap electrically connected to the first conductive strap and a second weld strap electrically connected to the second conductive strap, there being a voltage differential between the first weld strap and the second weld strap, the first weld strap being spaced from the second weld strap by a distance equivalent to between 0.6 millimeters (mm) per volt of the voltage differential and about 1.2 mm per volt of the voltage differential. The first weld strap may be spaced from the second weld strap by a distance of between about 5 mm and about 9 mm. The vapor-deposited coating may provide an electrical spacing distance greater than the distance.

Each battery cell may have a cell diameter of at least about 18 mm and a cell length of at least about 65 mm. Each battery cell may have a cell length of about 70 mm. Each battery cell may have a cell diameter of about 21 mm. The first weld strap may be spaced from the second weld strap by a distance of between about 6.5 mm and about 8.5 mm.

The first battery cell may be electrically connected in series with the second battery cell, and the cell module may include a third battery cell electrically connected in parallel with the first battery cell. The cell module may include a first string of series-connected battery cells electrically connected in parallel with a second string of series-connected cells. The cell module may include a third string of series-connected battery cells electrically connected in parallel with the first string and with the second string. The first weld strap may be spaced from the second weld strap by a distance of between about 6.5 mm and about 8.5 mm. A voltage potential between the first conductive strap and the second conductive strap may be at least about 8.0 volts (V) and may be no more than about 17.0 V.

The module housing may include a wall with a surface facing the outer housing, the wall including a standoff projecting from the surface toward the outer housing to limit an area of engagement between the outer housing and the surface. The outer housing may provide ultra-violet (UV) protection to the vapor-deposited coating.

The vapor-deposited coating may be applied to at least a portion of the module housing, and the module housing may include a portion exposed after assembly of the battery pack. The exposed surface may be masked during application of the vapor-deposited coating. At least a portion of the exposed surface may be roughened before application of the vapor-deposited coating. The exposed surface may have an edge, the edge being roughened before application of the vapor-deposited coating. The vapor-deposited coating is doped with UV-resistant material. The cell module may include a first module housing portion supporting the plurality of battery cells and a second module housing portion including the exposed portion, the vapor-deposited coating being applied to the first module housing portion, the second module housing portion being connected to the first module housing portion after the vapor-deposited coating is applied to the first module housing portion.

One of the battery cells may include a cell header, the cell module may further include a seal operable to seal the cell header, and the vapor-deposited coating may be applied to the seal. The seal may include a gasket, and the vapor-deposited coating may be applied to the gasket. The cell module may include a seal operable to seal an interface between the at least one of the battery cells and the conductive strap, and the vapor-deposited coating may be applied to the seal.

The battery pack may be operable to supply discharge current to a motorized electrical device. The battery pack may be operable to supply discharge current to at least one of a power tool and an outdoor tool. The battery pack may be operable to supply discharge current to a saw. The at least one of a power tool and an outdoor tool may include a hand-held tool, the hand-held tool being supportable by a user during operation.

Each of the battery cells may have a lithium-based chemistry. The vapor-deposited coating may have a dielectric breakdown strength between 200 Volts/micron (V/$\mu$m) and 300 V/$\mu$m. The vapor-deposited coating may be applied to at least a portion of the plurality of battery cells, and the plurality of battery cells may be operable to supply discharge current to the electrical device to an operating temperature of about 50° C. and about 110° C. The vapor-deposited coating may provide a corrosive resistance to a coated component of less than 10% swelling when exposed to an inorganic reagent or an organic solvent. The vapor-deposited coating may be applied to an at least partially charged battery cell. The battery cell may have a capacity, and the vapor-deposited coating may be applied to a battery cell charged to at least about 20% of the capacity.

In another independent aspect, a method of assembling a battery pack may be provided. The battery pack may include an outer housing, a cell module including a module housing, at least one battery cell, a controller, a conductive strap electrically connected to the battery cell, a weld strap connected between the controller and the conductive strap, and a terminal electrically connected to the battery cell and operable to connect the battery cell to an electrical device for power transfer. The method may generally include assembling components of the cell module; applying a vapor-deposited coating to one or more components of the cell module; and mounting the cell module relative to the outer housing.

Applying may include applying the vapor-deposited coating to at least one of the module housing, the battery cell, the controller, the conductive strap, and the weld strap. Applying may include applying the vapor-deposited coating to substantially all of the assembled cell module. Applying may include applying a poly(p-xylylene) polymer (e.g., parylene). Applying may include applying a hydrophobic vapor-deposited coating. Applying may include applying a vapor-deposited coating having a thickness of less than about 20 $\mu$m.

Assembling components of the cell module may include supporting the battery cell in the module housing, electrically connecting the conductive strap to the battery cell, electrically connecting the weld strap to the controller and to the conductive strap, and electrically connecting the terminal to the controller. Assembling the components of the cell module may include applying a seal to a header of the battery cell. Applying may include applying the vapor-deposited coating to the seal.

Applying may be performed before supporting the battery cell. Applying may be performed after supporting the battery cell. Applying may be performed after connecting the weld strap.

The method may further include charging the battery cell. Charging may be performed before applying. The battery cell has a capacity, and charging may include charging the battery cell to at least about 20% of the capacity.

The controller may include a substrate, an electronic component supported on the substrate, and a base coating applied to at least the electronic component, and applying may include applying the vapor-deposited coating over the base coating. The base coating may be applied to the substrate and the electronic component.

The terminal may include a female terminal having opposing contact surfaces operable to engage opposite faces of a mating male terminal of the electrical device, and the method my further include, during applying, inhibiting application of vapor-deposited coating to the opposing contact surfaces via engagement of the opposing contact surfaces.

The cell module may include a first battery cell and a second battery cell, assembling may include electrically connecting a first conductive strap to the first battery cell and a second conductive strap to the second battery cell, and electrically connecting a first weld strap to the first conductive strap and a second weld strap to the second conductive strap, there being a voltage differential between the first weld strap and the second weld strap, and assembling may include spacing the first weld strap from the second weld strap by a distance equivalent to between 0.6 millimeters (mm) per volt of the voltage differential and about 1.2 mm per volt of the voltage differential. Spacing may include spacing the first weld strap from the second weld strap by a distance of between about 5 mm and about 9 mm. Applying may include applying a vapor-deposited coating to provide an electrical spacing distance greater than the distance.

Each battery cell may have a cell diameter of between about 18 mm and about 21 mm and a cell length of between about 65 mm and about 70 mm, and spacing may include spacing the first weld strap from the second weld strap by a distance of between about 6.5 mm and about 8.5 mm.

Assembling components of the cell module may include electrically connecting in parallel a first string of series-connected battery cells, a second string of series-connected battery cells, and a third string of series-connected battery cells, and spacing may include spacing the first weld strap from the second weld strap by a distance of between about 6.5 mm and about 8.5 mm. A voltage potential between the first conductive strap and the second conductive strap may be at least about 8.0 volts (V) and may be no more than about 17.0 V.

The module housing may include a wall with a surface facing the outer housing, the wall including a standoff projecting from the surface toward the outer housing, and assembling components of the cell module may include limiting an area of engagement between the outer housing and the surface via engagement of the standoff with the outer housing.

Mounting may include mounting the cell module relative to an outer housing providing ultra-violet (UV) protection to the vapor-deposited coating. The module housing may include a portion exposed after assembly of the battery pack, applying may include applying the vapor-deposited coating to at least a portion of the module housing, and at least one of the following: assembling components of the cell module may include masking the exposed surface before applying; assembling components of the cell module may include, before applying, roughening at least a portion of the exposed surface; applying may include doping the vapor-deposited coating with UV-resistant material; and applying may include applying the vapor-deposited coating to a first module housing portion, a second module housing portion providing the exposed portion being connected to the first module housing portion after the vapor-deposited coating is applied to the first module housing portion.

The battery cell may include a cell header, the cell module may further include a seal operable to seal the cell header, and applying may include applying the vapor-deposited coating to the seal. The seal may include a gasket, and applying may include applying the vapor-deposited coating to the gasket. The cell module may include a seal operable to seal an interface between the battery cell and the conductive strap, and applying may include applying the vapor-deposited coating to the seal.

The battery pack may be operable to supply discharge current to a motorized electrical device. The battery pack may be operable to supply discharge current to at least one of a power tool and an outdoor tool. The battery pack may be operable to supply discharge current to a saw. The at least one of a power tool and an outdoor tool may include a hand-held tool, the hand-held tool being supportable by a user during operation.

The battery cell may have a lithium-based chemistry. Applying may include applying a vapor-deposited coating having a dielectric breakdown strength between 200 Volts/micron (V/$\mu$m) and 300 V/$\mu$m. Applying may include applying vapor-deposited coating to the battery cell, and the battery pack may be operable to supply discharge current to the electrical device to an operating temperature of about 50° C. and about 110° C. Applying may include applying a vapor-deposited coating provides a corrosive resistance to a coated component of less than 10% swelling when exposed to an inorganic reagent or an organic solvent. The battery pack may include a plurality of battery cells supported by the housing, the battery cells having an energy of at least about 60 Watt-hours.

In yet another independent aspect, a battery pack may generally include an outer housing; and a cell module mounted relative to the outer housing. The cell module may include a module housing, a first battery cell and a second battery cell supported by the module housing, and a first conductive strap electrically connected to the first battery cell and a second conductive strap electrically connected to the second battery cell, and a first weld strap electrically connected to the first conductive strap and a second weld strap electrically connected to the second conductive strap, there being a voltage differential between the first weld strap and the second weld strap, the first weld strap being spaced from the second weld strap by a distance equivalent to between 0.6 millimeters (mm) per volt of the voltage differential and about 1.2 mm per volt of the voltage differential.

The first weld strap may be spaced from the second weld strap by a distance of between about 5 mm and about 9 mm. Each battery cell may have a cell diameter of at least about 18 mm and a cell length of at least about 65 mm. Each battery cell may have a cell length of about 70 mm. Each battery cell may have a cell diameter of about 21 mm. The first weld strap may be spaced from the second weld strap by a distance of between about 6.5 mm and about 8.5 mm.

The first battery cell may be electrically connected in series with the second battery cell, and the cell module may include a third battery cell electrically connected in parallel with the first battery cell. The cell module may include a first string of series-connected battery cells electrically connected in parallel with a second string of series-connected cells. The cell module includes a third string of series-connected battery cells electrically connected in parallel with the first string and with the second string, and the first weld strap may be spaced from the second weld strap by a distance of between about 6.5 mm and about 8.5 mm. A voltage potential between the first conductive strap and the second conductive strap may be at least about 8.0 volts (V) and may be no more than about 17.0 V.

The battery pack may further include a vapor-deposited coating applied to at least a portion of the cell module. The vapor-deposited coating may provide an electrical spacing distance greater than the distance.

The vapor-deposited coating may be applied to at least one of the module housing, at least one of the battery cells, the controller, the conductive strap, and the weld strap. The vapor-deposited coating may be applied to substantially all of the cell module. The vapor-deposited coating may include a poly(p-xylylene) polymer (e.g., parylene). The vapor-deposited coating may include a hydrophobic vapor-deposited coating. The vapor-deposited coating may have a thickness of less than about 20 microns ($\mu$m).

The controller may include a substrate, an electronic component supported on the substrate, and a base coating applied to at least the electronic component, and the vapor-deposited coating may be applied over the base coating. The base coating may be applied to the substrate and the electronic component.

The terminal may include a female terminal having opposing contact surfaces operable to engage opposite faces of a mating male terminal of the electrical device, and the vapor-deposited coating may be applied to the female terminal, the opposing contact surfaces being engaged during coating to inhibit application of the vapor-deposited coating to the contact surfaces.

The module housing may include a wall with a surface facing the outer housing, the wall including a standoff projecting from the surface toward the outer housing to limit an area of engagement between the outer housing and the surface. The outer housing may provide ultra-violet (UV) protection to the vapor-deposited coating.

The vapor-deposited coating may be applied to at least a portion of the module housing, the module housing may include a portion exposed after assembly of the battery pack, and wherein at least one of the following: the exposed surface may be masked during application of the vapor-deposited coating; at least a portion of the exposed surface may be roughened before application of the vapor-deposited coating; the vapor-deposited coating may be doped with UV-resistant material; and the cell module may include a first module housing portion supporting the plurality of battery cells and a second module housing portion including the exposed portion, the vapor-deposited coating being applied to the first module housing portion, the second module housing portion being connected to the first module housing portion after the vapor-deposited coating is applied to the first module housing portion.

One of the battery cells may include a cell header, the cell module may further include a seal operable to seal the cell header, and the vapor-deposited coating may be applied to the seal. The cell module may include a seal operable to seal an interface between the at least one of the battery cells and the conductive strap, and wherein the vapor-deposited coating is applied to the seal.

The vapor-deposited coating may have a dielectric breakdown strength between 200 Volts/micron (V/μm) and 300 V/μm. The vapor-deposited coating may be applied to at least a portion of the plurality of battery cells, and the plurality of battery cells may be operable to supply discharge current to the electrical device to an operating temperature of about 50° C. and about 110° C. The vapor-deposited coating may provide a corrosive resistance to a coated component of less than 10% swelling when exposed to an inorganic reagent or an organic solvent.

The vapor-deposited coating may be applied to an at least partially charged battery cell. The battery cell has a capacity, and the vapor-deposited coating may be applied to a battery cell charged to at least about 20% of the capacity.

The battery pack may be operable to supply discharge current to a motorized electrical device. The battery pack may be operable to supply discharge current to at least one of a power tool and an outdoor tool. The battery pack may be operable to supply discharge current to a saw. The at least one of a power tool and an outdoor tool may include a hand-held tool, the hand-held tool being supportable by a user during operation.

Each of the battery cells may have a lithium-based chemistry. The battery pack may further include a plurality of battery cells supported by the housing, the battery cells having an energy of at least about 60 Watt-hours.

In a further independent aspect, a battery pack may generally include a housing; a battery cell supported by the housing and including a cell header, the battery cell having a nominal voltage of between about 3.6 V and about 4.2 V, the battery cell having a capacity of between about 2 Ah and about 5 Ah; a seal member sealing an interface of the cell header; and a vapor-deposited coating applied to the seal and to at least a portion of the battery cell.

The seal member may include a soft elastomer member. The soft elastomer member may be positioned at the interface, and the seal member may include a hard plastic member engageable to press the elastomer member into the interface. The battery pack may further include a conductive strap electrically connectable to the cell header and operable to hold the seal member in a position. The conductive strap may be welded to the cell header. The seal may include an adhesive seal adhesively fixed to the cell header.

The housing may be an outer housing; and the battery pack may further include a cell module mountable relative to the outer housing, the cell module including a module housing, the battery cell, the battery cell being supported by the module housing, a controller operable to control an operation of the battery pack, a conductive strap electrically connected the battery cell, a weld strap connected between the controller and the conductive strap, and a terminal electrically connected to the battery cell and operable to connect the battery cell to an electrical device for power transfer.

The vapor-deposited coating may be applied to at least a portion of the cell module. The vapor-deposited coating may be applied to substantially all of the cell module. The module housing may be operable to hold the seal member in a position.

The battery pack may include a plurality of battery cells supported by the housing, the battery cells having an energy of at least about 60 Watt-hours.

In another independent aspect, a battery pack may generally include an outer housing; a cell module connectable to the outer housing, the cell module including a module housing, a plurality of battery cells supported by the module housing, a controller operable to control an operation of the battery pack, a conductive strap electrically connected to at least one of the battery cells, a weld strap connected between the controller and the conductive strap, a terminal electrically connected to the battery cells and operable to connect the battery cells to an electrical device for power transfer, and a seal member operable to seal a portion of the cell module; and a vapor-deposited coating applied to the seal member.

Each of the battery cells may include a cell header, and seal member may seal an interface of the cell header. The seal operable may be operable to seal an interface between the at least one of the battery cells and the conductive strap.

In yet another independent aspect, a battery pack may generally include a housing assembly including an upper housing portion defining an opening, and a lower housing portion connectable to the upper housing portion to define a cavity, the lower housing portion being substantially uninterrupted; a controller supported on the upper housing portion; weld straps electrically connected to the controller and having contact ends; potting compound material sealing a lower section of the upper housing portion, the material covering the controller and the weld straps with the contact ends remaining exposed; a plurality of battery cells supported in the lower housing portion; and conductive straps electrically connected to the battery cells, the exposed contact ends being electrically connected to the conductive straps. The lower housing portion may be sealingly connected to the sealed lower section of the upper housing portion to seal the battery cells in the housing assembly.

In a further independent aspect, a battery pack may generally include a housing assembly including an upper housing portion defining an opening, and a substantially uninterrupted lower housing portion connectable to the upper housing portion to define a cavity; an insert plate including weld straps having exposed first contact ends and oppositely-extending exposed second contact ends; a controller electrically connected to the first contact ends; a plurality of battery cells supported in the lower housing portion; and conductive straps electrically connected to the battery cells, the second contact ends being electrically connected to the conductive straps. The lower housing portion may be sealingly connected to the insert plate to seal the battery cells in the lower housing portion.

The weld straps may be insert-molded with the insert plate. The weld straps may be supported on and sealed to the insert plate. The upper housing portion may be assembled to the insert plate and the lower housing portion.

Other independent aspects of the invention may become apparent by consideration of the detailed description and accompanying drawings.

BRIEF DESCRIPTION OF THE DRAWINGS

FIGS. 21A-21H are views of another sealed battery pack, illustrating a method of assembling the battery pack.

FIGS. 41A-41B are views of examples of battery pack components coated in vapor-deposited coating.

FIGS. 50A-50B illustrate electrical systems including various electrical devices operable with the battery packs of FIGS. 49A-49C.

FIGS. 54A-54E are view of an assembly process of the battery pack of FIG. 51B.

DETAILED DESCRIPTION

Figure 1:
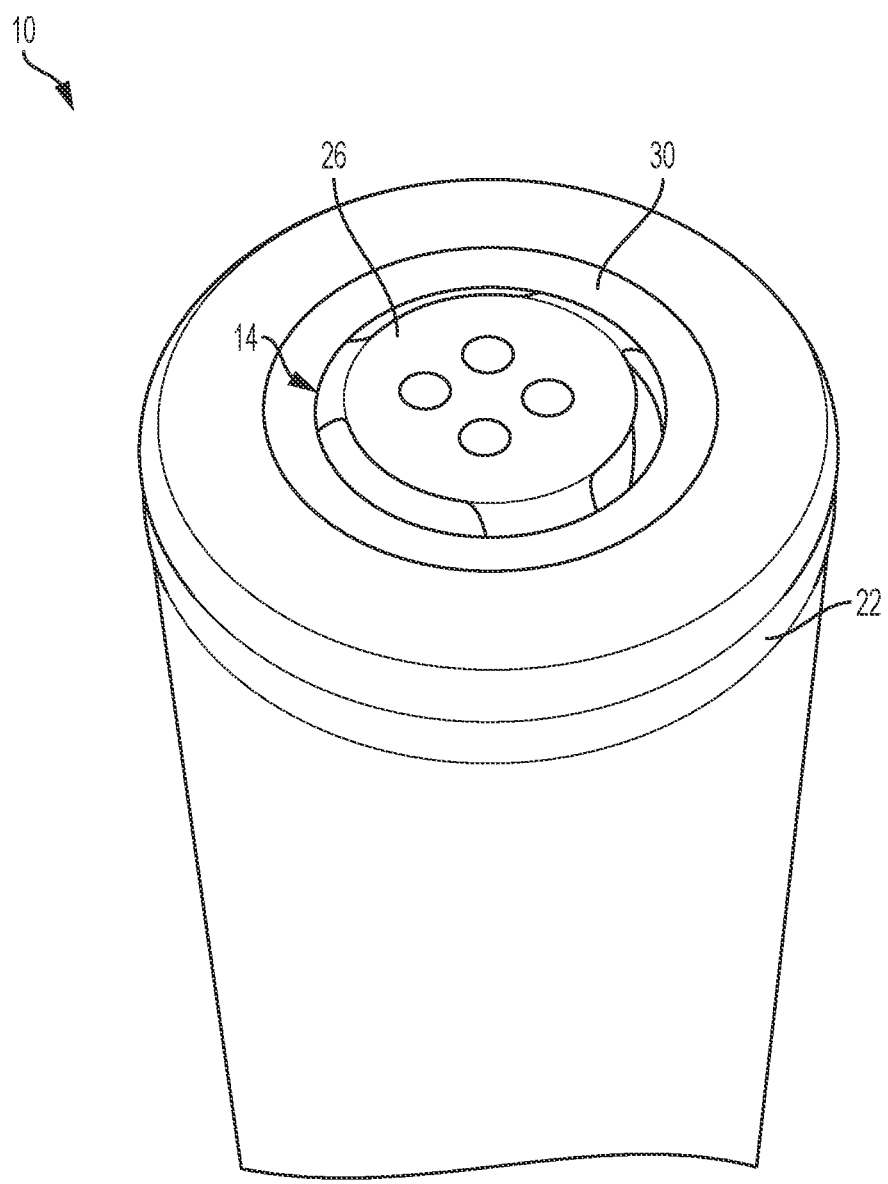
FIG. 1 is a perspective view of a cell in accordance with some embodiments.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use) associated with the particular value, etc.). Such terminology should also be considered as disclosing the range defined by the absolute values of the two endpoints. For example, the expression "from about 2 to about 4" also discloses the range "from 2 to 4".

The relative terminology may refer to plus or minus a percentage (e.g., 1%, 5%, 10% or more) of an indicated value. For example, with a 10% range, "about 20 Volts" may indicate a range of 18 Volts (V) to 22 V, and "about 1%" may mean from 0.9-1.1. Other meanings of relative terms may be apparent from the context, such as rounding off, so, for example "about 20 V" may also mean from 19.5 V to 20.4 V.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Various arrangements for inhibiting fluid intrusion into and/or a short circuit of a battery cell (e.g., a header portion), cells or a battery pack operable, for example, as a power source for motorized devices (e.g., power tools, outdoor power equipment, vehicles, etc.), non-motorized devices (e.g., lighting equipment, audio equipment, power supplies, etc.). In some constructions, a sealing arrangement is provided for the battery cell, specifically, the header portion. In some constructions, structure of the battery pack (e.g., the core housing, the conductive strap, the battery housing assembly, etc.) operates to inhibit fluid intrusion alone or in combination with a sealing arrangement. In some constructions, the construction of the battery pack (e.g., spacing between battery straps) operates to inhibit a short circuit if fluid does intrude into the battery pack.

FIG. 1 illustrates a battery cell 10 including a positive terminal 14, a negative terminal 18 (see FIG. 3), and a cell sleeve or cell covering 22 having a circular opening at the terminals. Typically, a washer, which does not seal the cell header 26, is provided. As described below, a gasket or soft elastomer seal 30 may replace the illustrated washer and be positioned and seal the spacing between the cell terminals. The gasket/seal 30 has an opening allowing electrical connection to the terminals. In some embodiments, the gasket/seal 30 has a strength that is less than approximately 20 kg/cm$^2$ to allow venting of the battery cell.

Figure 2:
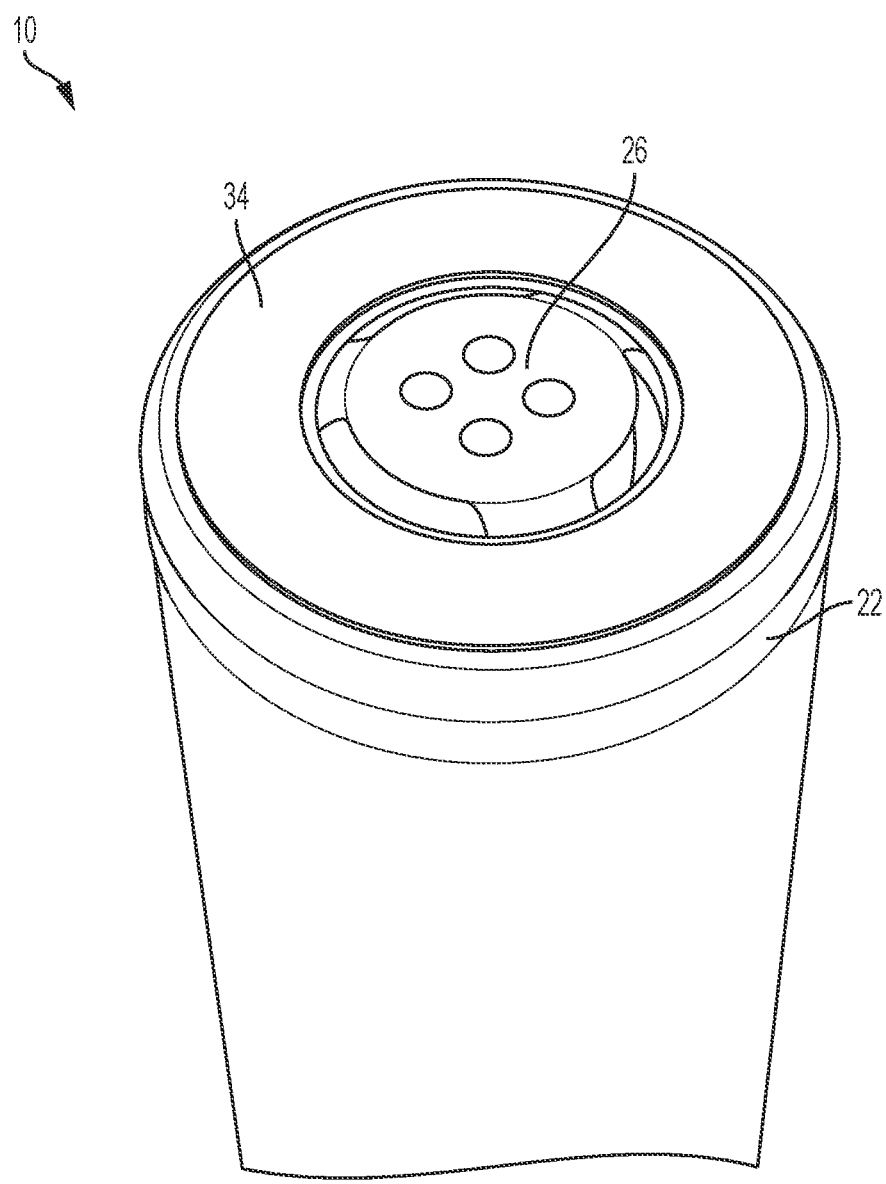
FIG. 2 is a perspective view of a cell in accordance with some embodiments.
Figure 3:
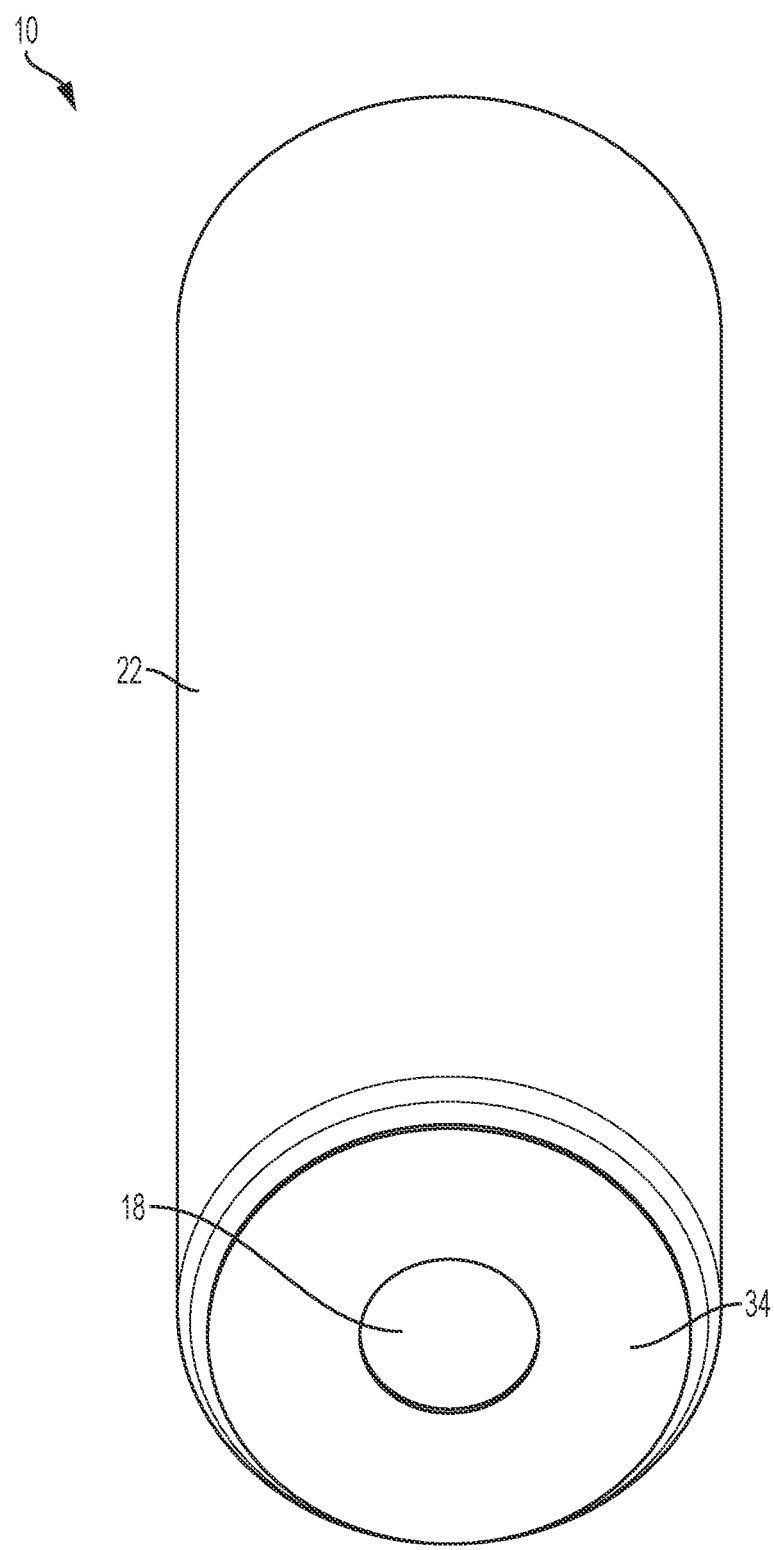
FIG. 3 is another perspective view of the cell shown in FIG. 2 in accordance with some embodiments.

In FIGS. 2-3, an adhesive seal 34 is positioned over the opening in the cell covering 22 to close off a portion of the cell head. In such constructions, the gasket/seal 30 shown in FIG. 1 may be used under the cell covering 22, and the adhesive seal 34 may be placed over the cell covering 22, the gasket 30, and the header part 26. The adhesive seal 34 may be a sticker, a tape, an adhesive backed rubber, etc.

In some embodiments, the adhesive seal 34 includes an electrically-insulating material with an adhesive backing. In some embodiments, the adhesive seal 34 may include a top layer of vinyl, polypropylene (PP) or nylon, as the electrically-insulating material, with an acrylic adhesive on the underside. In some embodiments, the adhesive could be applied to both sides of the electrically-insulating material layer to allow the seal 34 to adhere to both the cell 10 and the core housing 38 (or the battery housing (if there is no cell core)).

As shown in FIGS. 2-3, the illustrated adhesive seal 34 is generally doughnut-shaped with an opening exposing a terminal of the battery cell 10 for welding to the conductive strap 42.

Figure 31B:
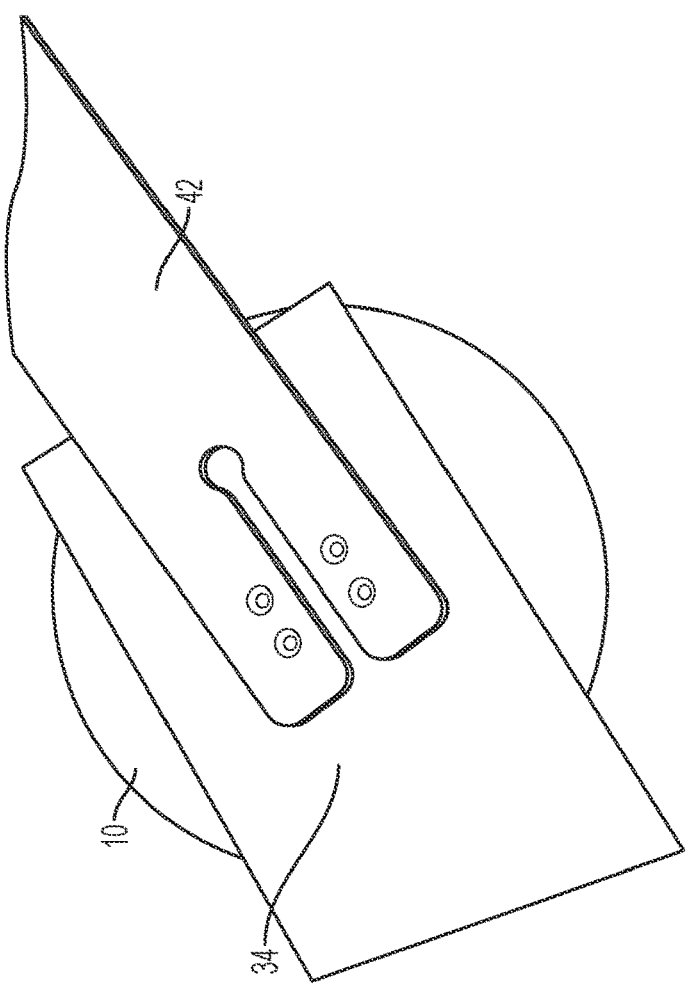
FIGS. 31A-31B are perspective views of a battery cell in accordance with some embodiments.
Figure 31A:
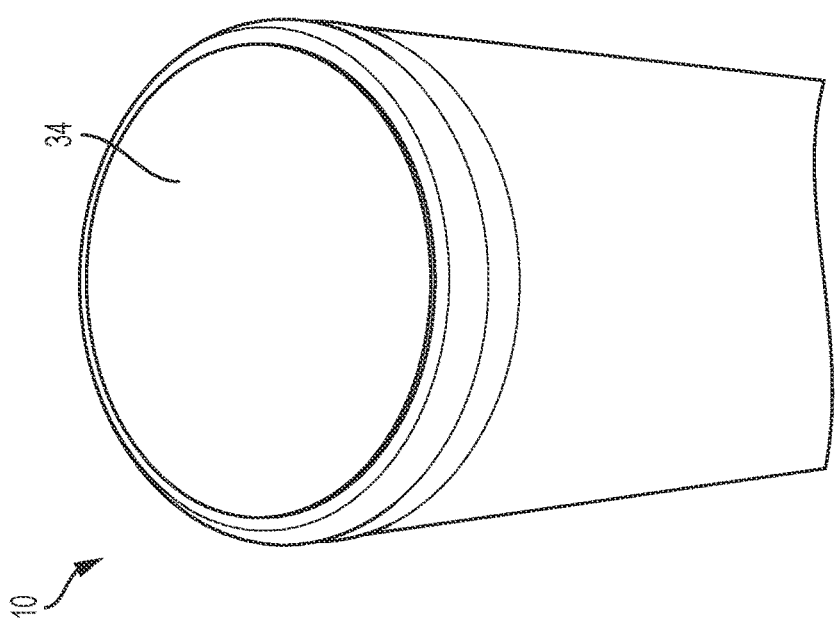

In other embodiments (see, e.g., FIGS. 31A-31B), the adhesive seal 34 does not include such an opening and covers the battery terminal. In such embodiments, the conductive straps 42 may be welded (e.g., spot welded, laser welded, etc.) through the adhesive seal 34 to electrically couple to the battery terminal. The welding operation heats the conductive strap 42 to thermally introduce a hole through the adhesive seal 34 before attaching to the cell header. Alternatively, points on the conductive strap 42 could physically puncture holes through the seal 34 to begin welding. Either way, the welding process minimally removes material of the seal 34 and provides a larger sealing area.

In some embodiments, the strength and/or distribution of the adhesive on the seal 34 are sufficient to prevent the seal 34 from becoming displaced or falling off during normal operation of a device being powered by the battery pack. The strength and/or distribution of the adhesive on the seal 34 are also sufficient to prevent ingress fluid (e.g., water) from penetrating the seal 34.

However, in some embodiments, the strength and/or distribution are low enough to allow venting of the battery cell 10 (i.e., gases are able to vent out of the battery cell 10 past the seal 34 even though the seal 34 prevents ingress fluid from entering the battery cell 10). In such embodiments, the adhesive seal 34 may have a strength that is, for example, less than approximately 20 kg/cm$^2$.

There may be advantages to sealing individual cells 10 compared to sealing groups of cells 10 (e.g., sealing the whole battery pack, sealing the cell core, etc.). For example, seals 34 for individual cells 10 may allow for flexibility in manufacturing for various different pack configurations (e.g., each cell 10 is sealed regardless of the pack configuration). As another example, an individual cell 10 can generally be more accurately sealed compared to a group of cells 10. As yet another example, an individual cell seal 34 may have greater durability and/or a reduced likelihood that the seal 34 will be displaced from its sealing position.

Figure 4:
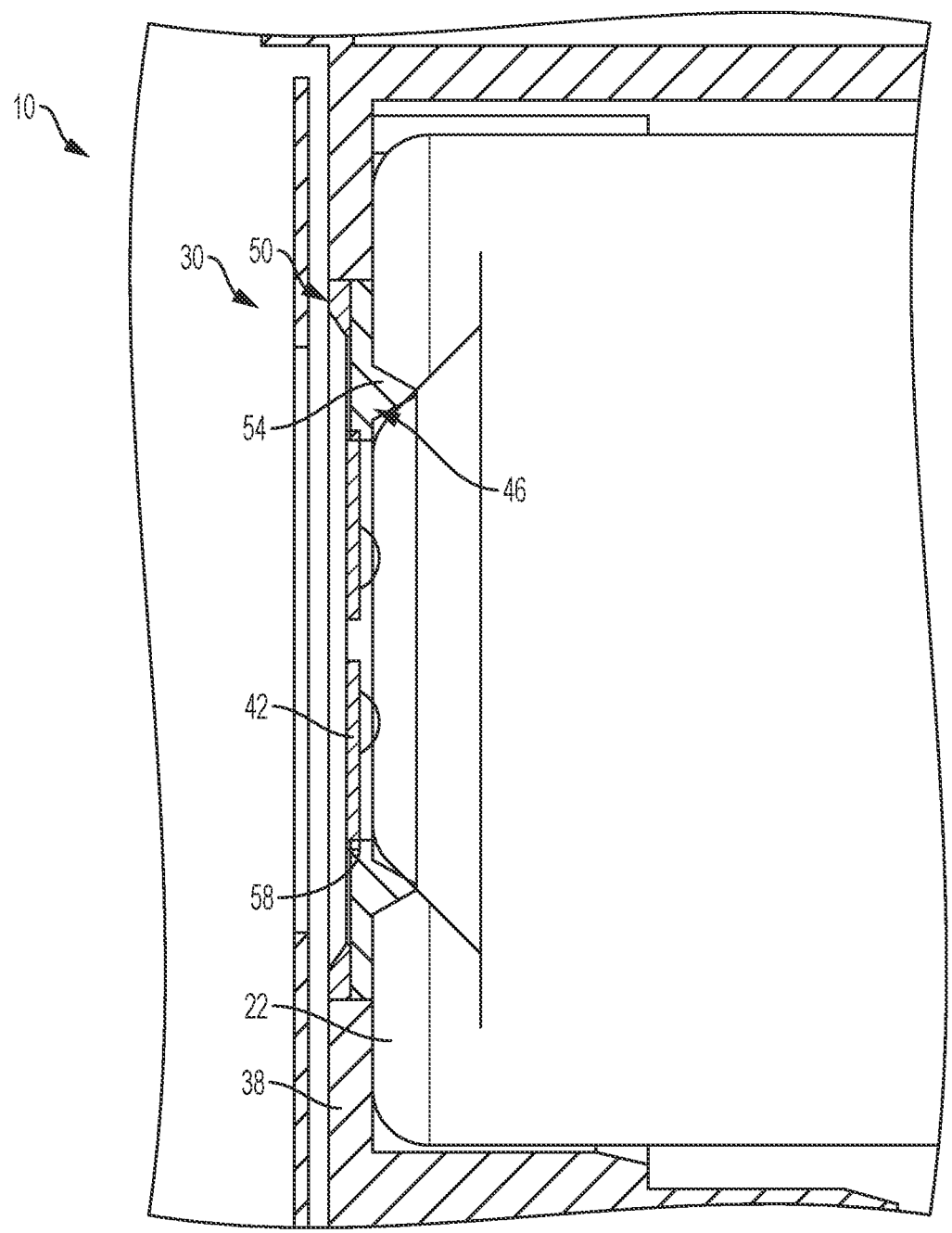
FIG. 4 is a side view of a cell in a core housing in accordance with some embodiments.
Figure 5:
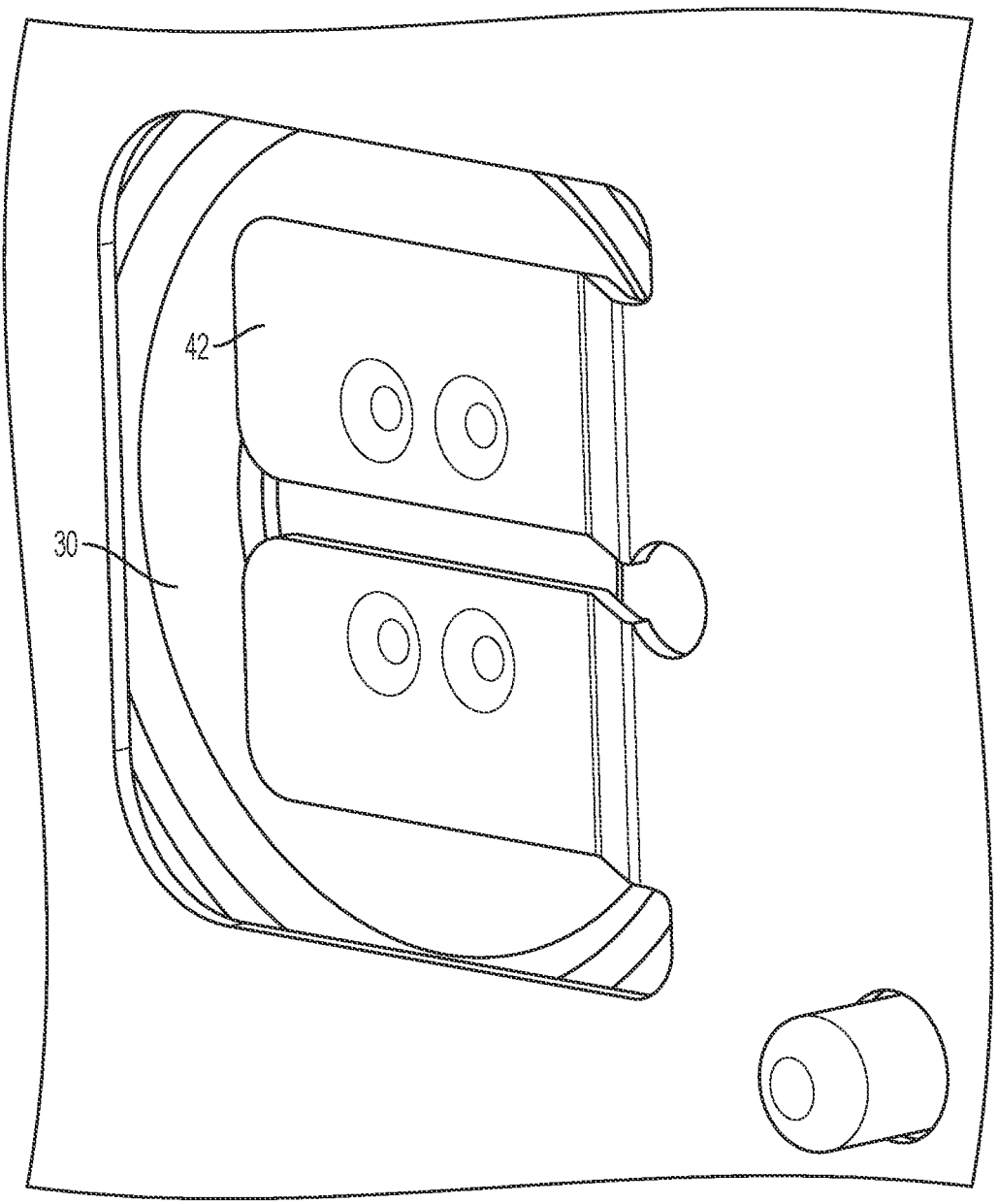
FIG. 5 is a perspective view of the core housing shown in FIG. 4 including a conducting strip in accordance with some embodiments.

In some independent embodiments, the gasket 30 is formed of multiple components, for example, by multi-shot injection molding. As shown in FIGS. 4-5, the illustrated gasket 30 includes two components: a soft elastomer 46; and a hard plastic 50. The hard plastic 50 and soft materials 46 may be insert-molded together. The soft elastomer 46 may be a soft material (e.g., silicone) having a durometer of, for example, about 50 on a Shore A scale or higher (though, in other constructions, this value could also be lower than 50). The gasket 30 extends into an opening of the core housing

38. The hard plastic 50 is pressed down and causes the soft elastomer 46 to be pressed into the opening, improving the seal.

As shown in FIG. 4, the illustrated soft elastomer 46 is shaped (e.g., has an inwardly-directed annular rib 54) to fill the opening between the cell header 26 and the covering 22. The illustrated hard plastic 50 is also shaped (e.g., has an outwardly-directed rib) to transfer the pressing force to the soft elastomer 46. The gasket 30 (e.g., the soft elastomer 46) also has an inner rim 58 around the opening engageable by the conducting strap 42.

Figure 8:
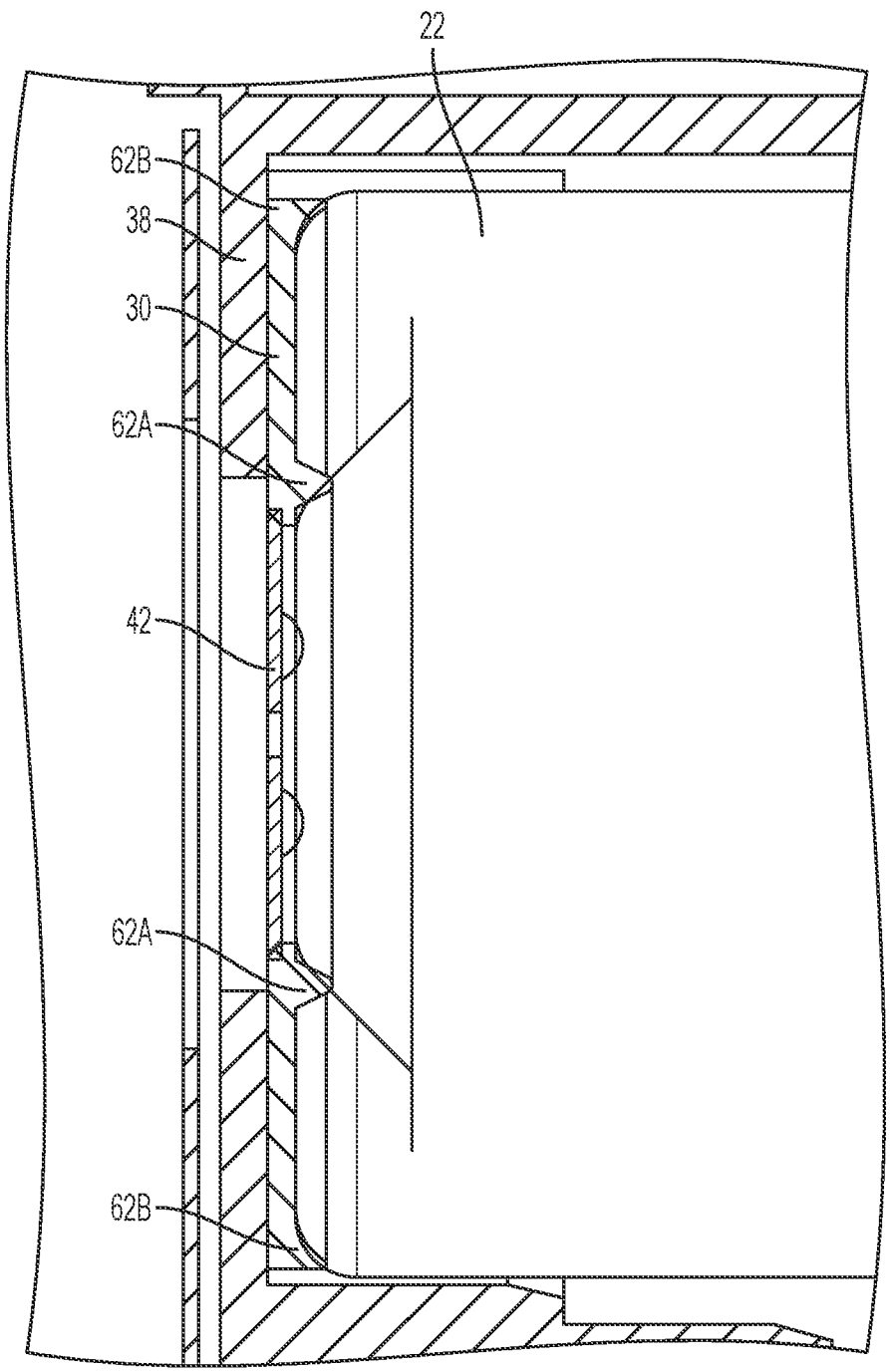
FIG. 8 is a side view of a cell in a core housing in accordance with some embodiments.
Figure 9:
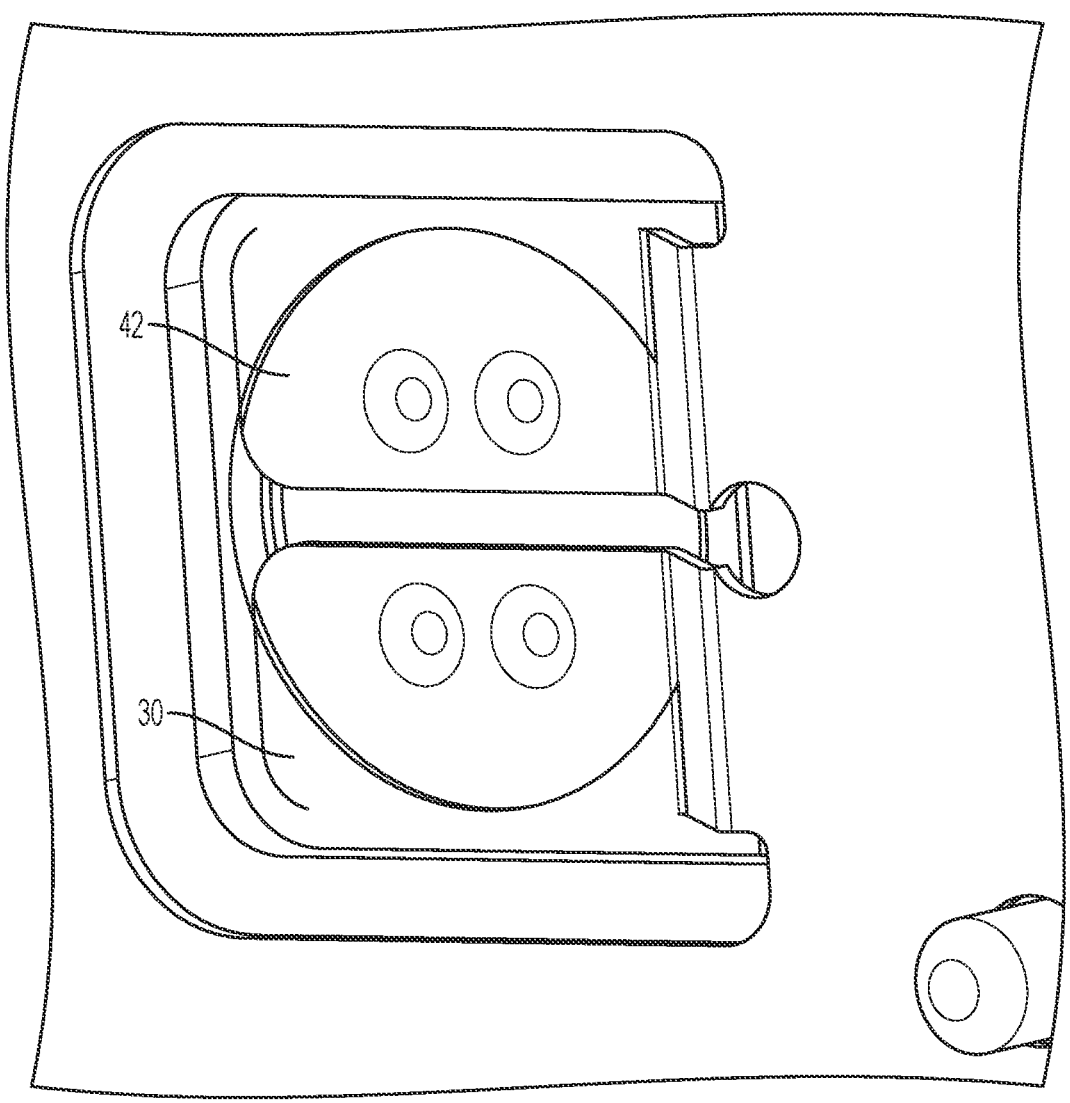
FIG. 9 is a perspective view of the core housing shown in FIG. 8 including a conductive strip in accordance with some embodiments.

In FIG. 4, the illustrated gasket 30 has a relatively-small outer diameter, fitting within the opening in the core housing 38. In other constructions (see, e.g., FIG. 8), the gasket 30 has a different diameter (e.g., a larger diameter) and is retained within the core housing 38.

Figure 10A:
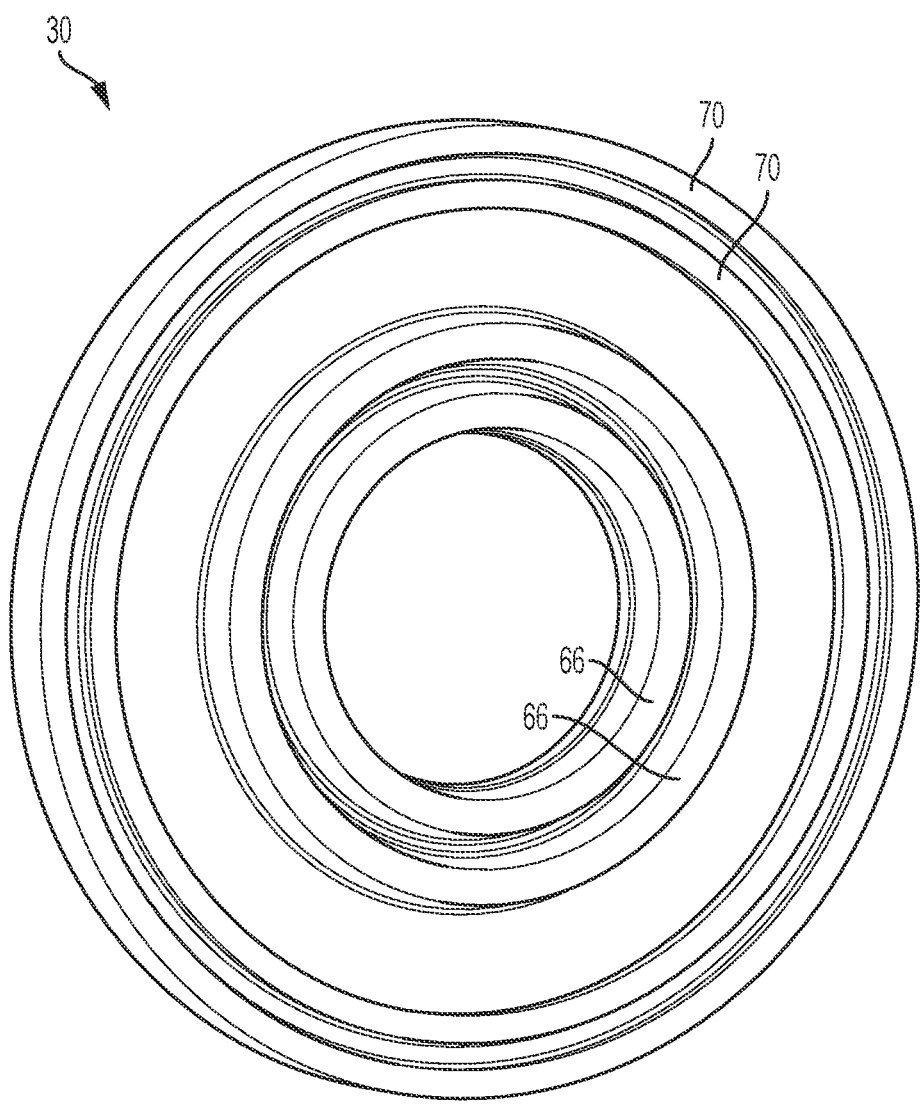
FIGS. 10A-10C are views of a gasket in accordance with some embodiments.
Figure 10B:
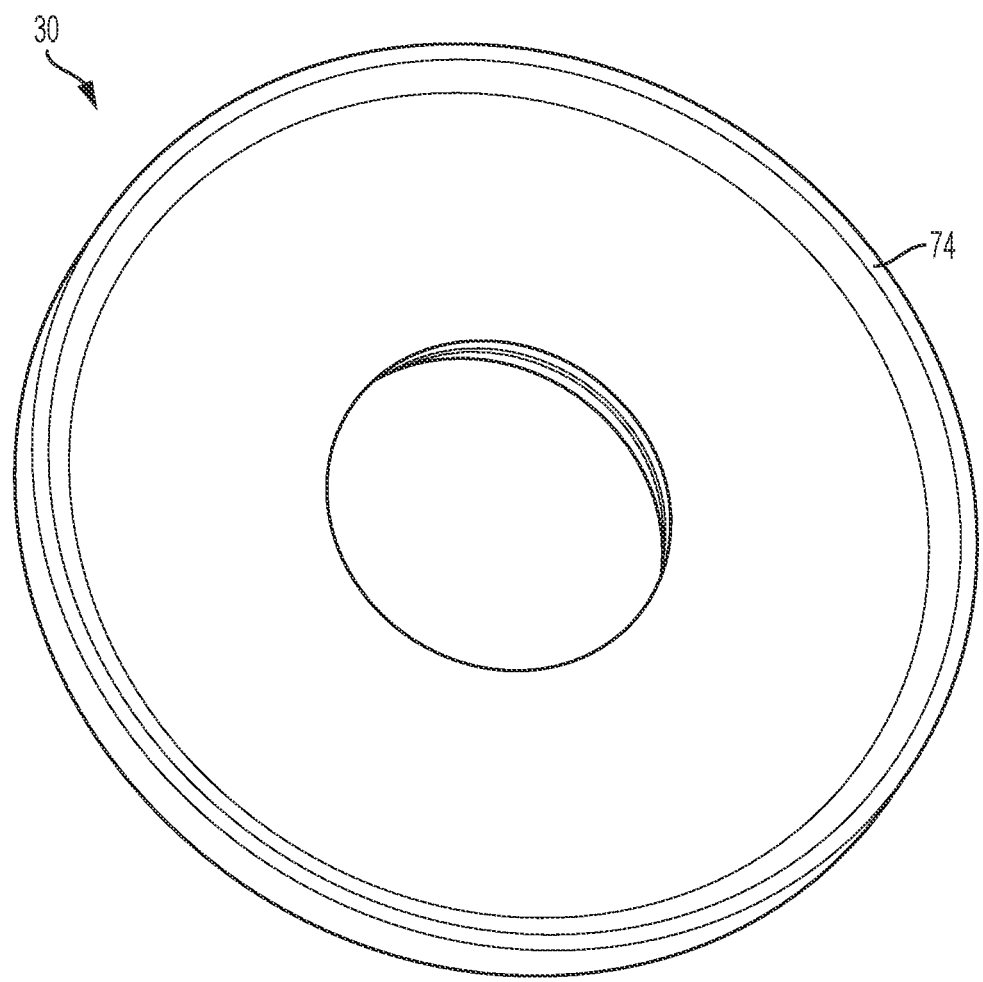
Figure 10C:
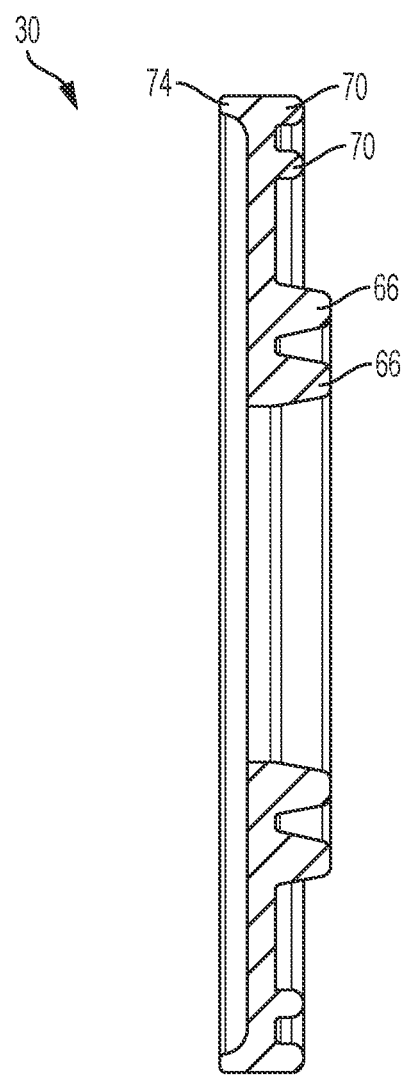
Figure 11:
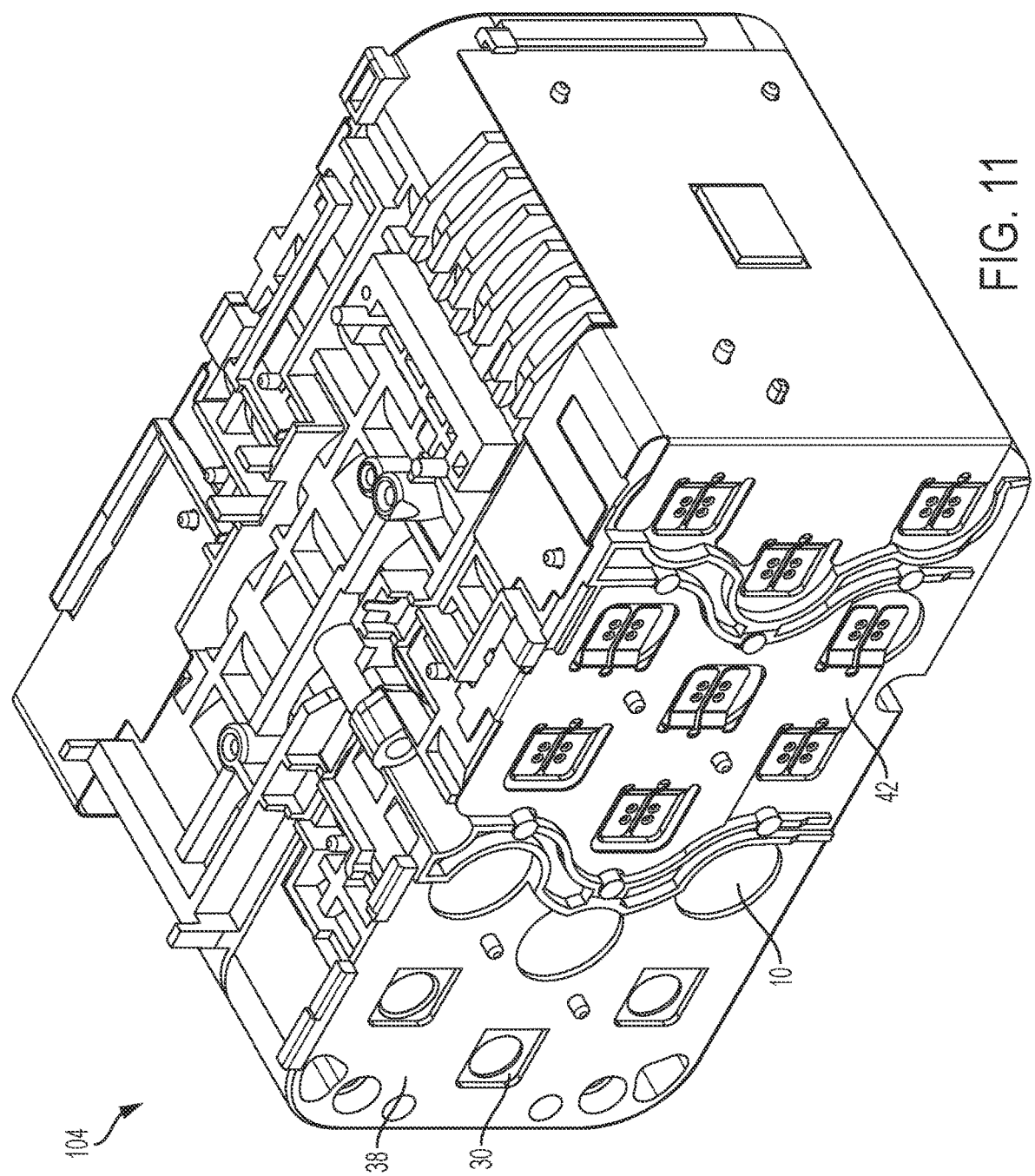
FIG. 11 is a perspective view of the core housing shown in FIG. 8 with a conducting strap removed in accordance with some embodiments.
Figure 12:
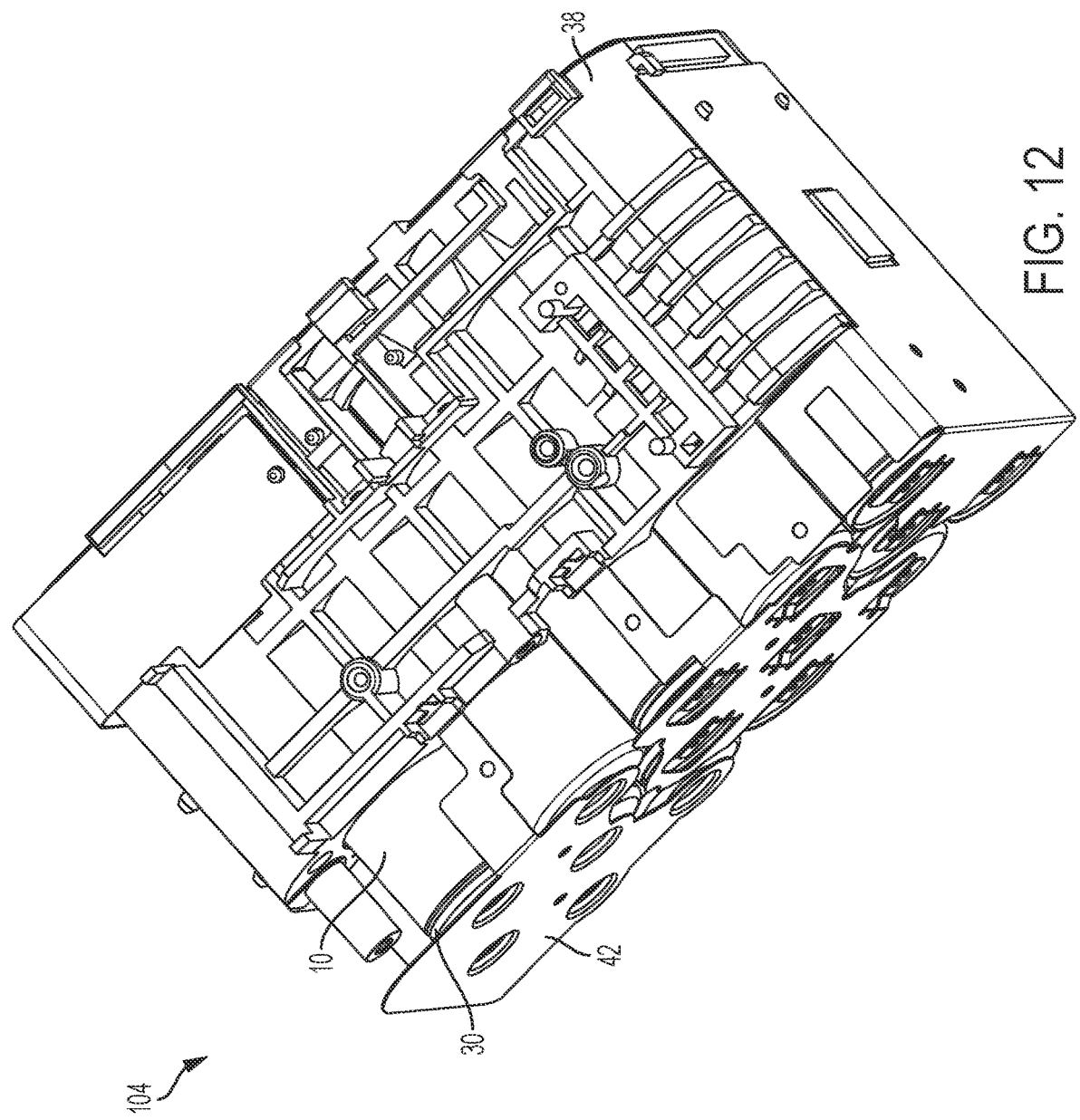
FIG. 12 is a perspective view of the core housing shown in FIG. 11 with a portion of the core housing removed in accordance with some embodiments.

It should be understood that the gasket 30 may have a different number of inwardly- and outwardly-directed ribs. For example, in FIG. 8, the gasket 30 has two inwardly-directed ribs 62 (e.g., a radially inner rib 62A and a radially outer rib 62B) and no outwardly-directed ribs. In another example (see FIGS. 10A-10C), the gasket 30 has a series of radially-inner inwardly-directed ribs 66 (e.g., two), a series of radially-outer inwardly-directed ribs 70 (e.g., two), and at least one outwardly-directed rib 74 (e.g., one).

Figure 15:
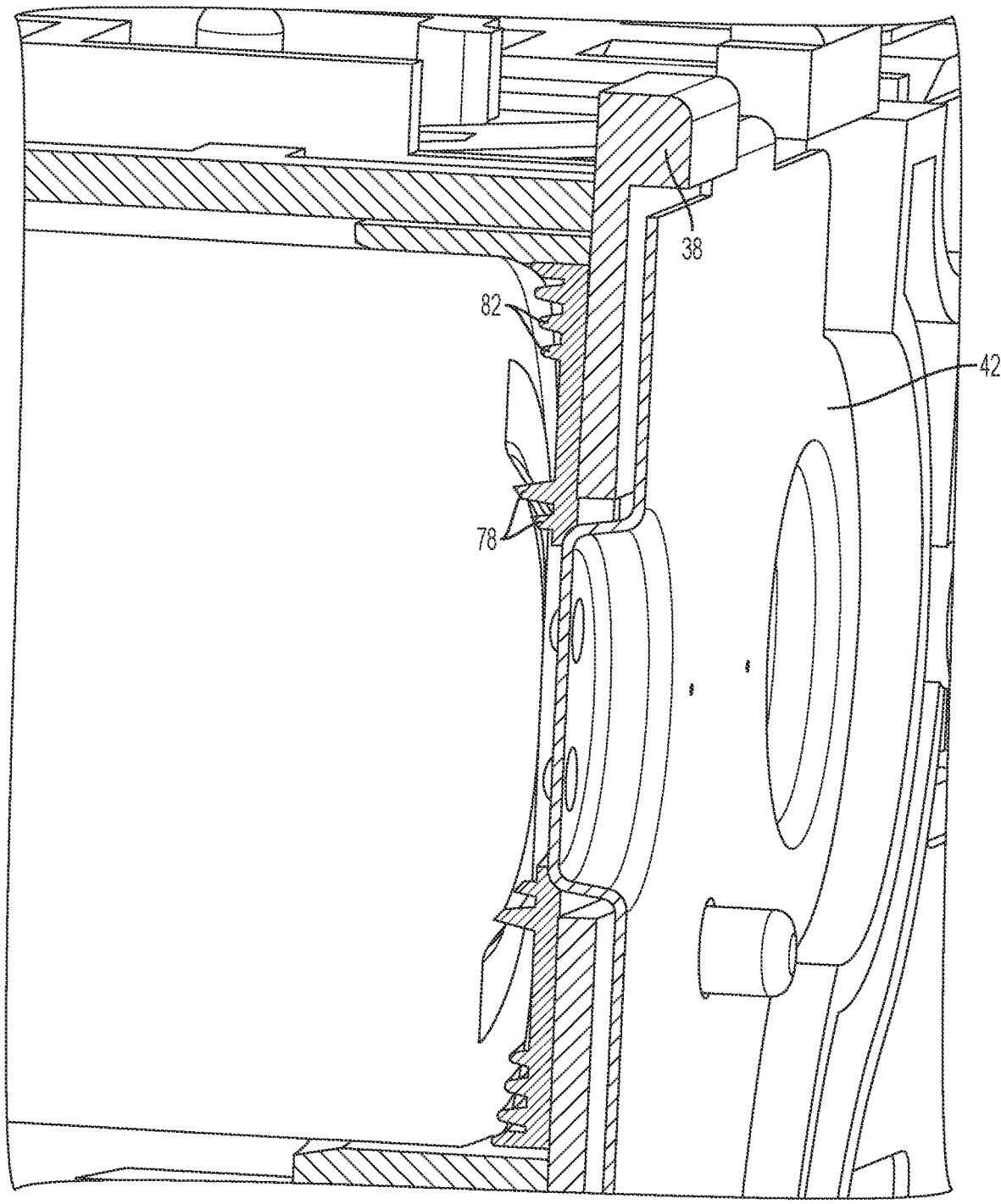
FIG. 15 is a cross-section view illustrating the laser welded conducting strap shown in FIG. 13 in contact with a cell in accordance with some embodiments.

In yet another example (see FIG. 15), the gasket 30 has a series of radially-inner inwardly-directed ribs 78 (e.g., two) and a series of radially-outer inwardly-directed ribs 82 (e.g., four). The ribs(s) may have different shapes and sizes (e.g., moving radial outward in FIG. 15, the ribs in each series increase in length). In general, for the illustrated gaskets 30, the ribs are for-the-most-part directed inwardly toward the cell 10 rather than outwardly toward the conductive strap 42.

The gasket 30 is held in place by a conducting strap 42 or weld of the strap of a cell core of a battery pack. The strap 42 can be laser welded (for straps having a thickness of less than about 0.15 mm) or resistance welded (for straps having a thickness of about 0.15 mm or greater) in place.

Figure 6:
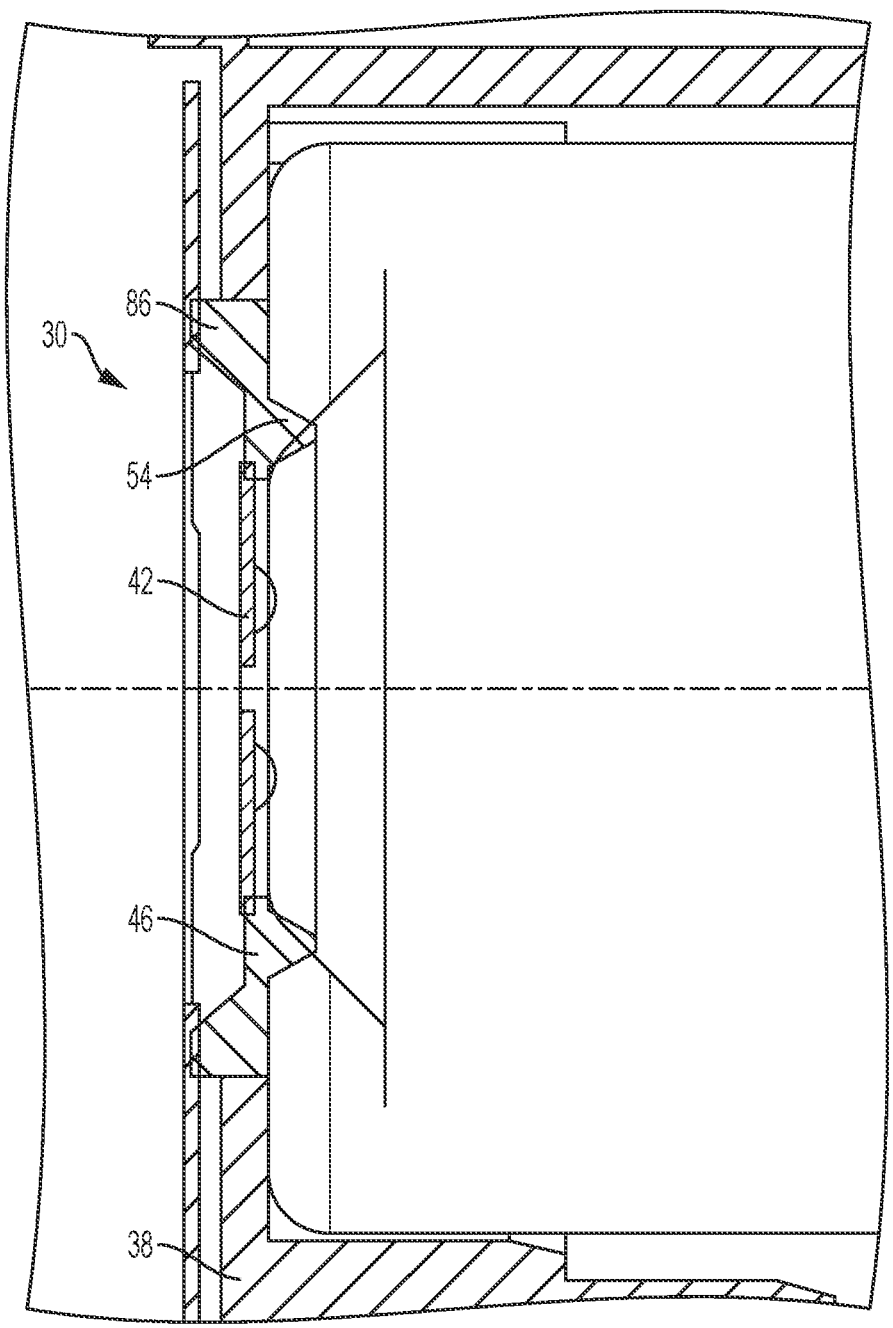
FIG. 6 is a side view of a cell in a core housing in accordance with some embodiments.
Figure 7:
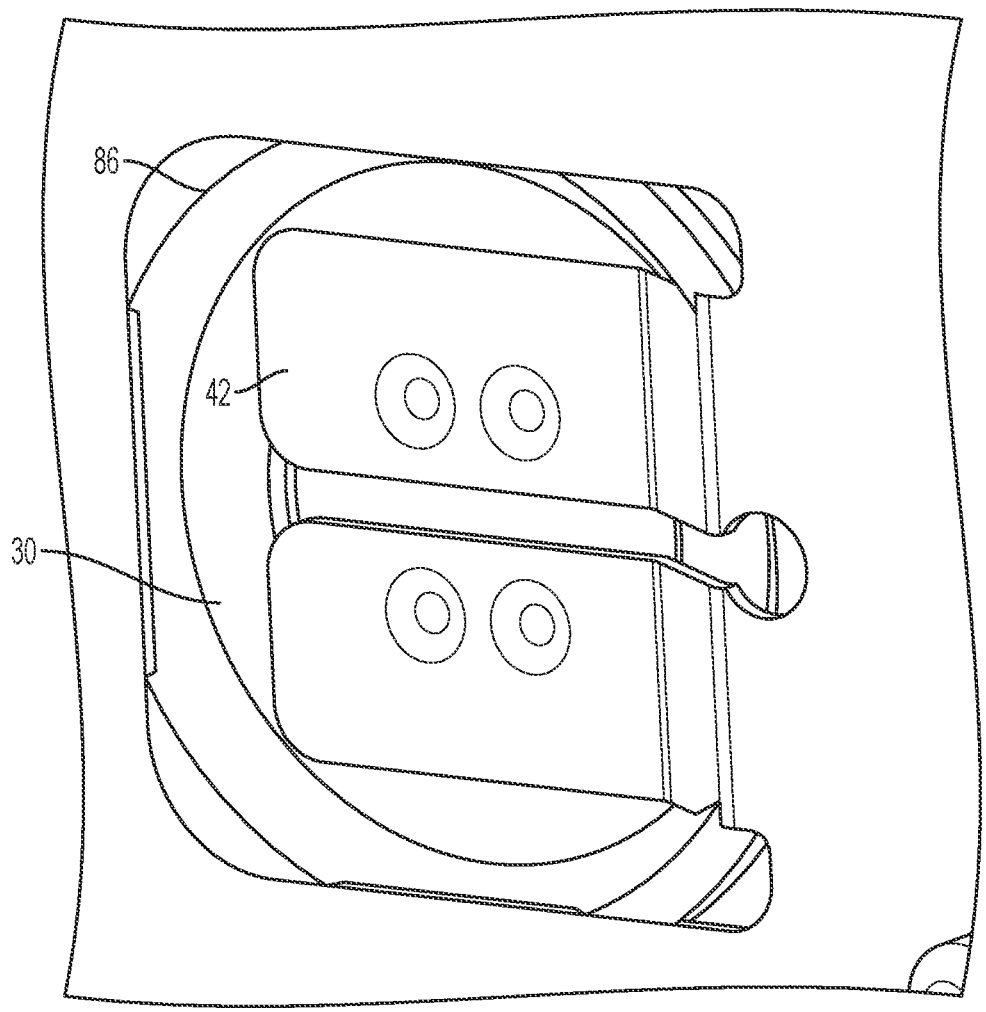
FIG. 7 is a perspective view of the core housing shown in FIG. 6 including a conducting strip in accordance with some embodiments.

With respect to FIGS. 6-7, in some embodiments, the gasket 30 is formed by a single injection molded soft elastomer 46. The gasket 30 extends into an opening of the core housing 38. The gasket 30 is shaped (e.g., with an over-sized inwardly-directed rib 54 and with an outwardly-directed rib 86) to fill the opening. As with the construction in FIGS. 4-5, the gasket 30 is illustrated being held in place by the conducting strap 42 or weld of the strap.

With respect to FIGS. 8-12, in some embodiments, the gasket 30 is placed between the core housing 38 and the cell header 26 (e.g., the positive header; a gasket 30 may or may not be placed at the negative header). The gasket 30 is shaped (e.g., with radially-inner and outer inwardly-directed ribs 62 to fill the opening and extend over the covering 22. As described above, the gasket 30 is illustrated being held in place by the conducting strap 42 or weld of the strap.

With respect to FIGS. 8-12 (and FIG. 15), in some embodiments, the gasket 30 is insert-molded or over-molded to and formed integrally with the core housing 38. Upon assembly of the core housing 38, the header part 26 (e.g., the positive header; again, a gasket 30 may or may not be placed at the negative header) is sealed by the core housing 38 and the insert-molded gasket 30.

Figure 13:
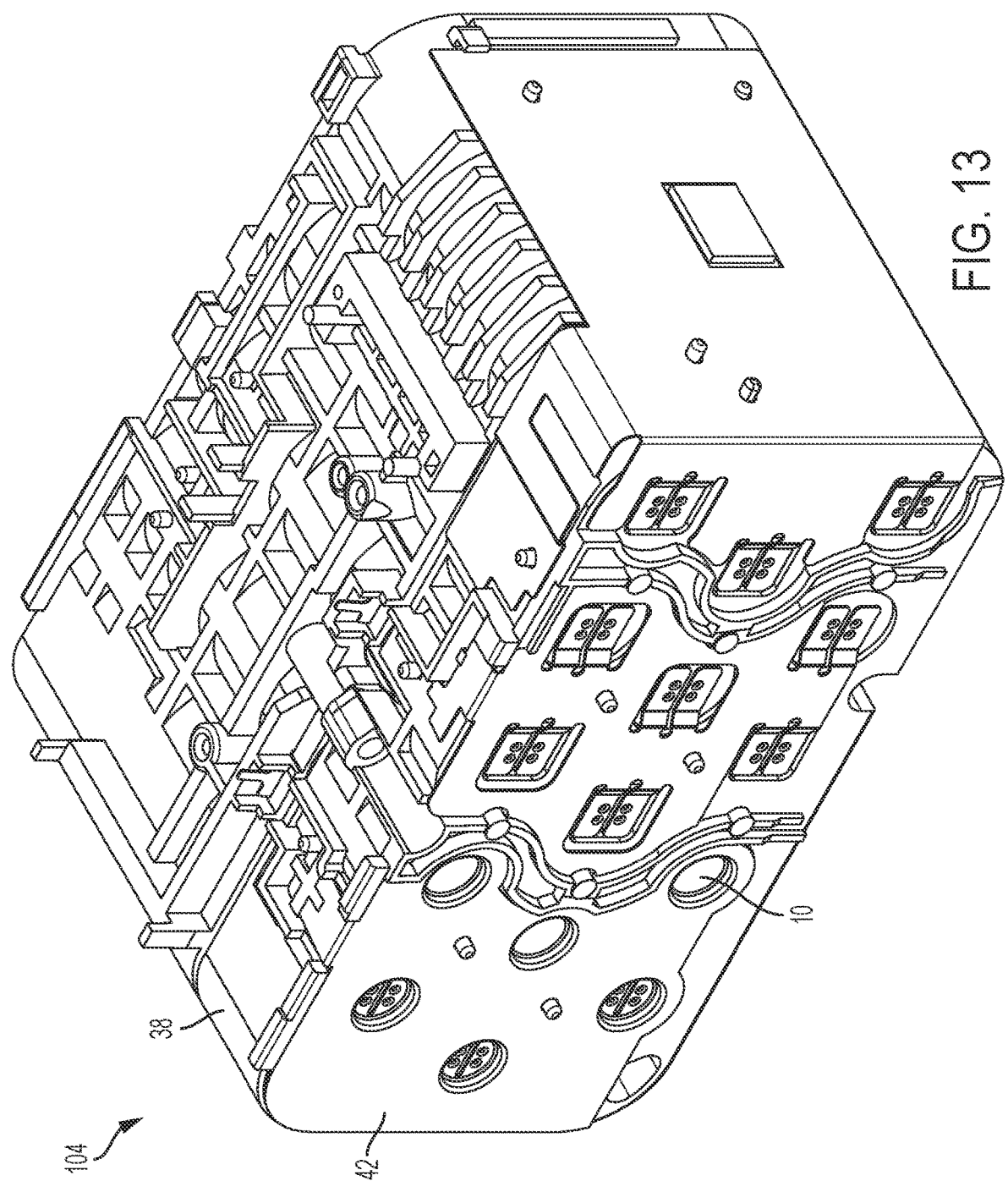
FIG. 13 is a perspective view of a core housing illustrating a laser welded conducting strap in accordance with some embodiments.
Figure 14:
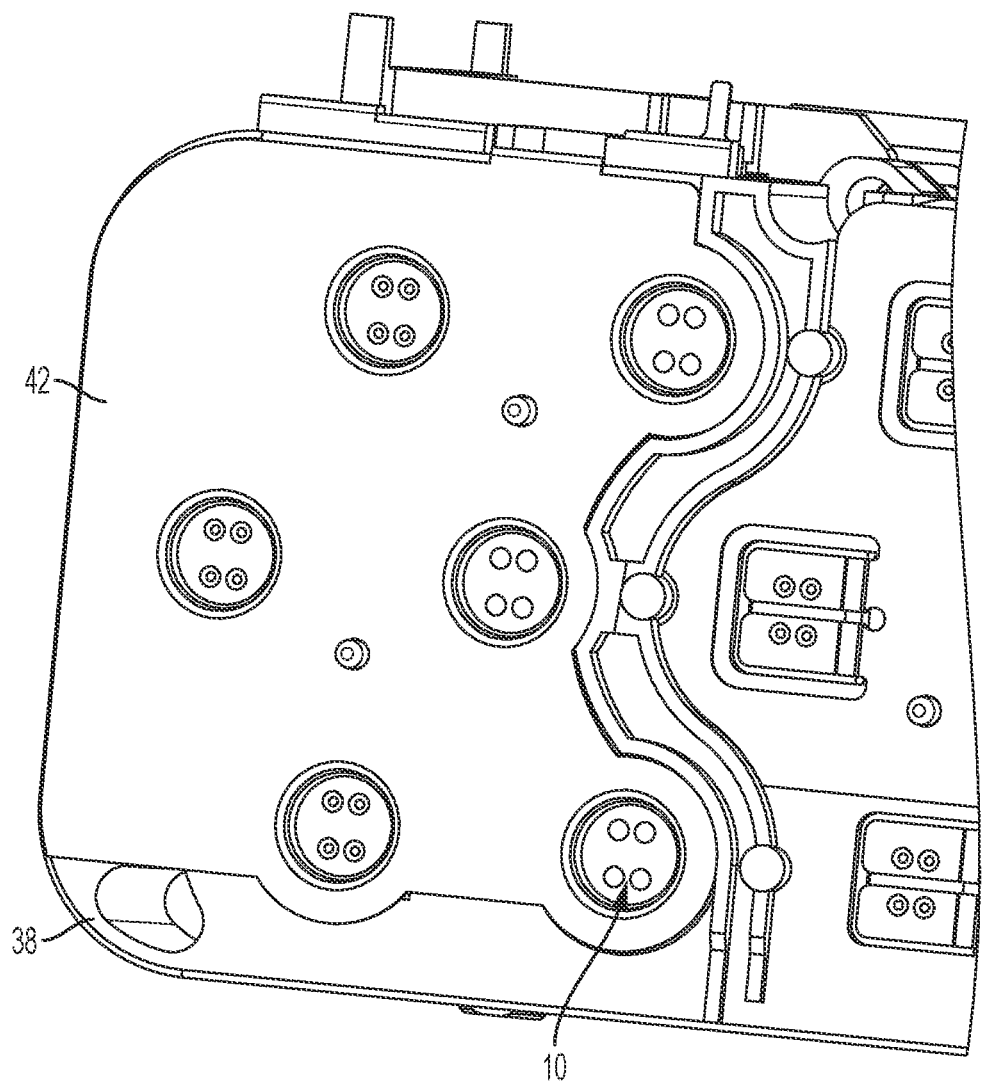
FIG. 14 is a perspective view of the laser welded conducting strap shown in FIG. 13 in accordance with some embodiments.

The conductive strap 42 may be resistance welded (again, for straps having a thickness of about 0.15 mm or greater) or laser welded (for straps having a thickness of less than about 0.15 mm). With respect to FIGS. 13-15, in some embodiments, the conducting strap 42 is laser welded to contact the terminals of the cell 10.

Figure 16:
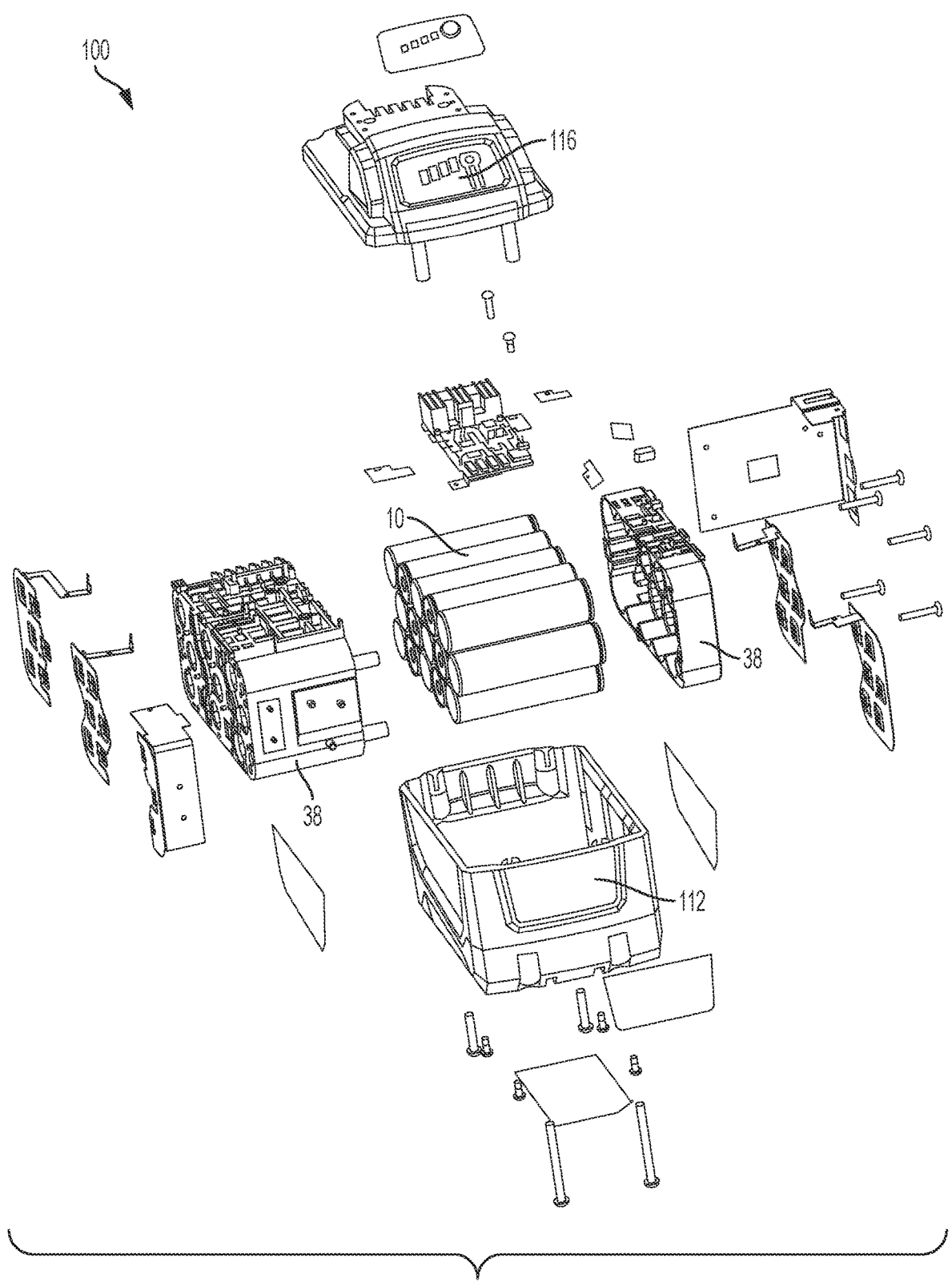
FIG. 16 is an exploded view of a battery pack in accordance with some embodiments.

FIG. 16 illustrates an exploded view of a battery pack 100. The cell core 104, including the core housing 38 supporting the cells 10, is placed in the main housing 108. The bottom portion 112 of the main housing 108 may include elevated posts to suspend cells 10 above the main housing 108 floor and higher side walls to allow for the top portion 116 of the main housing 108 to mount over such an elevated cell core 104. The spacing between the core housing 38 and the main housing 108 may be 3 mm or greater below and/or above the core housing 38.

Figure 17:
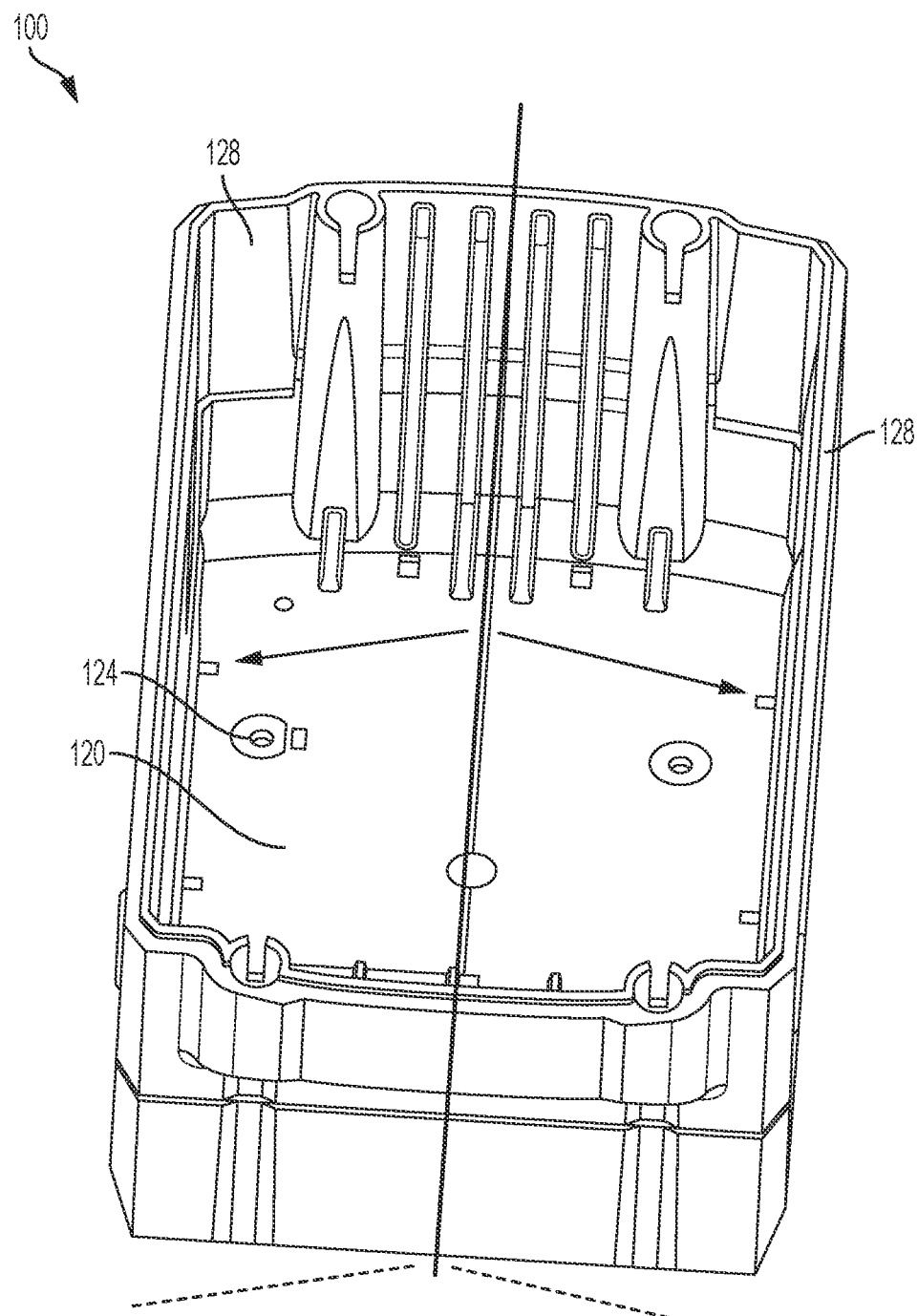
FIG. 17 is a perspective view of a bottom portion of a housing assembly of a battery pack in accordance with some embodiments.

FIG. 17 illustrates a construction of the bottom portion 112 of the main housing 108. The floor 120 of the bottom portion 112 of the main housing 108 may include a draft or slope to provide intentional direction of fluid within the housing 108 to a vent or drain hole 124. The floor 120 may be drafted (e.g., starting at the red line in FIG. 17) outwardly towards side walls 128 to allow any fluid to be directed to exit the housing 108 when the battery pack 100 sitting on a flat surface.

In some embodiments, the side walls 128 of the bottom portion 112 of the main housing 108 may include a draft or slope. The bottom portion 112 of the main housing 108 may also include intermediate drafts or slopes to also direct the fluid in a direction along the centerline and toward an associated vent or drain hole 124.

Figure 18:
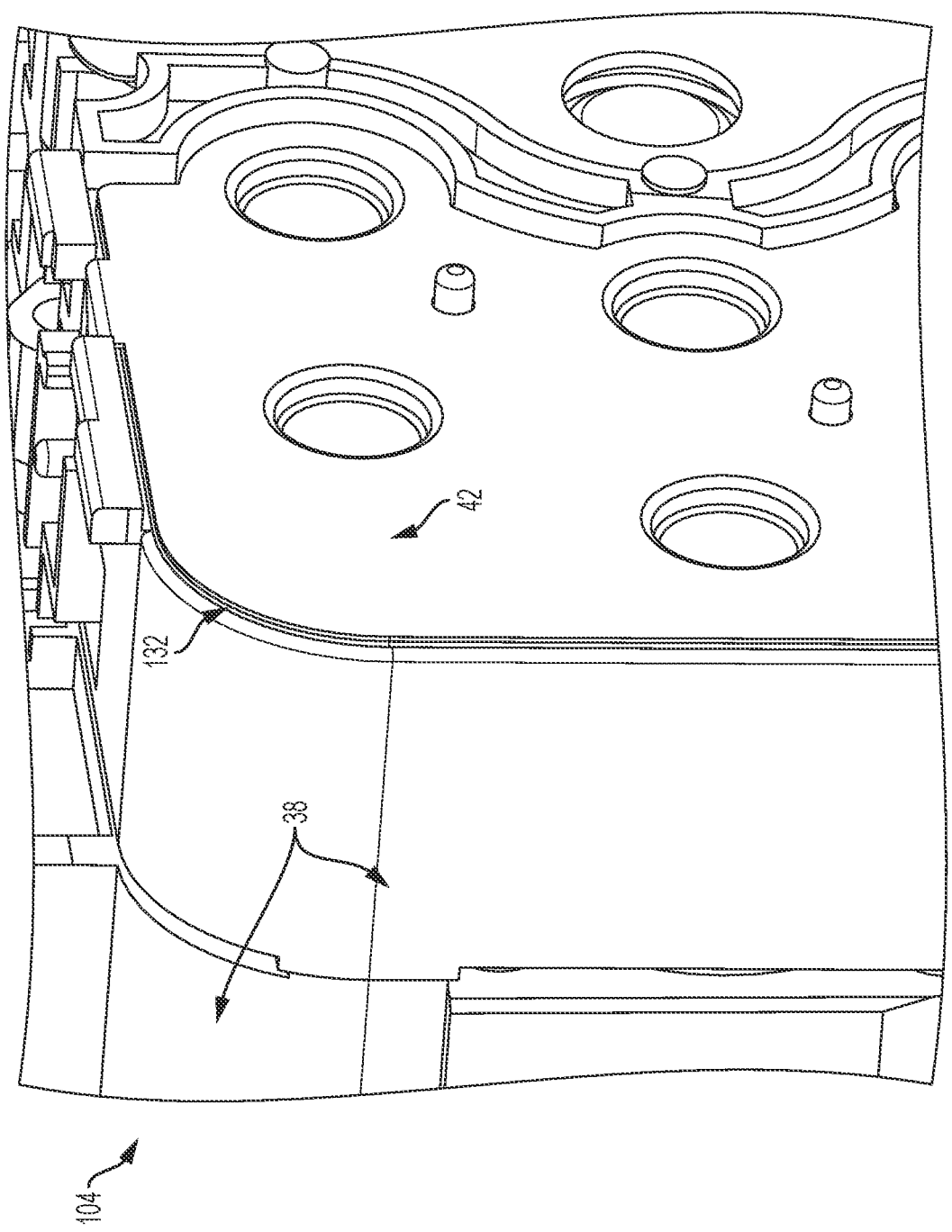
FIG. 18 is a perspective view of a portion of a battery pack in accordance with some embodiments.
Figure 19:
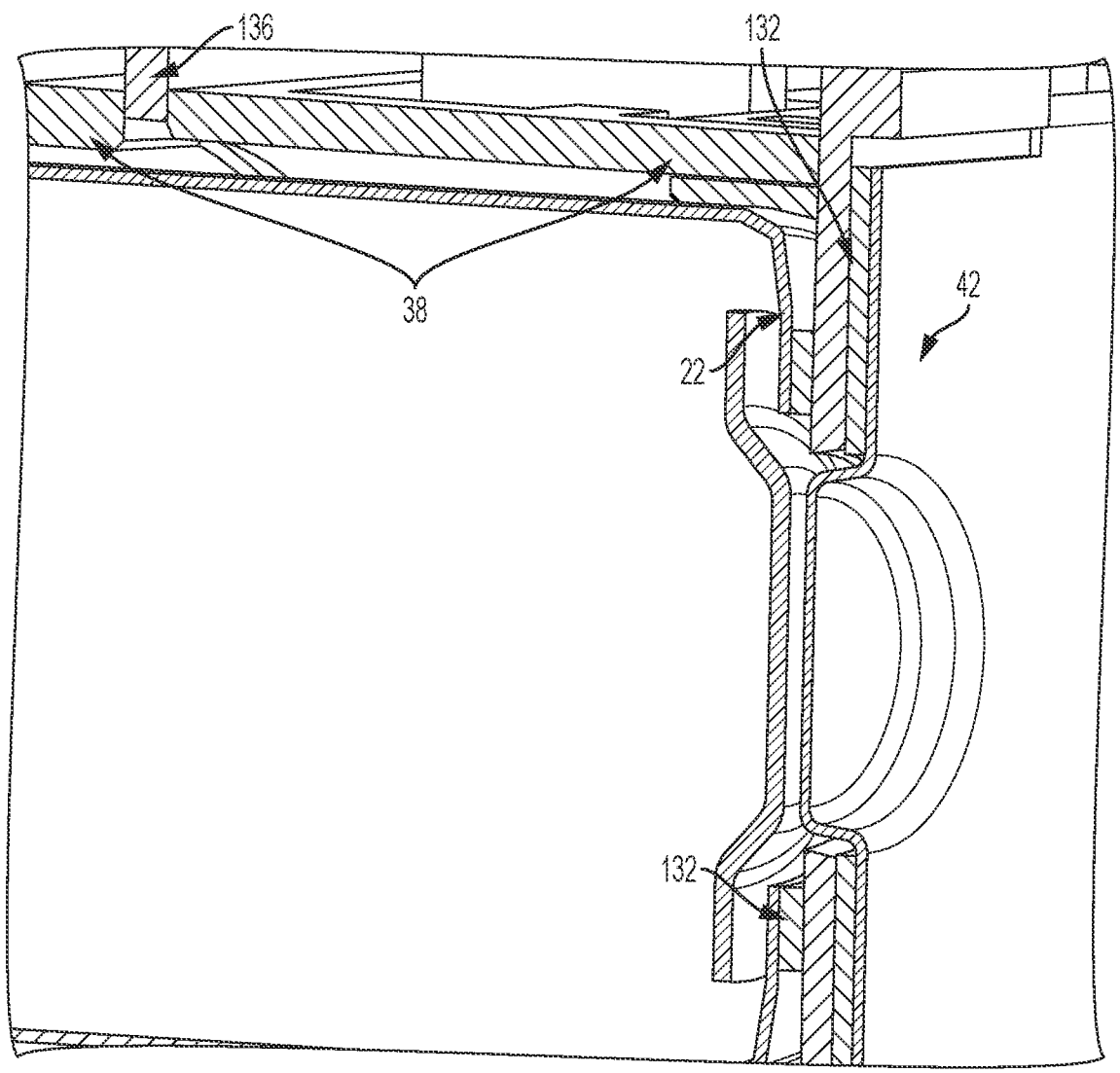
FIG. 19 is a perspective cross-sectional view of a portion of the battery pack shown in FIG. 18.

FIGS. 18-19 illustrate a portion of a battery pack 100 including a seal or gasket 132 between the conductive strap 42 and the core frame or housing 38. The strap 42 and the core housing 38 provide compression to the gasket 132 to inhibit ingress of fluid to the cell(s) 10 or cell header 26. The battery pack 100 may also include, as described above, a seal or gasket 30 between the cell 10 and the core housing 38 and/or a gasket 136 between pieces of the core housing 38 to prevent ingress from the opposite side.

As shown in FIG. 19, the weld strap 42 and the pieces of the cell core housing 38 sandwich material of a gasket 132 to inhibit ingress to the battery cell 10. Reference numbers 132, 136 illustrate possible secondary seal/gasket locations.

FIGS. 20A-20J illustrate a sealed battery pack 100. In the illustrated construction, the battery pack 100 is sealed by potting entire an upper housing portion 116 and removing drain holes 124 at the bottom of the lower housing portion 112.

As shown in FIGS. 20C-20F, openings through the upper housing area 116 and into the housing cavity are sealed, and, in order to accommodate the sealing arrangement, separate weld straps 140 mechanically and electrically connect to the conductive straps 42 of the cell core 104 (see FIGS. 20D and 20F-20H). Likewise, drain/vent openings 124 through the lower housing portion 112 are eliminated or closed (see FIG. 20I). As shown in FIG. 20J, a seal or gasket 144 is provided between (e.g., ultrasonically welded to, insert molded with, mechanically held by, etc.) the upper housing portion 116 and lower housing portion 112.

Figure 20A:
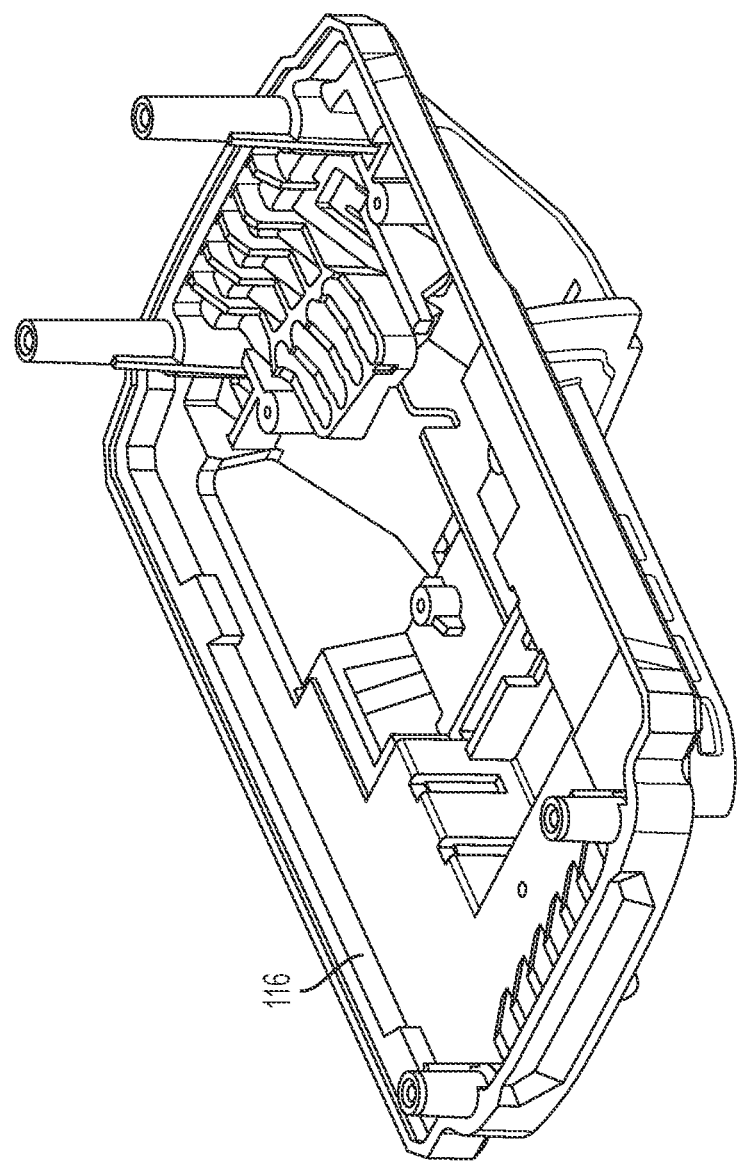
FIGS. 20A-20J are views of a sealed battery pack, illustrating a method of assembling the battery pack.
Figure 20B:
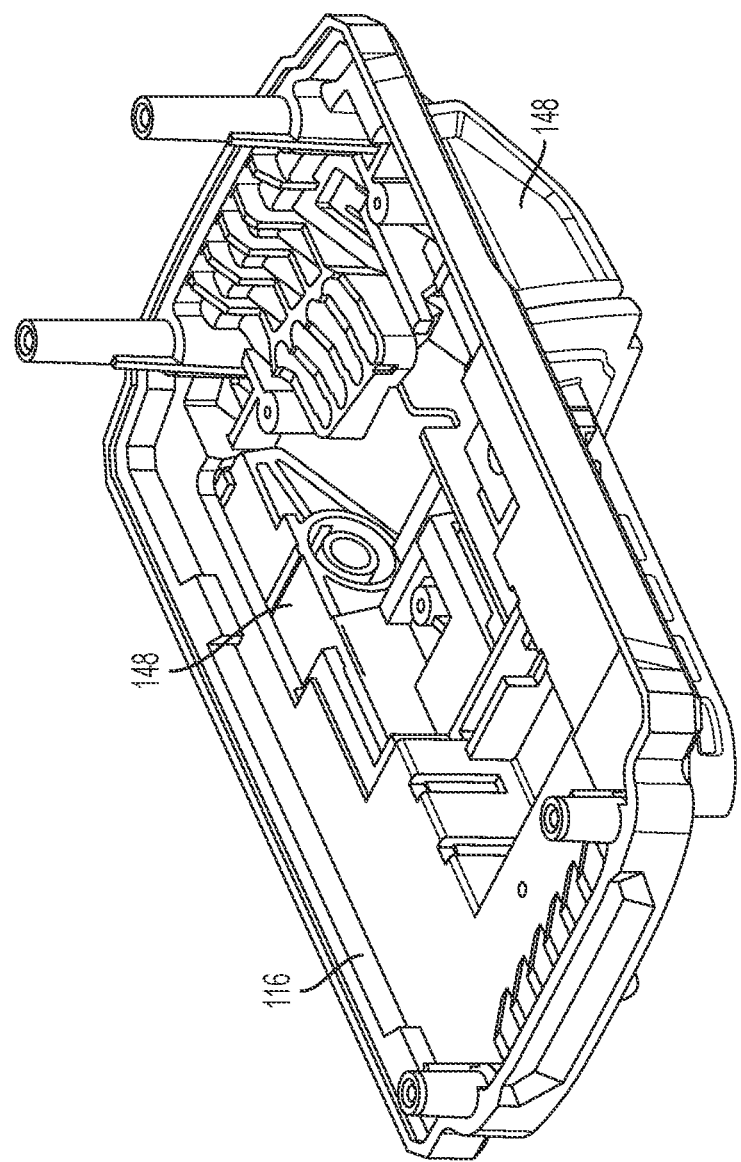
Figure 20C:
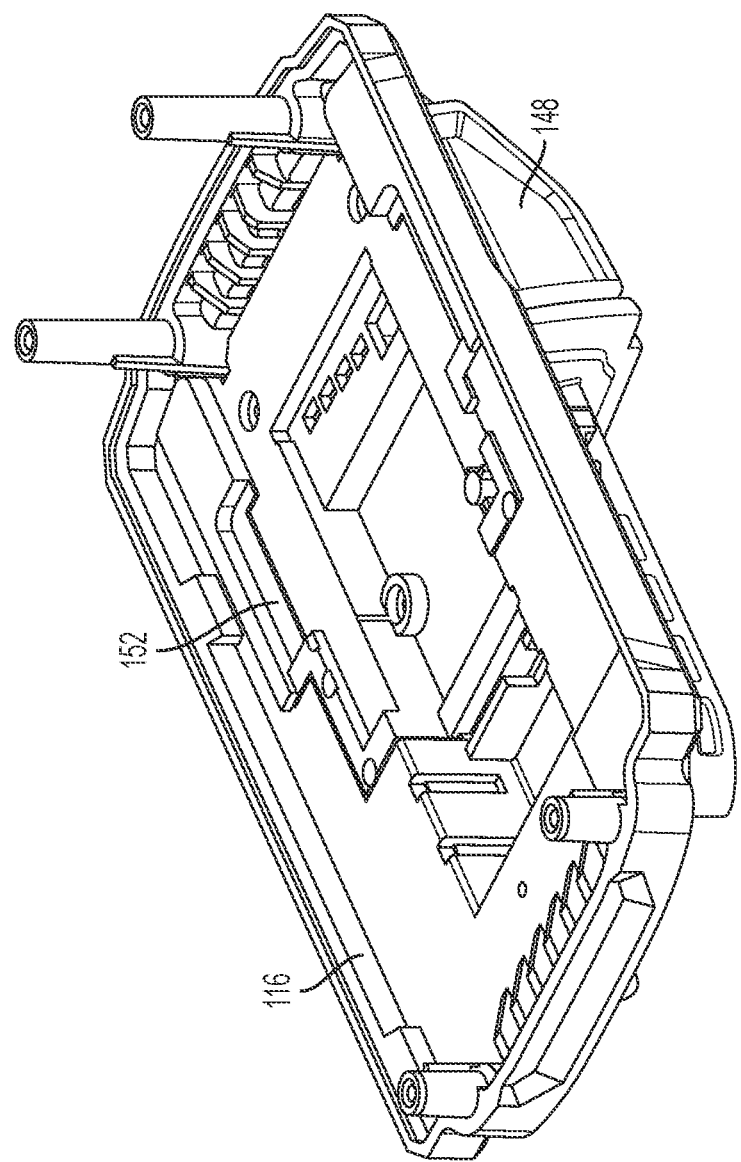
Figure 20D:
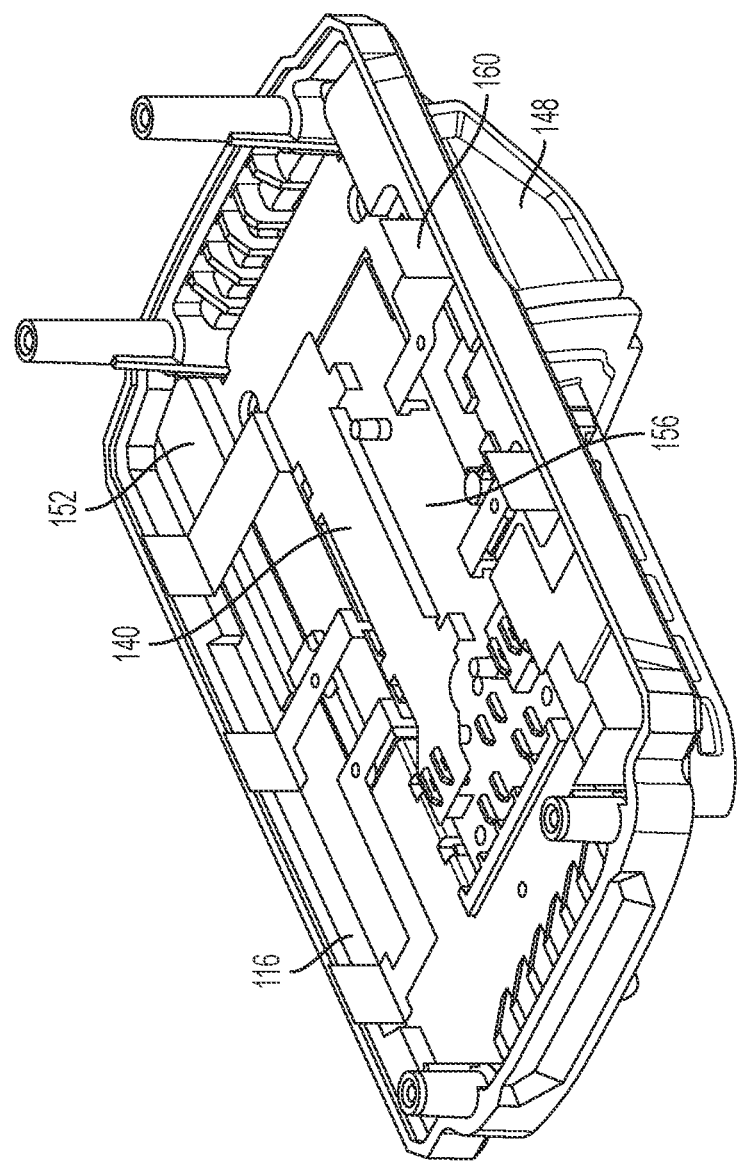

As shown in FIGS. 20A-20B, the upper housing portion 116 and the battery pack latches 148 are assembled. The latch cover 152 (see FIG. 20C) is insert-molded with clear material for a light-emitting diode (LED) or LED cover. In FIG. 20D, the printed circuit board assembly (PCBA) 156, including a controller, is assembled to the upper housing section 116. The separate weld straps 140 are electrically connected to the PCBA 156. Each weld strap 140 includes a free end 160 for connection to the cell core 104.

Figure 20E:
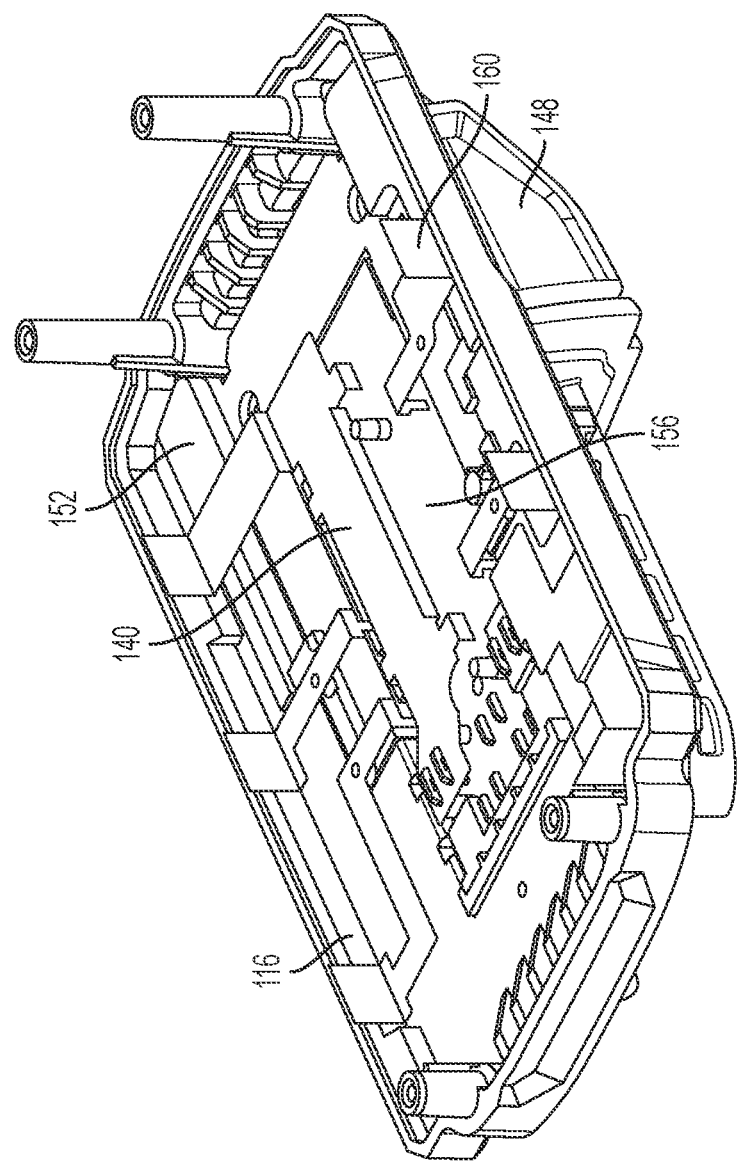
Figure 20F:
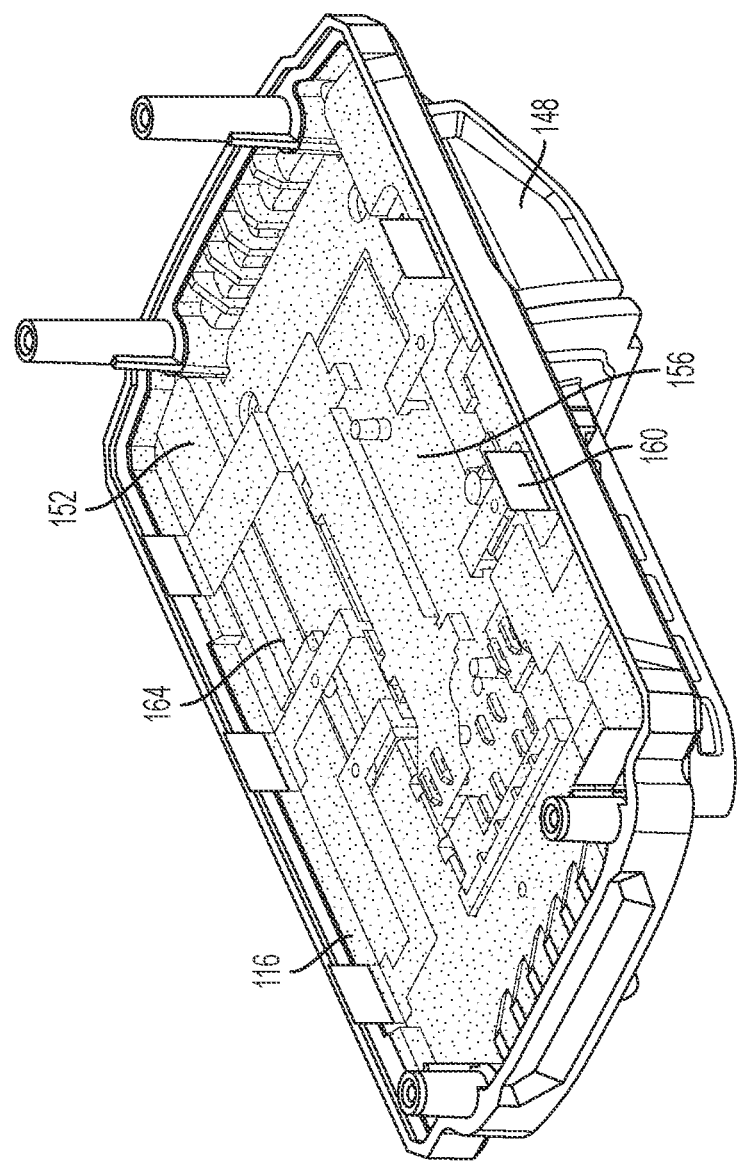

Spaces proximate the terminals and in the area the upper housing 116 contacts the PCBA 156 are filled (see FIG. 20E). As shown in FIG. 20F, potting compound material 164 covers the PCBA 156 and terminal connections and fills the underside of the upper housing area 116, leaving only the free ends 160 of the weld straps 140 exposed.

Figure 20G:
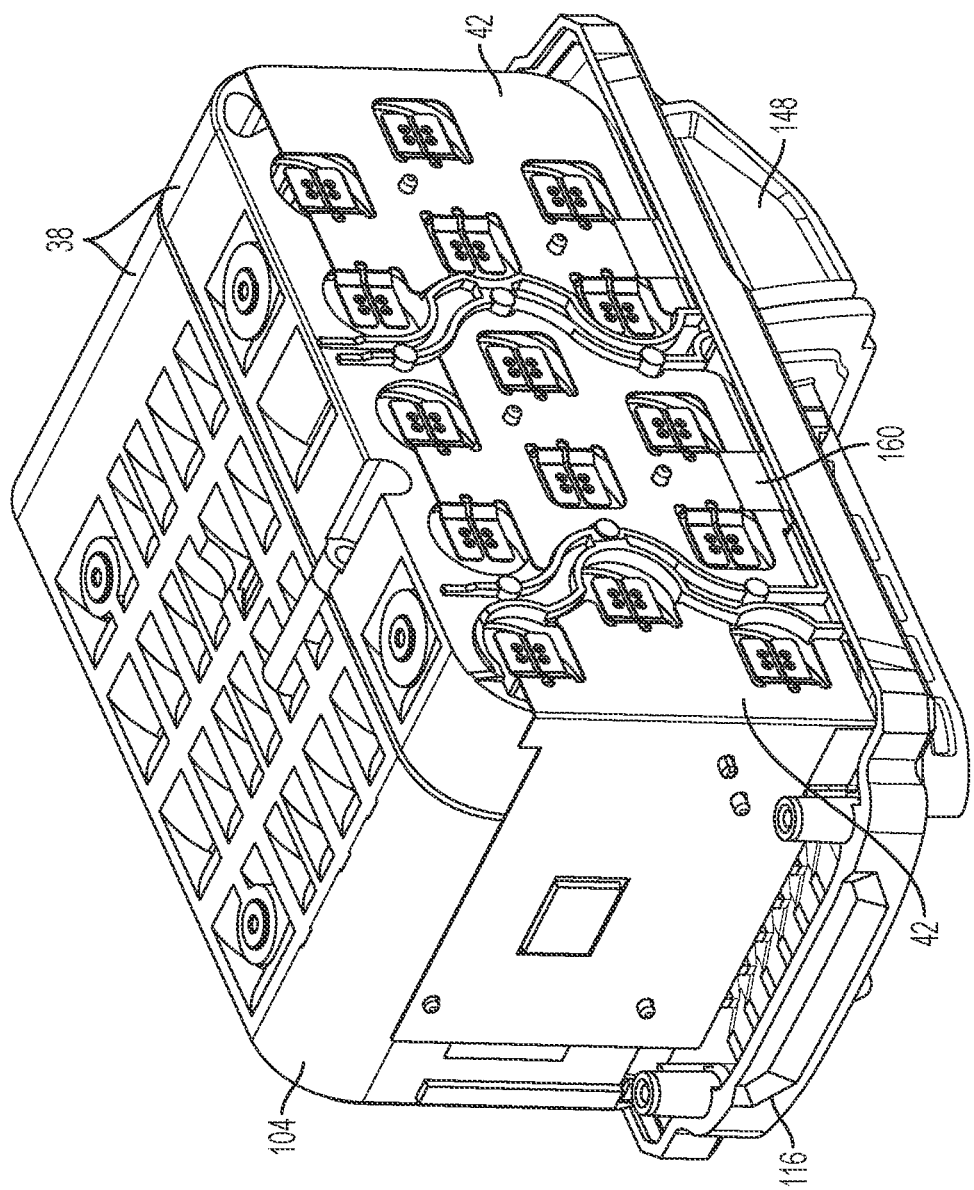
Figure 20H:
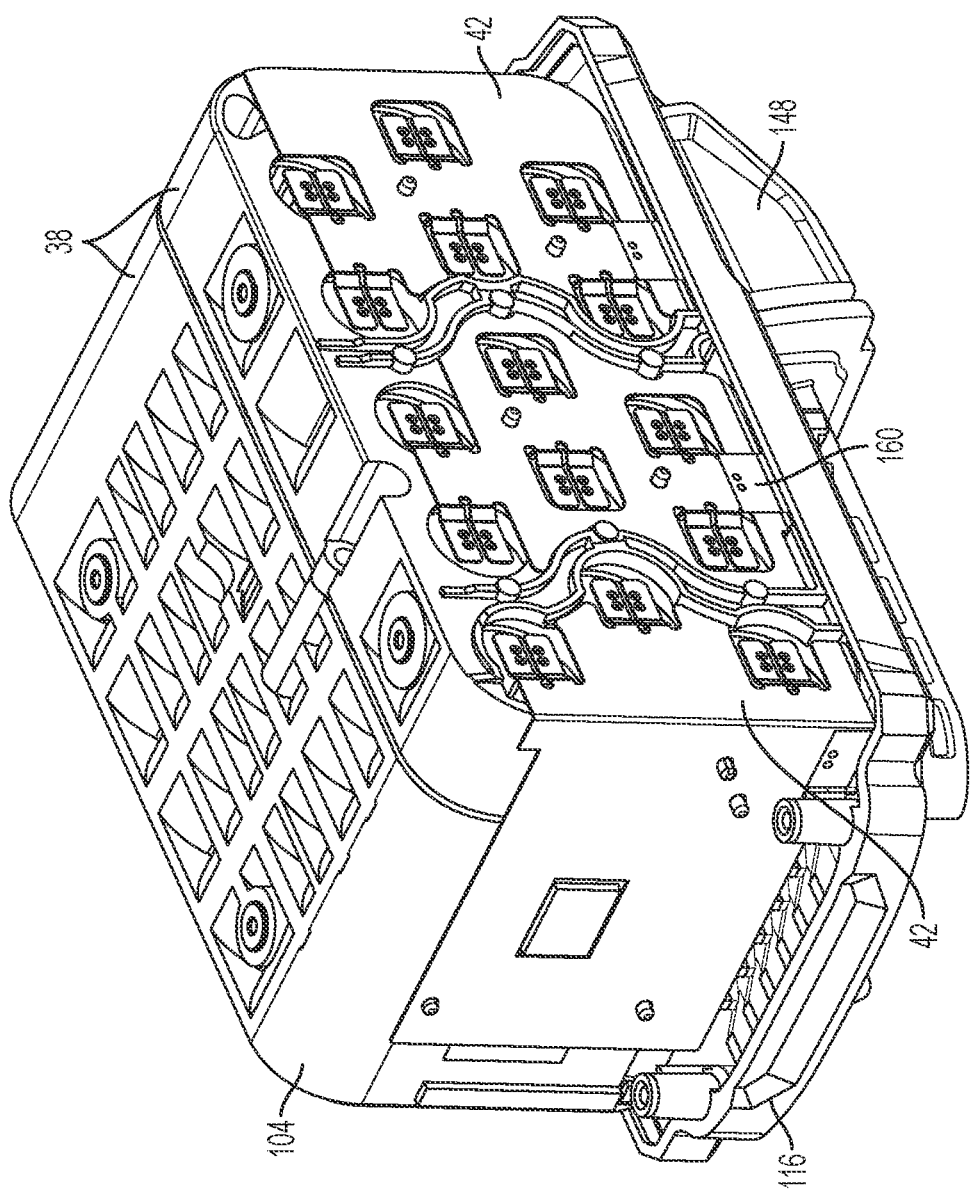
Figure 20I:
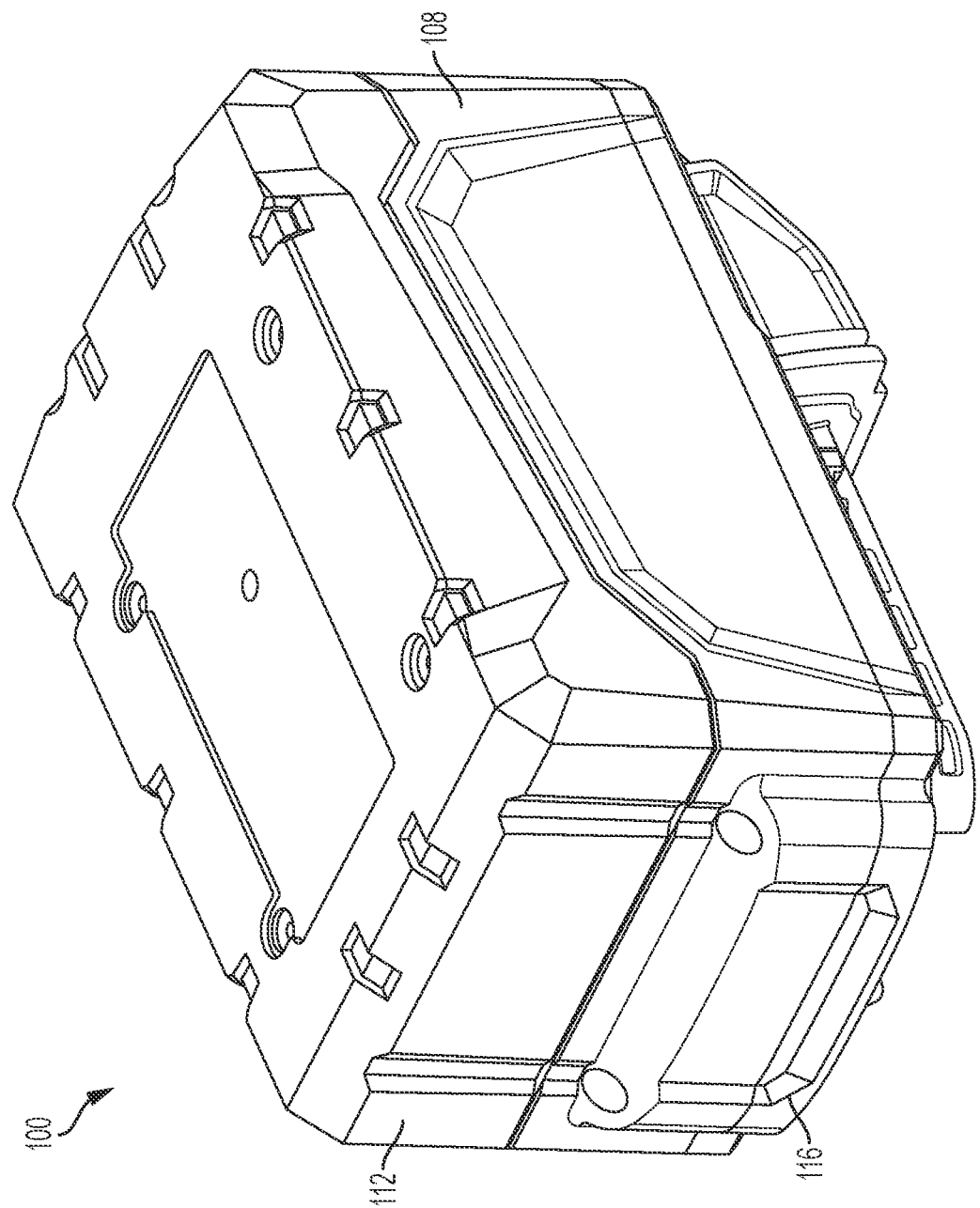
Figure 20J:
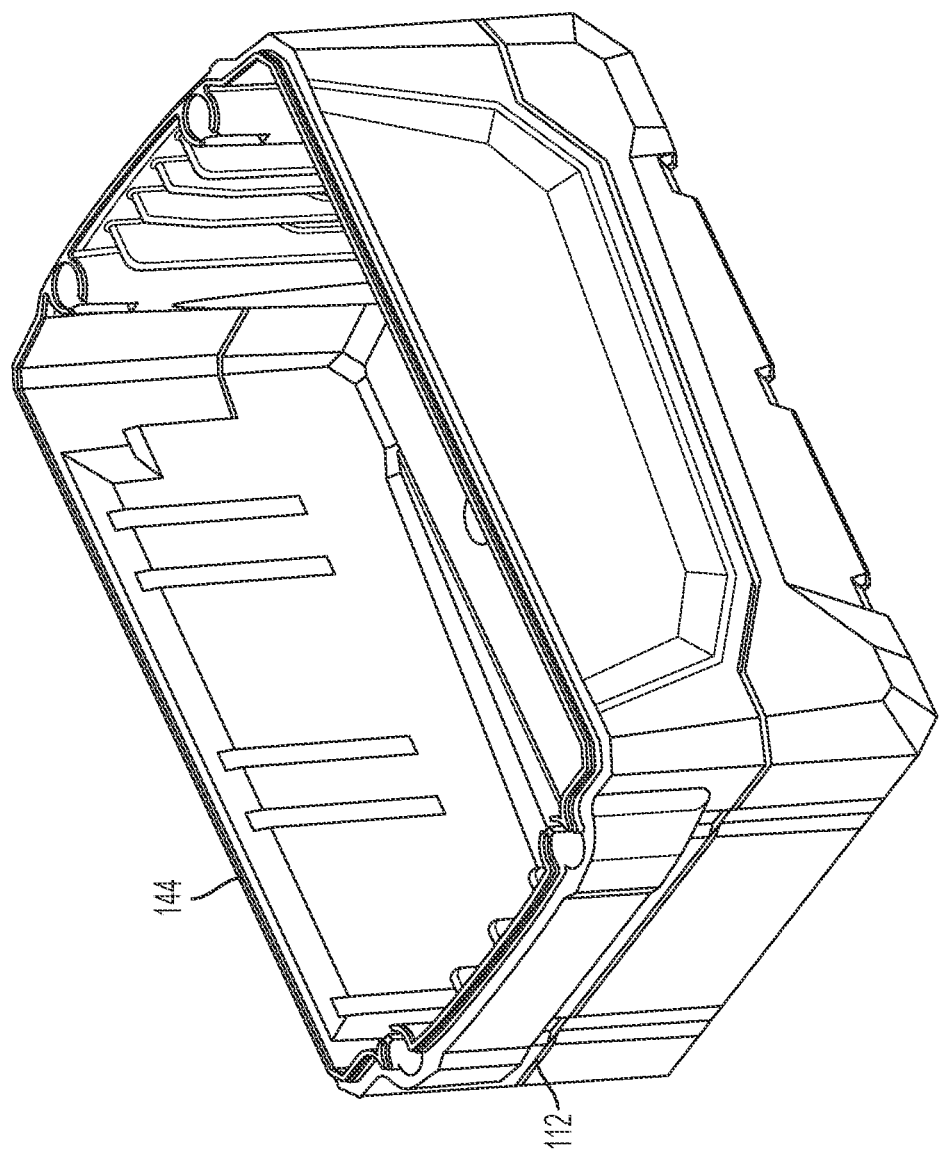

As shown in FIGS. 20G-20H, the cell core 104, including the battery cells 10, the core housing 38, and the conductive straps 42, is assembled to the upper housing section 116, and the weld straps 140 are electrically and mechanically connected to the conductive straps 42. The sealed lower housing portion 112 is connected to the upper housing section 116 (see FIG. 20I), and a gasket 132 (rubber foam), connected, in the illustrated construction to the lower housing portion 112 (e.g., by ultrasonic welding), seals the interface.

In some embodiments, spacing between conductive elements (e.g., weld straps 140, conductive straps 42, etc.) within the battery pack 100 is increased to reduce the likelihood of a short circuit when conductive fluid enters the battery pack 100—generally, the greater the spacing between conductive elements within the battery pack 100 the more ingress fluid that is necessary to cause a short circuit. Accordingly, spacing between the welding straps 140 (see, e.g., FIG. 20D) and/or between the conductive straps 42 (see, e.g., FIG. 20H) may be increased; however, spacing of such conductive components is not increased so much as to negatively impact electrical performance of the conductive components (e.g., significantly increase resistance and/or heat).

In existing battery packs, the spacing between weld straps may be as small as about 1.0 mm. With the above-described increased spacing, in some embodiments, the spacing between the weld straps 140 (and/or the conductive straps 42) may be between about 0.5 mm/1 V of voltage differential to about 1.5 mm/1 V of voltage differential. In other embodiments, the spacing may be between about 0.55 mm/1 V of voltage differential and about 1.2 mm/1 V of voltage differential. In still other embodiments, the spacing may be between about 0.7 mm/1 V of voltage differential and about 1.125 mm/1 V of voltage differential. For example, the spacing between weld straps 140 may be about 1 mm/1 V of voltage differential.

In some examples, the voltage differential between weld straps 140 may be about 8 V, and, for such examples, the corresponding spacing is at least about 3.5 mm or greater or at least 7.5 mm or greater. In some embodiments, the spacing is between about 5 mm and about 9 mm. In other embodiments, the spacing may be between about 6.5 mm and about 8.5 mm. In still other embodiments, the spacing is between about 7.0 mm and about 8.0 mm. In some embodiments, the example spacing distance between straps 140 noted above may be implemented on any type of battery pack 100 (e.g., battery packs 100 with a single cell string (1P), two parallel cell strings (2P), three parallel cell strings (3P), etc., battery packs 100 including 18650 battery cells, 20700 battery cells, 21700 battery cells, etc.).

In some embodiments, the spacing distance between the weld straps 140 and/or the conductive straps 42 may be different depending on the configuration of the battery pack 100. In other words, the spacing distance between the weld straps 140 and/or the conductive straps 42 may vary depending on at least one of the impedance and power capacity of the battery pack 100 (e.g., the number of and arrangement of cells 10 in the battery pack 100 (e.g., a single cell string (1P), two parallel cell strings (2P), three parallel cell strings (3P), etc.); the size of the battery cells 10 (e.g., 18650 cells, 20700 cells, 21700 cells, etc.), etc.).

In some embodiments, a battery pack 100 with higher power capacity and lower impedance may have larger spacing distances between straps 140 and/or the conductive straps 42 than a battery pack with lower power capacity and higher impedance. For example, a first battery pack 100 with two parallel sets of five battery cells 10 (2P) may have straps 140 spaced closer together (e.g., a spacing of about 3.5 mm) than a second battery pack 100 with three parallel sets of five battery cells 10 (e.g., a spacing of about 6.5 mm to about 8.5 mm) because the second battery pack 100 has a larger power capacity than the first battery pack 100.

In some embodiments, the spacing distance between the straps 140 and/or the conductive straps 42 may vary based on the type of battery cell 10 (e.g., 18650 cells, 20700 cells, 21700 cells, etc.). As another example, a first battery pack 100 with two parallel sets of five 18650 battery cells 10 may have the straps 140 spaced closer together (e.g., a spacing of about 3.5 mm) than a second battery pack 100 with two parallel sets of five 21700 battery cells 10 (e.g., a spacing of about 6.5 mm to about 8.5 mm) because the second battery pack 100 has a larger power capacity than the first battery pack 100.

Figure 21A:
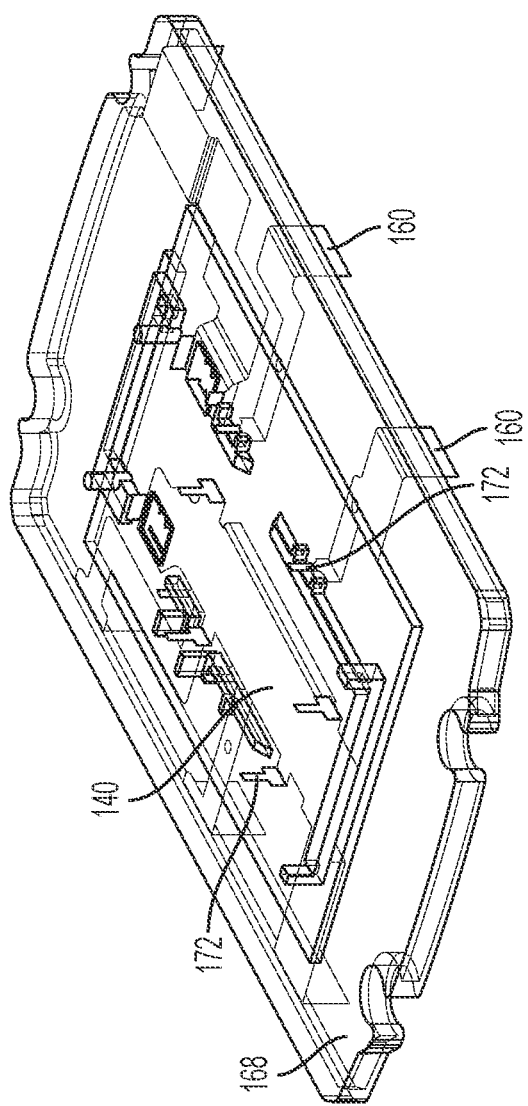
Figure 21B:
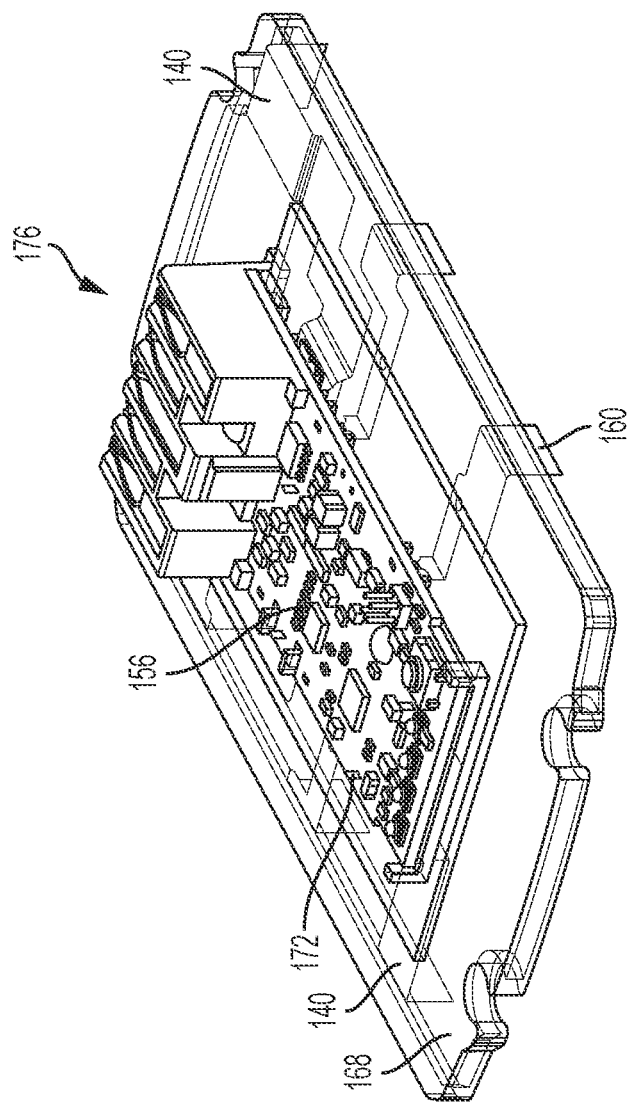
Figure 21D:
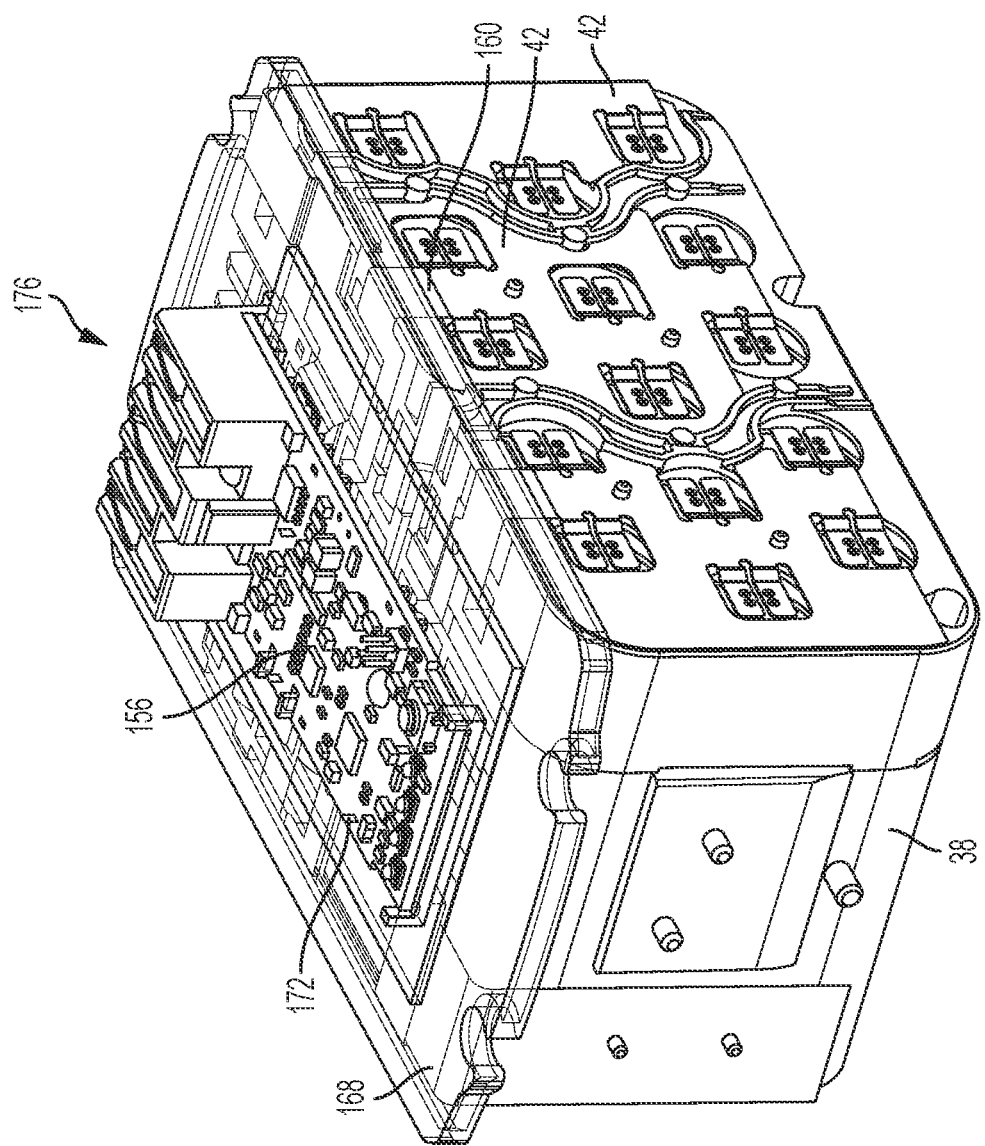
Figure 21E:
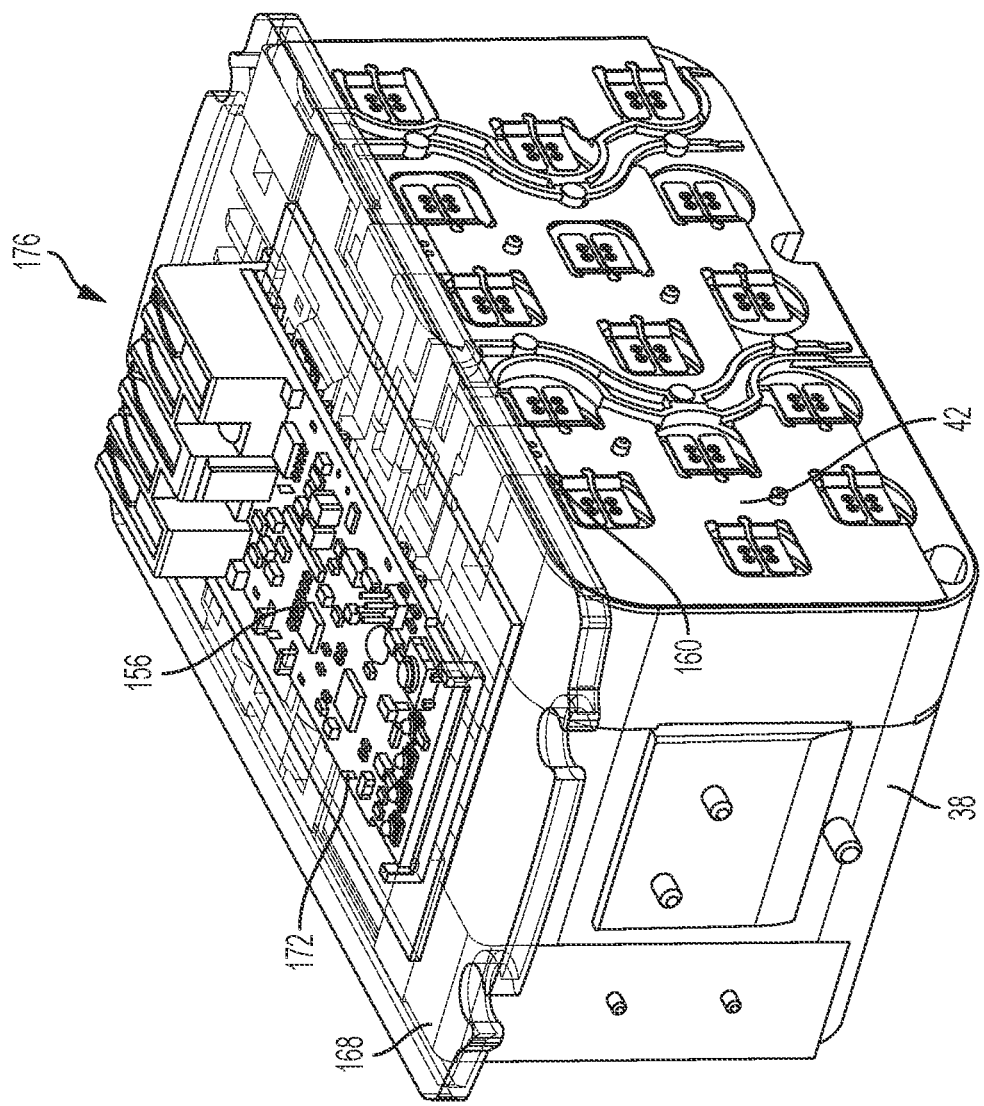
Figure 21F:
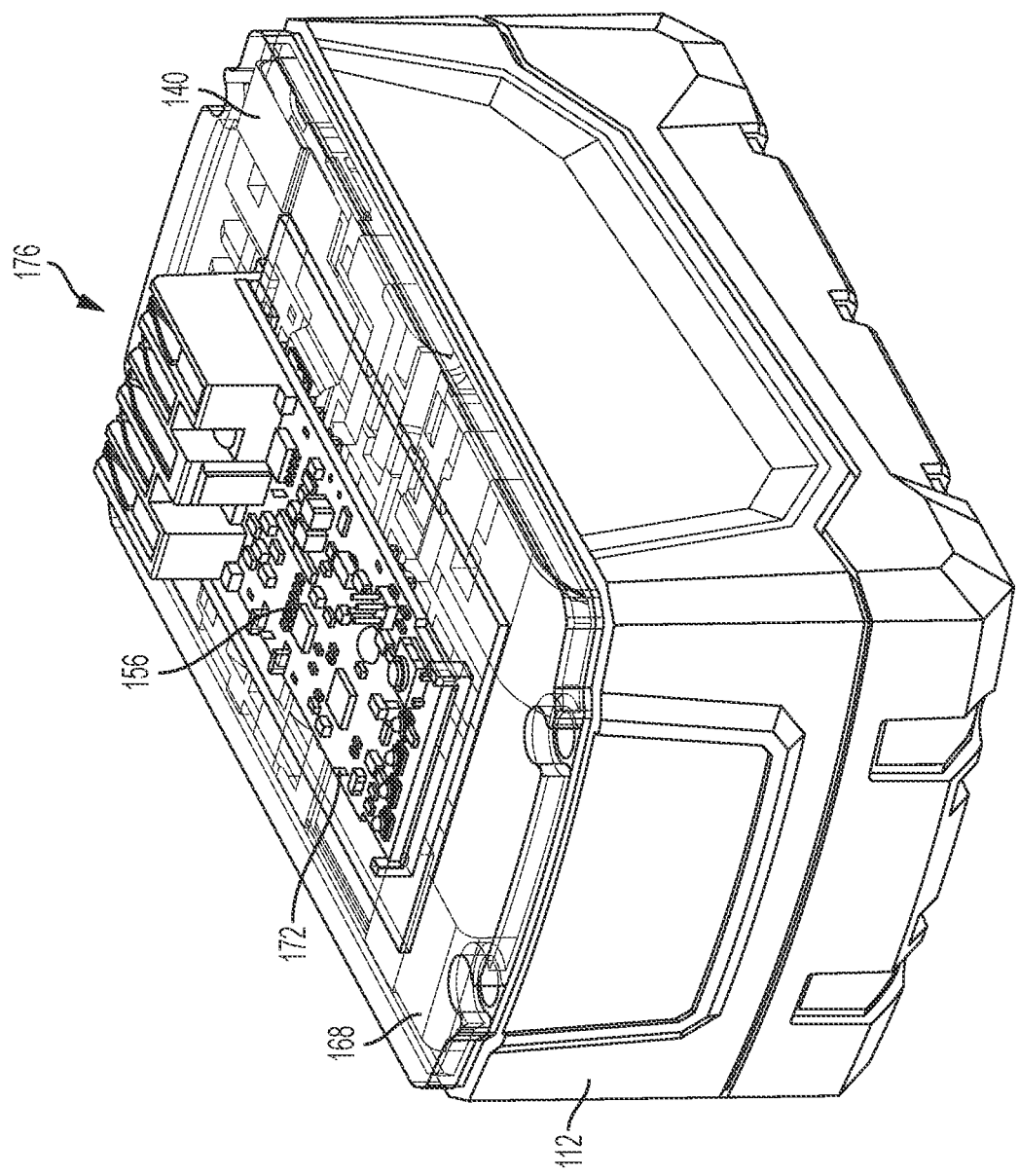
Figure 21G:
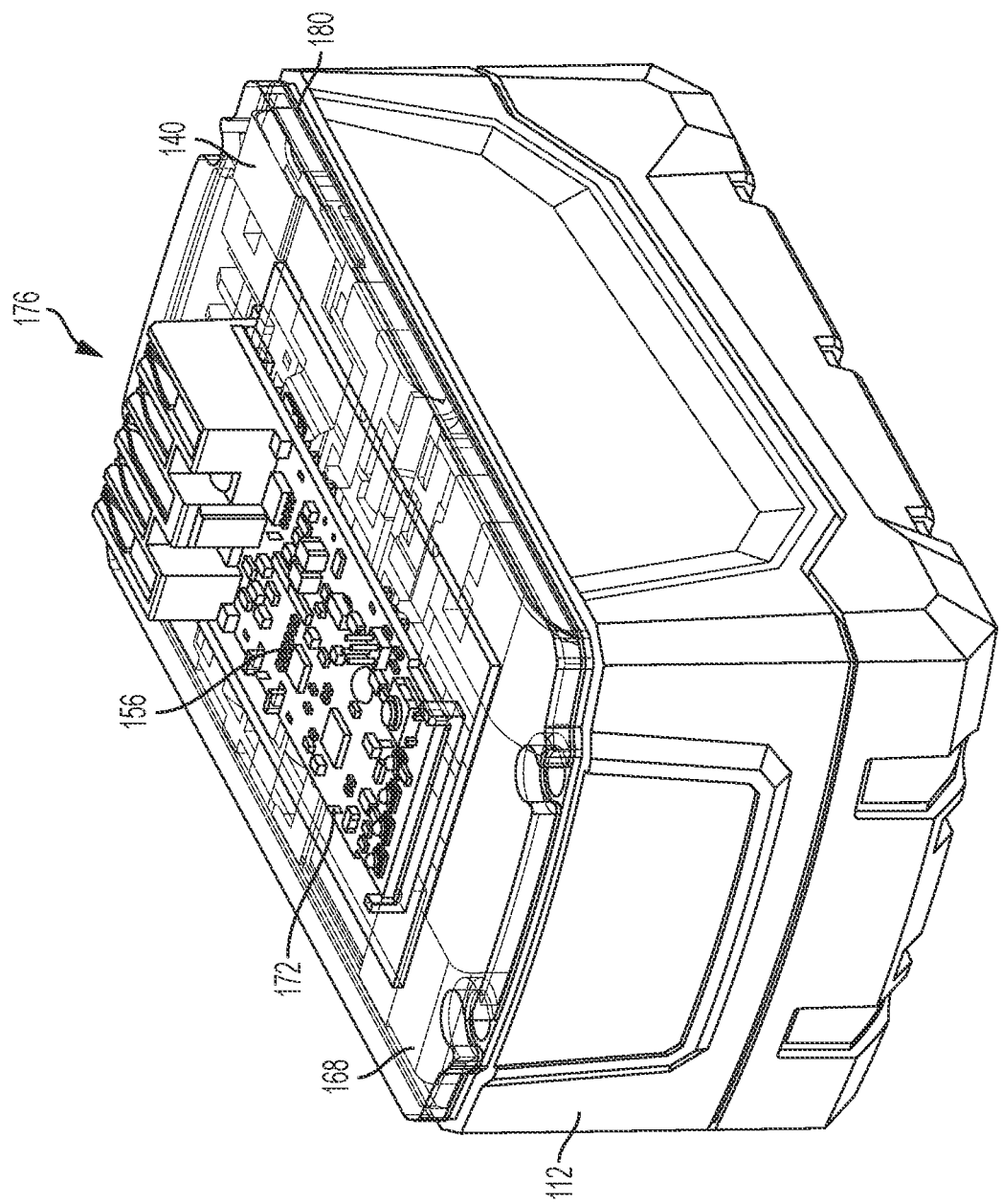

FIGS. 21A-21H illustrate another sealed battery pack 100. In the illustrated construction, the battery pack 100 is sealed by an insert 168 positioned between and sealing the lower housing portion 116 from the upper housing portion 120. As shown in FIGS. 21A and 21G, an insert plate 168, molded with a "spider" of weld straps 140, is sealingly connected (e.g., ultrasonically welded) to the sealed lower housing portion 112. In other constructions (not shown), the weld straps 140 may be assembled with or connected to the insert plate 168 with any openings (e.g., to accommodate exposed contact ends) being sealed.

As mentioned above, the insert 168 includes a plate with the weld straps 140 insert molded therein. The weld straps 140 include exposed contact ends 172 for the PCBA 156 and oppositely-extending (e.g., downwardly) exposed contact ends 160 for the conductive straps 42. As shown in FIG. 21B, the PCBA, with the battery pack terminal block 176, is electrically connected (e.g., soldered) to the upper contact ends 172. The area of the solder connections are filled (e.g., with glue; see FIG. 21C).

As shown in FIG. 21D, the insert 168 is connected to the core housing 38, and the lower contact ends 160 of the weld straps 140 are electrically-connected (e.g., welded) to the conductive straps 42 (see FIG. 21E). The cell core 104 is positioned within the sealed bottom housing portion 112 (see FIG. 21F), and, as shown in FIG. 21G, the insert 168 and the bottom housing portion 112 are sealingly connected (e.g., ultrasonically-welded). A sealing member 180 (e.g., a gasket, room-temperature-vulcanized (RTV) silicone, etc.; see FIG. 21G) is sealed at the interface between the insert 168 and the bottom housing portion 112. The lower portion of the battery pack 100 forms a sealed unit.

Figure 21H:
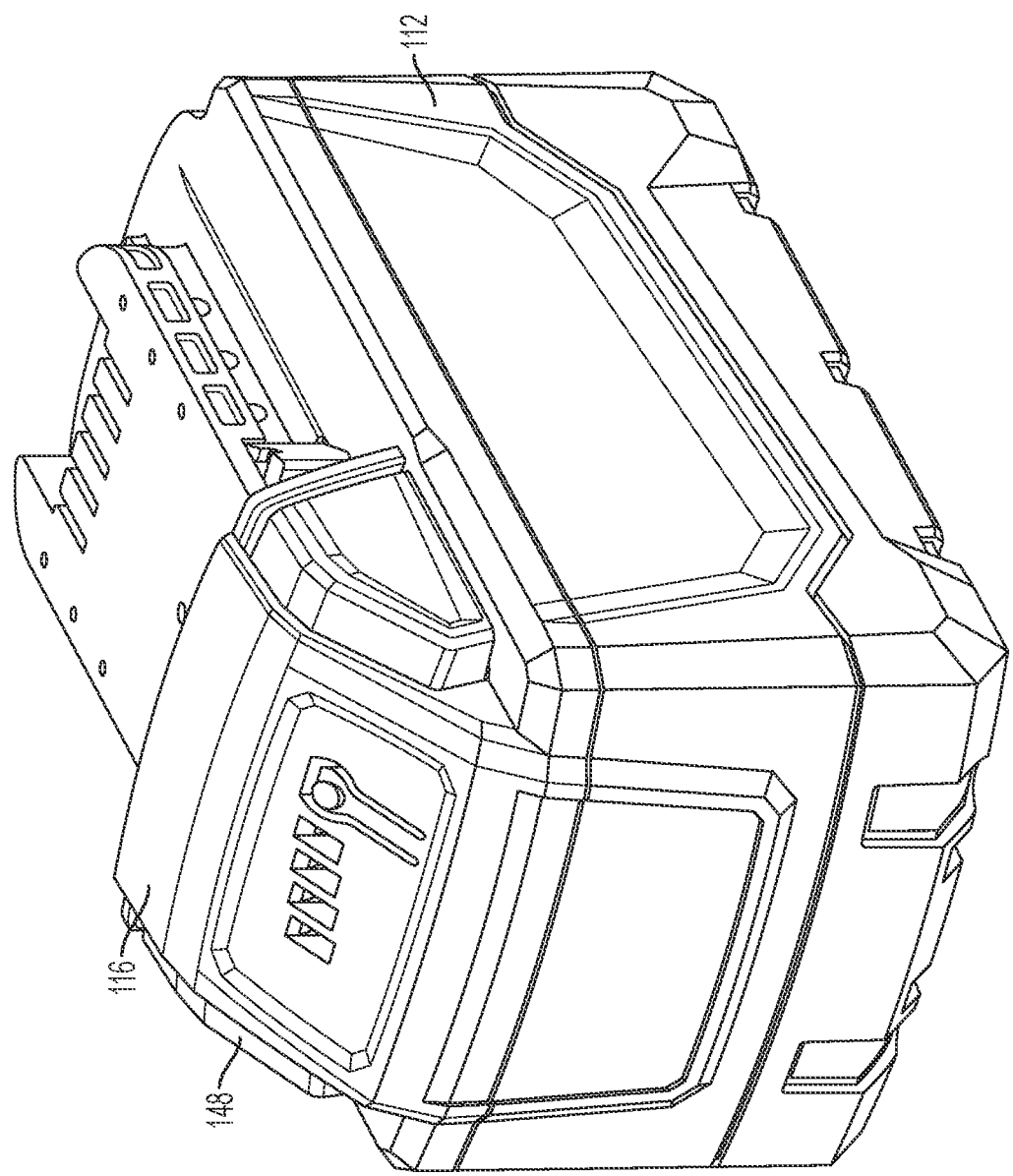

As shown in FIG. 21H, the upper housing sub-assembly is assembled to the lower portion of the battery pack 100 (shown in FIG. 21G). As described above (see FIGS. 20A-20C), the upper housing sub-assembly includes an upper housing portion 112, latches 148 and a latch cover 152.

Figure 22:
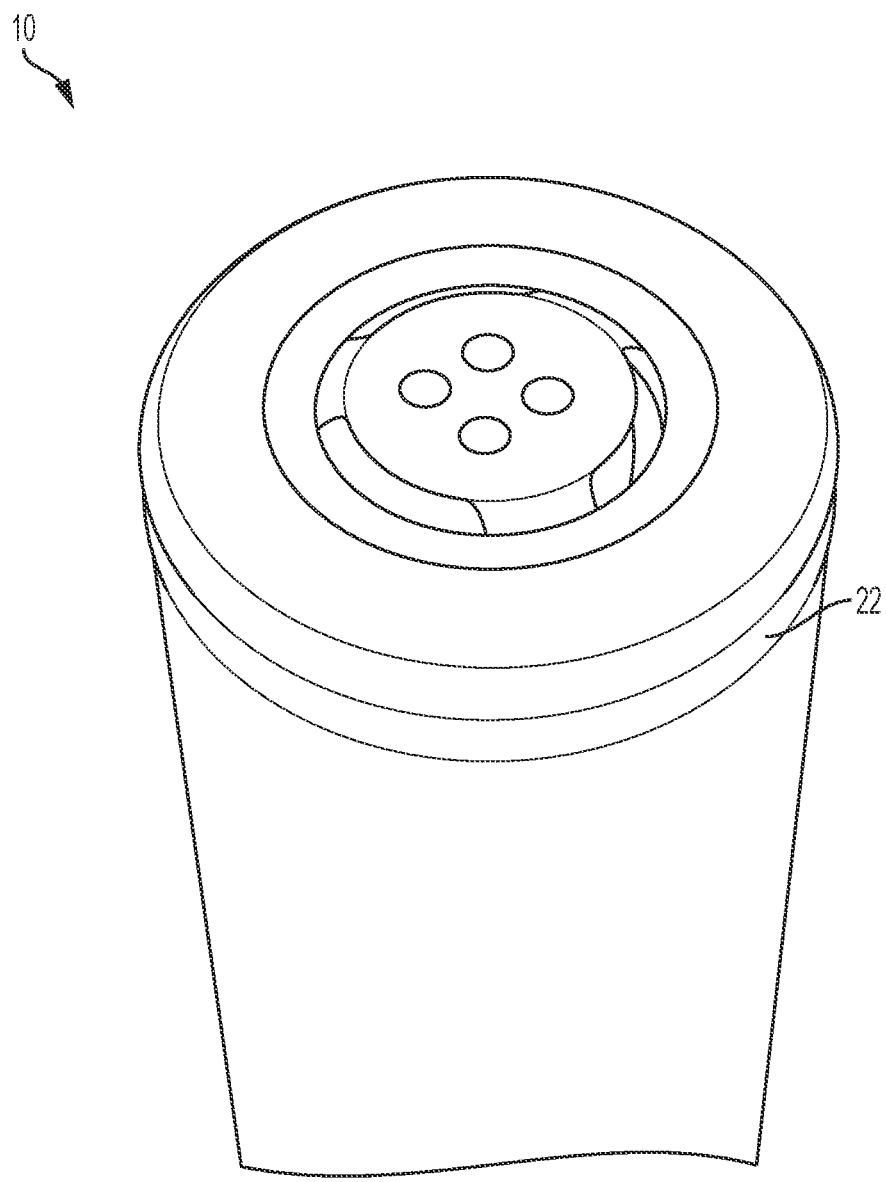
FIG. 22 is a perspective view of a cell in accordance with some embodiments.

FIG. 22 illustrates a battery cell 10 with a seal arrangement. Material inhibiting or preventing current flow, corrosion between the battery terminals, etc., may fill, be sprayed on, plate, coat, etc., the cell header or adjacent negative portion of the cell. The material may include silicone, electrically-insulating foam, etc.

Figure 23:
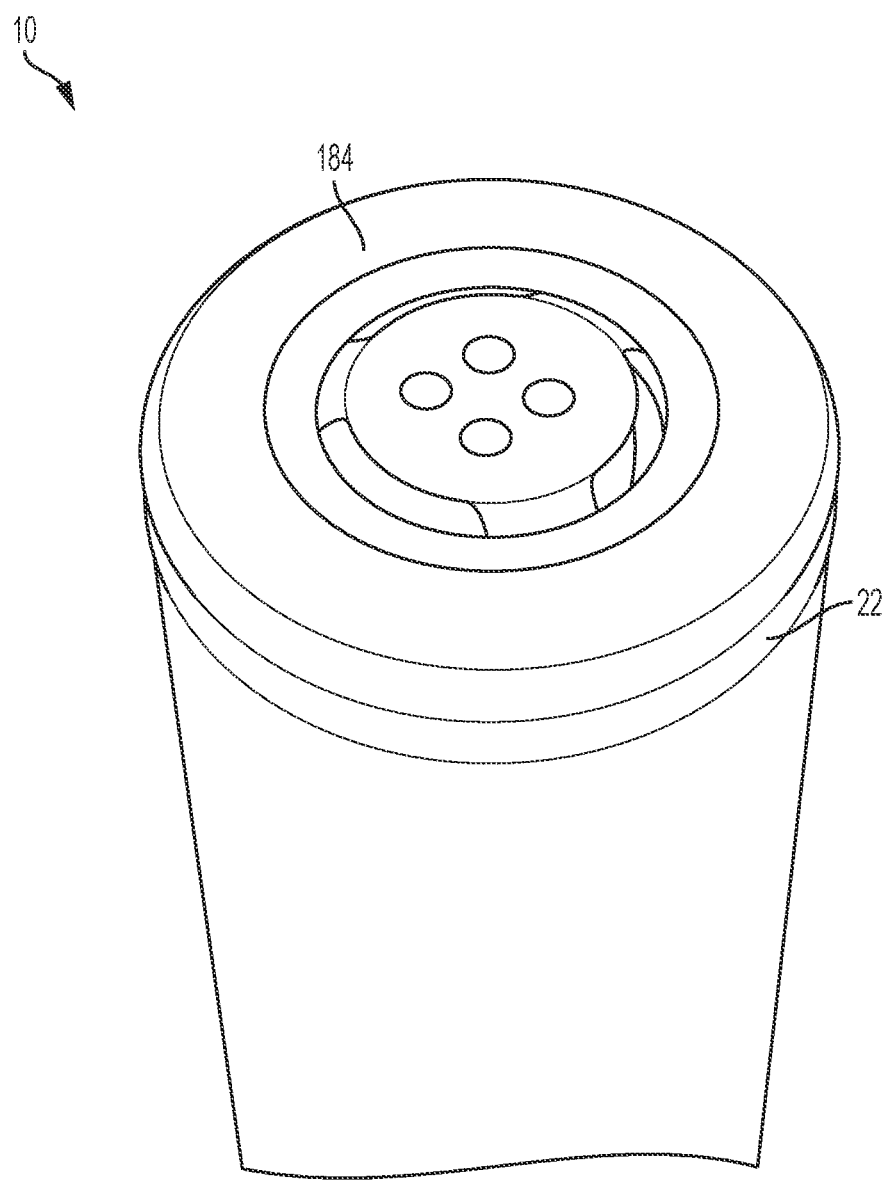
FIG. 23 is a perspective view of a cell in accordance with some embodiments.

FIG. 23 illustrates a battery cell 10 with a sealing sleeve 184. The cell sleeve 184 may include the base sleeve or may be an additional sleeve and may inhibit, prevent and/or close the open space surrounding the cell anode (batt +). This sleeve 184 inhibits or prevents fluid from entering the space below the anode and the space between the anode and cathode. In the illustrated constructions, the diameter of the sleeve 184 decreases to the diameter of the batt + anode and then seals against the anode.

Figure 24:
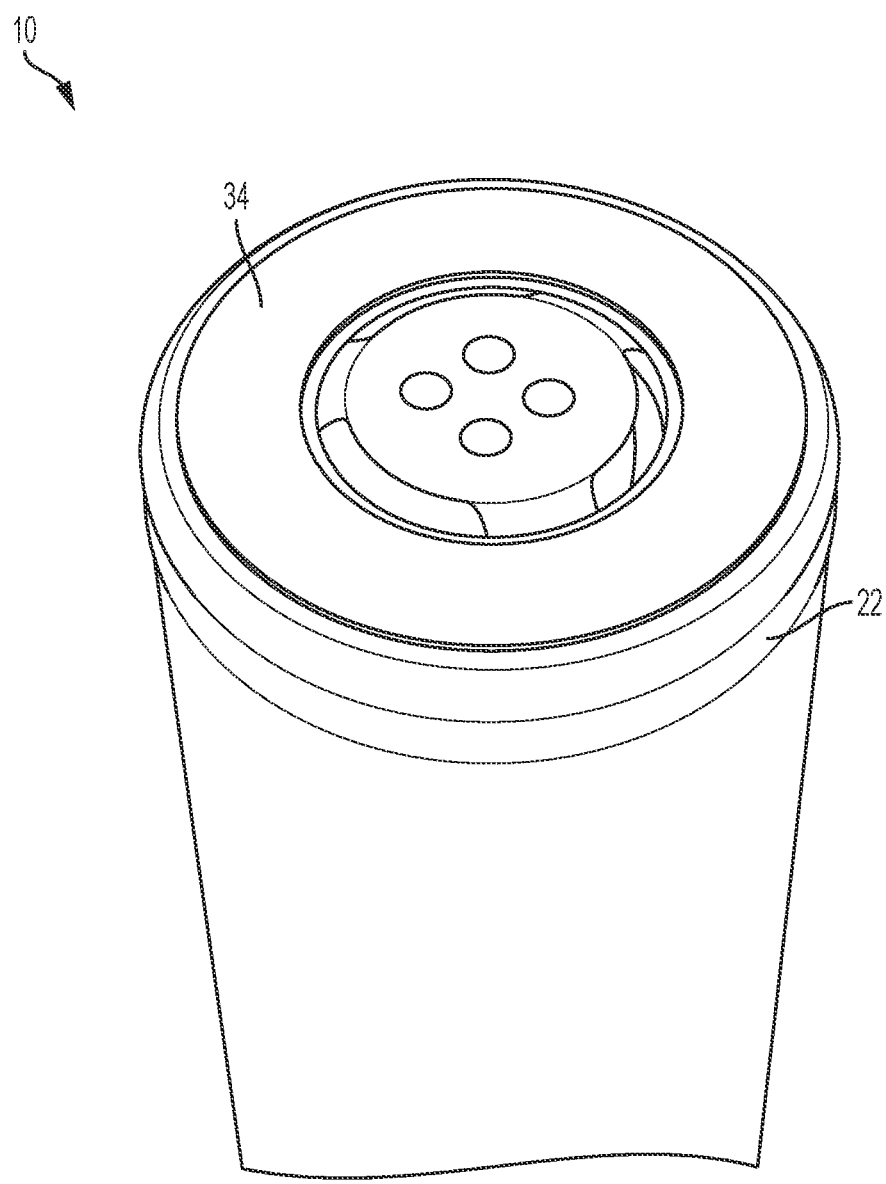
FIG. 24 is a perspective view of a cell in accordance with some embodiments.

As provided in FIG. 24, in some constructions, regardless of the method of sealing, the cell 10 is still able to vent excess gases and does not modify or alter vent pressure/characteristics of the current interrupt device (CID) or pressure relief device. In the example of an adhesive seal 34, the adhesive may be weak enough (e.g., have a strength of, for example, less than 20 kg/cm$^2$) to allow gases to escape. In the example of a seal 30 (e.g., a rubber), the seal may be flexible enough to allow gas to escape.

Figure 25:
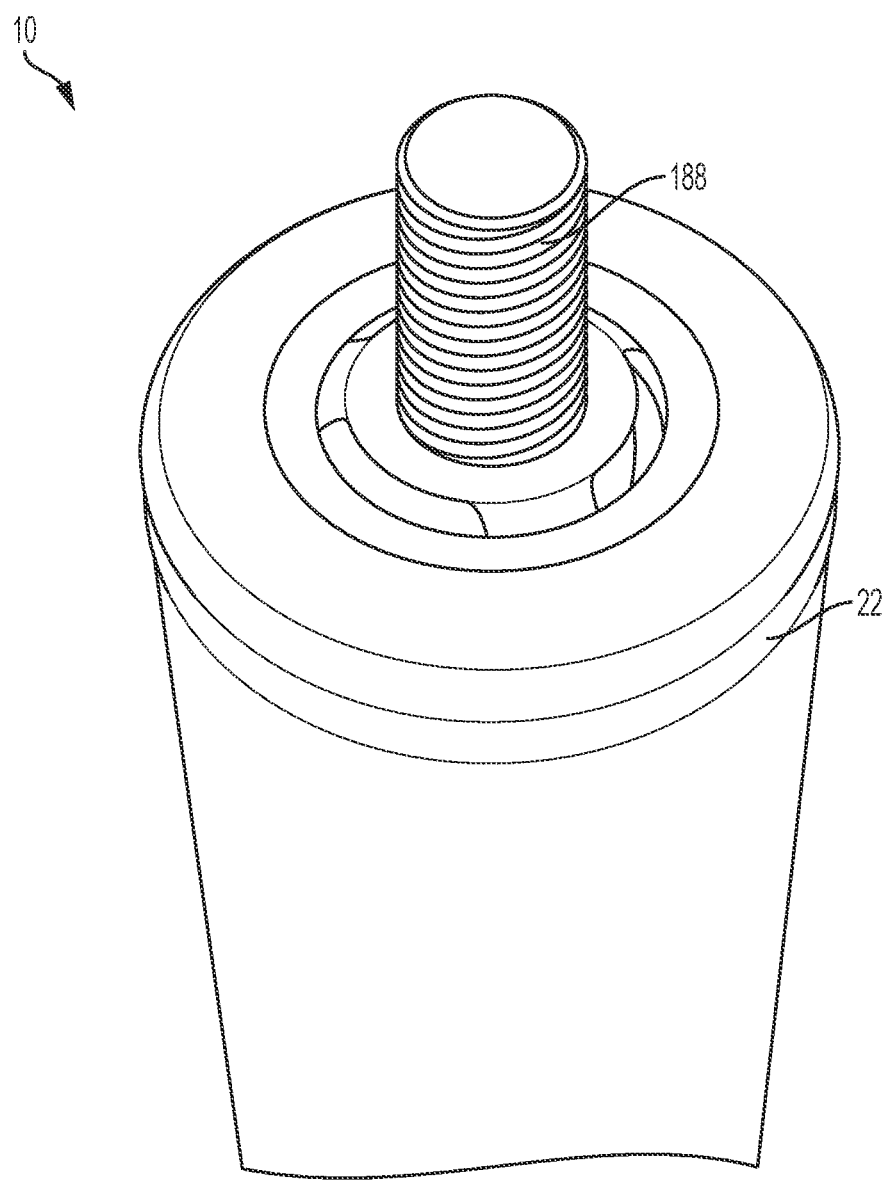
FIG. 25 is a perspective view of a cell in accordance with some embodiments.

As shown in FIG. 25, a battery cell 10 may include a mechanical connection feature 188 in place of the weld surface on the positive battery terminal 14. The feature 188 may include a projection, a threaded fastener, a rivet hole, etc. Such a feature 188 may provide a robust mechanical connection while facilitating connection of the seal, gasket, etc. to the cell header for ingress prevention.

Figure 26B:
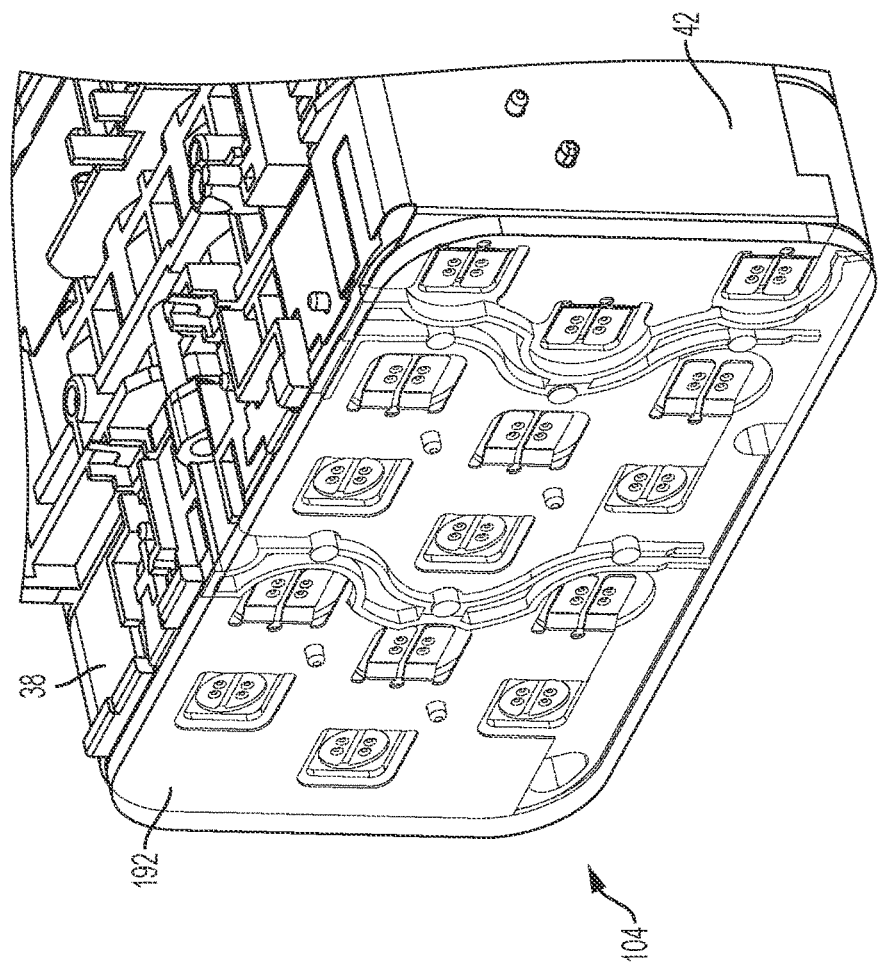
FIGS. 26A-26B are perspective views of a portion of a battery pack in accordance with some embodiments.
Figure 26A:
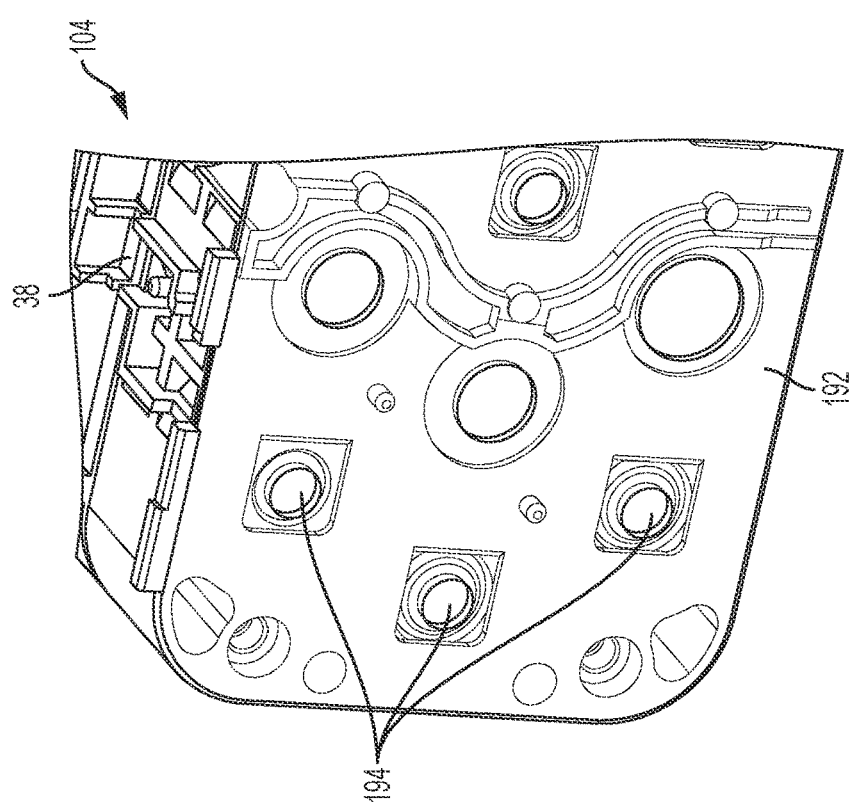

As shown in FIGS. 26A-26B, a Low Pressure Molding (LPM) process, with polyamide, polyolefin (hot-melt), potting compound, etc., material 192, may encapsulate the cell core 104 to environmentally protect the battery cells 10. The material 192 may inhibit or prevent fluid ingress to the cell headers 26, alone or along with the conductive straps 42. As shown in FIG. 26A, if the material 192 is added before welding, holes 194 added in the material may allow welding of the cell headers 26 to the straps 42.

In some embodiments, a coating (e.g., a rubberized coating) may be applied to the cell core 104 (e.g., to both sides), after the straps 42 have been welded to the cells 10. Such a coating will completely seal both ends of every cell 10, thereby preventing fluid from contacting any exposed conductive material (e.g., metal) on the cells 10. The coating may be applied by, for example, spraying, dipping, etc. The coating may include a hydrophobic or hydro-resistant material. In some embodiments, the entire cell core 104 may be coated after welding of the straps and the cells.

The coating material generally should not interfere with the venting features of the cells and should be electrically non-conductive. In addition, the coating material should bond to the materials in the cell core and produce a water tight seal. A wide range of materials may be suitable for the coating. Example materials include polyurethane, FKM fluoroelastomers, ethylene propylene diene monomer (M-class) rubber (EPDM), nitrile, silicone, and combinations thereof. In a specific example, a flexible rubber coating may be applied as a liquid and then dry to a low durometer rubber. Such a coating may be similar to LeakSeal® flexible rubber coating, manufactured by Rust-oleum Corporation, Vernon Hills, Ill., United States of America.

Figure 27B:
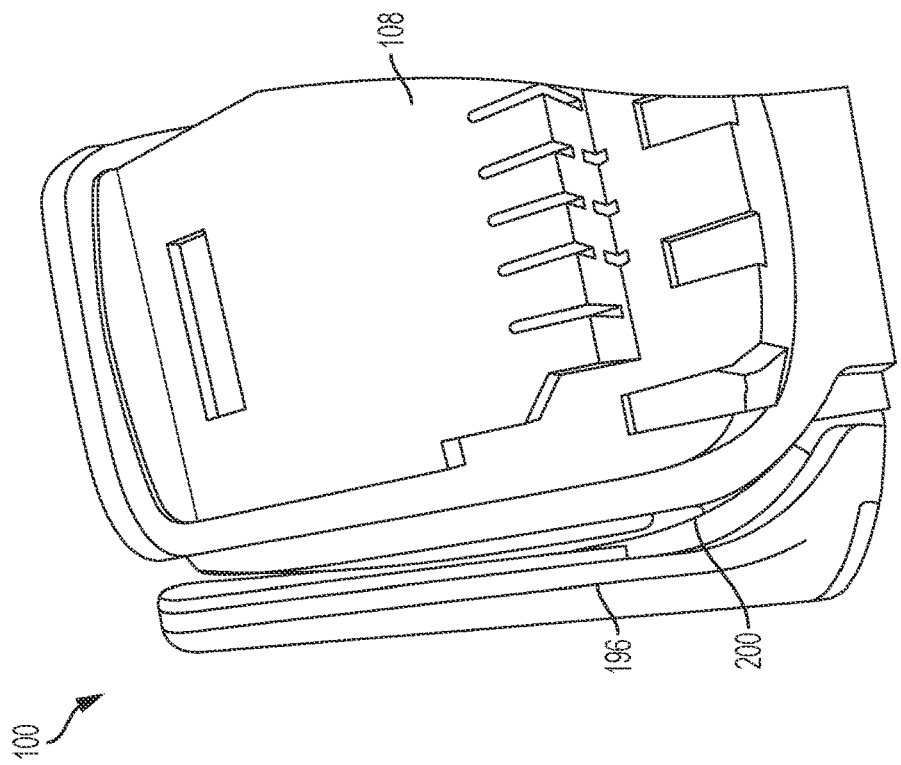
FIGS. 27A-27B are perspective views of a battery pack in accordance with some embodiments.
Figure 27A:
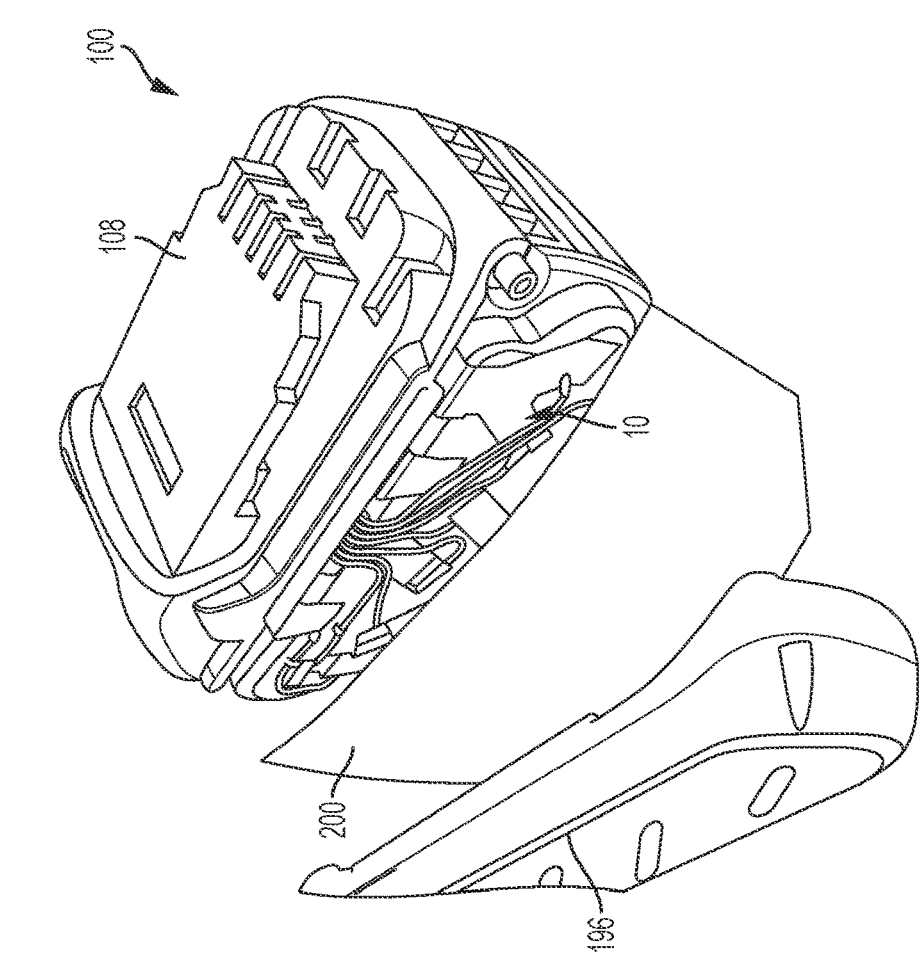

In some constructions (see FIGS. 27A-27B), the battery pack 100 may include side housings 196, rather than a bottom housing 112. A seal or sealing material 200 may be provided and compressed between the cell core 104 and the side housings 196. For example, the seal 200 may be similar to the seal 144 between the upper and lower housing portions shown in FIG. 20J. As another example, the seal 200 may be similar to the gaskets 30 shown in FIGS. 11-12 and may be placed between the core housing 38 and the side housings 196. As with the gaskets 30 described above with respect to FIGS. 11-12, the gaskets 30 may be insert-molded or over-molded to and formed integrally with the core housing 38 and be oriented to be between the core housing 38 and the side housings 196. In yet another example, sealing material (e.g., sealing foam) may be introduced between the cell core 104 and the side housings 196.

In some constructions (not shown), an existing, un-sealed battery pack 100 may be enclosed or sealed. A separate cover, cap or similar device may encompass or cover the un-sealed portion(s) of the existing battery pack 100 to inhibit or prevent certain levels of fluid ingress into the pack 100. The sealing device may be flexible, rigid or combinations thereof.

As an example, a boot (e.g., a flexible rubber boot) may be assembled to the battery pack housing 108 to seal one or more drain holes, cover mechanical interface portions, buttons, close and seal the terminal gaps (at least at that portion), etc. Upon engagement with the battery pack 100, the tool terminals (e.g., the male terminals) would push open the gaps to reach the battery pack terminals. As another example, a rigid housing could also be used to cover the drain holes only or be combined with a more flexible upper portion.

Figure 28C:
FIGS. 28A-28C are perspective views of a battery pack and a portion of an electrical device, such as a power tool, an outdoor tool, etc., in accordance with some embodiments.
Figure 28B:
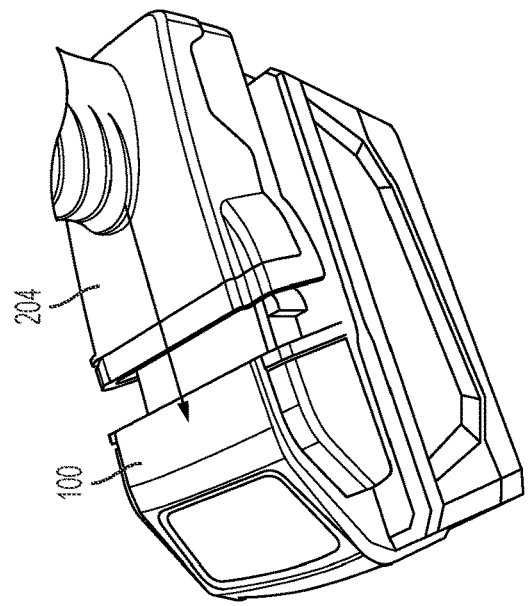
Figure 28A:
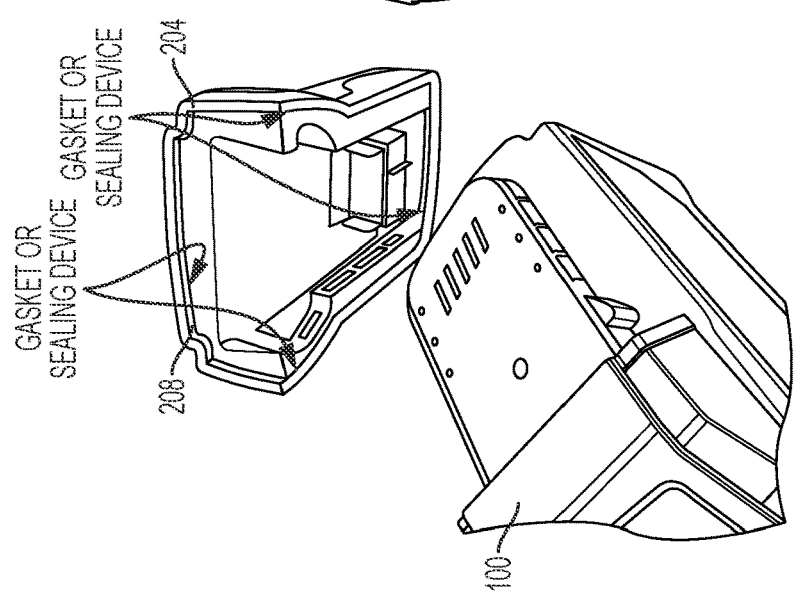

FIGS. 28A-28C illustrate a battery pack 100 sealed with an electrical device 204, such as a power tool, an outdoor tool, etc. The battery pack 100 may be partially sealed and be fully sealed when engaged with the electrical device 204 or a sealing cap. As shown in FIG. 28A, a gasket or sealing device 208 is provided on the electrical device 204 interface, and, when the electrical device 204 engages the battery pack 100, the interface is fully sealed. In other constructions, an insert may seal the electrical device 204 from the battery pack 100.

Figure 29B:
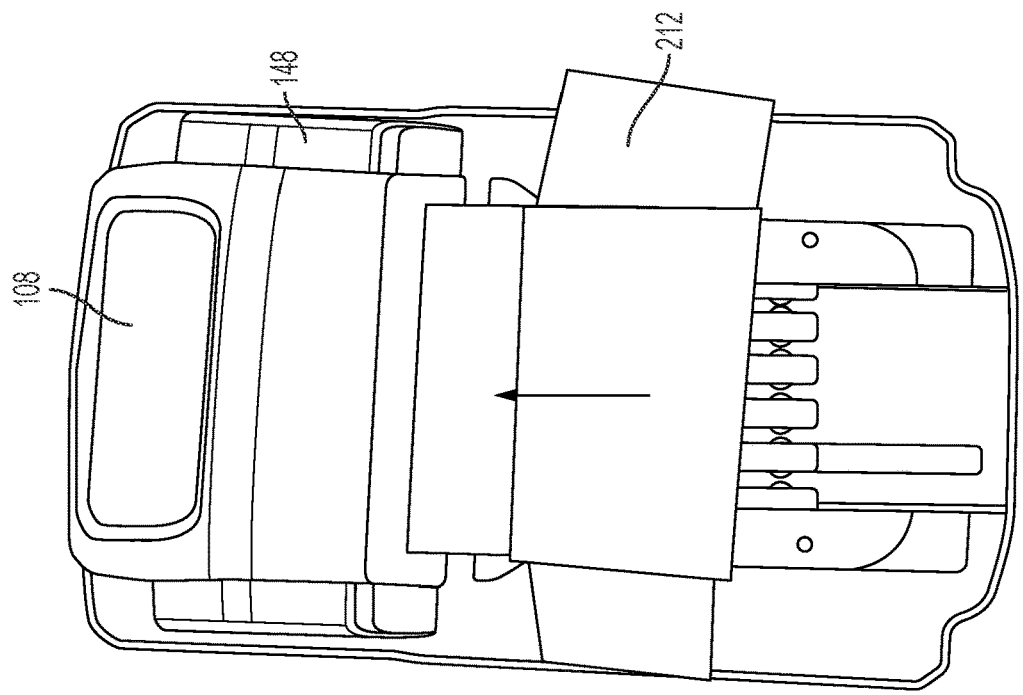
FIGS. 29A-29B are perspective views of a battery pack and a portion of an electrical device, such as a power tool, an outdoor tool, etc., in accordance with some embodiments.
Figure 29A:
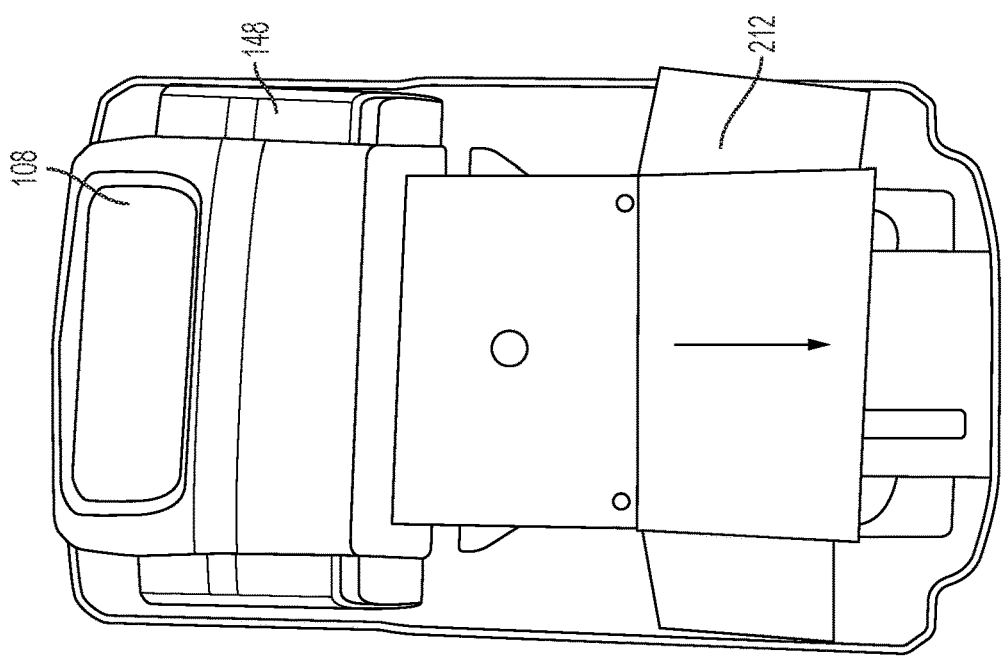

FIGS. 29A-29B illustrate a battery pack 100 with an adjustable (e.g., movable, slidable, etc.) sealing device 212. When the battery pack 100 is disengaged from an electrical device 204, the sealing device 212 is in the sealed condition. When the battery pack 100 is installed on an electrical device 204, the sealing device 204 is in the unsealed condition (e.g., moved out of the sealed condition, the seal is broken or bypassed, etc.). When the battery pack 100 is removed, the sealing device 212 may again be in the sealed condition (e.g., move or return to the sealed condition).

Figures 30A, 30B:
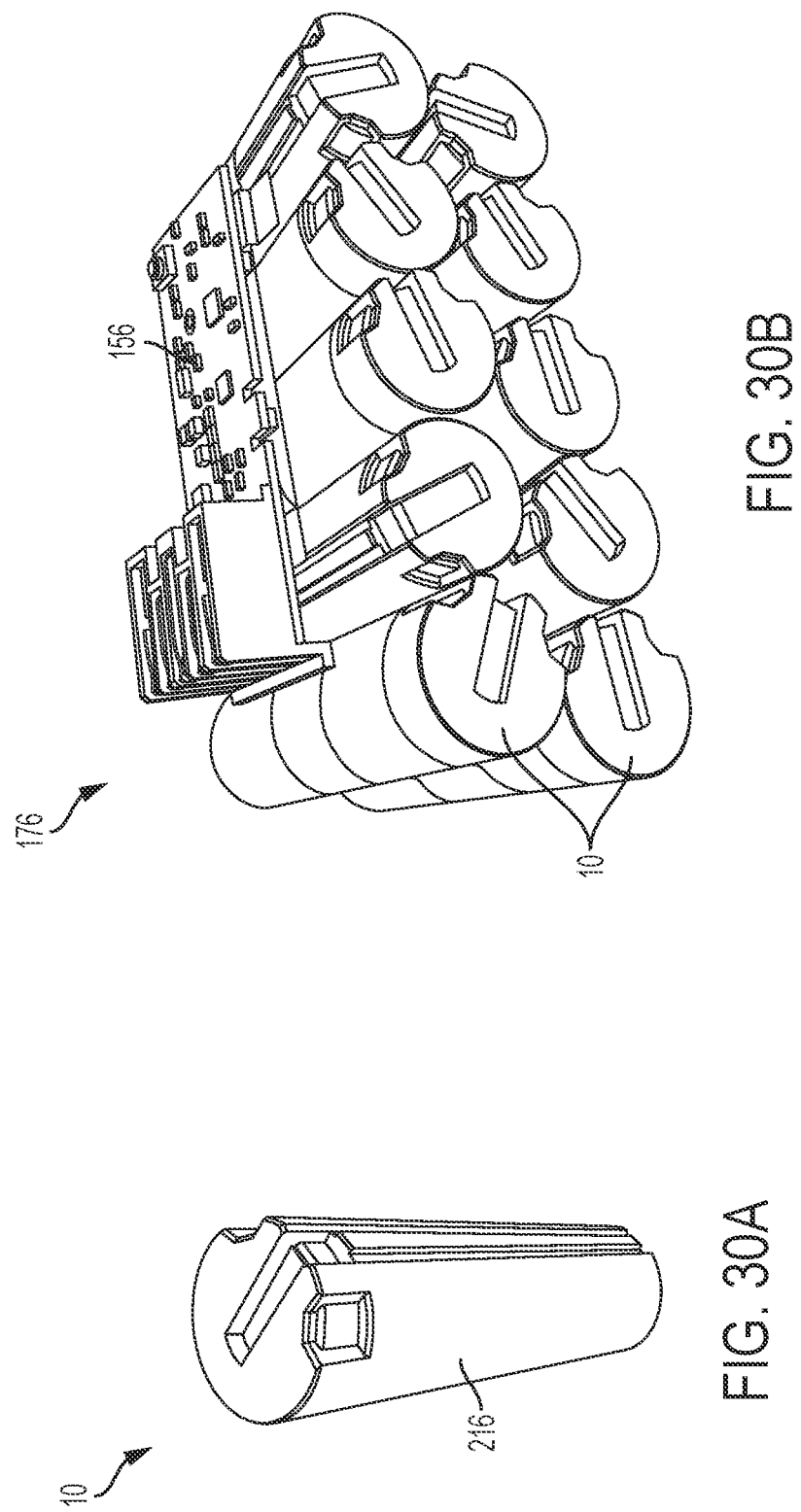
FIGS. 30A-30B are perspective views of battery cells in accordance with some embodiments.

FIGS. 30A-30B illustrate sealed battery cells 10. Each cell 10 is individually sealed or encased in an ingress-proof or ingress-resistant housing or material 216. Because each cell 10 is sealed, a separate sealing arrangement for the cell core 104 or the battery pack 100 may not be required.

As mentioned above, as shown in FIGS. 31A-31B, in some constructions, the conductive straps 42 can be welded through the seal 34, without an opening required for access to the cell terminal. For example, an adhesive seal 34 is positioned over the end of the cell 10. The seal 34 is directly welded through resistance or laser welding of the conductive strap 42 and the cell terminal.

Figure 32:
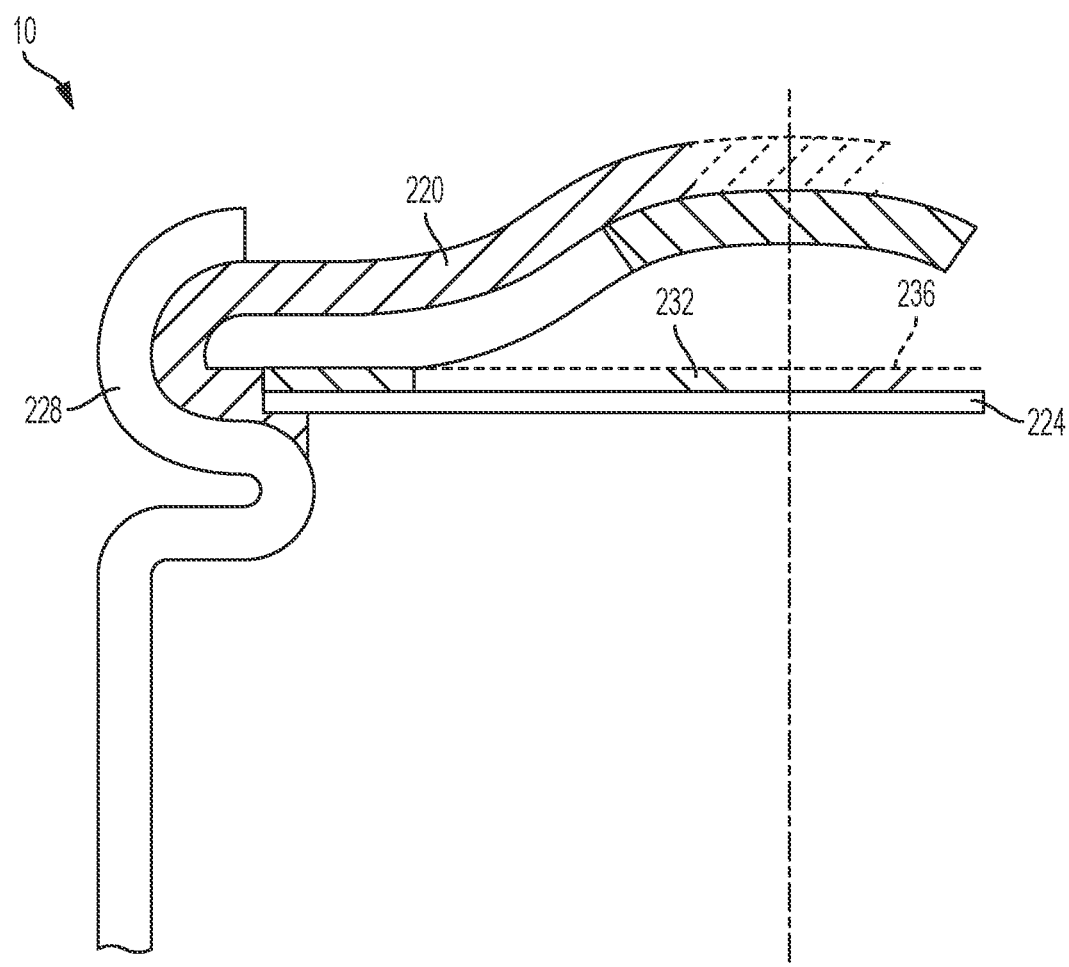
FIG. 32 is a schematic view of a battery cell including a gasket in accordance with some embodiments.

FIG. 32 generally illustrates a gasket 220 integrated into the cell structure itself. As shown in FIG. 32, the gasket 220 wraps around the header cap 26 and the weld plate 224 to isolate the positive components from the negative can 228. In FIG. 32, the angled lines illustrate the CID 232, and the dashed line illustrates a mechanical vent plate 236.

In some embodiment, the vent plate 236 of the cell 10 could be made to be highly corrodible, such that, in the presence of conductive fluid or material (e.g., sea water), the vent plate would corrode to disable the battery pack 100 rather than the battery pack 100 experiencing a short circuit.

The CID 232 connects the weld plate to the positive terminal 14, and, with an increased cell pressure, the CID 232 may break (e.g., typically at about 10 kg/cm$^2$), disabling the cell 10. The mechanical vent plate 236 is a backup to the CID 232 and may break if the rise in pressure is very rapid and quickly reaches its breaking threshold (e.g., typically about 20 kg/cm$^2$).

It should be understood that, as mentioned above, in some embodiments, the seals, gaskets, etc., described above, that prevent fluid ingress may have a strength that is, for example, less than approximately 20 kg/cm$^2$ (e.g., below the breaking threshold of the mechanical vent plate) to, as described above, allow venting of the battery cells 10 (i.e., gases are able to vent out of the battery cells 10/battery pack 100 through the seals, gaskets, etc. even though the seals, gaskets, etc. prevent ingress fluid from entering the battery pack 100). In other embodiments, the seals, gaskets, etc. may have a strength less than a different value (e.g., less than about 10 kg/cm$^2$, the breaking threshold of the CID 232).

As described above, each battery cell 10 may have a nominal voltage between about 3 volts (V) and about 5 V and may have a nominal capacity between about 3 Amp-hours (Ah) and about 5 Ah or more (e.g., up to about 9 Ah). The battery cells 10 may be any rechargeable battery cell chemistry type, such as, for example, lithium (Li), lithium-ion (Li-ion), other lithium-based chemistry, nickel-cadmium (NiCd), nickel-metal hydride (NiMH), etc.

Figure 33A:
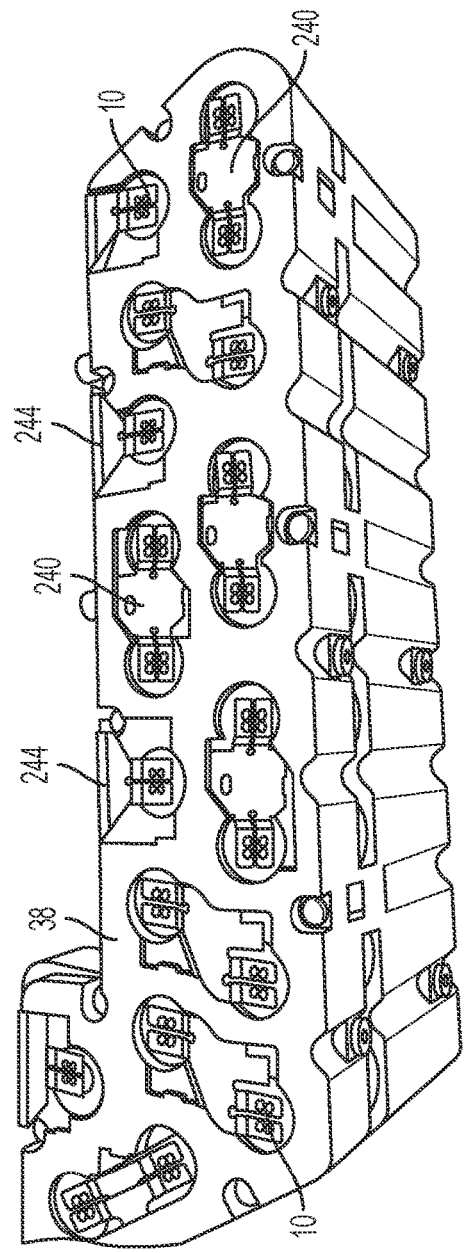
FIGS. 33A-33B are perspective views of a battery pack illustrating strap routing.
Figure 33B:
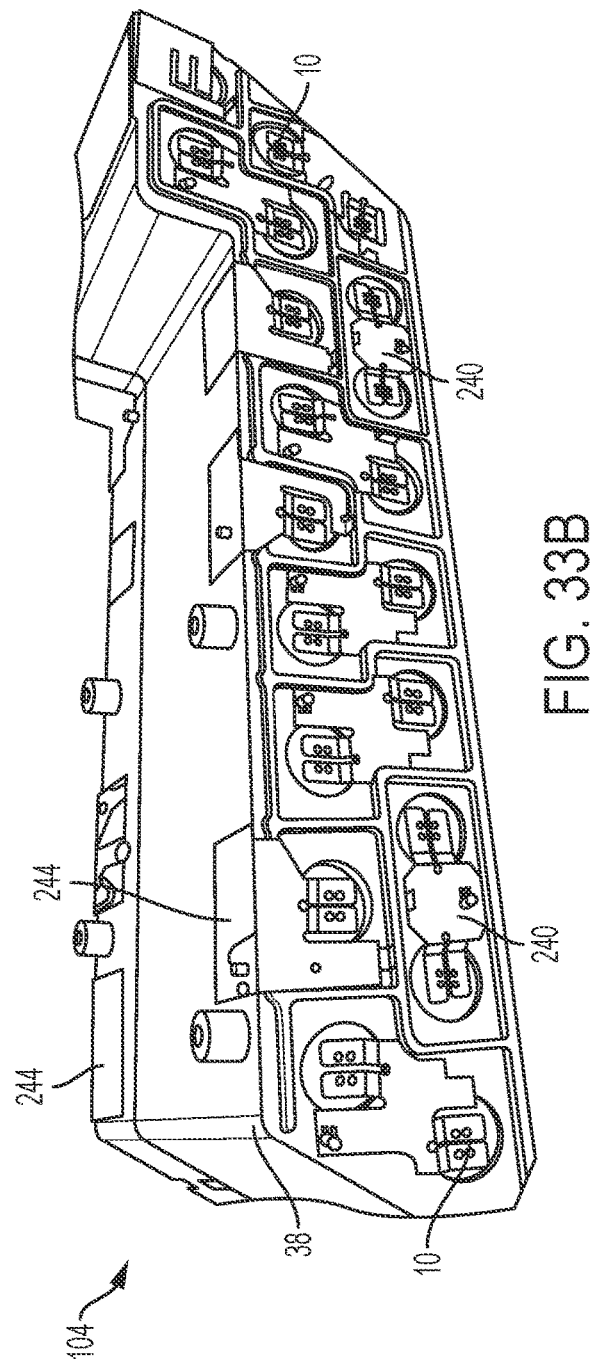

FIGS. 33A-33B illustrate a strap routing technique, for example, used in a battery pack with 20 series-connected cells (20S1P) 100. FIG. 33A illustrates a left side of the battery pack 100 showing straps 240 connecting battery cells 10 to each other or to weld joints 244. Similarly, FIG. 33B illustrates a right side of the battery pack 100 showing straps 240 connecting battery cells 10 to each other and to the weld joints 244.

Figure 34A:
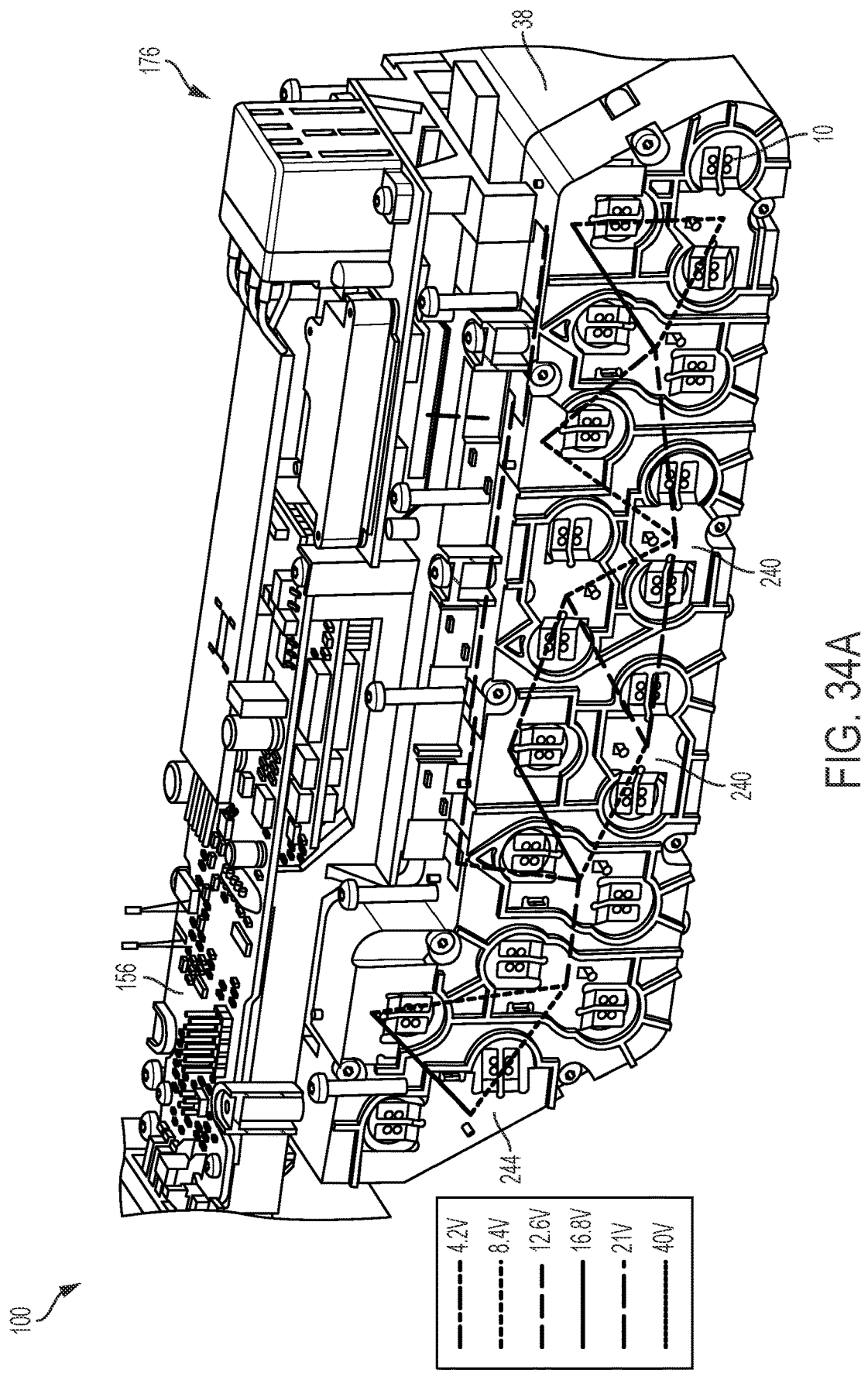
FIGS. 34A-34B are perspective views of the battery pack of FIGS. 33A-33B illustrating a voltage differential between pairs of straps.
Figure 34B:
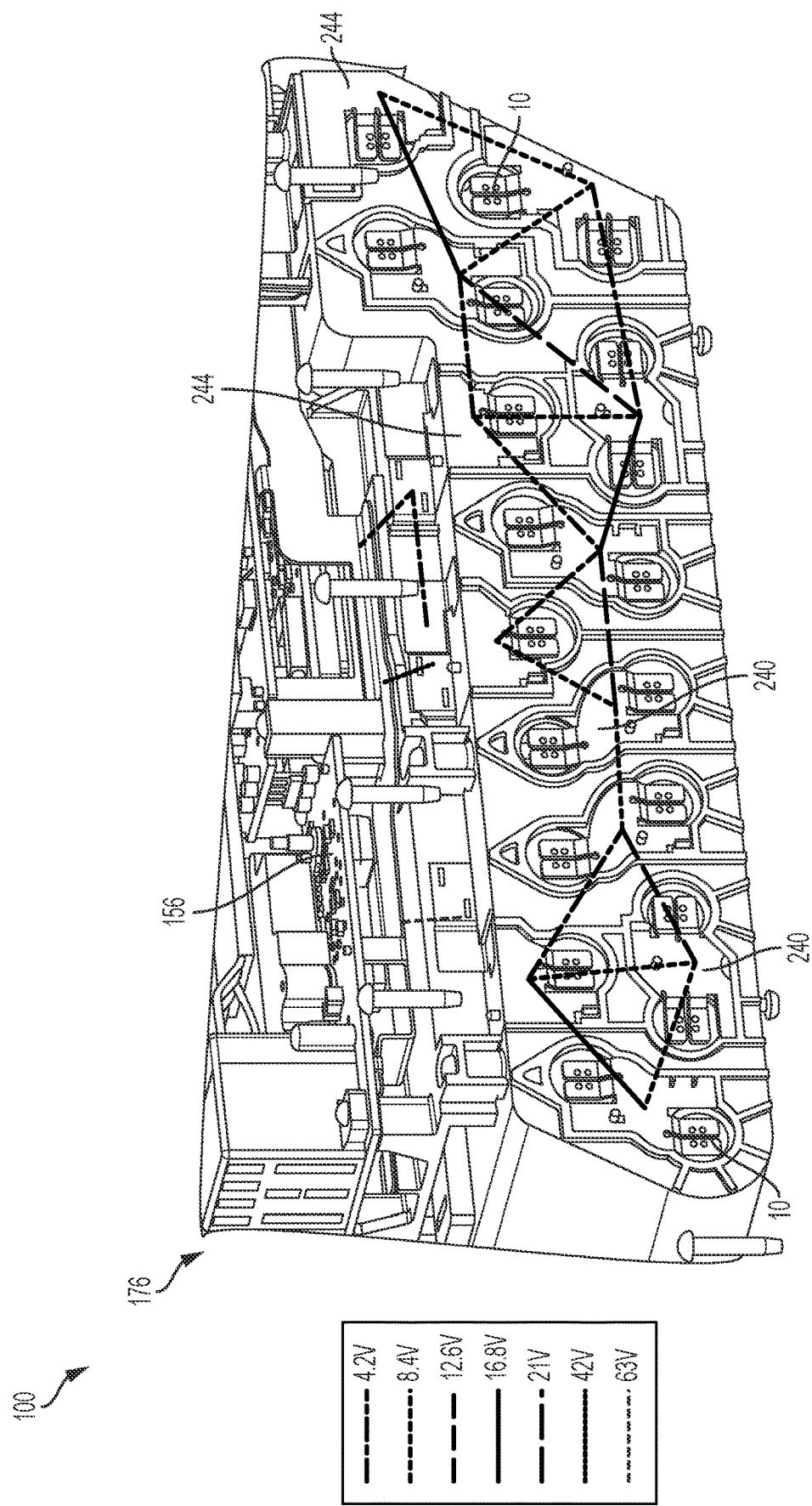

In the illustrated construction, a voltage differential exists between each strap 240. FIGS. 34A-34B illustrate voltage differentials between adjacent pairs of straps 240 and weld joints 244. In the illustrated example, the maximum voltage differential between adjacent pairs of straps 240 is shown in white and circled. As illustrated, the maximum voltage differential between adjacent pairs of straps is about 16.8 V.

Figure 35:
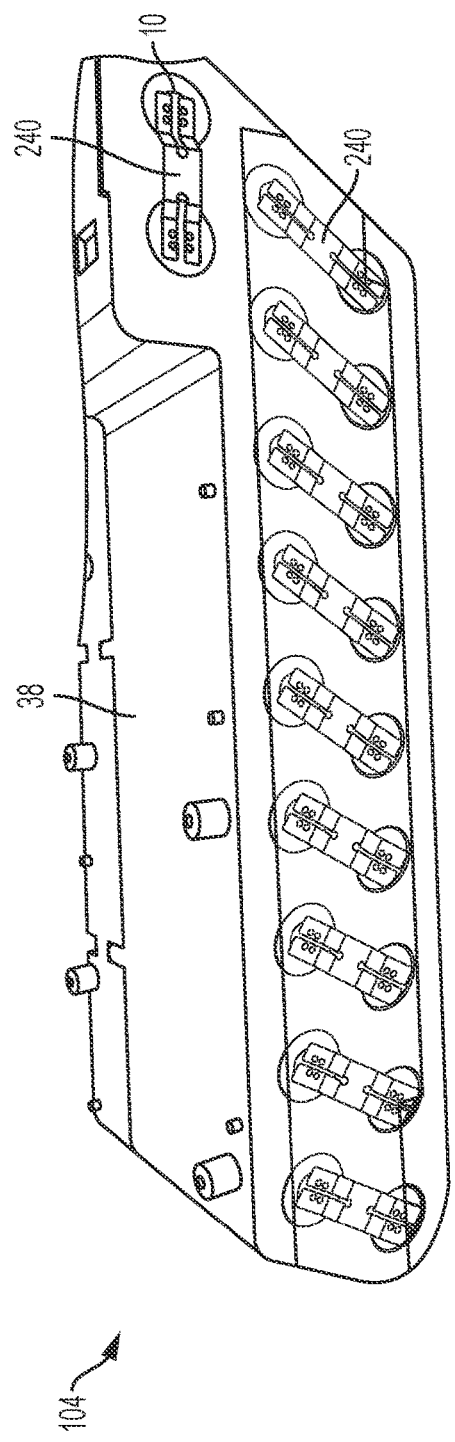
FIG. 35 is a perspective view of a battery pack illustrating alternative strap routing.
Figure 36:
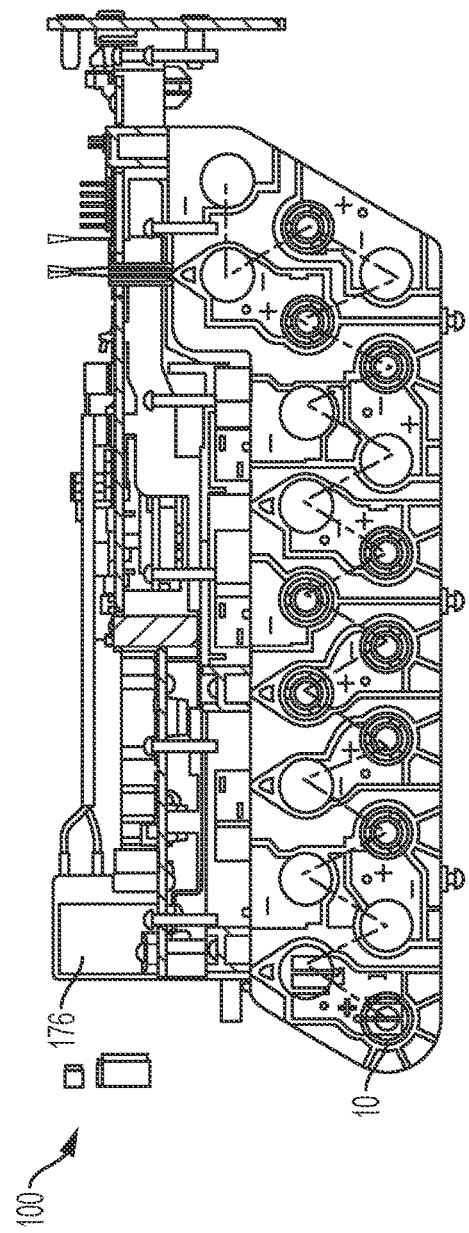
FIG. 36 is a plan view of the battery pack of FIG. 35 illustrating a voltage differential between pairs of straps.

FIGS. 35-36 illustrate an alternative strap routing technique, for example, used in the 20S1P pack 100. FIGS. 35-36 illustrate a right side of the battery pack 100 showing straps 240 connecting battery cells 10 to each other. Referring to FIG. 36, orientation and connection of straps 240 on the right side are shown in solid lines, and the orientation and connection of straps 240 on the left side are shown in dashed lines. In the illustrated embodiment, a consistent voltage differential of about 8.4 V is provided between most of the straps 240. The straps 240 at one end of the battery pack 100 (e.g., at the top right hand corner in FIG. 36) have the maximum voltage differential of 16.8 V.

Figure 37:
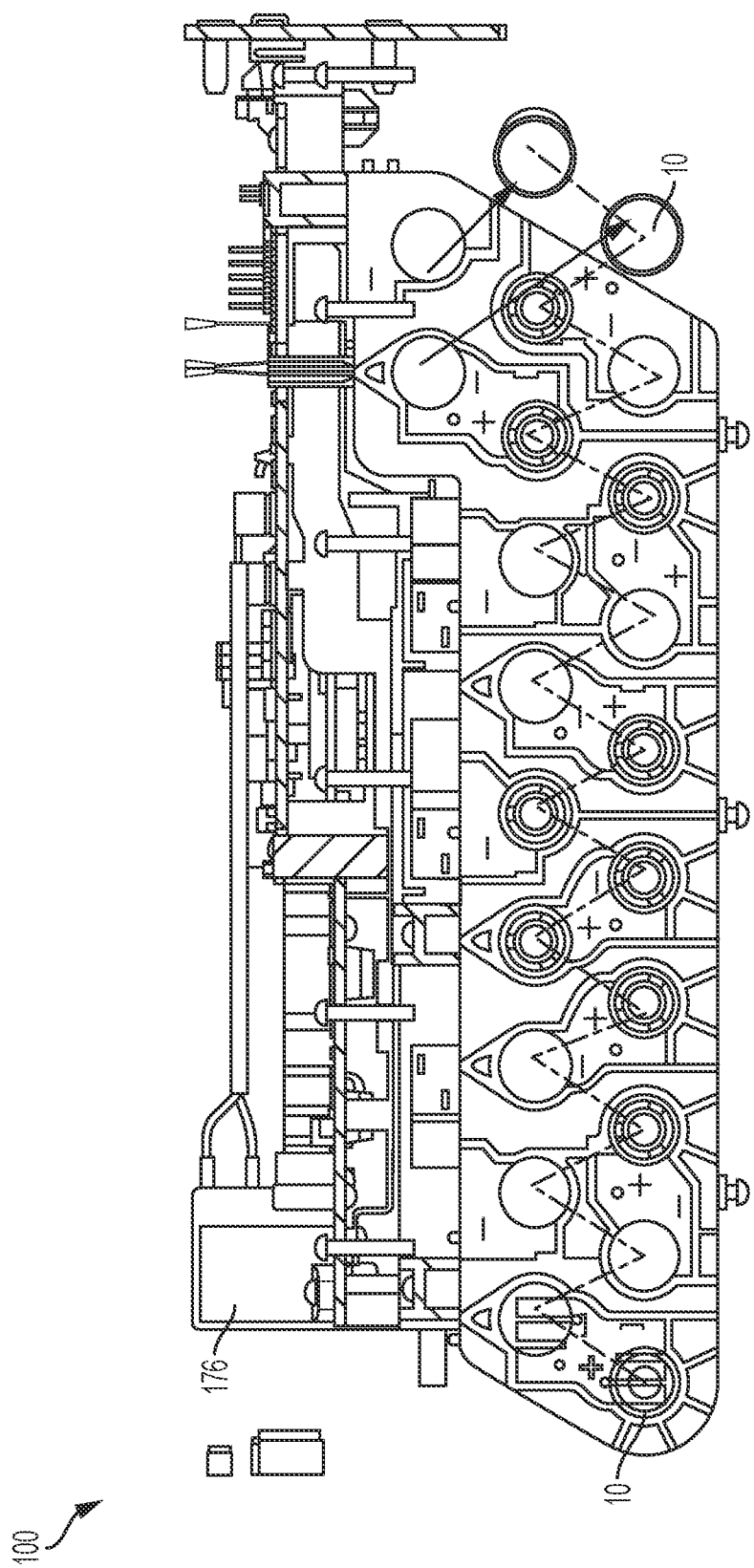
FIG. 37 is a plan view of an alternative construction of a battery pack illustrating strap routing.

FIG. 37 illustrates an alternative construction of a battery pack 100 and a strap routing technique, for example, used in the 20S1P pack. FIG. 37 illustrates a right side of the battery pack 100 showing straps 240 connecting battery cells 10 to each other in solid lines; the orientation and connection of straps 240 on the left side are shown in dashed lines. In the illustrated embodiment, two battery cells 100 from the top right hand corner (e.g., in the design shown in FIG. 36) are moved to the right (in FIG. 37) of the pack 100. While the length of the pack 100 is extended when compared to the construction shown in FIGS. 33A-36, the battery pack 100 of FIG. 37 provides a consistent voltage differential of about 8.4 V between all of the straps 240 connecting battery cells 10 to each other.

Figure 38:
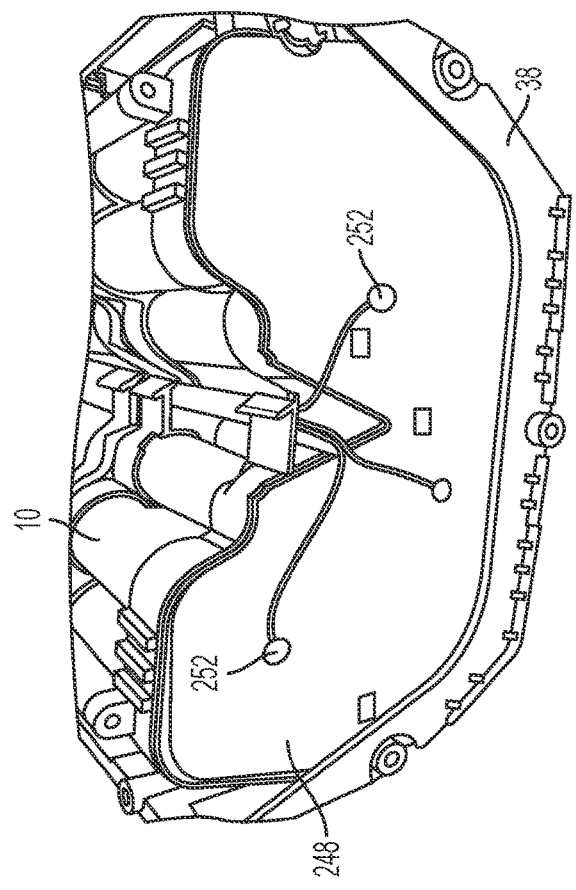
FIG. 38 is a perspective view of a battery pack illustrating a core seal.
Figure 39:
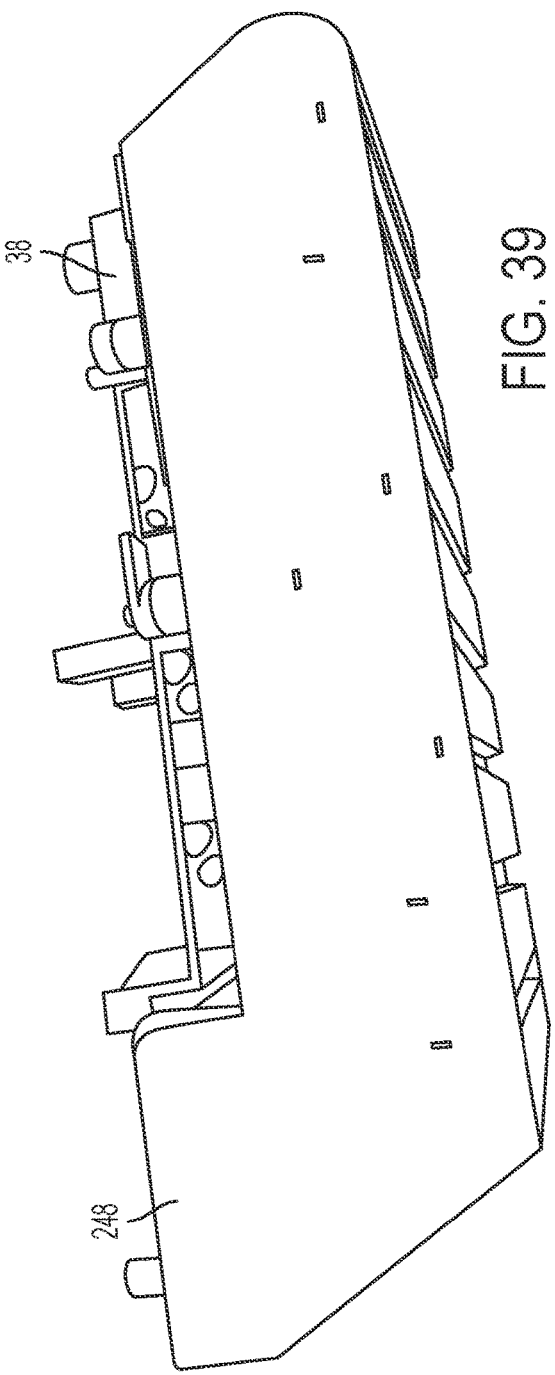
FIG. 39 is a perspective view of a battery pack illustrating a core seal.

In some embodiments, in addition or in the alternative to seals (e.g., adhesive seals 34) provided in or on battery cells 10, sealing arrangements may also be provided on the core housing 38 to provide ingress protection to straps 240 connecting battery cells 10. FIGS. 38-39 illustrate core seals 248 having different configurations. Similar to the adhesive seal 34 for the battery cells 10, the core seal 248 may include a sticker, a tape, an adhesive backed rubber, etc. The core seal 248 creates a seal to keep fluid (e.g., water) from contacting straps 240 and thus preventing bridging. The core seal 248 may be placed over each side of the cell core 104. In some embodiments, the voltage taps 252 of the core housing 38 may be provided outside the core seal 248. Similar adhesive seals may be used in other locations of the battery pack 100 to seal other components.

In some embodiments, the adhesive seal 34 and the core seal 248 may not be welded through (e.g., to weld conductive straps to battery cell terminals), and, in such constructions, welding is completed before each seal is installed. In other embodiments, the adhesive seal 34 may be welded through, and the core seal 248 may be added on top of the welded strap 240. Any exposed cell taps may be covered in glue. In yet another embodiment, both the adhesive seal 34 and the core seal 248 may be welded through (e.g., simultaneously). The exposed cells taps may be optionally covered with glue.

Figure 40A:
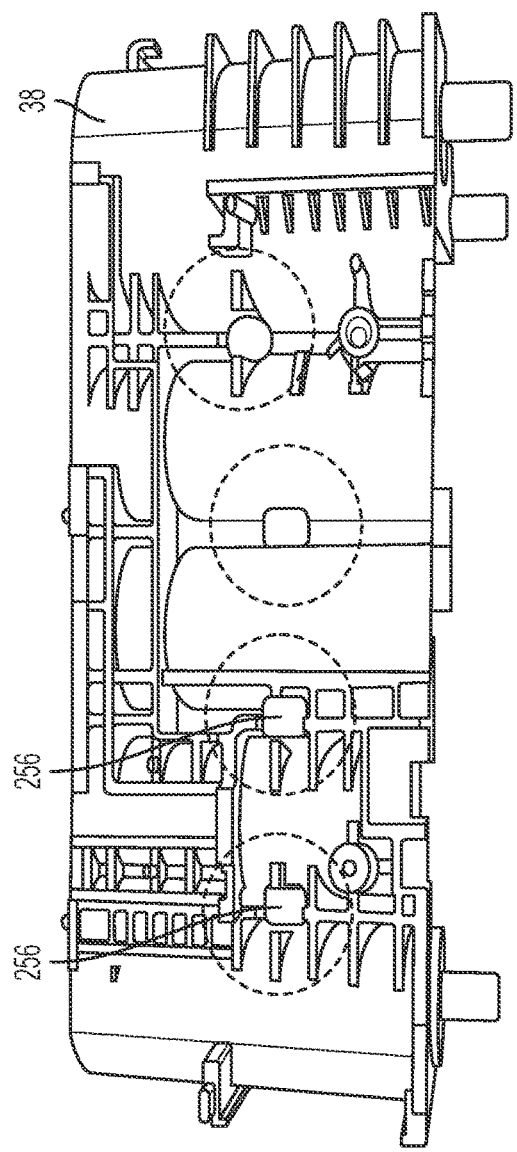
FIGS. 40A-40B are views of a core housing of a battery pack illustrating drain holes of the core housing.
Figure 40B:
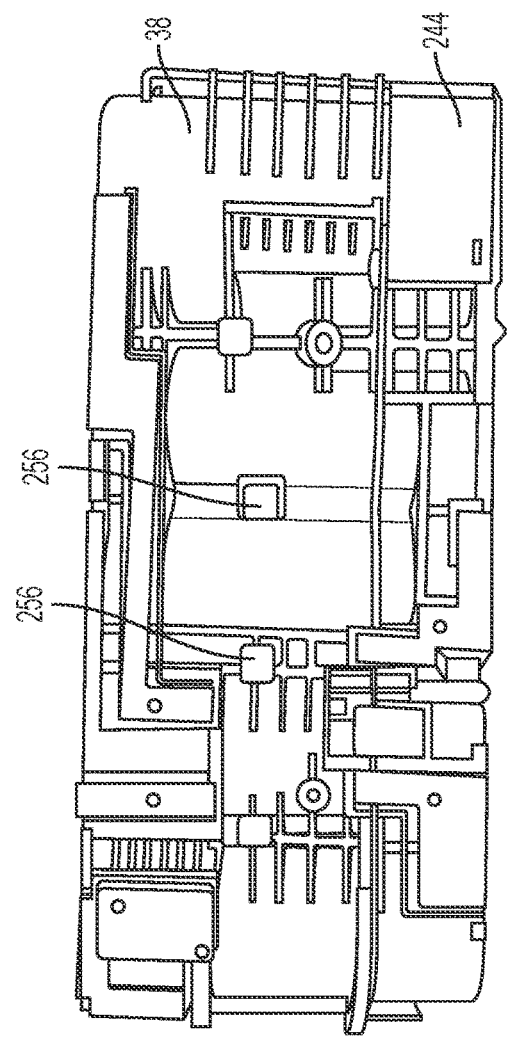

In some embodiments, drain holes 256 may be provided in the core housing 38 of the battery pack 100 to allow fluid to drain. FIGS. 40A-40B illustrate drain holes 256 in the core housing 38. The drain holes 256 may be added at the appropriate location (e.g., in the middle portion of the core) to promote and/or allow fluid to drain between cell bodies and away from the cell electrode area.

In some embodiments (see FIGS. 41A-41B), a potting or conformal coating material 260 may be applied to sides of the cell core 104 (e.g., to the core shown in FIG. 33B). The conformal coating 260 keeps fluid away from straps 240. However, in some embodiments, the voltage taps 252 may still be exposed for soldering. Conformal coating 260 may also be used for other components of the battery pack 100. Commercially available material such as silicone or other materials marketed and sold by ShinEtsu may be used for conformal coating 260.

The silicone conformal coating 260 may have a dielectric breakdown strength between about 8 Volt/micron (V/μm) to about 30 V/μm.

Figure 44:
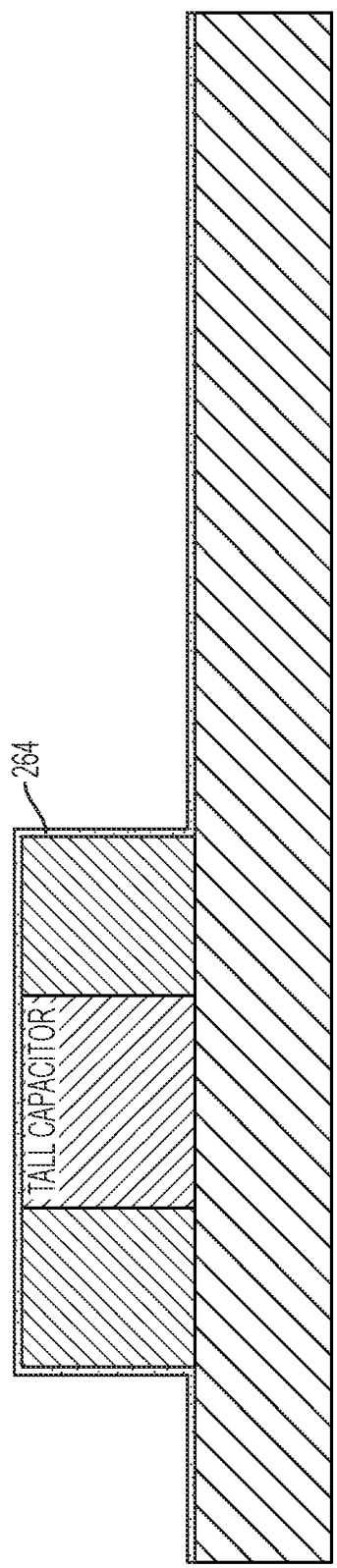
FIG. 44 is a schematic view of battery pack components coated in a vapor-deposited coating.
Figure 45A:
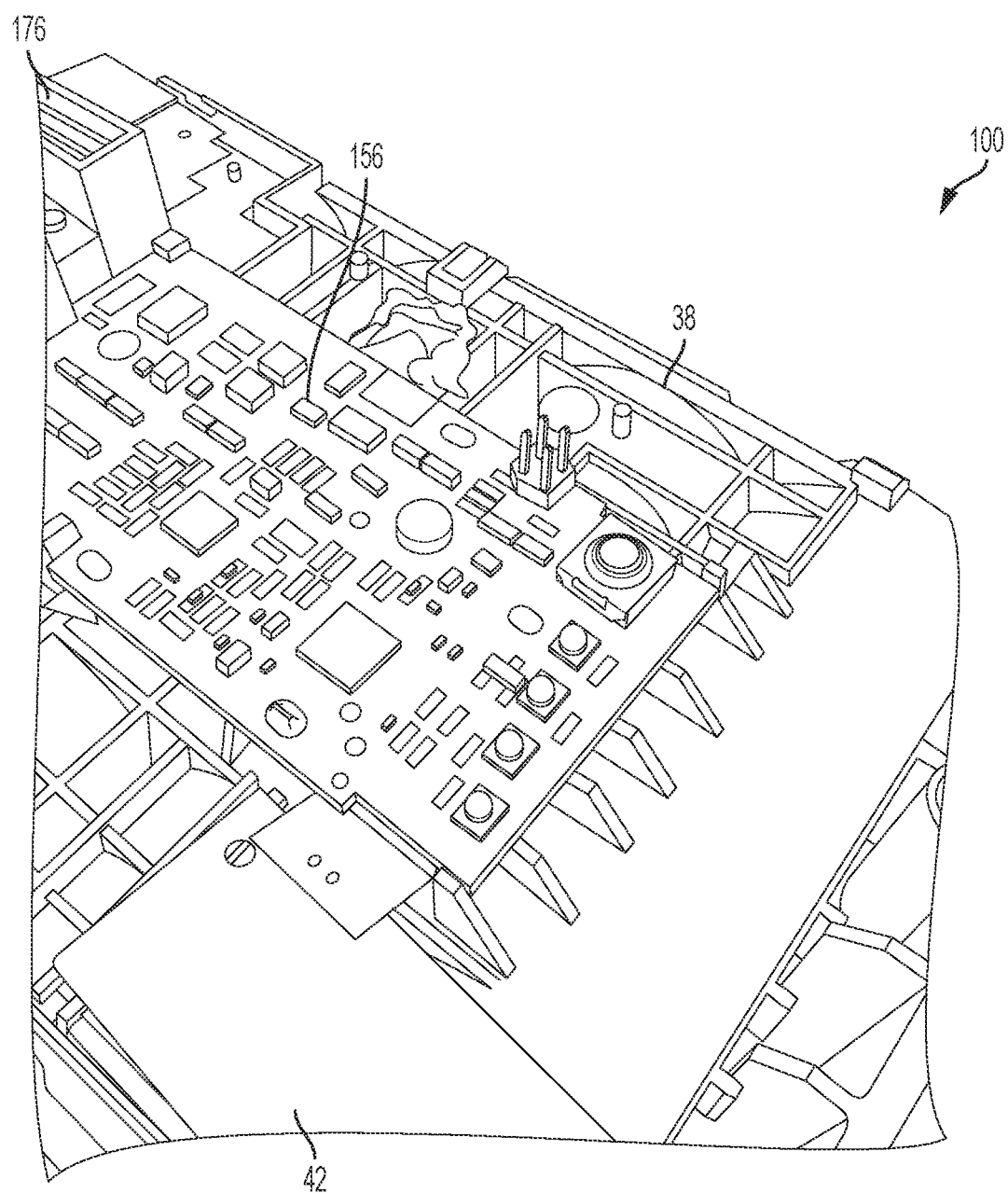
FIGS. 45A-45E are photographs of battery pack components coated in a vapor-deposited coating.
Figure 45B:
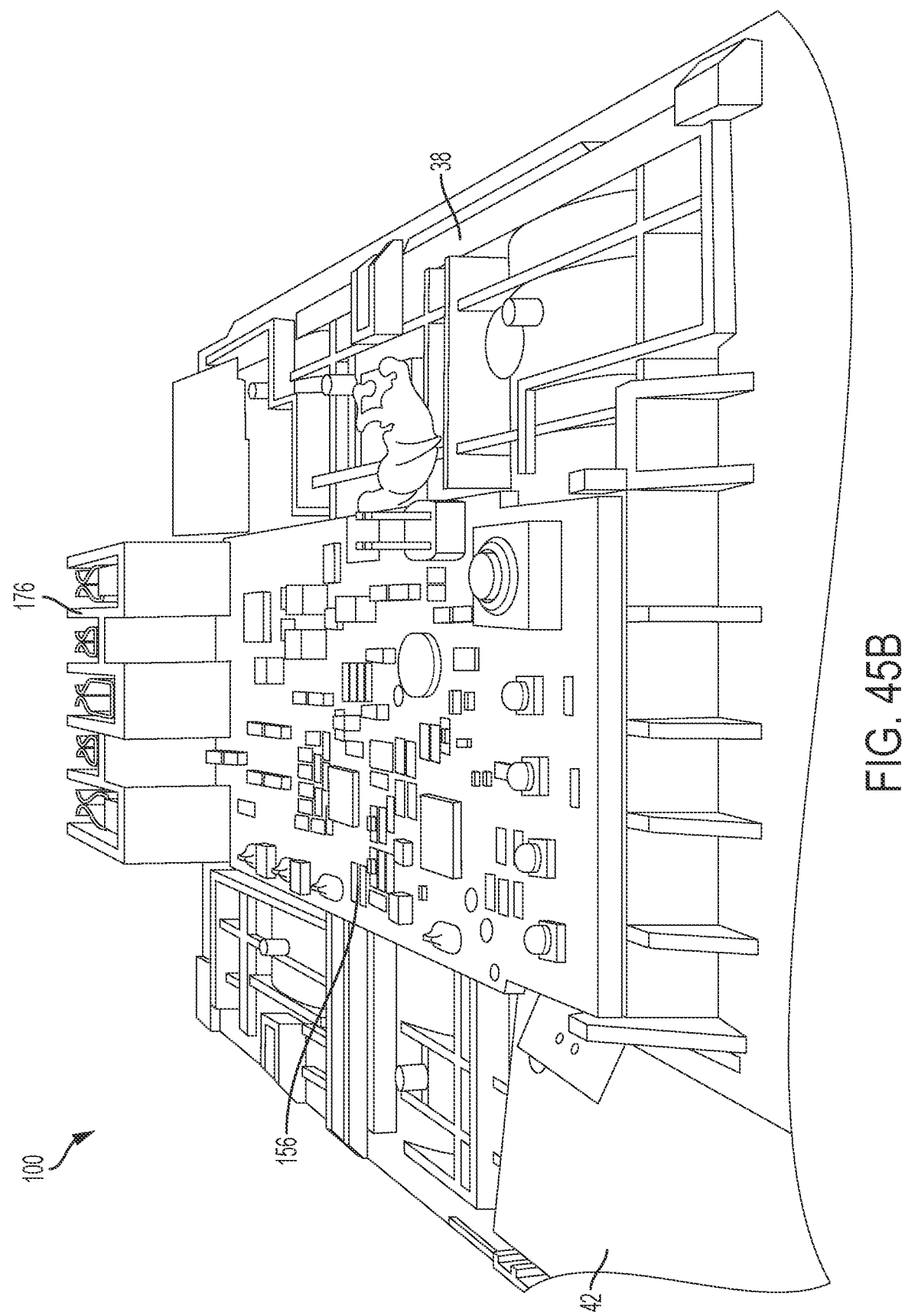
Figure 45C:
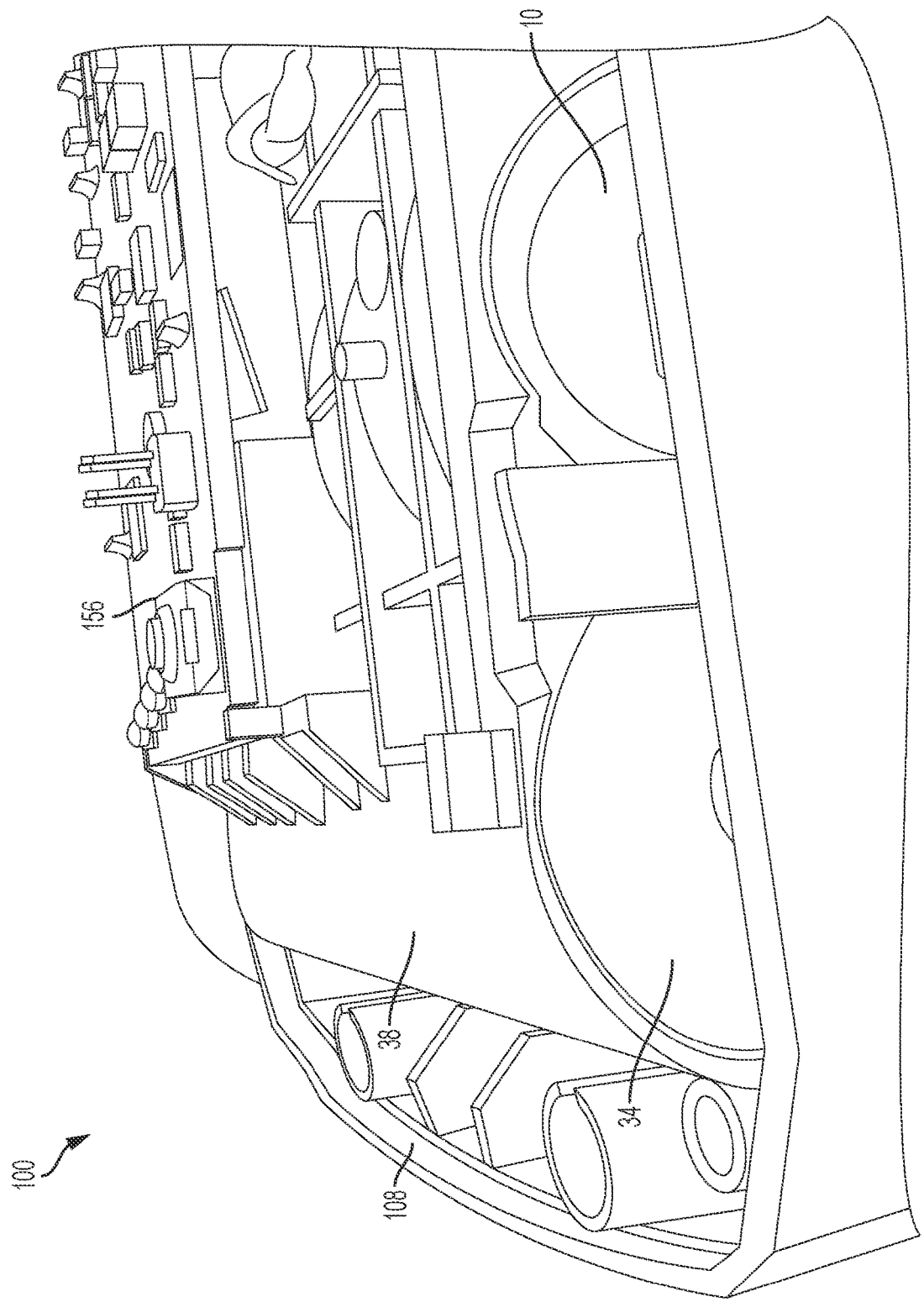
Figure 45D:
Figure 45E:
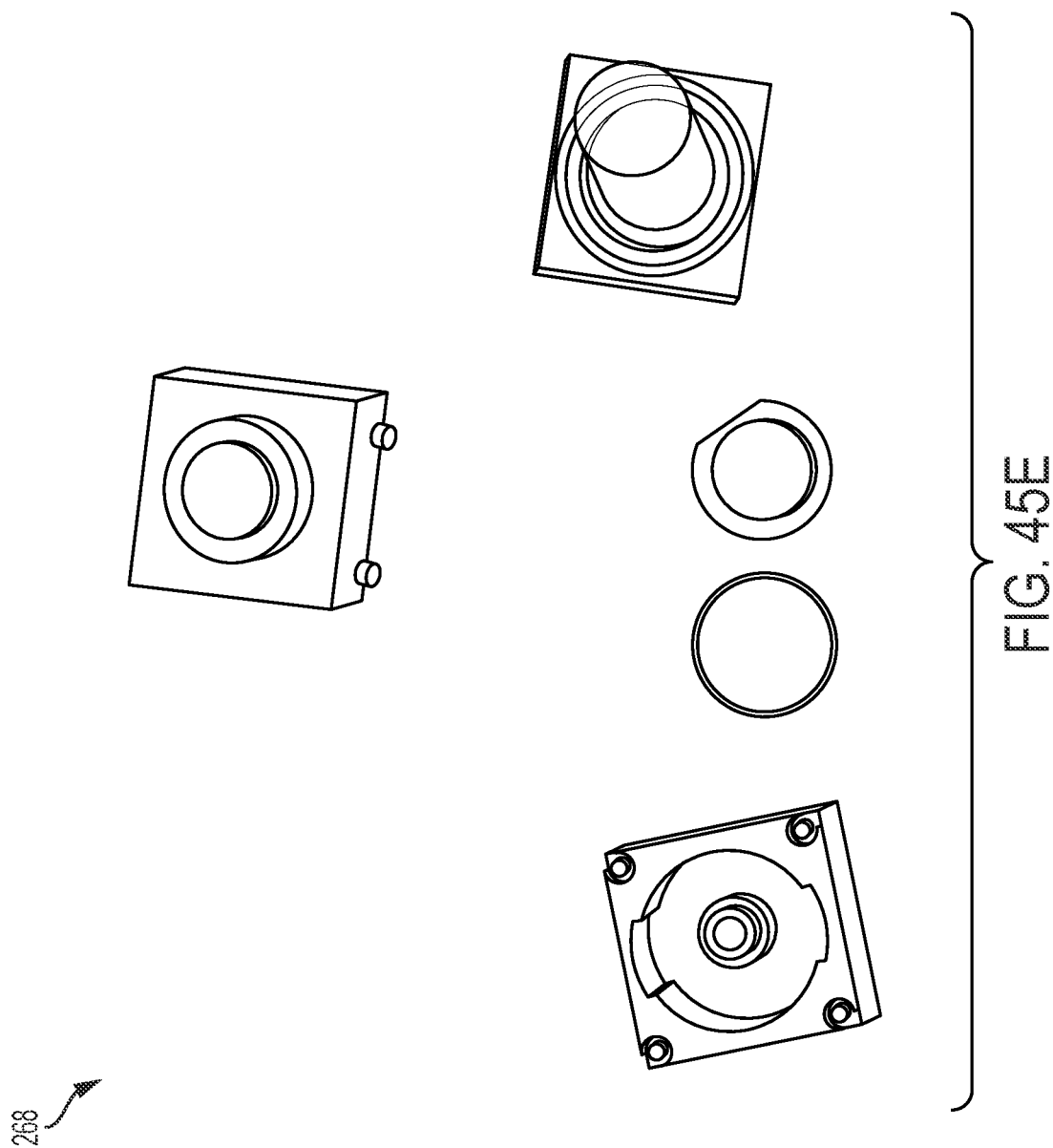

In some embodiments, as an alternative or in addition to the conformal coating 260, other sealing arrangements, etc., a vapor-deposited film or coating 264 may be applied to the components of the battery pack 100 (see FIGS. 44-45E illustrating vapor-deposited coating of battery pack electronics). Such battery packs 100 are generally high power constructions (e.g., greater than 12 V) in contrast to typical low power usages (e.g., cell phones) in which nano coatings have been employed.

As described above, the spacing between conductive components (e.g., the weld straps 140, the conductive straps 42, etc.) may be increased. In some embodiments, the vapor-deposited coating 264 may be used in combination with the above-described spacing of conductive components in the battery pack 100 to, for example, reduce the likelihood of a short circuit when conductive fluid enters the battery pack 100. The vapor-deposited coating 264 may provide an effective electrical spacing between conductive components greater than the actual spacing between such components.

In general, vapor-deposited coatings are vapor-deposited layers (e.g., with a fluorinated chemistry). The vapor-deposited coating 264 may be a hydrophobic or hydro-resistant material making the substrate upon which the coating 264 is deposited, fluid repellant or resistant. The vapor-deposited coating 264 may be applied to all components of the battery pack 100 (generally excluding the outer housing) to inhibit or prevent fluid ingress generally and/or into gap areas. For example, the cell core 104, the electronics and the terminal block 176 may be nano coated. Vapor-deposited coating allows for uniform thickness on all surfaces.

Commercially available material, such as parylene, marketed and sold by Diamon Mont., or other materials marketed and sold by P2i, Liquipel, etc., may be used for the vapor-deposited coating 264. Parylene refers to a family of chemical vapor-deposited poly(p-xylylene) polymers used as moisture and dielectric barriers. The vapor-deposited coating 264 may include parylene N, C, D, F, combinations thereof.

As shown in Table 1, below, parylene provides chemical resistance (measured as swelling of the film or coating) to various acids and other common chemicals that would otherwise severely corrode electronics. Due to the vapor-deposited coating 264, the battery pack 100 may have a similar corrosive resistance. The information in the below table and additional information on parylene is available at https://vsiparylene.com/parylene-advantages/properties/, VSI Parylene, Broomfield, Colo., the entire contents of which is hereby incorporated by reference.

TABLE 1

| | % Swelling | |
|---|---|---|
| | Parylene C | Parylene N |
| Inorganic Reagents | | |
| 10% Hydrochloric | 0.0% at 25° C. | 0.0% at 25° C. |
| (Non-Oxidizing Acid) | 0.0% at 75° C. | 0.0% at 75° C. |
| 37% Hydrochloric | 0.0% at 25° C. | 0.2% at 25° C. |
| (Non-Oxidizing Acid) | 4.1% at 75° C. | 2.3% at 75° C. |
| 10% Sulfuric | 0.3% at 25° C. | 0.1% at 25° C. |
| (Non-Oxidizing Acid) | 0.2% at 75° C. | 0.2% at 75° C. |
| 95-98% Sulfuric | 0.4% at 25° C. | 0.2% at 25° C. |
| (Non-Oxidizing Acid) | 5.1% at 75° C. | 5.3% at 75° C. |
| 10% Nitric | 0.1% at 25° C. | 0.1% at 25° C. |
| (Oxidizing Acid) | 0.1% at 75° C. | 0.2% at 75° C. |
| 71% Nitric | 0.2% at 25° C. | 0.2% at 25° C. |
| (Oxidizing Acid) | 1.85% at 75° C. | Became Brittle at 75° C. |
| 10% Chromic | 0.1% at 25° C. | 0.1% at 25° C. |
| (Oxidizing Acid) | 0.0% at 75° C. | 1.2% at 75° C. |
| 74% Chromic | 0.0% at 25° C. | 0.3% at 25° C. |
| (Oxidizing Acid) | 7.8% at 75° C. | 8.2% at 75° C. |
| 10% Sodium Hydroxide | 0.0% at 25° C. | 0.1% at 25° C. |
| (Base) | 0.5% at 75° C. | 0.0% at 75° C. |
| 10% Ammonium | 0.2% at 25° C. | 0.3% at 25° C. |
| Hydroxide (Base) | 0.4% at 75° C. | 0.4% at 75° C. |
| 100% De-Ionized Water | 0.0% at 25° C. | 0.0% at 25° C. |
| (Inert) | 0.0% at 75° C. | 0.0% at 75° C. |
| Organic Solvents | | |
| Isopropyl (Alcohol) | 0.1% at 25° C. | 0.3% at 25° C. |
| | 0.2% at 75° C. | 0.3% at 75° C. |
| Iso-Octane | 0.4% at 25° C. | 0.2% at 25° C. |
| (Aliphatic Hydrocarbon) | 0.5% at 75° C. | 0.3% at 75° C. |
| Pyridene (Amine) | 0.5% at 25° C. | 0.2% at 25° C. |
| | 0.7% at 75° C. | 0.4% at 75° C. |
| Xylene (Mixed) | 2.3% at 25° C. | 1.4% at 25° C. |
| | 3.3% at 75° C. | 2.1% at 75° C. |
| Trichloroethylene (TCE) | 0.8% at 25° C. | 0.5% at 25° C. |
| | 0.9% at 75° C. | 0.7% at 75° C. |
| Chlorobenzene | 1.5% at 25° C. | 1.1% at 25° C. |
| (Chlorinated Aromatic) | 2.0% at 75° C. | 1.7% at 75° C. |
| O-Dichlorobenzene | 3.0% at 25° C. | 0.2% at 25° C. |
| (Chlorinated Aromatic) | 1.4% at 75° C. | 0.3% at 75° C. |
| Trichlorotrifluoroethane | 0.2% at 25° C. | 0.2% at 25° C. |
| (Fluorocarbon) | 0.3% at 75° C. | 0.2% at 75° C. |
| Acetone (Ketone) | 0.9% at 25° C. | 0.3% at 25° C. |
| | 0.9% at 75° C. | 0.4% at 75° C. |
| 2,4-Pentanedione (Ketone) | 1.2% at 25° C. | 0.6% at 25° C. |
| | 1.8% at 75° C. | 0.7% at 75° C. |

In some constructions, the vapor-deposited coating 264 may have corrosive resistance comparable to polypropylene (PP) or polybutylene terephthalate (PBT) material. The vapor-deposited coating 264 may eliminate the need to use special materials for individual parts if the entire assembly is coated. The vapor-deposited coating 264 also facilitates the use of materials/constructions (e.g., a copper stamping) which may otherwise not be suitable due to potential for corrosion.

Some vapor-deposited coating materials (e.g., parylene with low adhesion and high cohesion) may degrade when exposed to UV light or due to abrasion. In order to inhibit such degradation, a cover (e.g., the outer housing or portions of the housing covering the vapor-deposited coating) formed of UV-rated plastic, such as acrylic, polytetrafluoroethylene (PTFE), Polyvinylidene Flouride (PVDF), etc., may provide UV protection to the coating 264. In the illustrated constructions, the outer housing 108 provides a UV-protected enclosure for the vapor-deposited coating 264 and the coated components.

In some embodiments, a portion of the core housing 38 may be exposed through the battery pack housing 108. For example, a bottom portion of the core housing 38 may be exposed through the core housing 38, for example, to reduce the size of the battery pack 100. However, in such a construction, a vapor-deposited coating on the exposed surface may be at risk for abrasion, exposure to damaging UV light, etc. The exposed vapor-deposited coating 264 may wear and flake, and such wear may expand and peel into the interior surfaces of the cell core 104.

To inhibit of prevent such occurrences, in some constructions, the exposed surface of the core housing 38 may be masked during coating such that there is no vapor-deposited coating on the exposed surface. In some constructions, the exposed surface, including edges and sides, may have an increased surface roughness (e.g., be roughened before application of the vapor-deposited coating 264); the roughened surface may inhibit peeling of the vapor-deposited coating 264 from the exposed surface from spreading to covered surfaces of the core housing 38.

In some constructions, the vapor-deposited coating 264 may be doped with other materials to improve UV performance (i.e., resistance to UV light) of the vapor-deposited coating 264.

In some constructions, the core housing 38 may include a housing portion supporting the battery cells and to which the vapor-deposited coating 264 is applied. A bottom housing portion including the exposed surface may be attached to the rest of the core 104 after the vapor-deposited coating 264 is applied.

The above techniques may also be used in battery packs 100 in which the core housing 38 is not exposed to promote adhesion and/or durability. The above techniques may be used in battery packs 100 having top and bottom housings, clamshell-style housings, etc.

The battery pack 100 may have a non-conductive bottom layer (e.g., plastic). If the bottom of the battery pack 100 was not non-conductive plastic, the pack 100 would be much harder to protect and difficult to fixture for chamber placement.

In some embodiments, only the circuit board 156 may be coated with the vapor-deposited coating 264 with the cell taps and straps 240 exposed. In one example, a layer of coating 264 of about 1 micron (μm) to about 20 μm or more (e.g., 22 μm) may be used to coat the components. A coating of these dimensions may prevent any penetration of fluids, provide structural strength/resistance from deterioration (e.g., during drops or rough handling), etc. In other embodiments, the layer of coating 264 may be thinner (e.g., between about 5 µm and about 15 µm; between about 1 µm and about 8 µm (e.g., about 6 µm), etc.). In still other embodiments, the layer of coating 264 may be even thinner (e.g., between about 100 nanometer (nm) and about 1,000 nm, between about 10 nm to about 30 nm, etc.).

In addition, a geometry of the battery pack 100 may be altered using the vapor-deposited coating 264. For example, the vapor-deposited coating 264 may be provided such that a slope is formed on electrical components (e.g., the electronics) promoting run-off of fluids to drain areas (e.g., drain holes) and/or away from such components or cells. The sloping may also provide for a coating of sufficient thickness, even at the thinnest location.

In some constructions, the vapor-deposited coating 264 may be applied to a terminal member. For example, FIG. 45D illustrates a crab claw terminal with a vapor-deposited coating 264. In such a construction, the two facing sides of the contacts protect each other from the non-conductive dielectric coating thereby maintaining electrical conductivity of the protected contact portions after coating. Accordingly, these contacts do not need to be masked for coating, reducing time and cost. In other constructions (not shown), a terminal without a protecting structure (e.g., a male terminal) may have a vapor-deposited coating 264, and, in such constructions, contact portions may be masked or protected before coating.

For components subject to multiple insertions/removals (e.g., terminals), protective material (e.g., grease) may be applied to the coating. Using uniform heat transfer materials (e.g., copper, etc.) may provide improved maintenance of the vapor-deposited coating 264. In contrast, non-uniform or multiple material components, may contribute to the coating breaking down, being brittle, melting.

FIG. 45E illustrates another component, a button 268 (e.g., a sealed "popple dome" style button, for example, for a state-of-charge (SOC) indicator) coated with a vapor-deposited coating 264. The illustrated sealed switch design allows for coating without costly masking with the seal protecting the internal components from the coating.

In some constructions (see FIGS. 46A-46B), substantially the entire battery pack assembly 100 (including electronic components), other than the outer housing 108, is coated with a vapor-deposited coating 264.

Figure 46A:
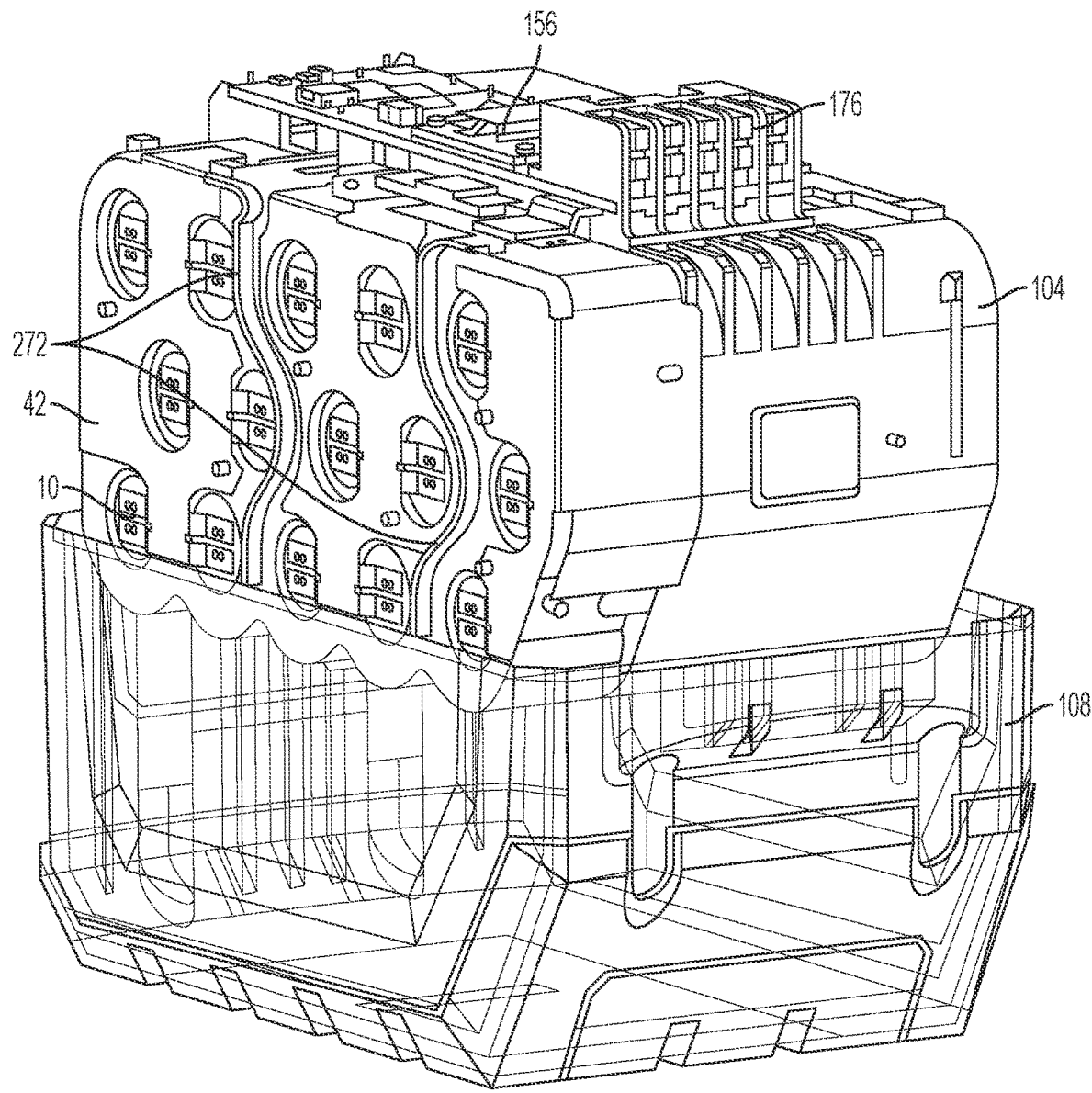
FIGS. 46A-46B are views of a portion of a battery pack.
Figure 46B:
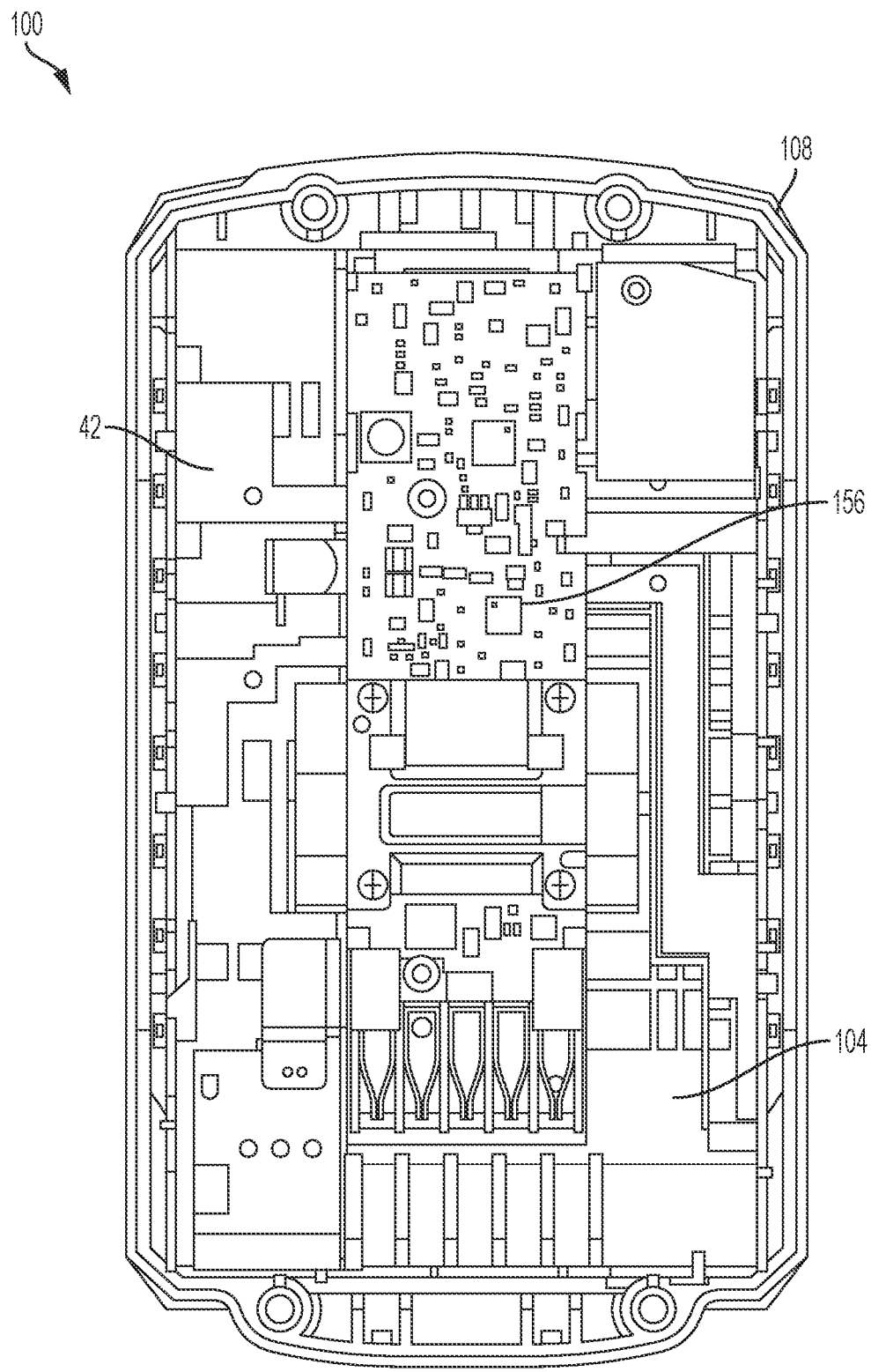

The vapor-deposited coating 264 may be susceptible to abrasion. As shown in FIG. 46A, the cell module housing 38 includes a standoff 272 to prevent or inhibit abrasion of the coating by the outer housing walls, for example, by minimizing an area of engagement during assembly (e.g., insertion) and/or via drop, impact, vibration, etc. The illustrated cell module construction (see FIGS. 46A-46B) allows for safe insertion of the coated pack into the outer housings 108 without damaging coating 264. The standoff 272 (e.g., an S-shaped rib between the straps, as illustrated) is proud of the conductive straps 42, allowing the cell core 104 to be inserted without or with a reduced risk of scratching coating on the straps 42, other components, etc. The standoff 272 may also help application of the coating 264 to the straps 42. If the coating 264 on the standoff 272 (e.g., the ribs) itself is scratched during insertion, this is not an issue because the cell module housing is non-conductive plastic.

In other constructions (not shown), individual battery cells 10 may be coated with a vapor-deposited coating 264, for example, to at least prevent fluid (water) ingress into the cell header 26. While welding of the conductive strap 42 may remove some coating material from the coated cell 10, ingress prevention performance is still improved. With the vapor-deposited coating 264, a washer normally used to hold the cell sleeve may not be required.

The material of the coating 264 may be transparent or translucent to allow visibility of components of the coated cell (e.g., the sleeve). The material of the coating 264 may be tinted or colored as desired or required. The material of the coating 264 may allow for printing, coloring, etc., on the outer surface of the material without impeding performance of the material.

In some constructions, the vapor-deposited coating 264 may replace the cell sleeve. In some constructions, the conductive cell can provides a conductive portion of the battery cell 10 (e.g., the negative terminal). The coating 264 may cover and insulate at least portions of the can (e.g., exposed conductive portions of the can).

In the illustrated construction, each cell 10 is able to vent, if necessary, for example, for protection of the cell 10, the battery pack 100, etc. The vapor-deposited coating material has a construction (e.g., thickness) to provide desired ingress prevention, durability, etc., while allowing cell venting. Further, for cells 10 with a current interrupt device (CID) 232, the coating 264 does not affect performance of the CID 232 which is internal to the cell 10.

In some constructions, the coating 264 may be applied to the cell header 26. In such constructions, the coating 264 has a construction to provide desired ingress prevention, durability, etc. while allowing cell venting, operation of the CID 232, etc. and without inhibiting performance of the cell 10. The coating material has a thickness such that the coating 264 does not affect heat transfer of the cells 10—the thermal conductivity of the coating 264 is negligible, and the coating 264 does not insulate/has similar properties to air.

In some constructions, the vapor-deposited coating 264 has a thickness of between about 1 micron (µm) and about 20 µm or more. In some constructions, the thickness of the vapor-deposited coating 264 is between about 5 µm and about 15 µm. In some constructions, the thickness of the vapor-deposited coating 264 is between about 1 µm and about 8 µm (e.g., about 6 µm). In some constructions, the vapor-deposited coating 264 has a thickness of between about 10 µm and about 22 µm (e.g., less than about 22 µm for a fuel gauge button).

The vapor-deposited coating 264 may provide improved insulation of conductive parts. With the resulting insulation, voltage potentials and spacings between conductive components can be reduced, thereby reducing the size of the coated components (e.g., the cell module) and the overall assembly (e.g., the battery pack). The coating 264 may facilitate reducing the size of the battery pack 100 while still allowing sufficient fluid drainage/resistance to fluid intrusion or shorting.

The spacings are voltage dependent and may be about 0.8 mm up to about 15 V; about 1.5 mm up to about 32 V; about 2.0 mm creepage and about 1.5 mm clearance up to about 60 V; about 2.5 mm creepage and about 1.5 mm clearance up to about 130 V. Clearance is the shortest distance through air between two conductive parts, and creepage is the shortest distance between two conductive parts along a surface of any insulating material common to both parts. The vapor-deposited coating 264 may provide comparable performance when applied to components of AC products.

With the vapor-deposited coating 264 and using a non-sealed outer housing 108, the battery pack 100 is at least dust protected such that, while ingress of dust is not entirely prevented, dust does not enter in sufficient quantity to interfere with the operation of the battery pack 100 with complete protection against contact. Likewise, the battery pack 100 will have liquid protection at least against water projected in powerful jets (12.5 mm nozzles) against the outer housing 108 from any direction with no harmful effects.

In some constructions, with the vapor-deposited coating 264, the battery pack 100 may be dust tight such that there is no ingress of dust with complete protection against contact. The battery pack 100 will have liquid protection for long-term immersion beyond 1 m—for continuous immersion in water under specified conditions which may mean that the battery pack 100 is equivalent to being hermetically sealed or that water can enter but only in such a manner that the produces no harmful effects.

Unsealed battery packs without nano coated components may immediately react when immersed in a tank of water. In contrast, when tested, the unsealed battery packs 100 with nano coated components remain functional (e.g., with a working fuel gauge) from about 10 seconds up to and beyond 24 hours of immersion. The battery pack 100 may withstand up to about 75° C. in the presence of liquid. The vapor-deposited coating material (e.g., parylene) will typically withstand at least this temperature and higher temperatures without degrading.

A high operating temperature of the battery cells of the battery pack 100 is between about 50° C. and about 110° C. In some constructions, when the vapor-deposited coating 264 includes parylene C or parylene N, which each provide good thermal properties, the cell core 104 and the battery pack 100 can withstand continuous exposure to temperatures up to between about 75° C. and about 85° C. (about 80° C.) and short-term exposure of up to between about 90° C. and about 100° C. (about 95° C.).

Other parylene vapor-deposited coatings 264 may withstand continuous exposure up to 100° C., 200° C., or 350° C. In some embodiments, the cell core 104 with the vapor-deposited coating 264 may withstand continuous exposure to temperatures up to 80° C., 100° C., 120° C., 150° C., 200° C., 250° C., 300° C., or 350° C.

The parylene vapor-deposited coating 264 has a dielectric breakdown strength between 200 Volts/micron (V/μm) and 300 V/μm. For a coating with a thickness 6 μm, the vapor-deposited coating 264 can withstand between 1200 V and 1800 V before breakdown. In some embodiments, the vapor-deposited coating 264 has a dielectric breakdown strength of up to 200 V/μm, 250 V/μm, or 300 V/μm. Generally, parylene N and parylene F have a higher dielectric breakdown strength than parylene C.

In some constructions, the vapor-deposited coating 264 may be used in combination with polycarbonate (PC)/plastic.

Battery packs 100 having cells with lithium-ion chemistry may be subject to shipping regulations. Such shipping regulations may limit the voltage and/or power capacity of the battery pack being shipped. In order to comply with such regulations, battery packs 100 may be shipped with subcores of the battery cells 10 disconnected from each other. In other constructions, a battery pack may include battery cells 10 which are selectively connectable in different configurations (e.g., series, parallel, combination series-parallel, etc.) to provide different selected output capabilities (e.g., nominal voltage, capacity, etc.) for the battery pack.

The battery pack 100 may include a switch 1315 (see FIGS. 48A-48E) which selectively connects the battery cell 10/subcores together when the battery pack 100 is in use and/or in the selected configuration for use. A similar switch and switching arrangement is described and illustrated in U.S. Provisional Patent Application No. 62/435,453, filed Dec. 16, 2016, and in U.S. patent application Ser. No. 15/845,068, filed Dec. 18, 2017, the entire contents of both of which are hereby incorporated by reference.

The vapor-deposited coating 264 may be applied to portions of the switch 1315, leaving a minimum portion exposed for operation of the switch 1315 (e.g., only the tracks of the switch 1315 remain exposed instead of entire busbar). In some constructions, operational portions (e.g., the conductive portions) of the switch 1315 may be masked during application of the vapor-deposited coating 264. In some constructions, operational portions of the switch may be engaged during application of the coating 264, the engagement inhibiting application of the vapor-deposited coating 264 to the operational portions. After application of the coating 264, the switch 1315 may be operated a number of times (e.g., ten times) to, for example, confirm or ensure operation of the switch 1315 in its various positions.

Figure 48A:
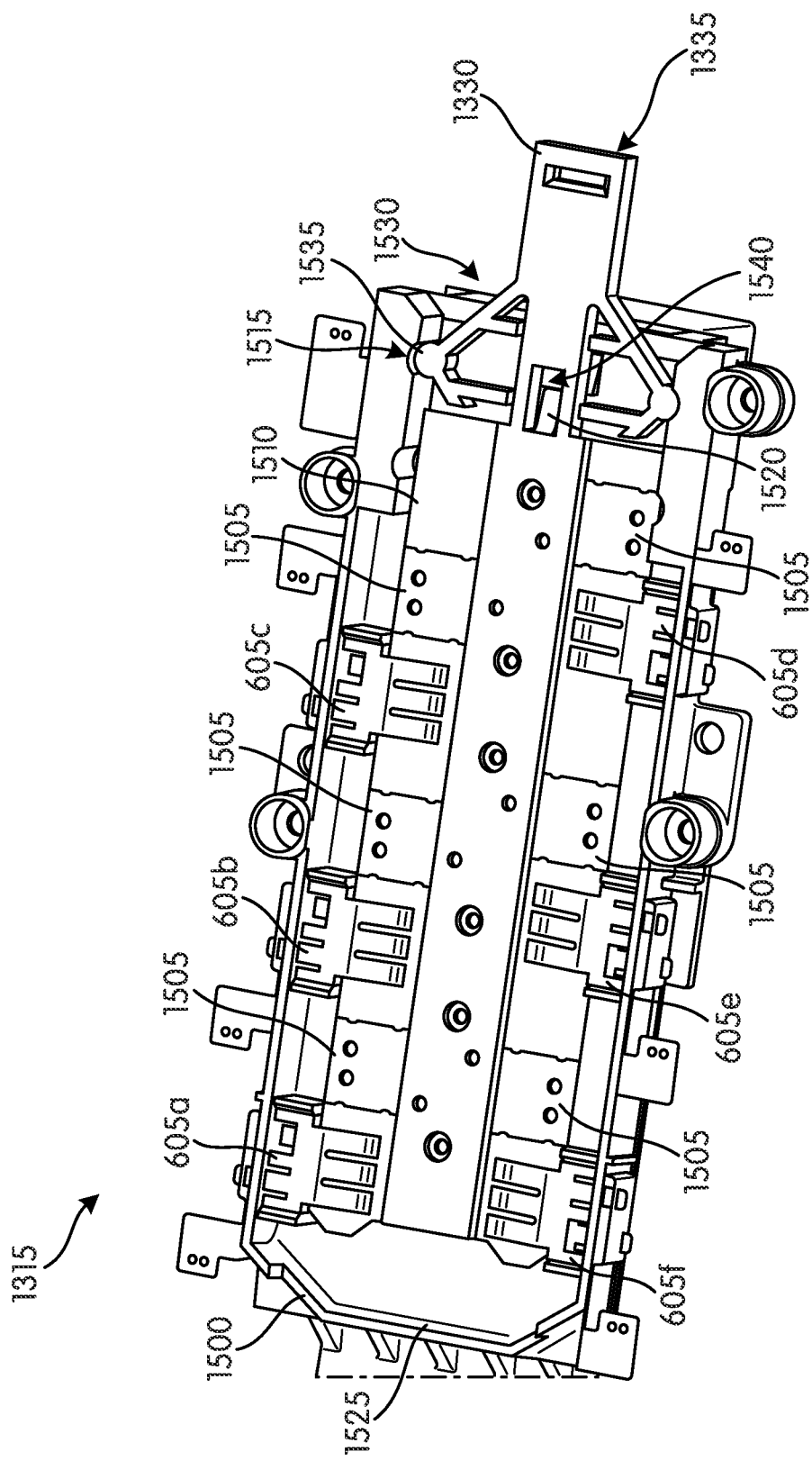
FIGS. 48A-48E are views of a switch for the battery pack.
Figure 48B:
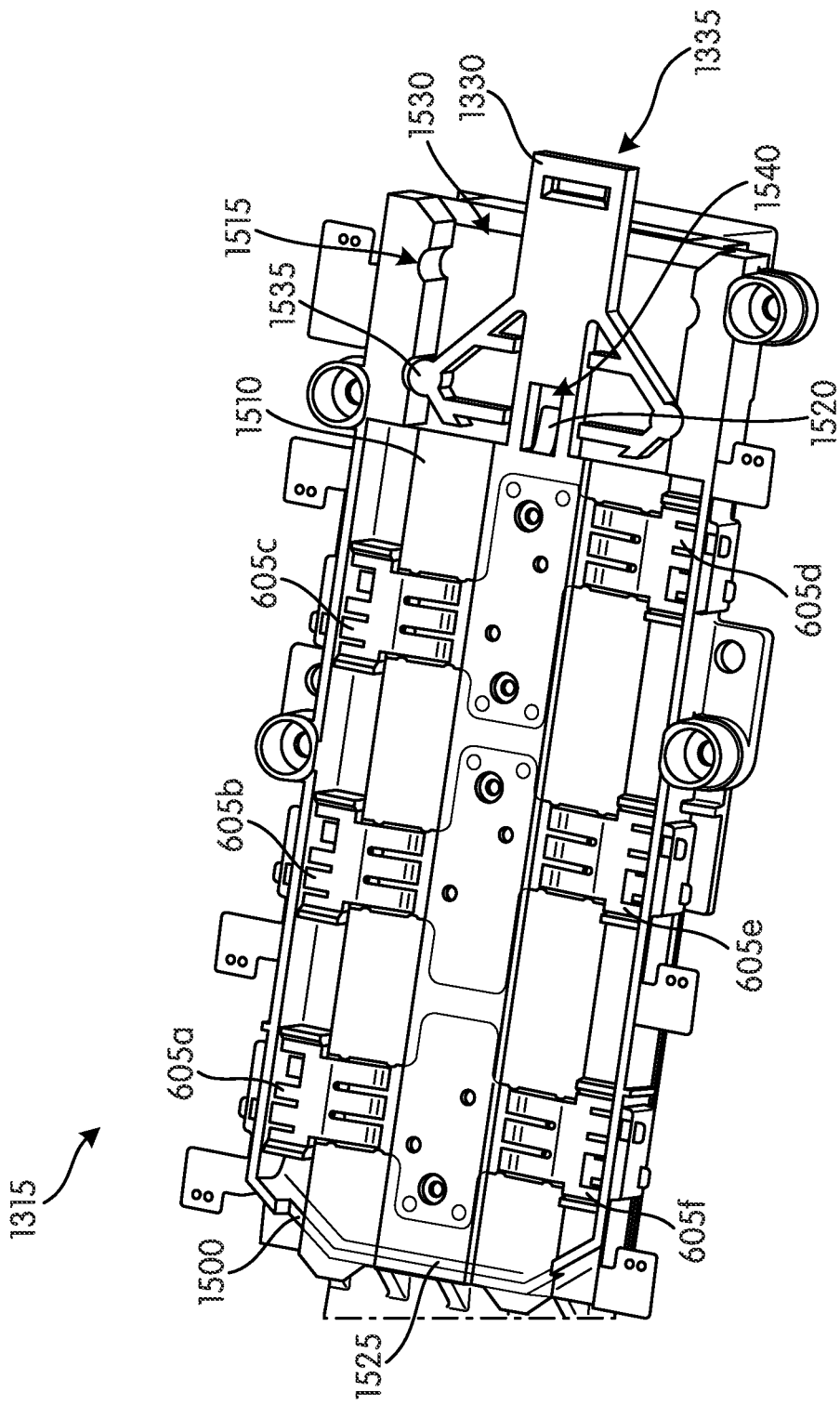
Figure 48C:
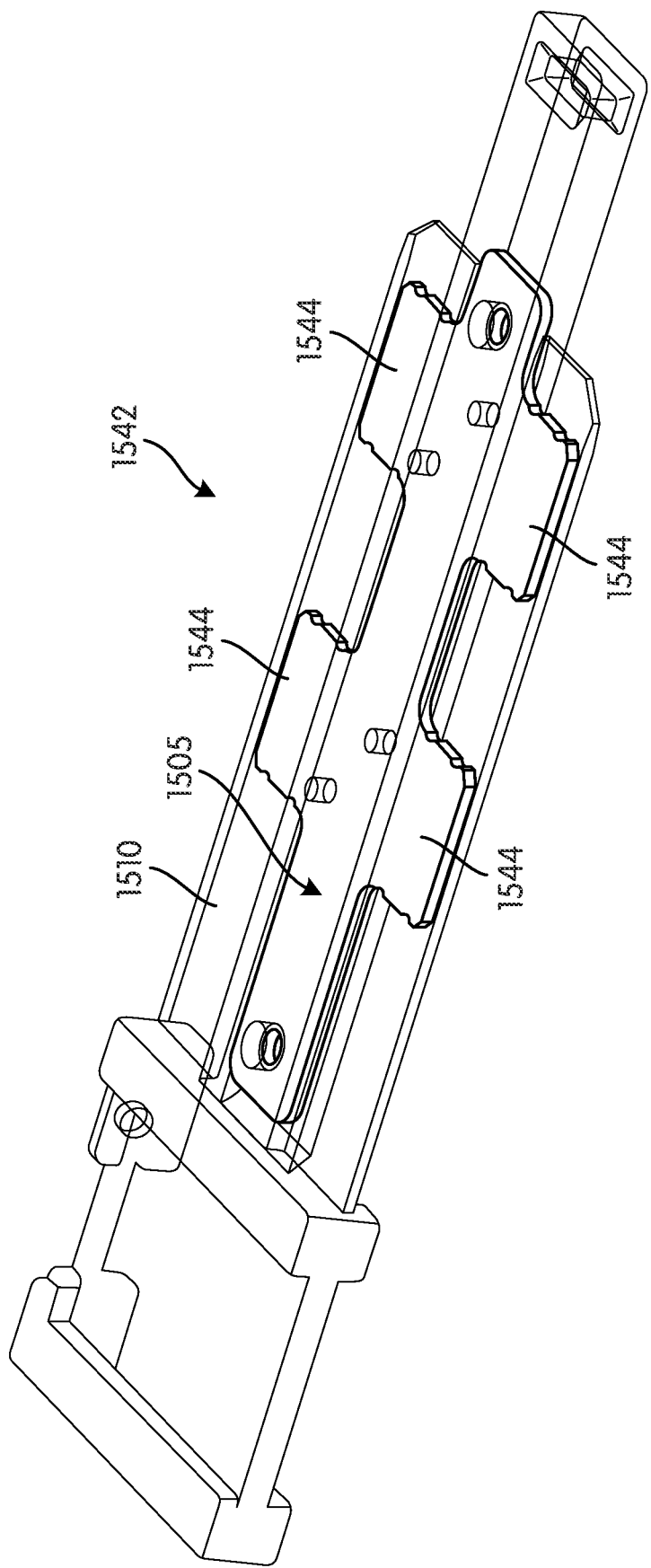
Figure 48D:
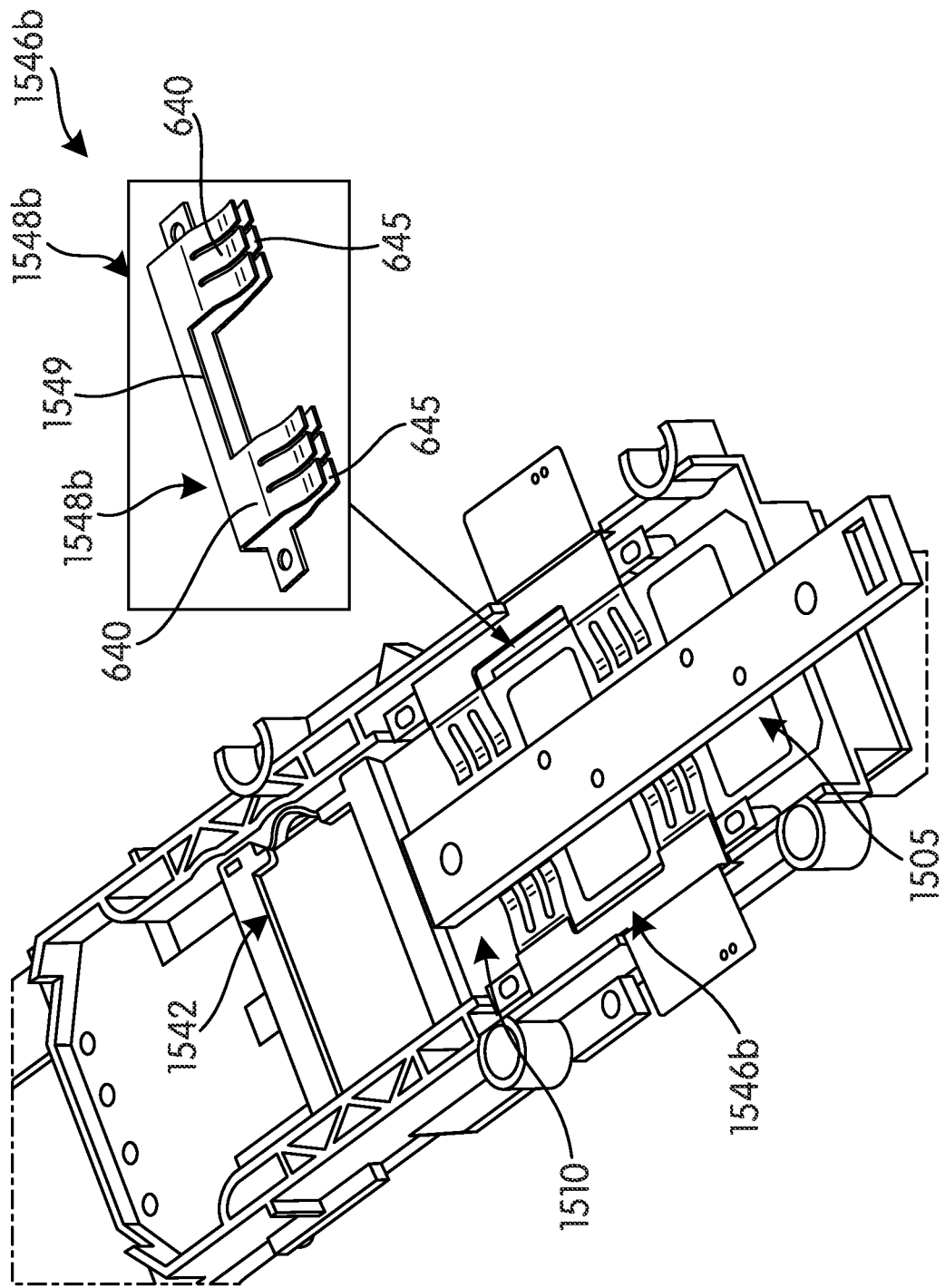
Figure 48E:
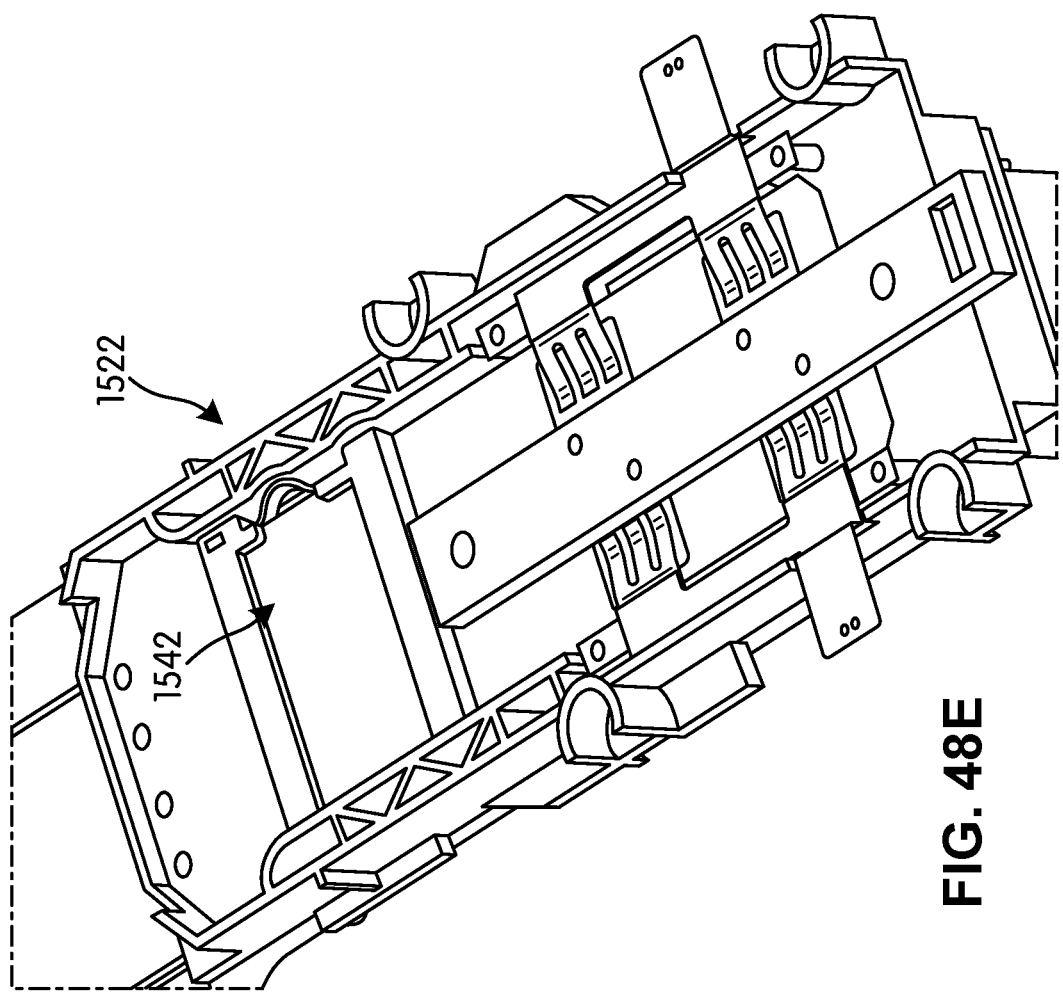

The switch 1315 is configured to be in the first position (see FIG. 48A or 48D; e.g., disconnected or "OFF") and the second position (see FIG. 48B or 48E; e.g., connected or "ON"). The illustrated switch 1315 includes a shell 1500, terminals 605a, 605b, 605c, . . . 605n, a conductive bus 1505, and a non-conductive layer 1510. The shell 1500 may include one or more recesses 1515, a front stop member 1520, and a rear stop member 1525.

As illustrated in FIGS. 48A-48B, in some embodiments, the conductive bus 1505 and non-conductive layer 1510 are coupled to the user-interface 1330 via a protective member 1530 having one or more projections 1535 and forming an aperture 1540. The projections 1535 engage with the one or more recesses 1515 of the shell 1500 to prevent unwanted movement between the first and second positions. As illustrated in FIG. 48C, the conductive bus 1505 and the non-conductive layer 1510 may form a plate 1542. Although illustrated with the conductive bus 1505 having four conductive members 1544, in other embodiments, the conductive bus 1505 may have more or fewer conductive members 1544.

In the illustrated embodiment of FIG. 48C, the conductive members 1544 are approximately flush, or continuous, with the non-conductive layer 1510. Such an embodiment promotes movement of the terminals 605 between connection to the non-conductive layer 1510 and connection to the conductive members 1544 of the conductive bus 1505. In some embodiments, as illustrated in FIG. 48C, the conductive bus 1505 is formed of a continuous conductive material (for example, copper).

FIGS. 48D-48E illustrates the conductive bus 1505 and non-conductive layer 1510 electrically and/or physically connected to terminals 1546a, 1546b in another embodiment. Each illustrated terminal 1546 includes a first terminal portion 1548a and a second terminal portion 1548b connected via a bus bar 1549. In some embodiments, the bus bar 1549 provides a parallel connection between the terminal portions 1548a, 1548b, while reducing electrical resistance and heat generated via the connection of subcores.

As illustrated, each terminal portion 1548 includes an upper foot 640 and a lower foot 645, which are substantially similar to the upper and lower feet 640, 645 of terminal 605. Terminals 1546, including bus bar 1549, allow for a single electrical connection between a first plurality of subcores and a second plurality of subcores. In other embodiments, the terminal 1546 may include more than two terminal portions 1548.

As described above, the coating 264 may be applied when the switch 1315 is in the second position (see FIG. 48B or 48E; e.g., connected or "ON"). Engagement of the terminals 605a, 605b, 605c, . . . 605n with the conductive members 1544 inhibits application of the coating 264 to at least portions of the conductive members 1544 (e.g., at least operational portions of the conductive members 1544 to be engaged by the respective terminals 605 in the second position).

In other constructions (not shown), the switch 1315 may have a first position corresponding to a first operational configuration (e.g., a nominal voltage about 20 V and a capacity of about 4 Ah) and a second position corresponding to a second operational configuration (e.g., a nominal voltage of about 40 V and a capacity of about 2 Ah). The switch 1315 may include additional positions (e.g., an additional operation configuration, a non-operational configuration (e.g., "OFF"), etc.).

With the vapor-deposited coating 264, components (e.g., the coding header, the tall 4-pin connector (see FIG. 45C), etc.) of the pack electronics which are normally removed (e.g., at the factory) before shipping, sale or use, for example, to prevent shorting may remain installed, reducing labor cost for removal.

A metal housing/core may be provided around a pack to compress/coat to avoid abrasion and provide good heat sinking. In some constructions, there may be ultrasonic fixturing of components while being coated.

The vapor-deposited coating 264 provides another layer of insulation on conductive components to help prevent electrostatic discharge (ESD) between components inside the pack 100. The coating 264 could also provide a benefit in high voltage field environments (e.g., near power lines), as voltage arcs tend to concentrate on corners or sharp-edged components. The coating 264 can provide insulation on those edges.

In some constructions, the vapor-deposited coating 264 may be applied to a heat sink, facilitating the elimination or reduction of insulating material. This may also allow the removal or reduction of any gap such that the heat sink is mounted directly to improve thermal transfer and reduce cost (i.e., less expensive anodization). The heat sink (and other coated components) may be coated before and after assembly to provide the desired coating characteristics and performance.

In some constructions, such as for lighting applications, the vapor-deposited coating 264 may be applied to control electronics while allowing greater airflow. The coating 264 may be applied to LED boards, eliminating the need for a sealed compartment (e.g., via gaskets).

Figure 47:
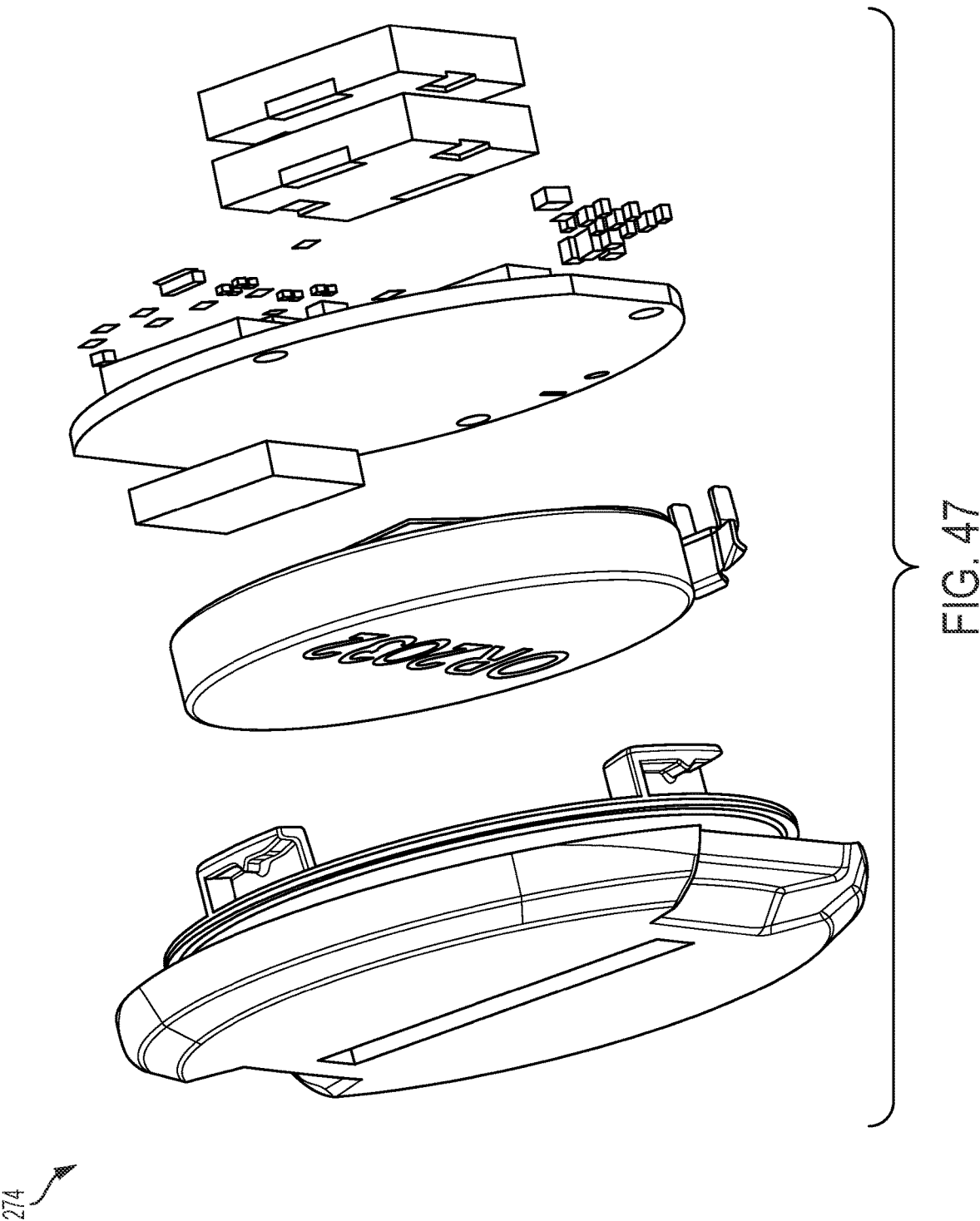
FIG. 47 is an exploded view of an electronic device, such as a tracking device.

In some constructions, a vapor-deposited coating 264 may be applied to components of a Bluetooth® low energy (BLE) module. The vapor-deposited coating 264 does not interfere with operation, range of the BLE module when compared to a conformal coating. FIG. 47 illustrates a tracking device 274 including a BLE module. Components of the device may be coated such that additional seals (e.g., an o-ring) are not required while maintaining performance of the components. A similar tracking device is described and illustrated in U.S. Provisional Patent Application No. 62/592,181, filed Nov. 29, 2017, the entire contents of which are hereby incorporated by reference.

In some constructions, use of a vapor-deposited coating 264 may eliminate the need for potting of electronics, depending on structural/thermal needs of the components. While the structure of the potting boat may be retained, the potting material may be eliminated or reduced to the amount needed to help dissipate heat.

The battery pack 100 assembly process may be as follows: An adhesive label/seal 34, if necessary, may be applied to each cell header 26. The cells 10 are then installed into the cell module frame 38, and fasteners are installed to the frame. The conductive straps 42 are assembled on the frame and welded (e.g., resistance welded) to the cell contacts. The electronics, including the PCB 156, are installed and welded and soldered to provide the necessary electrical connections. After welding and soldering of the electronics, the vapor-deposited coating 264 is applied to the components of the assembled cell module. After coating, fasteners are installed to the bottom housing 112 and then to the top housing 116.

In some constructions, the vapor-deposited coating 264 may replace or eliminate the need for the adhesive label/seal 34 added to each cell 10. In some constructions, individual cells 10 may be coated with a vapor-deposited coating 264 before installation into the cell module frame 38, eliminating a need for a cell label or seal 34 to protect the cell header 26. In some constructions, the vapor-deposited coating 264 may be provided in addition to the seal/gasket 30 and/or the adhesive seal 34. In these constructions, the vapor-deposited coating 264 may provide a layer of ingress protection in addition to the gasket 30 and/or the adhesive seal 34. The vapor-deposited coating 264 covers all exposed cell surfaces of the battery cell 10 including the gaskets 30 and the cell header portions 26.

In some constructions, individual conductive straps 42, weld straps 140, etc., may be coated with a vapor-deposited coating 264 to increase spacings between voltages. Resistance welding through the vapor-deposited coating 264 is possible if the coating (e.g., parylene) is thin enough (e.g., less than or equal to about 20 μm is suitable for welding without impacting operation of any related components (for example, the fuel gauge button)), and, while this may expose the voltage potential at the weld joint, the overall strap-to-strap effective electrical spacing would increase.

In some constructions, the vapor-deposited coating 264 (e.g., parylene) is applied to coat the battery PCBA 156. The coating 264 provides uniform coating coverage over complex geometries (differences between components, different shapes (e.g., cylinder, rectangular prism, complex polygon, etc.), multiple stacked components, etc.), such as a sense resistor, a tall capacitor, a large resistor, toroid-shaped large inductor, etc.

In some constructions, motor components may include a vapor-deposited coating 264. For example, a vapor-deposited coating 264 may be applied to the stator laminations which may reduce/adjust (increase) natural resonant frequencies (e.g., due to a change in mass).

As another example, motor magnets (e.g., sintered primary magnets, sense magnets, etc.) may include a vapor-deposited coating 264. Such a coating may improve the strength of the magnet (e.g., a ferrite sense magnet which may otherwise be very brittle and can fall out if cracked/broken). With respect to a primary magnet, the vapor-deposited coating 264 may replace the nickel-copper-nickel coating which is provided to inhibit rust, reducing the cost. The vapor-deposited coating 264 may also improve adhesion to glue compared to the nickel coating. The magnets may be coated in place after insertion, a potential cost saving. The coating process may allow bulk coating of magnets when un-magnetized.

The vapor-deposited coating 264 may be applied to winding leads. The coating 264 may reduce breakage on tang leads of small winding wires.

In some constructions, the vapor-deposited coating 264 may replace a slot liner paper/dielectric in the stator. Generally, the paper is an insulator and does not transfer heat well. In contrast, with certain properties, the vapor-deposited coating 264 could improve heat transfer from the coil to the stator. The vapor-deposited coating 264 may also replace the tape, minimizing spacings between the magnet wire, rotor, and stator. The vapor-deposited coating 264 may help prevent build-up of dust, debris, metal, etc., in coated motor components.

In some constructions, the vapor-deposited coating 264 may be used to strengthen mounting of components. For example, the vapor-deposited coating 264 may be used to strengthen the mounting of electronic components to the PCBA substrate. A coating with a thickness of 6 μm or greater may improve the mounting between components.

In some constructions, the vapor-deposited coating 264 contains phase change materials around a battery cell 10. Phase change materials store and release large amounts of energy when the substance changes phase (e.g., freezes, melts, etc.). The phase change material is used to improve thermal management, for example, heat dissipation during discharge of the battery pack 100.

The phase change material can be used in conjunction with parylene to form the vapor-deposited coating 264 to improve thermal management of the battery pack 100. Accordingly, the vapor-deposited coating 264 may be used instead of a sleeve or a wrapper around the battery cells 10 containing the phase change material.

In some constructions, one or more surfaces of the core housing 38 may be made of plastic or other non-conducting material. Using plastic or non-conducting material reduces or prevents the risk of potential short circuiting and allows the core housing 38 to be placed on metal fixtures during application of the vapor-deposited coating 264.

In some constructions, the application of the vapor-deposited coating 264 is performed to one or more at least partially charged battery cells 10. For example, the battery cell(s) 10 are charged to about 20% state of charge (SOC) before the vapor-deposited coating 264 is applied (e.g., directly to the cell(s) 10, to the cell core 104 after assembly of the cell(s) 10 into the core housing 38, etc.). In some constructions, the vapor-deposited coating 264 is applied to the battery cell(s) 10 that have been charged to at least about 10% SOC, about 20% SOC, about 25% SOC, about 30% SOC, or more. The battery cells 10 may be charged up to about 75% SOC or even about 100% SOC.

Figure 42:
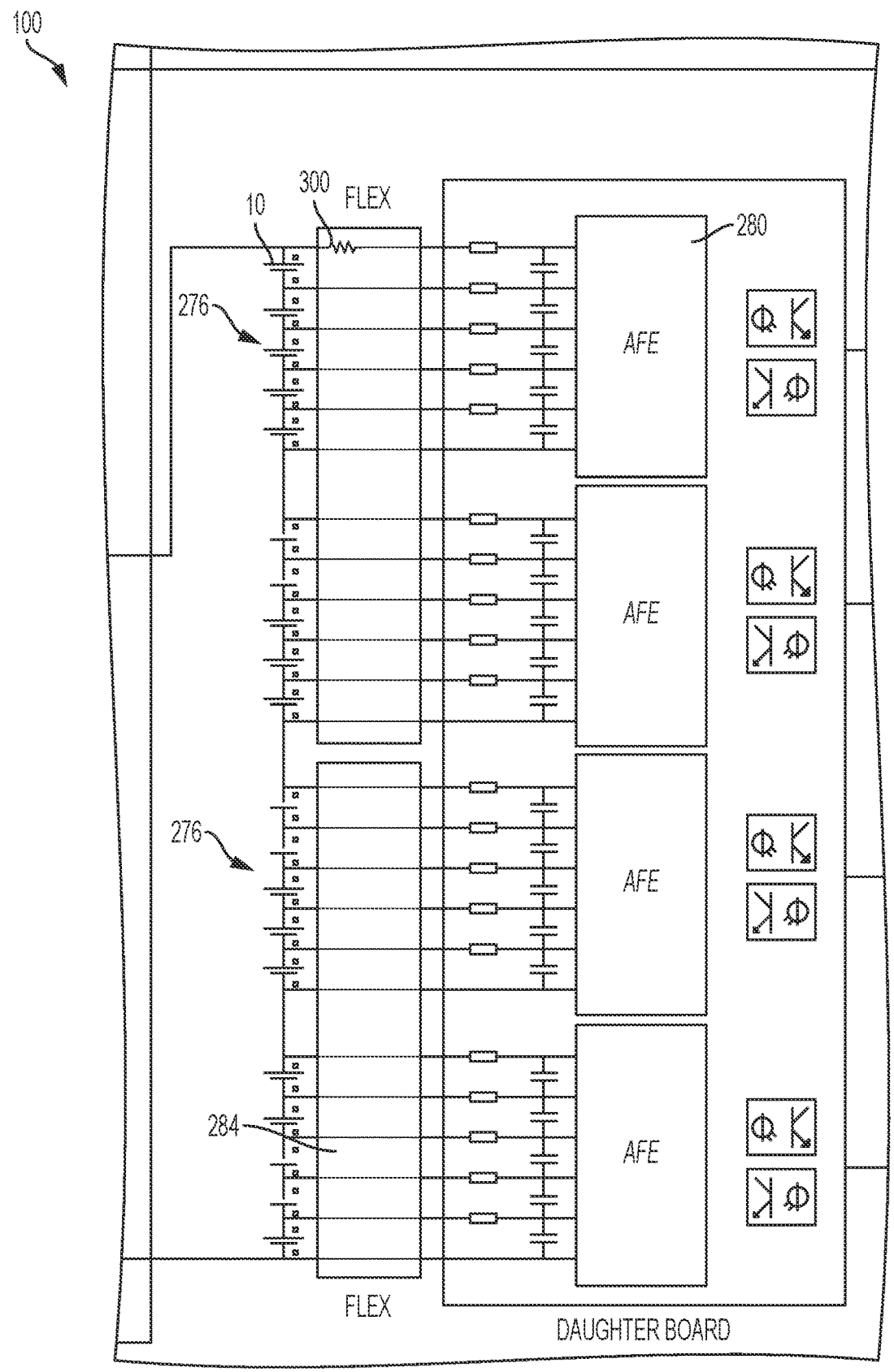
FIG. 42 is a block diagram of a battery pack illustrating individual cell monitoring.

Battery packs 100 may include multiple series strings 276 of battery cells 10 connected in series or parallel to each other. Each series string 276 includes several battery cells 10 connected in series to each other. Each individual cell 10 of the battery packs 100 may be individually monitored by an analog front end (AFE) 280 as shown in FIG. 42.

Figure 43:
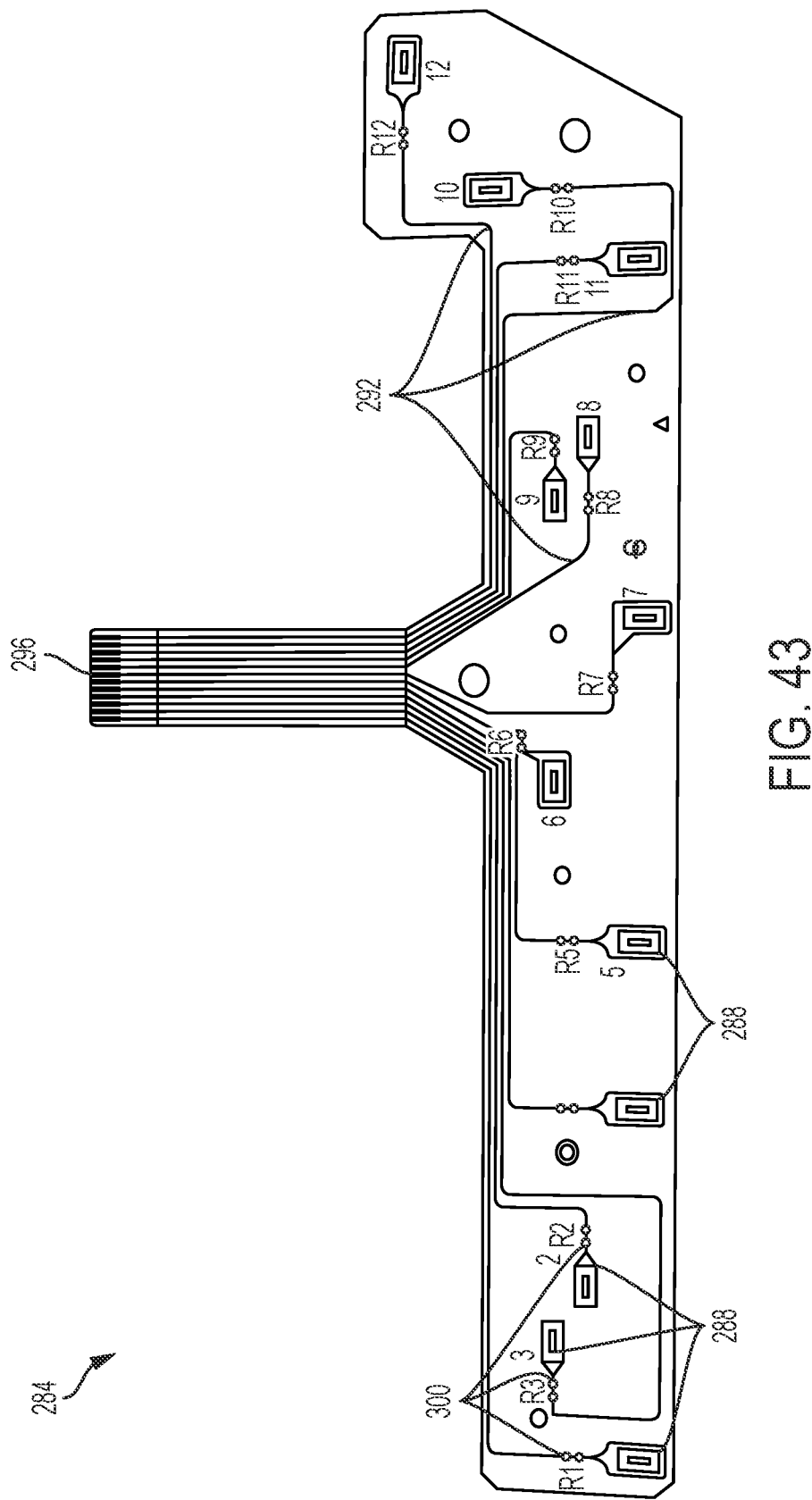
FIG. 43 is a view of a cell tap flex circuit.

A cell tap flex circuit 284 is used to connect the individual cells 10 to the AFE 280. As shown in FIG. 43, the cell tap flex circuit 284 includes cell taps 288 (shown on the circuit board with numerals 1-12) connected to individual cells 10 of the battery pack 100. In the illustrated construction of the cell tap flex circuit 284, all cell taps 288 are on one side of the battery pack 100; in other constructions (not shown), cell taps 288 may be on both sides of the battery pack 100. Traces 292 run from each cell tap 288 to a common connection point 296 to electrically connect the cells 10 to the connection point 296. The connection point 296 is connected to the AFE 280.

To apply the vapor-deposited coating 264, the PCB 156 is assembled onto the cell core 104 and placed into a chamber of a coating machine. The coating machine reduces the air pressure in the chamber and supplies vapor-deposited coating (e.g., parylene) in amorphous form to be applied to the contents of the chamber. The vapor-deposited coating 264 is then applied to every exposed surface of the cell core 104 and the PCB 156.

As can be seen in FIG. 43, the traces 292 may run very close to each other on the cell tap flex circuit 284. As such, the traces 292 may short-circuit in the presence of a conductive fluid. For example, conductive fluid or material (e.g., sea water) entering the battery pack 100 and onto the cell tap flex circuit 284 may short-circuit two or more of the traces 292.

When traces 292 short-circuit, the temperature of the circuit components (e.g., the cells 10, the traces 292, the connection point 296, etc.) may increase rapidly. The illustrated cell tap flex circuit 284 includes resistors 300 (shown on the circuit board with R1-R12) connected on the traces 292 between the cell taps 288 and the connection point 296. Each trace 292 includes at least one resistor 300. If and when a short-circuit occurs, the resistors 300 will break down and fault open, thereby opening the connection between the cell taps 288 and the connection point 296 to inhibit or prevent the battery pack 100 from overheating.

In some embodiments, the resistors 300 are replaced by positive thermal coefficient resistors/thermistors (PTCs). A PTC is characterized in that its resistance increases with increasing temperature. Accordingly, if and when a short circuit occurs, the PTCs increase their resistance, thereby preventing excess current through the traces 292. That is, rather than breaking down as the resistors 300 will do, PTCs increase their resistance with increasing temperature. This will inhibit or prevent the battery pack 100 from overheating while improving the servicing of the battery pack 100 as the circuit will be operable again once the short circuit condition is alleviated.

In some constructions, components in an electric power system (e.g., a battery pack 100, an electrical device 204 (a power tool, a charger, etc.)) and the associated components to be coated and/or otherwise sealed (e.g., an adhesive seal on the cell header, etc.) may be determined based on the use/application of the system. For example, if the system will be used in applications involving fluid (e.g., water delivery, plumbing, marine, etc.) or other contamination, relatively more components of the elements of the system may be coated or sealed compared to systems being used in applications not typically involving fluid, contaminants, etc.

Figure 49B:
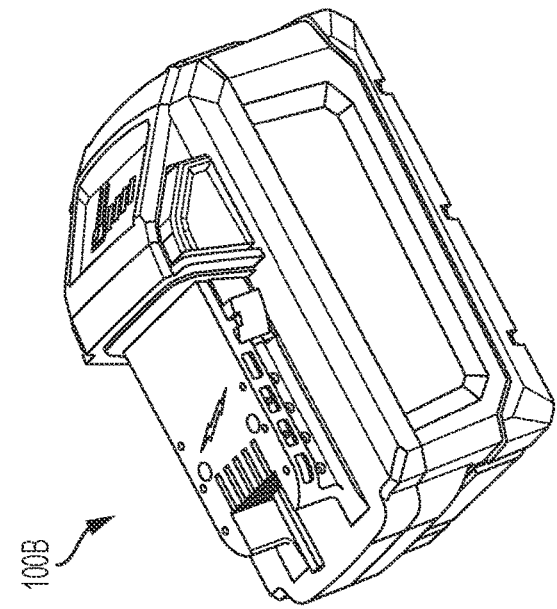
FIGS. 49A-49C are perspective views of battery packs in accordance with some embodiments.
Figure 49C:
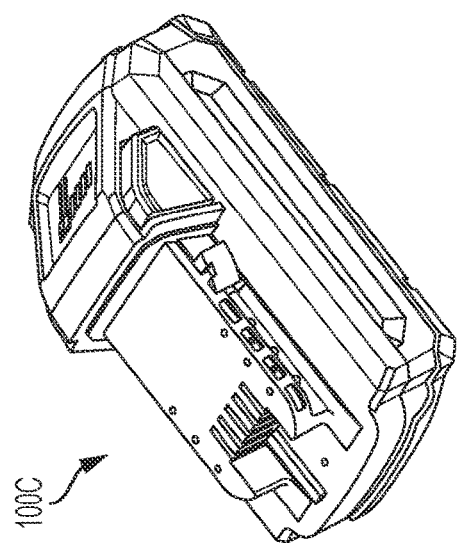
Figure 49A:
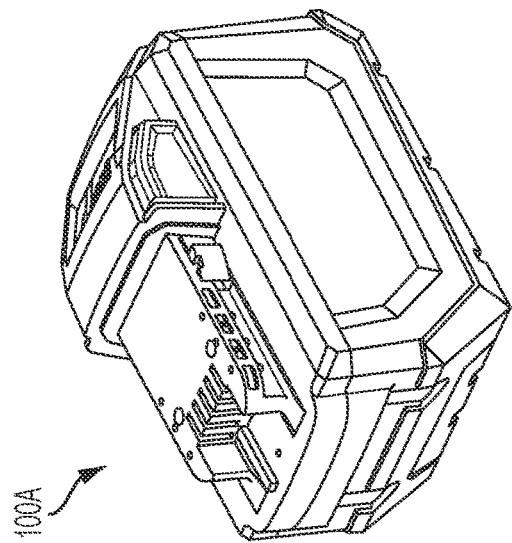
Figure 50A:
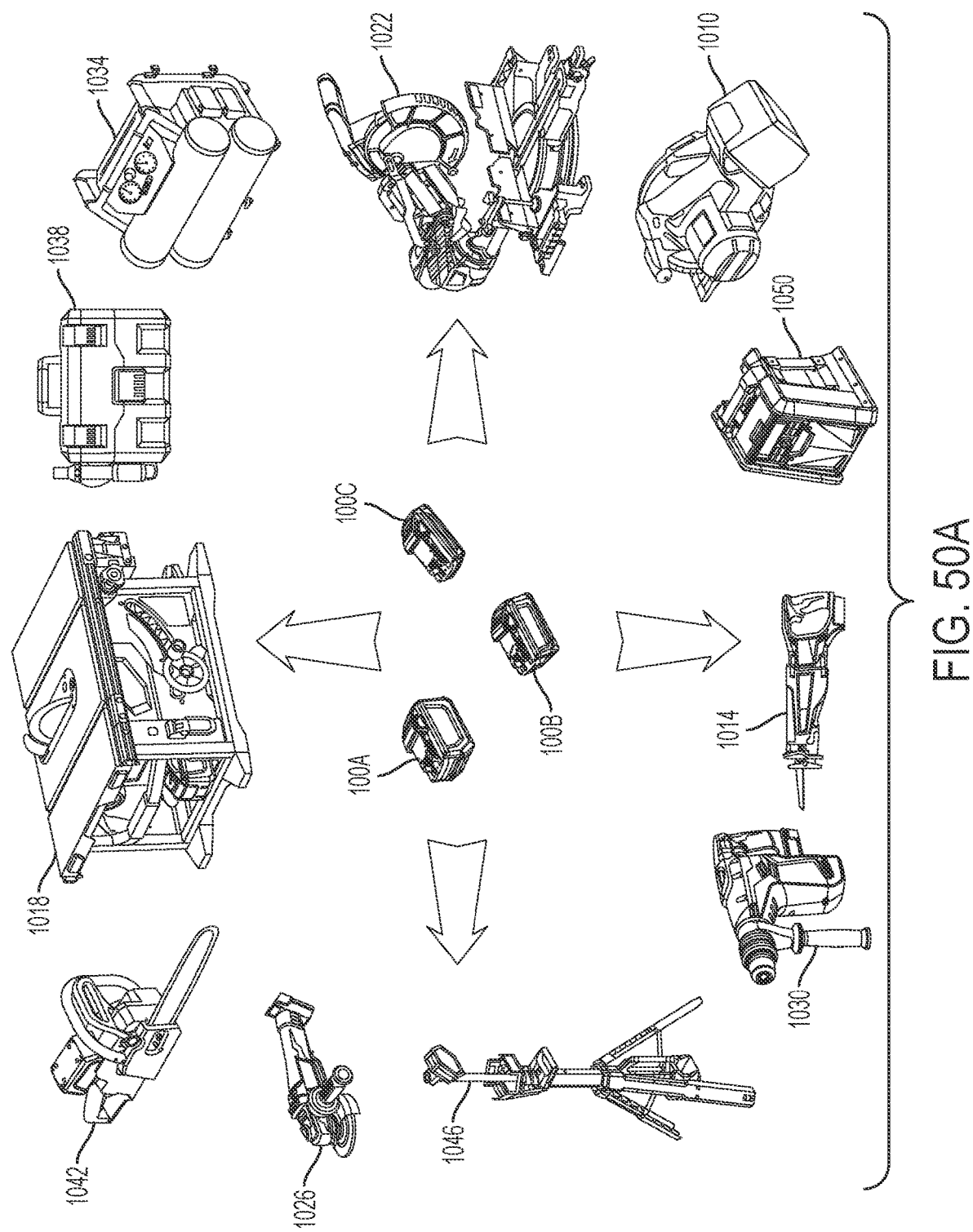
Figure 51A:
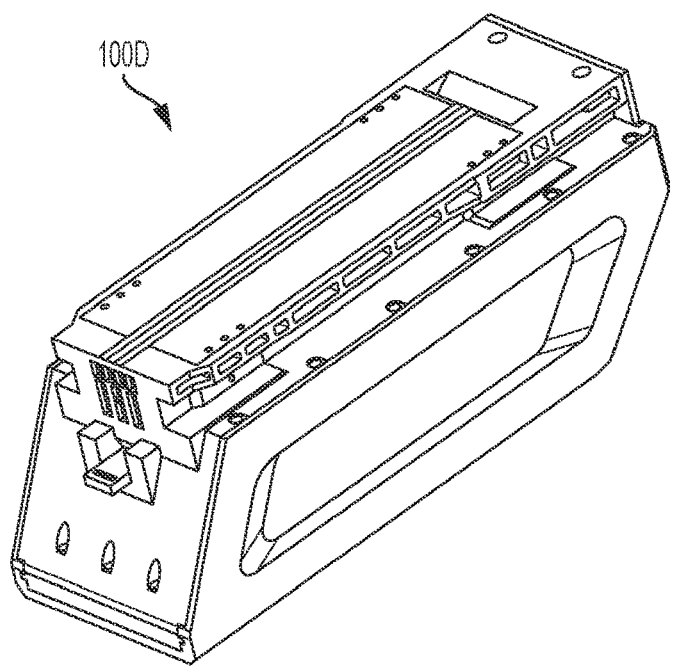
FIGS. 51A-51B are perspective views of battery packs in accordance with some embodiments.
Figure 51B:
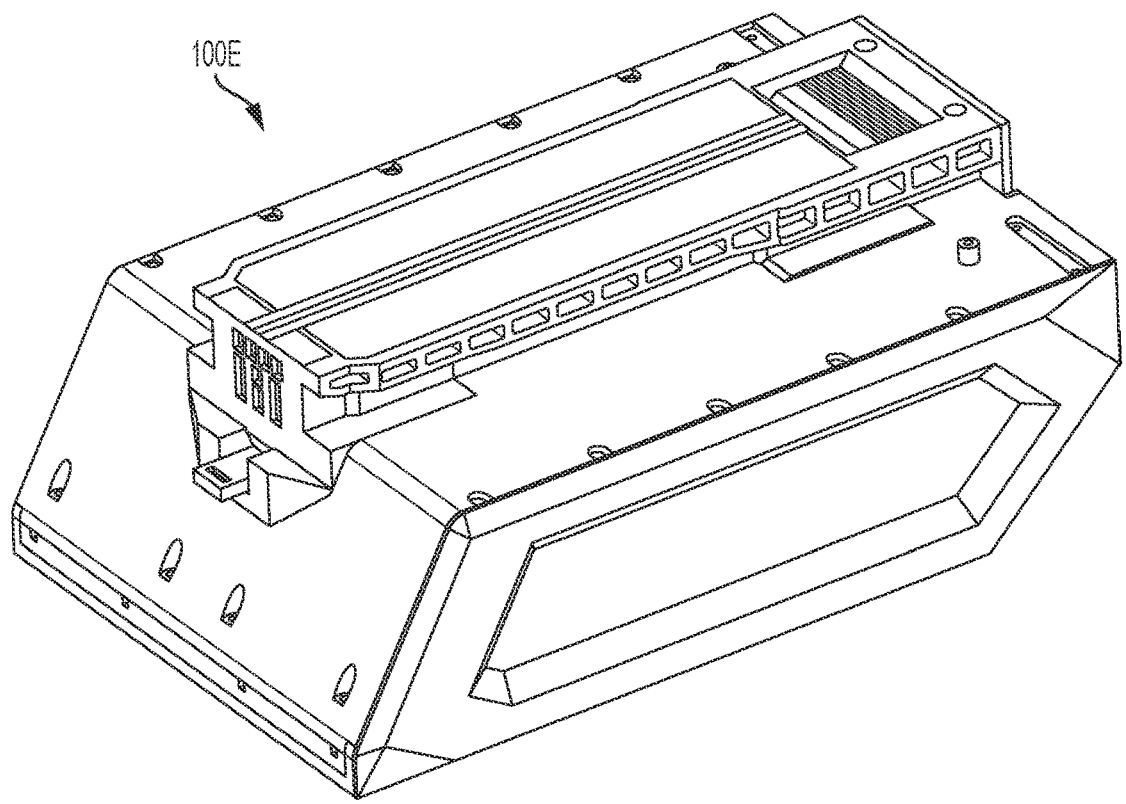
Figure 52:
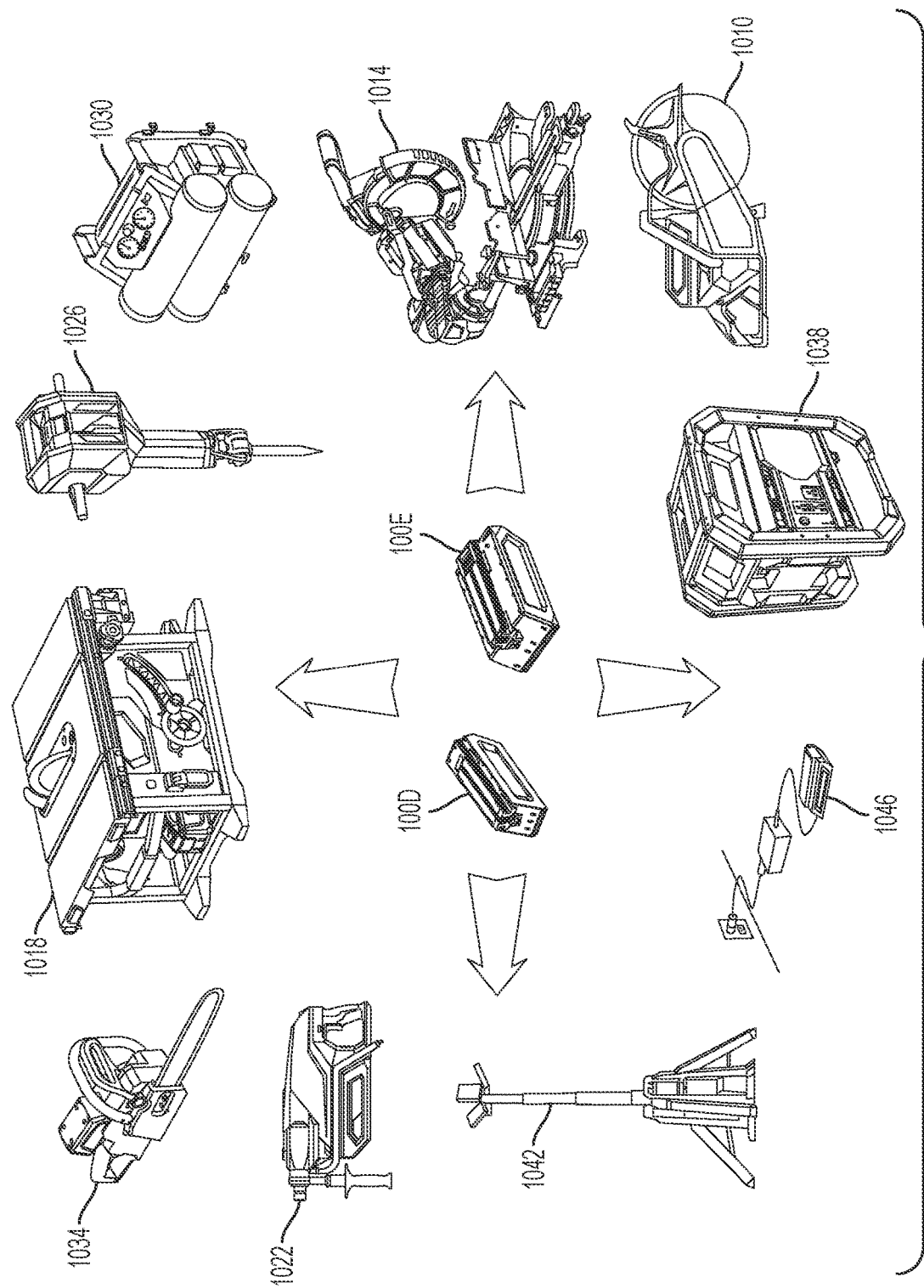
FIG. 52 illustrates an electrical system including various electrical devices operable with the battery packs of FIGS. 51A-51B.

FIGS. 49A-49C and 51A-51B illustrate several embodiments of a battery pack 100 operable to power cordless electrical devices (see FIGS. 50A-50B and 52; e.g., electrical devices, such as power tools, outdoors tools, other motorized devices, non-motorized devices, etc.).

Each battery pack 100 includes battery cells 10 having a nominal voltage (e.g., between about 3 volts (V) and about 5 V) and a nominal capacity (e.g., between about 3 Amp-hours (Ah) and about 5 Ah or more (e.g., up to about 9 Ah)). The battery cells 10 may be any rechargeable battery cell chemistry type, such as, for example, lithium (Li), lithium-ion (Li-ion), other lithium-based chemistry, nickel-cadmium (NiCd), nickel-metal hydride (NiMH), etc.

The battery pack 100 includes a number and arrangement of battery cells 10 to provide a desired output (e.g., nominal voltage, capacity, etc.). The battery pack 100 may have a nominal voltage of at least about 12 V up to about 100 V.

In FIGS. 49A-49C, the battery packs 100A-100C have a nominal voltage of between about 16 V and about 21 V, and the capacity of the battery pack 100A is about three times the capacity of the battery pack 100C (e.g., about 9 Ah compared to about 3 Ah). The battery pack 100A has an energy of between about 140 Watt-hours (Wh) and about 190 Wh, the battery pack 100B has an energy of between about 95 Wh and about 130 Wh, and the battery pack 100C has an energy of between about 45 Wh and about 65 Wh.

In FIGS. 51A-51B, the battery packs 100D-100E have a nominal voltage of between about 72 V and about 84 V, and the capacity of the battery pack 100E is about two times the capacity of the battery pack 100D (e.g., about 6 Ah compared to about 3 Ah). The battery pack 100D has an energy of between about 215 Wh and about 255 Wh, and the battery pack 100E has an energy of between about 430 Wh and about 505 Wh.

The high power battery pack 100 includes battery cells which are operable to output a sustained operating discharge current of between about 20 Amps (A) and about 130 A (e.g., between about 40 A and about 60 A, between about 60 A and 120 A, between about 80 A and about 110 A, etc.). The battery cells may be operable to output a peak discharge current up to about 200 A.

In FIGS. 49A-49C, the battery packs 100A-100C have an AC internal resistance (ACIR) within a range of approximately 18 milliohms to approximately 23 milliohms. The battery packs 100A-100C have a DC internal resistance (DCIR) within a range of approximately 15 mΩ to approximately 25 mΩ. In some embodiments, the DCIR of the battery packs 100A-100C is about 21 mΩ. In FIG. 51A, the battery pack 100D has an AC internal resistance (ACIR) within a range of approximately 150 mΩ to approximately 160 mΩ. The battery pack 100D has a DC internal resistance within a range of approximately 220 mΩ to approximately 260 mΩ. In FIG. 51B, the battery pack 100E has an AC internal resistance (ACIR) within a range of approximately 75 mΩ to approximately 80 mΩ. The battery pack 100E has a DC internal resistance within a range of approximately 130 mΩ to approximately 170 mΩ.

FIG. 49A illustrates a battery pack 100A having a "5S3P" configuration (three parallel-connected strings of five series-connected battery cells), FIG. 49B illustrates a battery pack 100B having a "5S2P" configuration (two parallel-connected strings of five series-connected battery cells), and FIG. 49C illustrates a battery pack 100C having a "5S1P" configuration (one string of five series-connected battery cells). Similar battery packs are described and illustrated in U.S. Provisional Patent Application Nos. 62/536,807, filed Jul. 25, 2017, and 62/570,828, filed Oct. 11, 2017, entitled "HIGH POWER BATTERY-POWERED SYSTEM," the entire contents of both of which are hereby incorporated by reference.

FIGS. 50A-50B illustrate high power electrical systems 1000, 1100 including various high power electrical devices for use with the battery pack 100A-100C. For example, the system 1000 includes motorized power tools (e.g., a circular saw (e.g., a worm drive saw 1010), a reciprocating saw 1014, a table saw 1018, a miter saw 1022, an angle grinder 1026, a SDS Max hammer 1030, a compressor 1034, a vacuum 1038, etc.), outdoor tools (e.g., a chain saw 1042, a string trimmer, a hedge trimmer, a blower, a lawn mower, etc.), other motorized devices (e.g., vehicles, utility carts, off-road vehicles, recreational vehicles, etc.), etc. and non-motorized electrical devices (e.g., a power supply, a light 1046, a testing device, an audio device 1050, etc.).

The system 1100 of electrical devices operable to be powered by an existing battery pack 1104 or the high-power battery pack 100A-100C. The illustrated electrical devices include various motorized power tools (e.g., a circular saw 1110, a reciprocating saw 1114, a grinder 1126, a vacuum 1138, a drill 1154, a nailer 1158, an impact driver/wrench 1162, etc.), outdoor tools (e.g., a string trimmer 1166, a hedge trimmer, a blower 1170, etc.), etc. and non-motorized electrical devices (e.g., an audio device 1150, a light 1174, a testing device, etc.).

In some constructions, the battery pack 100 has a nominal voltage of up to about 20 V (e.g., about 18 V to about 20 V), and is operable to output only between about 1000 Watts (W) to about 1400 W at a current of between about 50 Å to about 70 A. In some constructions, the battery pack 100 is operable to output high power (e.g., a peak power of about 1800 W to about 2400 W or more (2.4 horsepower (hp) to 3.0 hp or more)). In order to achieve this peak power, a high current (e.g., about 100 A or more) is discharged from the battery pack 100, through the interconnections and components to which the vapor-deposited coating 264 is applied.

FIG. 51A illustrates a battery pack 100D having a "20S1P" configuration (one string of twenty series-connected cells), and FIG. 51B illustrates a battery pack 100E having a "20S2P" (two parallel-connected strings of twenty series-connected cells). Similar battery packs are described and illustrated in U.S. Provisional Patent Application No. 62/527,735, filed Jun. 30, 2017, entitled "HIGH POWER BATTERY-POWERED SYSTEM," the entire contents of which are hereby incorporated by reference.

FIG. 52 illustrates a high power electrical system 1000 including various high power electrical devices for use with the battery packs 100D-100E. For example, the system 1000 includes hand-held devices (i.e., devices configured to be supported by an operator during use) and non-hand-held devices (i.e., devices supported on a work surface or support rather than by the operator during use. Such devices include motorized power tools (e.g., a drill, an impact driver, an impact wrench, a rotary hammer, a hammer drill, a saw (a circular saw, a cut-off saw 1010, a reciprocating saw, a miter saw 1014, a table saw 1018, etc.), a core drill 1022, a breaker 1026, a demolition hammer, a compressor 1030, a pump, etc.), outdoor tools (e.g., a chain saw 1034, a string trimmer, a hedge trimmer, a blower, a lawn mower, etc.), drain cleaning and plumbing tools, construction tools, concrete tools, other motorized devices (e.g., vehicles, utility carts, wheeled and/or self-propelled tools, etc.), etc. and non-motorized electrical devices (e.g., a power supply 1038, a light 1042, an AC/DC adapter 1046, a generator, etc.).

In other constructions, the battery pack 100D-100E has a nominal voltage of up to about 80 volts (V). In such constructions, the battery pack 100D-100E is operable to output high power (e.g., power of about 2760 W to about 3000 W or more (3.7 horsepower (hp) to 4.0 hp or more)) for sustained durations (e.g., at least 5-6 minutes or more). In order to achieve this sustained power, a high sustained current (e.g., about 50 amps (A) or more) is discharged from the battery pack 100D-100E through the interconnections and components to which the vapor-deposited coating 264 is applied.

Figure 53A:
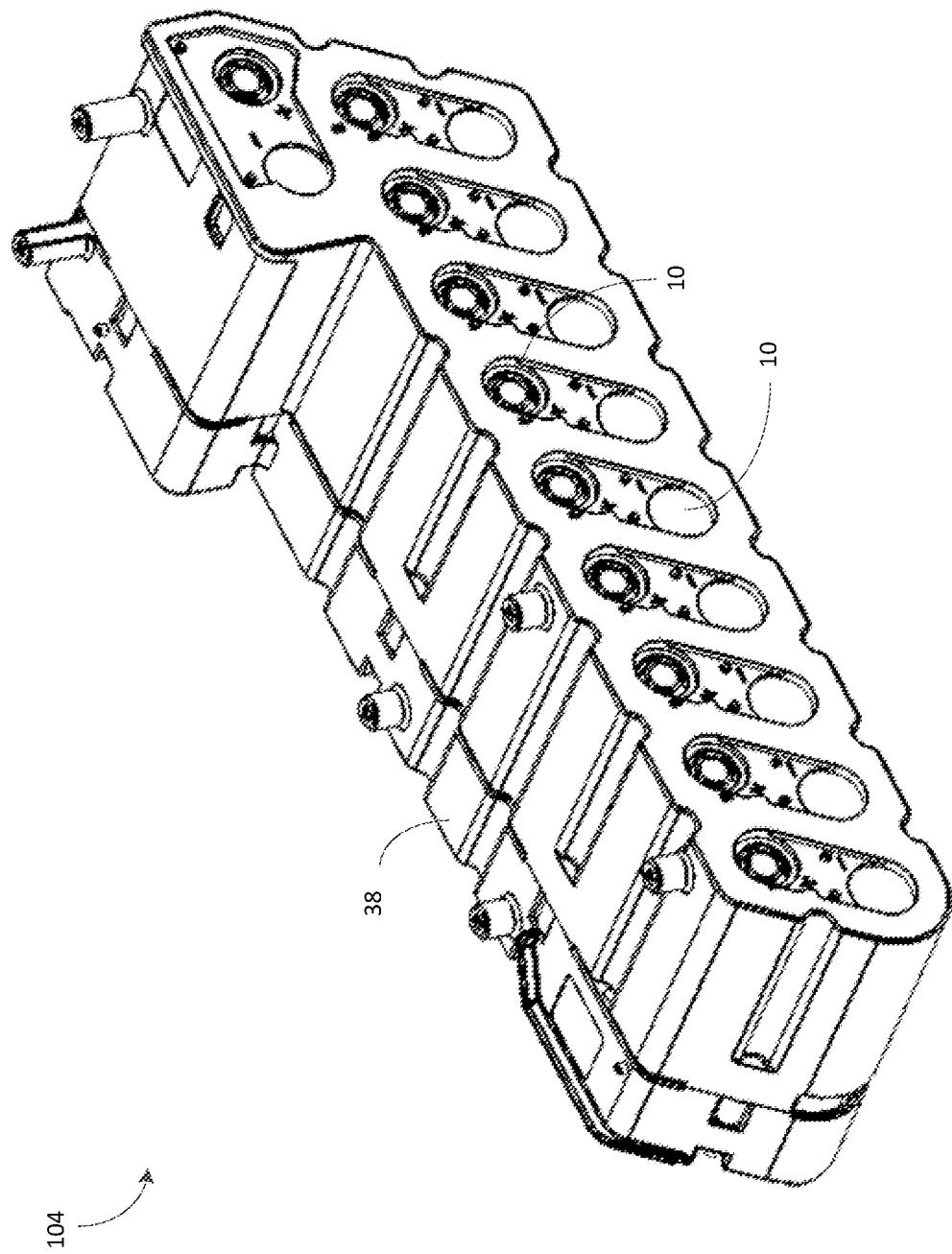
FIGS. 53A-53F are views of an assembly process of the battery pack of FIG. 51A.
Figure 53B:
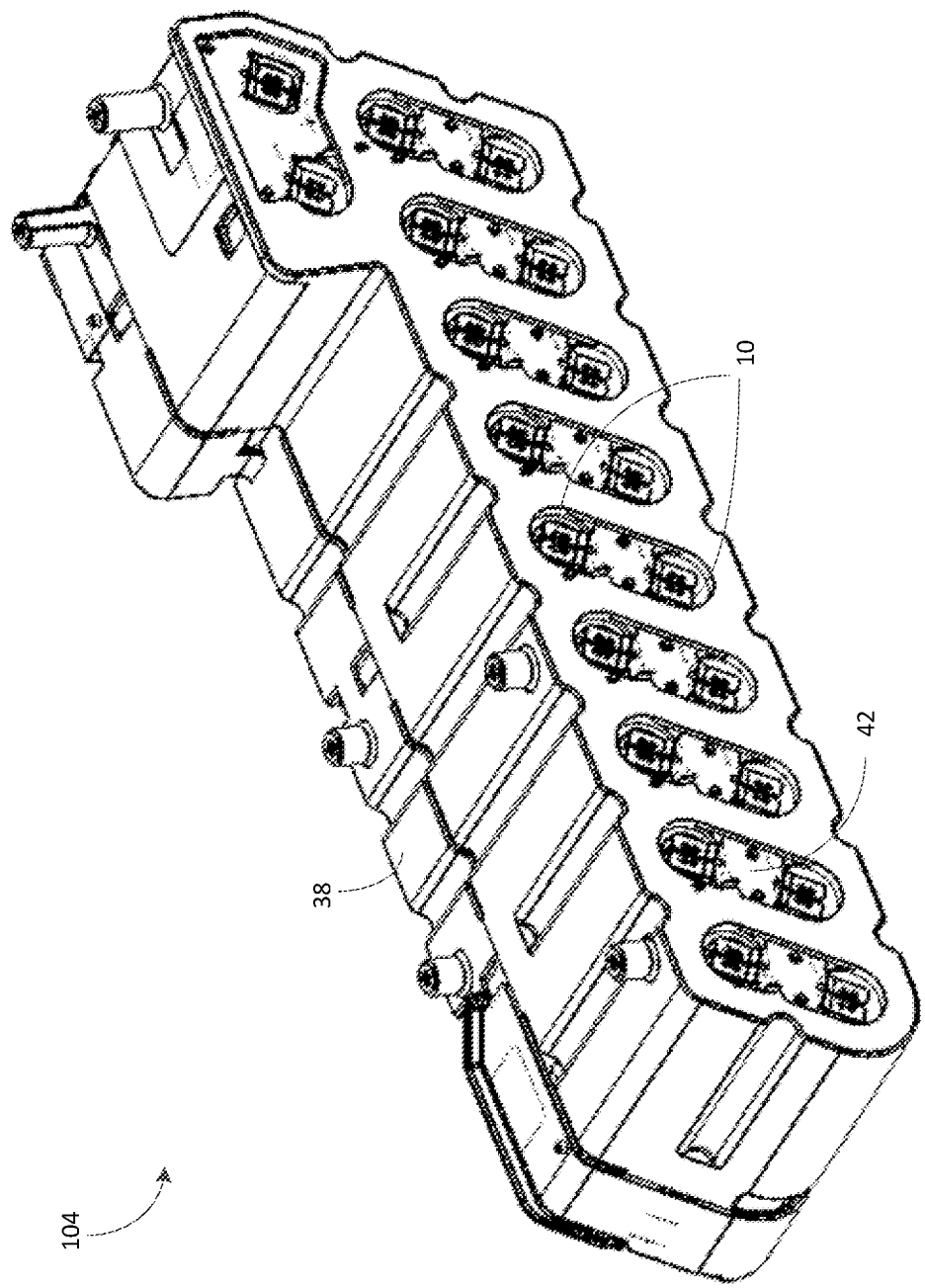
Figure 53C:
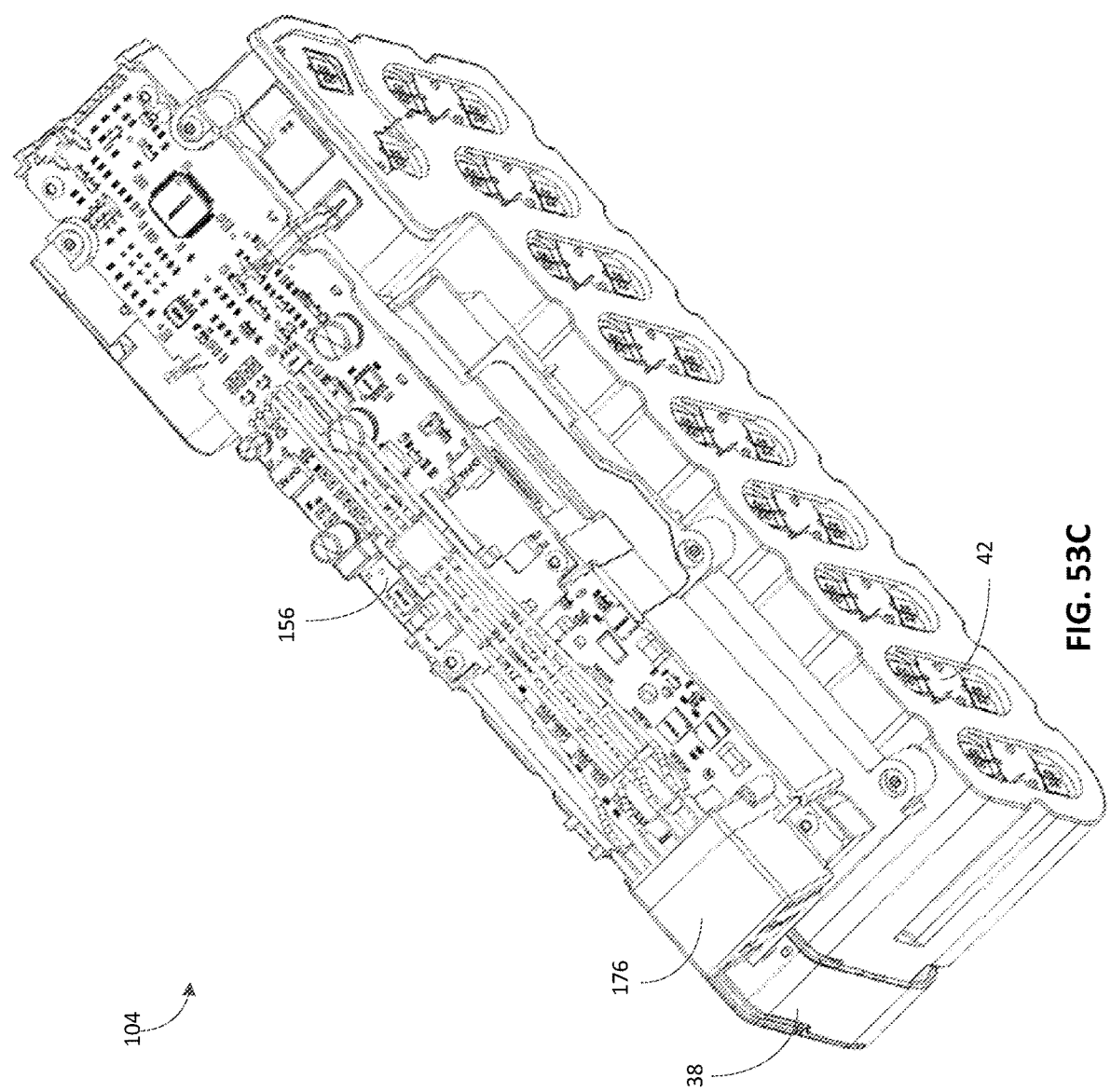

FIGS. 53A-53E illustrate an assembly process of the battery pack 100D. The assembly is performed by supporting the battery cells 10 in the core housing 38 (as shown in FIG. 53A). The conductive straps 42 are added to the battery cells 10 to connect the battery cells 10 in series or parallel (as shown in FIG. 53B). The PCBA 156 is added to the core housing 38 (as shown in FIG. 53C). The terminal block 176 may or may not be added in this step.

Figure 53D:
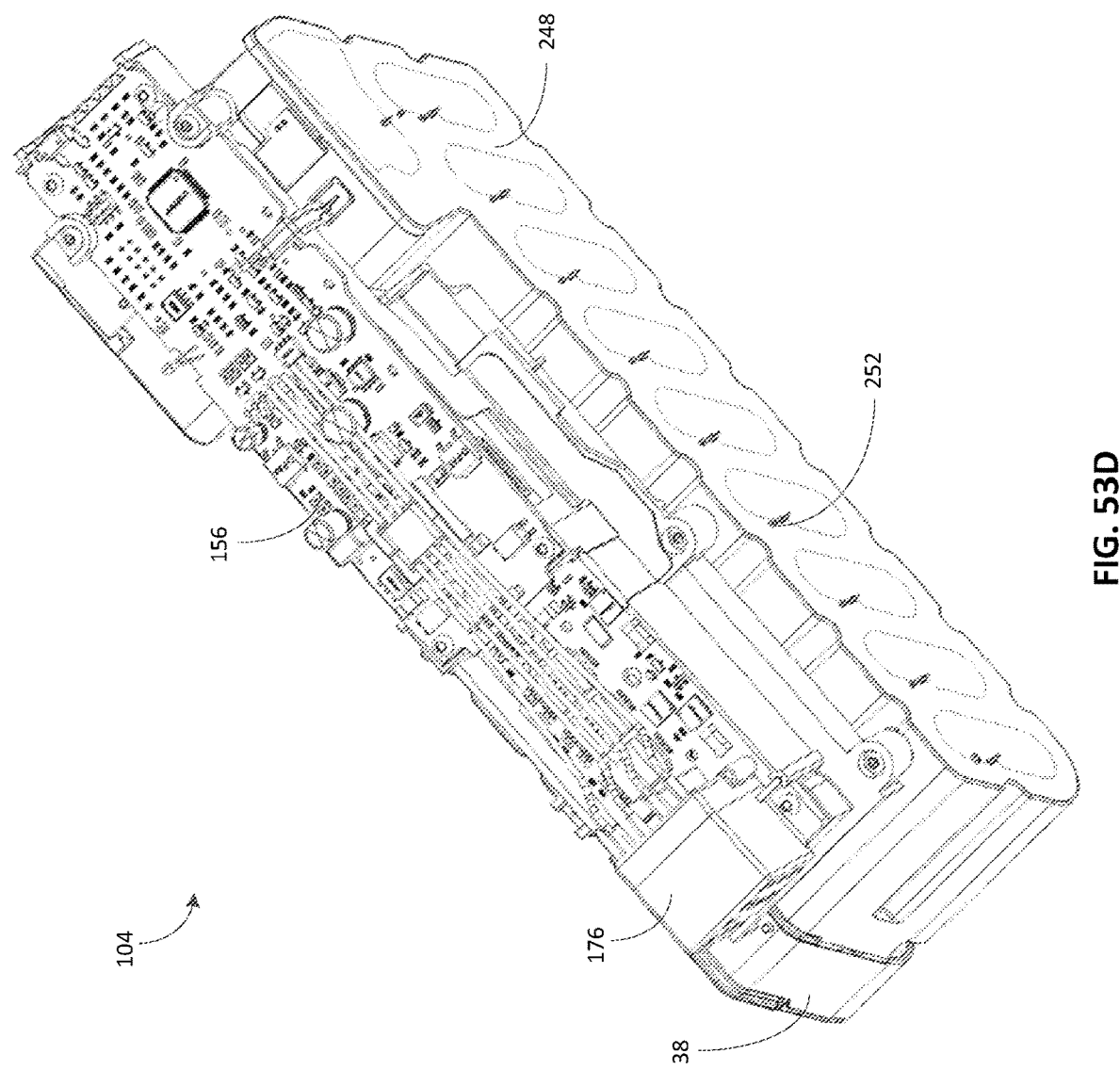
Figure 53E:
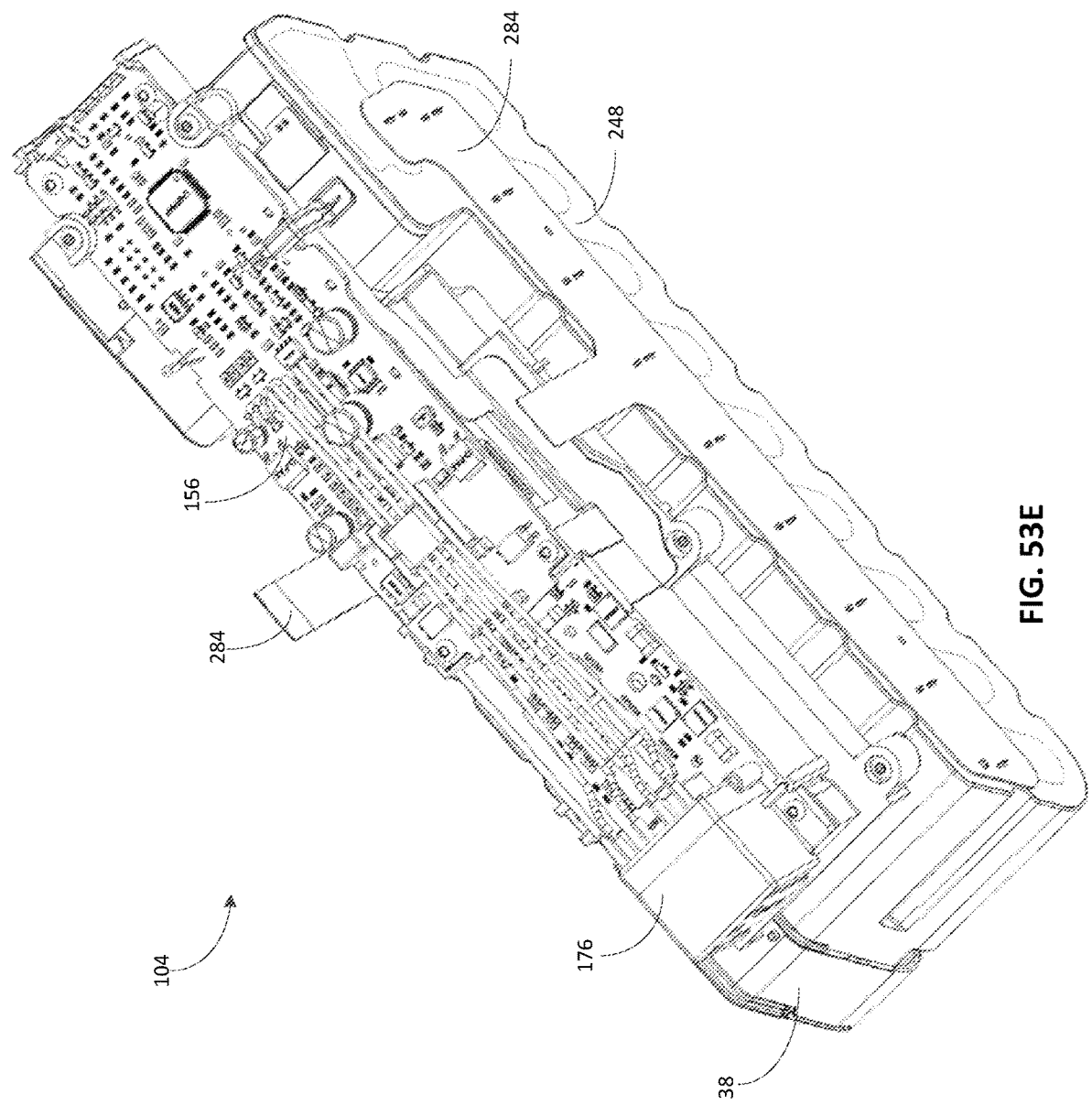
Figure 53F:
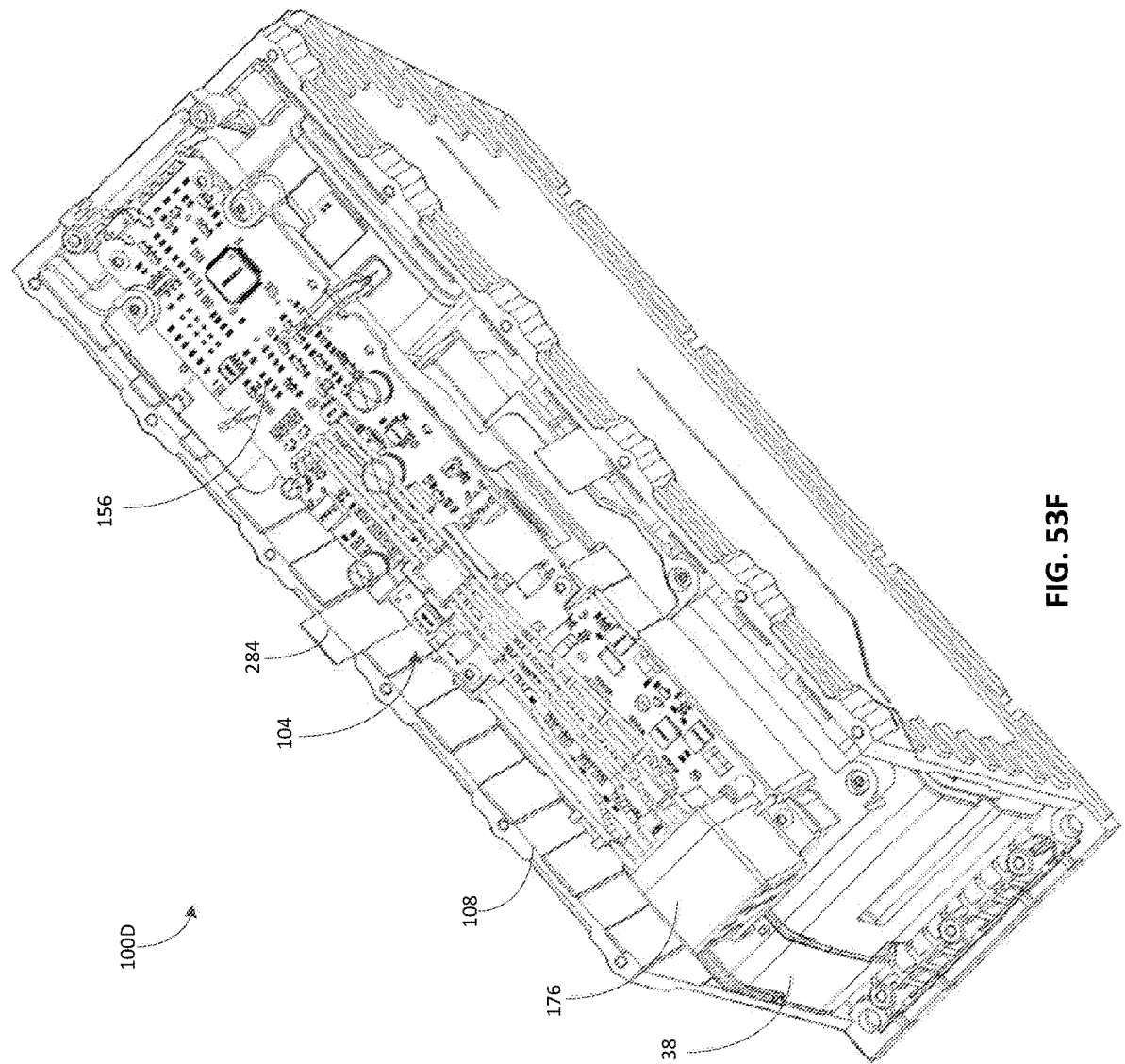

The core assembly 104 is then placed in the coating machine and the vapor-deposited coating 264 is performed as described above. Once the core assembly 104 is coated, the core seal 248 is added to the core housing 38 to seal the battery cells 10 (as shown in FIG. 53D). The core seal 248 includes cell voltage taps 252 extending outside of the core seal 248 for connection to the PCBA 156 and the terminal block 176. The flex circuits 284 are then added to the core assembly 104 to couple the battery cells 10 to the PCBA 156 and the terminal block 176 (as shown in FIG. 53E). The core assembly 104 is then placed in the battery pack housing 108 (as shown in FIG. 53F).

In some embodiments, vapor-deposited coating may be performed after adding the seal 248 and/or the flex circuits 284. In these embodiments, the terminal block 176 may be added before or after the vapor-deposited coating.

Figure 54B:
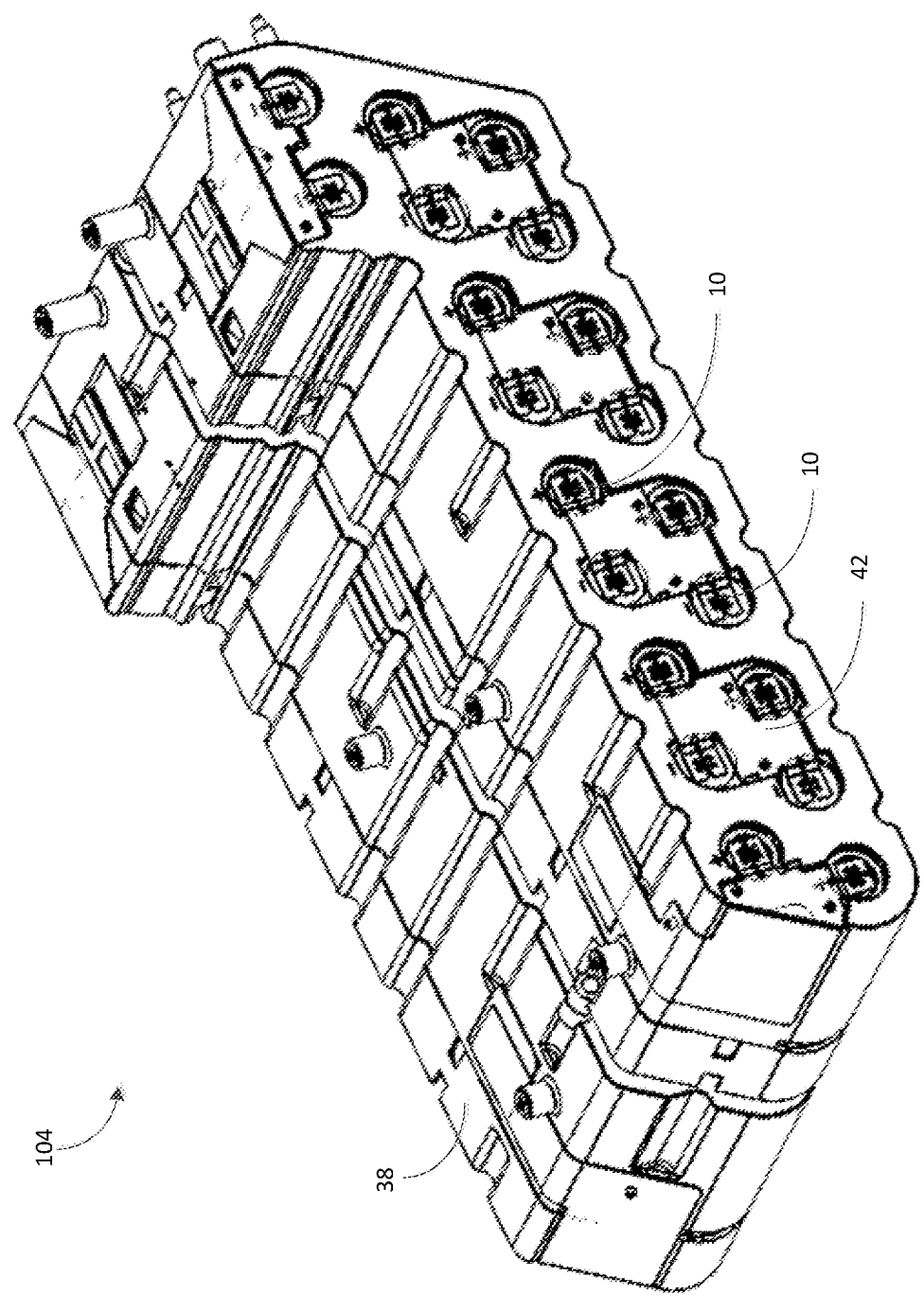
Figure 54C:
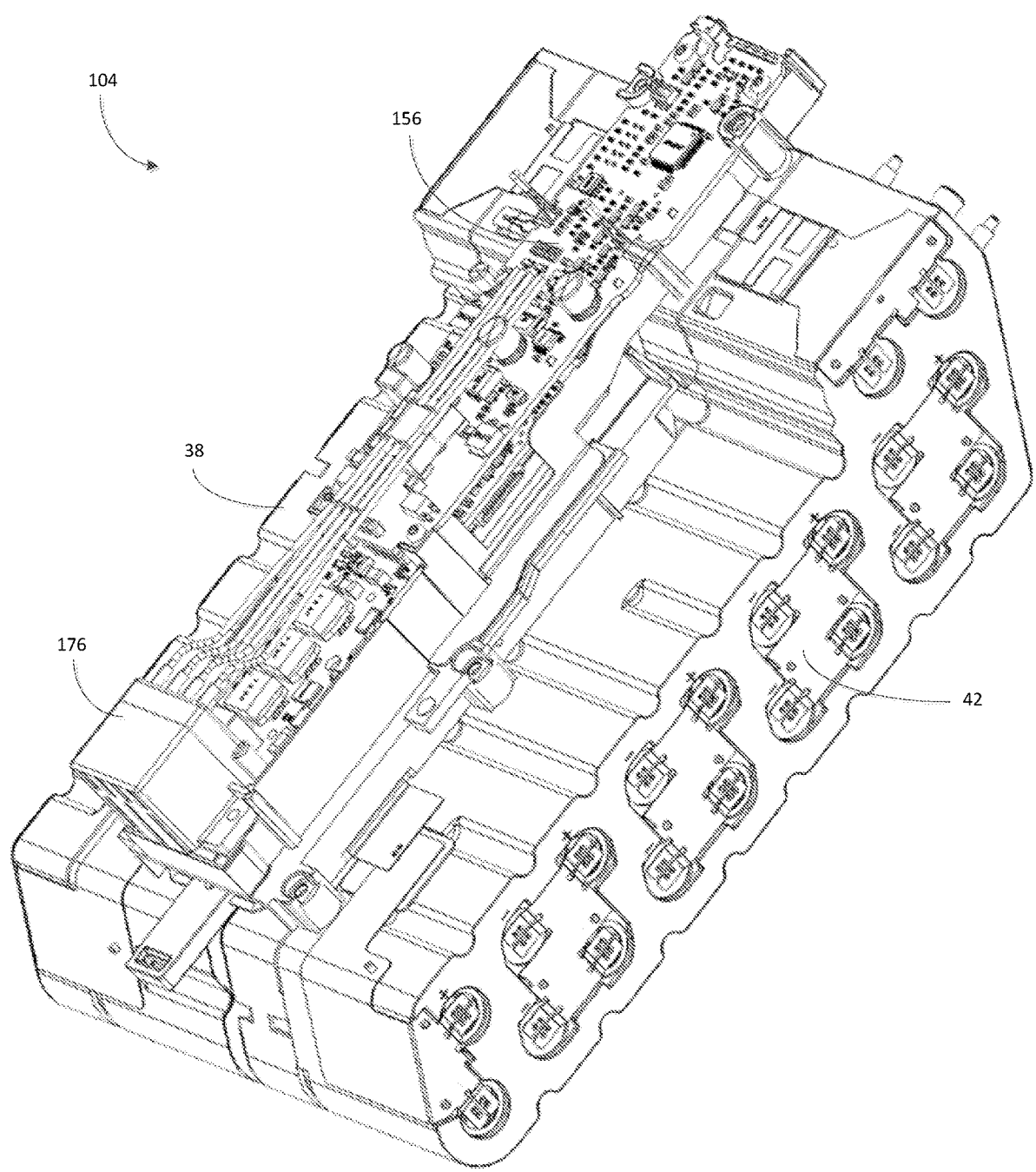

FIGS. 54A-54E similarly illustrate an assembly process of the battery pack 100E. The assembly is performed by supporting the battery cells 10 in the core housing 38 (as shown in FIG. 54A). The conductive straps 42 are added to the battery cells 10 to connect the battery cells 10 in series or parallel (as shown in FIG. 54B). The PCBA 156 is added to the core housing 38 (as shown in FIG. 54C). The terminal block 176 may or may not be added in this step.

Figure 54D:
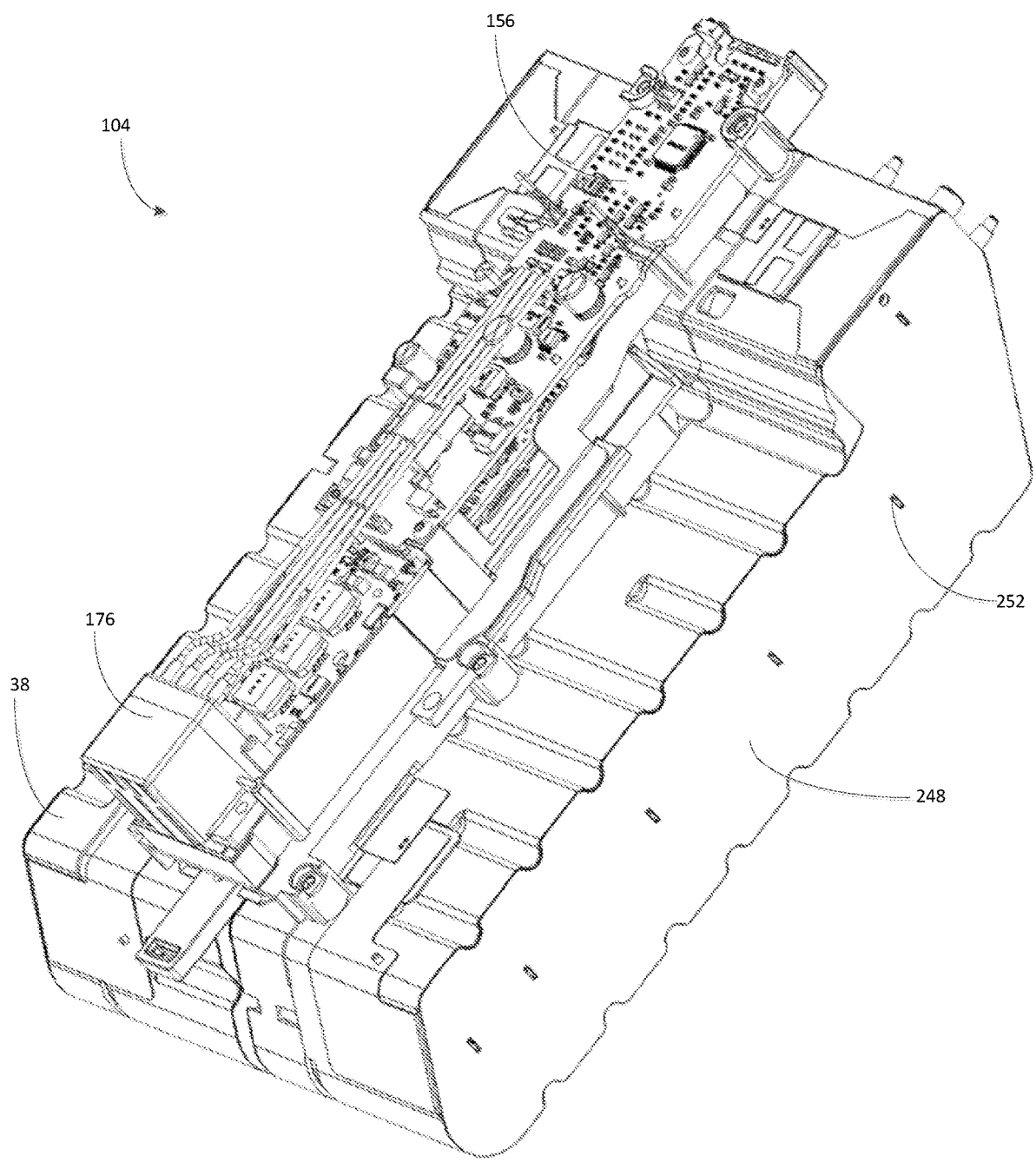
Figure 54E:
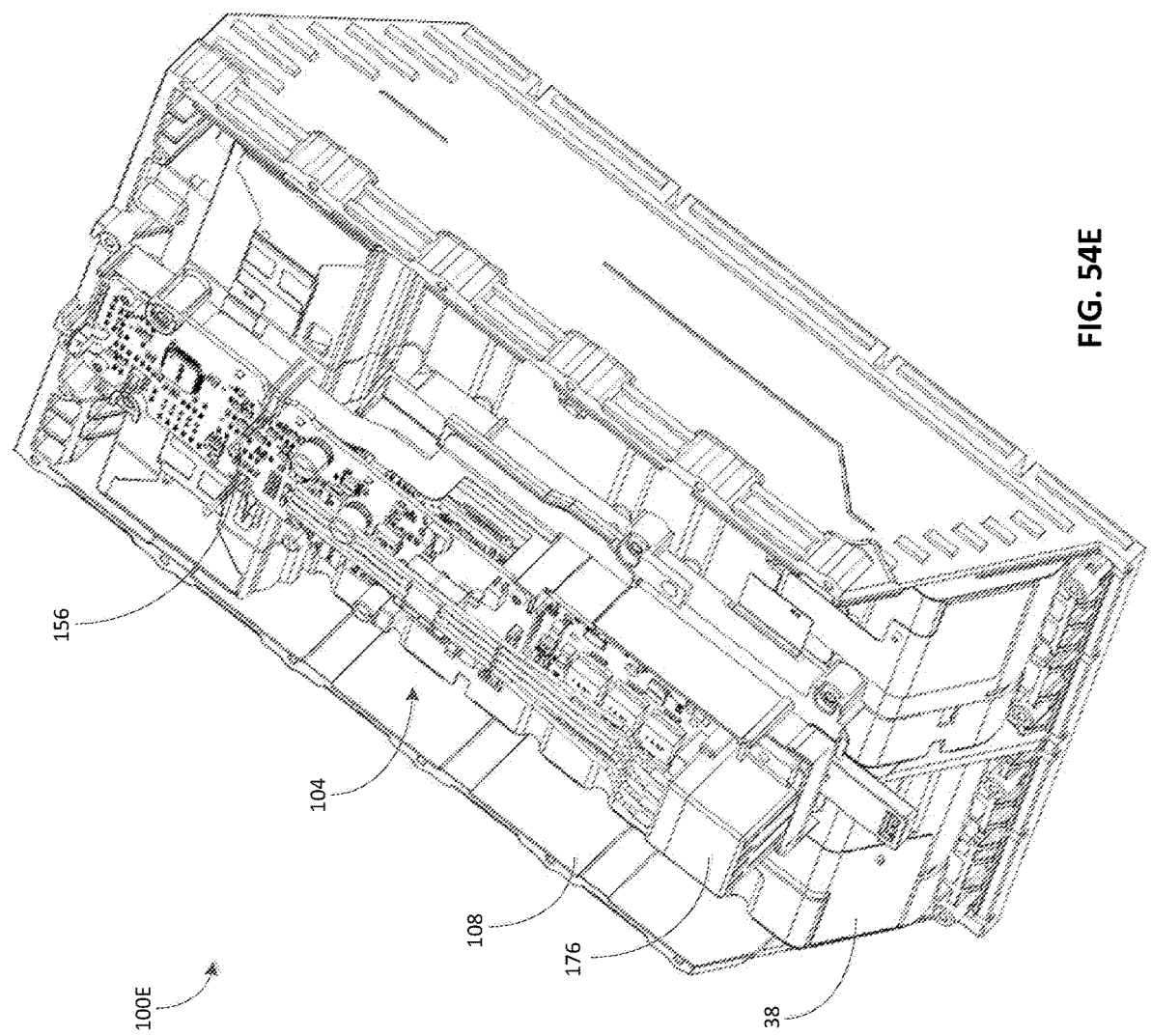

The core assembly 104 is then placed in the coating machine and the vapor-deposited coating is performed as described above. Once the core assembly 104 is coated, the core seal 248 is added to the core housing 38 to seal the battery cells 10 (as shown in FIG. 54D). The core seal 248 includes cell voltage taps 252 extending outside of the core seal 248 for connection to the PCBA 156 and the terminal block 176. The flex circuits 284 may then added to the core assembly 104 to couple the battery cells 10 to the PCBA 156 and the terminal block 176 (not shown). The core assembly 104 is then placed in the battery pack housing 108 (as shown in FIG. 54E). In some embodiments, vapor-deposited coating may be performed after adding the seal 248 and/or the flex circuits 284. In these embodiments, the terminal block 176 may be added before or after vapor-deposited coating.

Thus, the invention may provide, among other things, arrangements for inhibiting water intrusion into a battery cell 10 or cells 10 in a battery pack 100. The arrangements may include a sealing arrangement for the battery cell 100 and/or structure of the battery pack 100 operating to inhibit water intrusion.

Although the invention has been described in detail with reference to certain preferred embodiments, variations and modifications exist within the scope and spirit of one or more independent aspects of the invention as described.

One or more independent features and/or independent advantages of the invention may be set forth in the claims:

What is claimed is:

1. A water-resistance battery pack comprising:
an outer housing;
a controller operable to control an operation of the battery pack;
a terminal operable to connect to an electrical device for power transfer;
a cell module within the outer housing, the cell module including:
a module housing,
at least one battery cell supported by the module housing and including a cell header,
a water-resistant ring provided at the cell header, and
a conductive element electrically connecting the at least one battery cell to at least one of the controller and the terminal; and
an insulating sheet provided between the module housing and the outer housing.

2. The battery pack of claim 1, wherein the at least one battery cell has a cell diameter of about 18 mm and a cell length of about 65 mm.

3. The battery pack of claim 1, wherein the module housing includes a wall with a surface facing the outer housing, a clearance provided between the surface and the outer housing to limit an area of engagement between the outer housing and the surface.

4. The battery pack of claim 1, further comprising a protective film applied to at least a portion of the conductive element.

5. The battery pack of claim 1, further comprising a plurality of battery cells including the at least one battery cell, the plurality of battery cells supported by the module housing, wherein the battery pack is configured to output a rated voltage of 36 Volts to the electrical device.

6. The battery pack of claim 5, wherein the plurality of battery cells have an energy of at least 60 Watt-hours.

7. The battery pack of claim 1, further comprising at least one drain hole provided in the bottom portion of the outer housing.

8. The battery pack of claim 1, wherein the water-resistant ring includes a gasket.

9. The battery pack of claim 1, wherein the water-resistant ring seals an interface between the at least one battery cell and the conductive element.

10. A water-resistant battery pack comprising:
a housing;
a terminal operable to connect to an electrical device for power transfer;
a battery cell supported by the housing and including a cell header, the battery cell having a rated voltage of 3.6 V, the battery cell having a capacity between 2 Ah and 5 Ah;
a water-resistant ring providing a water-resistant seal at an interface of the cell header;
a conductive element electrically connecting the battery cell to the terminal; and
an insulating sheet provided between the conductive element and the housing.

11. The battery pack of claim 10, wherein the at least one battery cell has a cell diameter of about 18 mm and a cell length of about 65 mm.

12. The battery pack of claim 10, further comprising a protective film applied to at least a portion of the conductive element.

13. The battery pack of claim 10, further comprising a plurality of battery cells including the battery cell, the plurality of battery cells supported by the housing, wherein the battery pack is configured to output a rated voltage of 36 Volts to the electrical device.

14. The battery pack of claim 13, wherein the plurality of battery cells have an energy of at least 60 Watt-hours.

15. The battery pack of claim 10, further comprising at least one drain hole provided in the bottom portion of the housing.

16. The battery pack of claim 10, wherein the water-resistant ring includes a gasket.

17. The battery pack of claim 10, wherein the water-resistant ring seals an interface between the at least one battery cell and the conductive element.

18. A water-resistance battery pack comprising:
an outer housing;
a controller operable to control an operation of the battery pack;
a terminal operable to connect to an electrical device for power transfer;
a cell module within the outer housing, the cell module including:
a module housing, at least one battery cell supported by the module housing and including a cell header, a water-resistant ring provided at the cell header, a conductive element electrically connecting the at least one battery cell to at least one of the controller and the terminal, and a protective film applied to at least a portion of the conductive element; and an insulating sheet provided between the module housing and the outer housing.

19. The battery pack of claim 18, wherein the module housing includes a wall with a surface facing the outer housing, a clearance provided between the surface and the outer housing to limit an area of engagement between the outer housing and the surface.

20. The battery pack of claim 18, further comprising a plurality of battery cells including the at least one battery cell, the plurality of battery cells supported by the module housing, wherein the battery pack is configured to output a rated voltage of 36 Volts to the electrical device.

21. The battery pack of claim 20, wherein the plurality of battery cells have an energy of at least 60 Watt-hours.

22. The battery pack of claim 18, further comprising at least one drain hole provided in the bottom portion of the outer housing.

23. The battery pack of claim 18, wherein the water-resistant ring includes a gasket.

24. The battery pack of claim 18, wherein the water-resistant ring seals an interface between the at least one battery cell and the conductive element.

25. A water-resistant battery pack comprising:

a housing;

a terminal operable to connect to an electrical device for power transfer;

a battery cell supported by the housing and including a cell header, the battery cell having a rated voltage of 3.6 V, the battery cell having a capacity between 2 Ah and 5 Ah;

a water-resistant ring providing a water-resistant seal at an interface of the cell header;

a conductive element electrically connecting the battery cell to the terminal;

a protective film applied to at least a portion of the conductive element; and an insulating sheet provided between the conductive element and the housing.

26. The battery pack of claim 25, further comprising at least one drain hole provided in the bottom portion of the housing.

27. The battery pack of claim 25, further comprising a plurality of battery cells including the battery cell, the plurality of battery cells supported by the housing, wherein the battery pack is configured to output a rated voltage of 36 Volts to the electrical device.

28. The battery pack of claim 27, further comprising at least one drain hole provided in the bottom portion of the housing.

29. The battery pack of claim 25, wherein the water-resistant ring includes a gasket.

30. The battery pack of claim 25, wherein the water-resistant ring seals an interface between the at least one battery cell and the conductive element.

* * * * *